(12) United States Patent
Kilgariff et al.

(10) Patent No.: US 6,778,181 B1
(45) Date of Patent: Aug. 17, 2004

(54) GRAPHICS PROCESSING SYSTEM HAVING A VIRTUAL TEXTURING ARRAY

(75) Inventors: Emmett M. Kilgariff, San Jose, CA (US); Dane T. Mrazek, Redwood City, CA (US)

(73) Assignee: NVIDIA Corporation, Santa Clara, CA (US)

( * ) Notice: Subject to any disclaimer, the term of this patent is extended or adjusted under 35 U.S.C. 154(b) by 263 days.

(21) Appl. No.: 10/012,895

(22) Filed: Dec. 7, 2001

Related U.S. Application Data

(60) Provisional application No. 60/254,022, filed on Dec. 7, 2000.

(51) Int. Cl.$^7$ .............................................. G09G 5/00
(52) U.S. Cl. ................................................... 345/582
(58) Field of Search ............................. 345/631, 582, 345/506, 428, 558, 530, 501

(56) References Cited

U.S. PATENT DOCUMENTS

| | | | | |
|---|---|---|---|---|
| 4,996,666 A | | 2/1991 | Duluk, Jr. ..................... | 365/49 |
| 5,535,288 A | | 7/1996 | Chen et al. ................... | 382/236 |
| 5,572,634 A | | 11/1996 | Duluk, Jr. ..................... | 395/119 |
| 5,574,835 A | | 11/1996 | Duluk, Jr. et al. ........... | 395/121 |
| 5,596,686 A | | 1/1997 | Duluk, Jr. ..................... | 395/122 |
| 5,669,010 A | | 9/1997 | Duluk, Jr. ............... | 395/800.22 |
| 5,977,987 A | | 11/1999 | Duluk, Jr. ..................... | 345/441 |
| 6,181,352 B1 | * | 1/2001 | Kirk et al. ................... | 345/506 |
| 6,229,553 B1 | | 5/2001 | Duluk, Jr. et al. ........... | 345/506 |
| 6,268,875 B1 | | 7/2001 | Duluk, Jr. et al. ........... | 345/506 |
| 6,285,378 B1 | | 9/2001 | Duluk, Jr. ..................... | 345/441 |
| 6,288,730 B1 | | 9/2001 | Duluk, Jr. et al. ........... | 345/552 |
| 6,297,833 B1 | * | 10/2001 | Ho et al. ...................... | 345/582 |
| 6,333,744 B1 | * | 12/2001 | Kirk et al. ................... | 345/506 |
| 6,462,743 B1 | * | 10/2002 | Battle ........................... | 345/506 |
| 6,501,474 B1 | * | 12/2002 | Thomson et al. ............ | 345/581 |
| 6,532,013 B1 | | 3/2003 | Papakipos et al. .......... | 345/426 |

FOREIGN PATENT DOCUMENTS

| | | | |
|---|---|---|---|
| WO | 93/23816 | 11/1993 | ......... G06F/15/334 |
| WO | 97/05575 | 2/1997 | ........... G06T/15/00 |
| WO | 97/05576 | 2/1997 | ........... G06T/15/00 |
| WO | 00/10372 | 3/2000 | |
| WO | 00/11562 | 3/2000 | ........... G06F/15/00 |
| WO | 00/11602 | 3/2000 | |
| WO | 00/11603 | 3/2000 | |
| WO | 00/11604 | 3/2000 | |
| WO | 00/11605 | 3/2000 | |
| WO | 00/11607 | 3/2000 | ............. G06T/1/20 |
| WO | 00/11613 | 3/2000 | ........... G06T/15/00 |
| WO | 00/11614 | 3/2000 | ........... G06T/17/00 |
| WO | 00/19377 | 4/2000 | ........... G06T/15/00 |

* cited by examiner

*Primary Examiner*—Kee M. Tung
(74) *Attorney, Agent, or Firm*—Silicon Valley IP Group, PC; Kevin J. Zilka

(57) ABSTRACT

A graphics processing system is provided. The graphics processing system includes a front end module for receiving pixel data. A setup unit is coupled to the front end module and generates parameter coefficients. A raster unit is coupled to the setup unit and generates stepping information. A virtual texturing array engine textures and colors the pixel data based on the parameter coefficients and stepping information. Also provided is a pixel engine adapted for processing the textured and colored pixel data received from the virtual texturing array engine.

21 Claims, 175 Drawing Sheets

300

|  | SGRAM or AGP Texture Memory | | | | | | Texture Palette | | | |
|---|---|---|---|---|---|---|---|---|---|---|
|  | A | R | G | B | I | palette index | A | R | G | B |
| RGB332 |  | 3 | 3 | 2 |  |  |  |  |  |  |
| A8 | 8 |  |  |  |  |  |  |  |  |  |
| I8 |  |  |  |  | 8 |  |  |  |  |  |
| AI44 | 4 |  |  |  | 4 |  |  |  |  |  |
| RGB Palette |  |  |  |  |  | 8 |  | 8 | 8 | 8 |
| ARGB Palette |  |  |  |  |  | 8 | 6 | 6 | 6 | 6 |

|  | SGRAM or AGP Texture Memory | | | | | | Texture Palette | | | |
|---|---|---|---|---|---|---|---|---|---|---|
|  | A | R | G | B | I | palette index | A | R | G | B |
| RGB565 |  | 5 | 6 | 5 |  |  |  |  |  |  |
| ARGB8332 | 8 | 3 | 3 | 2 |  |  |  |  |  |  |
| ARGB1555 | 1 | 5 | 5 | 5 |  |  |  |  |  |  |
| ARGB4444 | 4 | 4 | 4 | 4 |  |  |  |  |  |  |
| AI88 | 8 |  |  |  | 8 |  |  |  |  |  |
| A & RGB Palette | 8 |  |  |  |  | 8 |  | 8 | 8 | 8 |

|  | SGRAM or AGP Texture Memory (~ effective bits) | | | | | | Texture Palette | | | |
|---|---|---|---|---|---|---|---|---|---|---|
|  | A | R | G | B | I | palette index | A | R | G | B |
| ARGB8888 (32 bit) | 8 | 8 | 8 | 8 |  |  |  |  |  |  |
| Compressed Texture | ~8 | ~8 | ~8 | ~8 |  |  |  |  |  |  |
| Compressed Render |  | ~8 | ~8 | ~8 |  |  |  |  |  |  |
| YUYV422 |  | ~8 | ~8 | ~8 |  |  |  |  |  |  |
| UYVY422 |  | ~8 | ~8 | ~8 |  |  |  |  |  |  |

| Recursive Texturing Examples | Texture Recursion Push and Pop Programming | | | | | | | | |
|---|---|---|---|---|---|---|---|---|---|
| | texture # | 7 | 6 | 5 | 4 | 3 | 2 | 1 | 0 |
| Simple Recursion | | | | | | | | | |
| 1. recursion:<br>• T1>T0 | push[7:0]<br>pop[7:0] | 0<br>* | 0<br>0 | 0<br>0 | 0<br>0 | 0<br>0 | 0<br>0 | 1<br>0 | *<br>1 |
| 2. recursion & composite:<br>• T2>T1#T0 | push[7:0]<br>pop[7:0] | 0<br>* | 0<br>0 | 0<br>0 | 0<br>0 | 0<br>0 | 1<br>0 | 0<br>1 | *<br>0 |
| 3. composite & recursion:<br>• T2#T1>T0 | push[7:0]<br>pop[7:0] | 0<br>* | 0<br>0 | 0<br>0 | 0<br>0 | 0<br>0 | 0<br>0 | 1<br>0 | *<br>1 |
| 4. extreme com-rec-com:<br>• T7#T6#T5#T4>T3#T2#T1#T0 | push[7:0]<br>pop[7:0] | 0<br>* | 0<br>0 | 0<br>0 | 1<br>0 | 0<br>1 | 0<br>0 | 0<br>0 | *<br>0 |
| Parallel Recursion | | | | | | | | | |
| 5. two recursions & composite:<br>• (T3>T1)#(T2>T0) | push[7:0]<br>pop[7:0] | 0<br>* | 0<br>0 | 0<br>0 | 0<br>0 | 1<br>0 | 1<br>0 | 0<br>1 | *<br>1 |
| 6. two com-rec & composite:<br>• (T5#T4>T1)#(T3#T2>T0) | push[7:0]<br>pop[7:0] | 0<br>* | 0<br>0 | 0<br>0 | 1<br>0 | 0<br>0 | 1<br>0 | 0<br>1 | *<br>1 |
| 7. two rec-com & accumulate:<br>• (T5>T3#T2)+(T4>T1#T0) | push[7:0]<br>pop[7:0] | 0<br>* | 0<br>0 | 1<br>0 | 1<br>0 | 0<br>1 | 0<br>0 | 0<br>1 | *<br>0 |
| 8. extreme com-rec-com & accumulate:<br>• (T7#T6>T3#T2)+(T5#T4>T1#T0) | push[7:0]<br>pop[7:0] | 0<br>* | 1<br>0 | 0<br>0 | 1<br>0 | 0<br>1 | 0<br>0 | 0<br>1 | *<br>0 |
| Serial Recursion | | | | | | | | | |
| 9. rec-rec & composite:<br>• T3>T2>T1#T0 | push[7:0]<br>pop[7:0] | 0<br>* | 0<br>0 | 0<br>0 | 0<br>0 | 1<br>0 | 1<br>1 | 0<br>1 | *<br>0 |
| 10. com-rec-rec & composite:<br>• T5#T4>T3#T2>T1#T0 | push[7:0]<br>pop[7:0] | 0<br>* | 0<br>0 | 0<br>0 | 1<br>0 | 0<br>1 | 1<br>0 | 0<br>1 | *<br>0 |
| 11. extreme rec-rec & composite:<br>• T7>T6>T5>T4>T2#T1#T0 | push[7:0]<br>pop[7:0] | 1<br>* | 1<br>1 | 1<br>1 | 1<br>1 | 0<br>1 | 0<br>0 | 0<br>0 | *<br>0 |
| Parallel Serial Recursion | | | | | | | | | |
| 12. two rec-rec & composite:<br>• (T5>T3>T1)#(T4>T2>T0) | push[7:0]<br>pop[7:0] | 0<br>* | 0<br>0 | 1<br>0 | 1<br>0 | 1<br>1 | 1<br>1 | 0<br>1 | *<br>1 |
| 13. two com-rec-rec & composite:<br>• (T7#T6>T3>T1)#(T5#T4>T2>T0) | push[7:0]<br>pop[7:0] | 0<br>* | 1<br>0 | 0<br>0 | 1<br>0 | 1<br>1 | 1<br>1 | 0<br>1 | *<br>1 |
| 14. two com-rec-rec & composite:<br>• (T7>T5>T3#T2)+(T6>T4>T1#T0) | push[7:0]<br>pop[7:0] | 1<br>* | 1<br>0 | 1<br>1 | 1<br>1 | 0<br>1 | 0<br>1 | 0<br>0 | *<br>0 |

Note1: accumulates "+" are indicated in the above examples to identify recursion operations where combine math may or may not be possible because the composite texture iterations are non-adjacent (see examples 7, 8 & 14).

Note2: recursion pushes may be limited to 4 pushes per bundle, this may result in a limit to the extreme recursion-recursion case (see example 11).

Fig. 11

Example: (T7 # T6 > T3 # T2) + (T5 # T4 > T1 # T0)

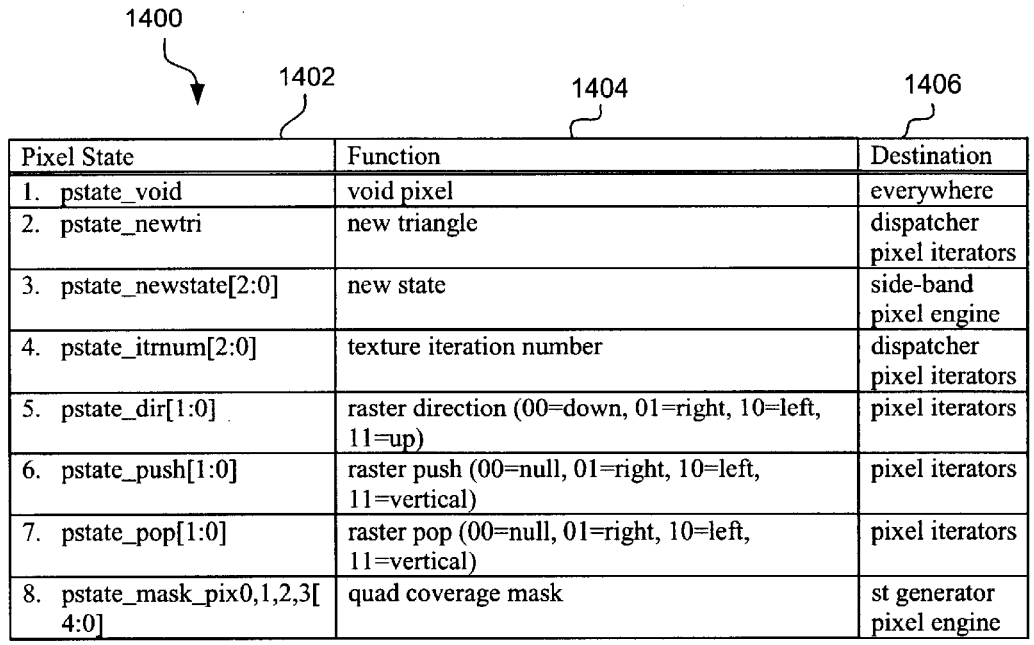

| Pixel State | Function | Destination |
|---|---|---|
| 1. pstate_void | void pixel | everywhere |
| 2. pstate_newtri | new triangle | dispatcher pixel iterators |
| 3. pstate_newstate[2:0] | new state | side-band pixel engine |
| 4. pstate_itrnum[2:0] | texture iteration number | dispatcher pixel iterators |
| 5. pstate_dir[1:0] | raster direction (00=down, 01=right, 10=left, 11=up) | pixel iterators |
| 6. pstate_push[1:0] | raster push (00=null, 01=right, 10=left, 11=vertical) | pixel iterators |
| 7. pstate_pop[1:0] | raster pop (00=null, 01=right, 10=left, 11=vertical) | pixel iterators |
| 8. pstate_mask_pix0,1,2,3[4:0] | quad coverage mask | st generator pixel engine |

Fig. 14

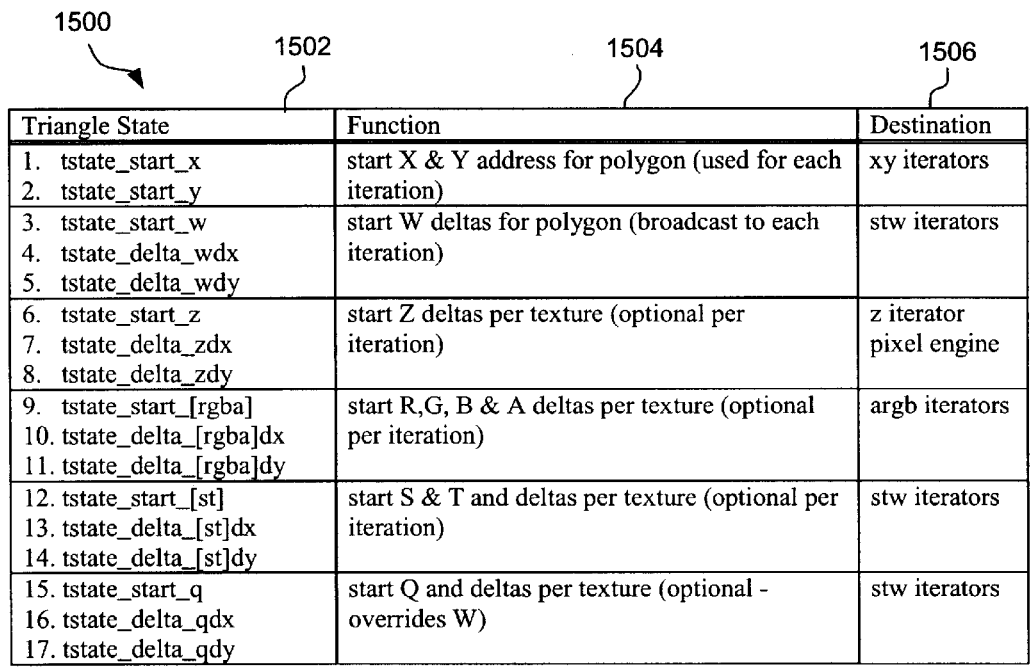

| Triangle State | Function | Destination |
|---|---|---|
| 1. tstate_start_x<br>2. tstate_start_y | start X & Y address for polygon (used for each iteration) | xy iterators |
| 3. tstate_start_w<br>4. tstate_delta_wdx<br>5. tstate_delta_wdy | start W deltas for polygon (broadcast to each iteration) | stw iterators |
| 6. tstate_start_z<br>7. tstate_delta_zdx<br>8. tstate_delta_zdy | start Z deltas per texture (optional per iteration) | z iterator pixel engine |
| 9. tstate_start_[rgba]<br>10. tstate_delta_[rgba]dx<br>11. tstate_delta_[rgba]dy | start R,G, B & A deltas per texture (optional per iteration) | argb iterators |
| 12. tstate_start_[st]<br>13. tstate_delta_[st]dx<br>14. tstate_delta_[st]dy | start S & T and deltas per texture (optional per iteration) | stw iterators |
| 15. tstate_start_q<br>16. tstate_delta_qdx<br>17. tstate_delta_qdy | start Q and deltas per texture (optional - overrides W) | stw iterators |

Fig. 15

1600

| Mode State – Per VTA (1 each) | Function | Destination Unit ||||||||||
|---|---|---|---|---|---|---|---|---|---|---|---|
| | | TA |||||| TD ||||
| | | D I S | S T G | L O D | K E R | T A D | | F L T | C O M | A C C | |
| ta_control[22:0] | Texture iteration and recursive control. | D I S | S T G | L O D | K E R | T A D | | F L T | C O M | A C C | |
| • ta_num_tex[2:0] | | * | | | | | | | | | |
| • ta_rec_push[7:1] | | * | | | | | | | | | |
| • ta_rec_pop[6:0] | | * | * | | | | | | | | |
| • ta_rec_dispatch_id | | * | | | | | | | | | |
| • ta_rec_push_limit[2:0] | | * | | | | | | | | | |
| • ta_dis_raw_cache | | * | | | | | | | | | |
| • ta_dis_color_cache | | * | | | | | | | | | |
| ta_lfb_mode[8:0] | Linear frame buffer mode. | D I S | S T G | L O D | K E R | T A D | | F L T | C O M | A C C | |
| • ta_lfb_format[4:0] | | | | | | | | | * | | |
| • ta_lfb_rgba_lanes[1:0] | | | | | | | | | * | | |
| • ta_lfb_write_swap16 | | | | | | | | | * | | |
| • ta_lfb_write_byte_swap | | | | | | | | | * | | |
| ta_mop[0:0] | Miscellaneous Operation Command | D I S | S T G | L O D | K E R | T A D | | F L T | C O M | A C C | |
| • mop_flush_tcache | | | | | | * | | | | | |

Fig. 16

1700

| Mode State – Per Texture (8 each) | Function | Destination Unit | | | | | | | |
|---|---|---|---|---|---|---|---|---|---|
| | | DIS | STG | LOD | KER | TAD | FLT | COM | ACC |
| ta_mode[23:0] | Texture filter modes. | | | | | | | | |
| • ta_en_texturemap | | | | | * | | | | |
| • ta_minfilter[1:0] | | | | | * | | | | |
| • ta_magfilter[1:0] | | | | | * | | | | |
| • ta_max_ani_ratio[3:0] | | | | | * | | | | |
| • ta_clampw | | | | | * | | | | |
| • ta_lms_dither | | | | | * | | | | |
| • ta_lms_2_tcu_sel[1:0] | | | | | * | | | | |
| • ta_old_trilinear | | | | | * | | | | |
| • ta_wrap_s[1:0] | | | | | > | > | * | | |
| • ta_wrap_t[1:0] | | | | | > | > | * | | |
| • ta_tex_is_tiled | | | | | > | > | * | | |
| • ta_tex_format[4:0] | | | | | > | > | * | | |
| ta_lms[29:0] | Log of Map Size control. | DIS | STG | LOD | KER | TAD | FLT | COM | ACC |
| • ta_lms_min[5:0] | | | | | * | | | | |
| • ta_lms_max[5:0] | | | | | * | | | | |
| • ta_lms_bias[5:0] | | | | | * | | | | |
| • ta_lms_lar[3:0] | | | | | * | > | * | | |
| • ta_lms_s_is_larger | | | | | * | > | * | | |
| • ta_lms_zero_frac | | | | | * | | | | |
| • ta_lms_odd | | | | | * | | | | |
| • ta_lms_tsplit | | | | | * | > | * | | |
| • ta_lms_mba_mode[1:0] | | | | | * | > | * | | |
| • ta_lms_en_npt | | | | | * | > | * | | |
| ta_shift_bias[14:0] | ST scale and bias. | DIS | STG | LOD | KER | TAD | FLT | COM | ACC |
| • ta_rec_post_wmult | | | | * | | | | | |
| • ta_rec_st_shift[3:0] | | | | * | | | | | |
| • ta_rec_w_shift[1:0] | | | | * | | | | | |
| • ta_s_bias_log2[3:0] | | | | > | * | | | | |
| • ta_t_bias_log2[3:0] | | | | > | * | | | | |

| ta_detail[16:0] | Detail Texturing. | DIS | STG | LOD | KER | TAD | FLT | COM | ACC |
|---|---|---|---|---|---|---|---|---|---|
| • ta_detail_max[7:0] | | | | | | * | | | |
| • ta_detail_bias[5:0] | | | | | | * | | | |
| • ta_detail_scale[2:0] | | | | | | * | | | |
| ta_npt[30:0] | Non power or two textures | DIS | STG | LOD | KER | TAD | FLT | COM | ACC |
| • ta_npt_s_max[10:0] | | | | | | | * | | |
| • ta_npt_s_stride[8:0] | | | | | | | * | | |
| • ta_npt_t_max[10:0] | | | | | | | * | | |
| ta_base_addr0,1,2,3[31:0] | Texture base address 0, 1, 2, 3 | DIS | STG | LOD | KER | TAD | FLT | COM | ACC |
| • ta_tex_agp | | | | | | | * | | |
| • ta_tex_staggered | | | | | | | * | | |
| • ta_tex_base_addr[31:5] | | | | | | | * | | |
| ta_tcu_color[28:0] | Texture combine color channel control. | DIS | STG | LOD | KER | TAD | FLT | COM | ACC |
| • ta_tcc_a_select[3:0] | | | | | | | | * | |
| • ta_tcc_b_select[3:0] | | | | | | | | * | |
| • ta_tcc_c_select[3:0] | | | | | | | | * | |
| • ta_tcc_d_select[3:0] | | | | | | | | * | |
| • ta_tcc_a_mode[1:0] | | | | | | | | * | |
| • ta_tcc_b_mode[1:0] | | | | | | | | * | |
| • ta_tcc_c_mode[1:0] | | | | | | | | * | |
| • ta_tcc_d_mode[1:0] | | | | | | | | * | |
| • ta_tcc_out_clamp | | | | | | | | * | |
| • ta_tcc_en_min_max | | | | | | | | * | |
| • ta_tcc_tex_shift[2:0] | | | | | | | | * | |

| ta_tcu_alpha[28:0] | Texture combine alpha channel control. | D I S | S T G | L O D | K E R | T A D | F L T | C O M | A C C |
|---|---|---|---|---|---|---|---|---|---|
| • ta_tca_a_select[3:0] | | | | | | | | * | |
| • ta_tca_b_select[3:0] | | | | | | | | * | |
| • ta_tca_c_select[3:0] | | | | | | | | * | |
| • ta_tca_d_select[3:0] | | | | | | | | * | |
| • ta_tca_a_mode[1:0] | | | | | | | | * | |
| • ta_tca_b_mode[1:0] | | | | | | | | * | |
| • ta_tca_c_mode[1:0] | | | | | | | | * | |
| • ta_tca_d_mode[1:0] | | | | | | | | * | |
| • ta_tca_out_clamp | | | | | | | | * | |
| • ta_tca_en_min_max | | | | | | | | * | |
| • ta_tca_tex_shift[2:0] | | | | | | | | * | |
| ta_ccu_color[31:0] | Texture combine color channel control. | D I S | S T G | L O D | K E R | T A D | F L T | C O M | A C C |
| • ta_ccc_a_select[3:0] | | | | | | | | * | |
| • ta_ccc_b_select[3:0] | | | | | | | | * | |
| • ta_ccc_c_select[3:0] | | | | | | | | * | |
| • ta_ccc_d_select[3:0] | | | | | | | | * | |
| • ta_ccc_a_mode[1:0] | | | | | | | | * | |
| • ta_ccc_b_mode[1:0] | | | | | | | | * | |
| • ta_ccc_c_mode[1:0] | | | | | | | | * | |
| • ta_ccc_d_mode[1:0] | | | | | | | | * | |
| • ta_ccc_out_mode[1:0] | | | | | | | | * | |
| • ta_ccc_out_clamp | | | | | | | | * | |
| • ta_ccc_en_min_max | | | | | | | | * | |
| • ta_ccc_override_atex | | | | | | | | * | |
| • ta_ccc_a_zero | | | | | | | | * | |
| • ta_acc_load | | | | | | | | > | * |
| • ta_acc_add | | | | | | | | > | * |

| ta_ccu_alpha[31:0] | Texture combine alpha channel control. | D I S | S T G | L O D | K E R | T A D | F L T | C O M | A C C |
|---|---|---|---|---|---|---|---|---|---|
| • ta_cca_a_select[3:0] | | | | | | | | * | |
| • ta_cca_b_select[3:0] | | | | | | | | * | |
| • ta_cca_c_select[3:0] | | | | | | | | * | |
| • ta_cca_d_select[3:0] | | | | | | | | * | |
| • ta_cca_a_mode[1:0] | | | | | | | | * | |
| • ta_cca_b_mode[1:0] | | | | | | | | * | |
| • ta_cca_c_mode[1:0] | | | | | | | | * | |
| • ta_cca_d_mode[1:0] | | | | | | | | * | |
| • ta_cca_out_mode[1:0] | | | | | | | | * | |
| • ta_cca_out_clamp | | | | | | | | * | |
| • ta_cca_en_min_max | | | | | | | | * | |
| • ta_cca_en_alpha_mask | | | | | | | | * | |
| • ta_cca_a_zero | | | | | | | | * | |
| • ta_acc_shift[1:0] | | | | | | | | > | * |
| ta_color_ar0,1[31:0] | Color 0, 1 alpha and red. | D I S | S T G | L O D | K E R | T A D | F L T | C O M | A C C |
| • ta_color0,1_a[12:0] | | | | | | | | * | |
| • ta_color0,1_r[12:0] | | | | | | | | * | |
| ta_color_gb0,1[31:0] | Color 0, 1 green and blue. | D I S | S T G | L O D | K E R | T A D | F L T | C O M | A C C |
| • ta_color0,1_g[12:0] | | | | | | | | * | |
| • ta_color0,1_b[12:0] | | | | | | | | * | |
| ta_tex_chroma_key[25:0] | Texture chroma key control. | D I S | S T G | L O D | K E R | T A D | F L T | C O M | A C C |
| • ta_tchroma_r[7:0] | | | | | | | | * | |
| • ta_tchroma_g[7:0] | | | | | | | | * | |
| • ta_tchroma_b[7:0] | | | | | | | | * | |
| • ta_tchroma_mode[1:0] | | | | | | | | * | |
| ta_tex_chroma_range[27:0] | Texture chroma range control. | D I S | S T G | L O D | K E R | T A D | F L T | C O M | A C C |
| • ta_tchroma_range_r[7:0] | | | | | | | | * | |
| • ta_tchroma_range_g[7:0] | | | | | | | | * | |
| • ta_tchroma_range_b[7:0] | | | | | | | | * | |
| • ta_tchroma_range_r_ex | | | | | | | | * | |
| • ta_tchroma_range_g_ex | | | | | | | | * | |
| • ta_tchroma_range_b_ex | | | | | | | | * | |
| • ta_tchroma_range_block_or | | | | | | | | * | |

| ta_chroma_key[25:0] | Color chroma key control. | D I S | S T G | L O D | K E R | T A D | F L T | C O M | A C C |
|---|---|---|---|---|---|---|---|---|---|
| • ta_cchroma_r[7:0] | | | | | | | | * | |
| • ta_cchroma_g[7:0] | | | | | | | | * | |
| • ta_cchroma_b[7:0] | | | | | | | | * | |
| • ta_cchroma_mode[1:0] | | | | | | | | * | |
| ta_chroma_range[27:0] | Color chroma range control. | D I S | S T G | L O D | K E R | T A D | F L T | C O M | A C C |
| • ta_cchroma_range_r[7:0] | | | | | | | | * | |
| • ta_cchroma_range_g[7:0] | | | | | | | | * | |
| • ta_cchroma_range_b[7:0] | | | | | | | | * | |
| • ta_cchroma_range_r_ex | | | | | | | | * | |
| • ta_cchroma_range_g_ex | | | | | | | | * | |
| • ta_cchroma_range_b_ex | | | | | | | | * | |
| • ta_cchroma_range_block_or | | | | | | | | * | |

2800

| {s,t}_{00,01,10,11}_ov_pos | Indicates that the coordinate was positive and of magnitude greater than the 3.1.11.8 value can express. This is can be used for positive clamping later, though it is not the only cause. The mirror bit must be referenced for pos. clamp when not mirroring. The +1/2 can cause pos. overflow and clamp, and is especially sensitive to small map size. This bit does not include |
|---|---|
| {s,t}_{00,01,10,11}_is_neg | Indicates that the coordinate was negative, for use in clamping later. Note that the 3.1.11.8 number is unsigned. The -1/2 can cause underflow and clamp, and is especially sensitive to small map size. |
| {s,t}_{00,01,10,11}_3_1_11_8[19:0] | Three extra MSBs for far kernel walking, 1 bit for mirror, 19 bits for integer and fraction of coordinate. In the perspective of 0.0 to 1.0 spanning one whole texture, the decimal point is after the mirror bit (4.19 int.frac). 3_1_11_8 is extra_mirror_int_frac for a 2kx2k map. For a 16x16 map, it is interpreted as 3_1_4_8_7, extra_mirror_int_frac_dontcare. This value is positive unsigned. *** how are non-square maps expressed for the smaller dimension? |

| {s,t}_{00,01,10,11}_lms_exp_x[x-1:0] | Exponent ... |
|---|---|
| {s,t}_{00,01,10,11}_lms_mant_x[x-1:0] | ... and mantissa of coordiates for use in LMS. This may include overflow bits dropped from the s and t used for address generation. *** determine precision needed, format and exponent bias |

Fig. 29

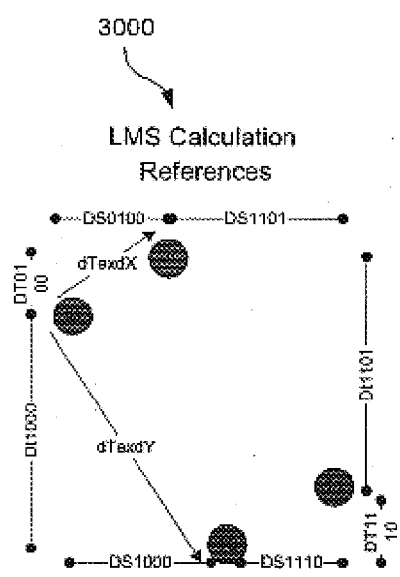
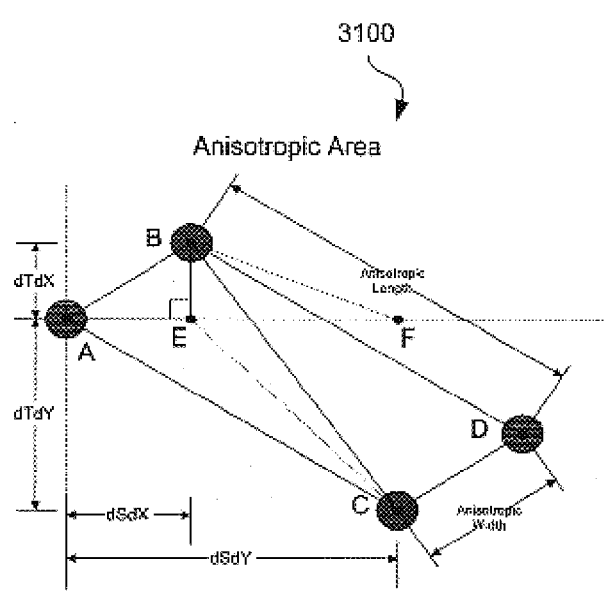
Fig. 30
Fig. 31

Wrapping

Mirroring

Clamping

Clamp to Black

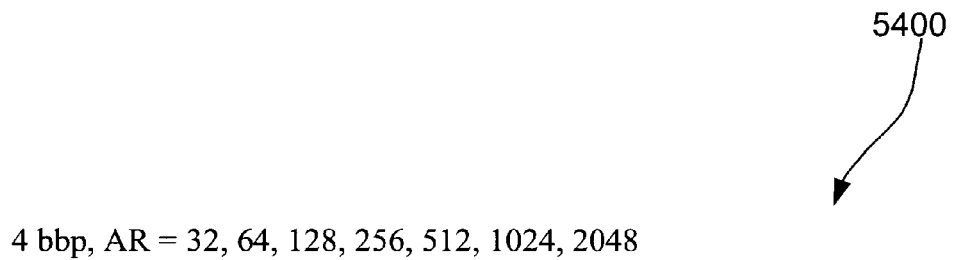
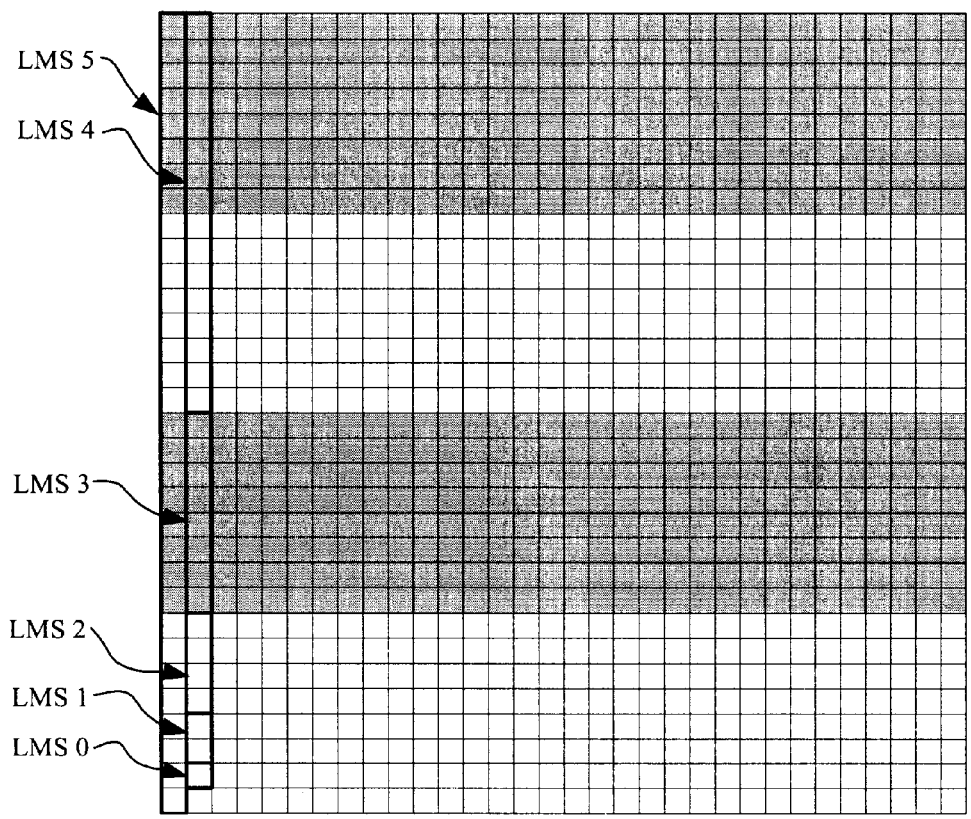
Fig 54

6100

7600

4, 2, or 1 texels wide 256 bit read atom arbitrarily tall

7700 wrapst[3:2] = 00 wrapst[1:0] = 00 : no wrap
wrapst[1:0] = 01 : 2 tall
wrapst[1:0] = 10 : 4 tall

8200
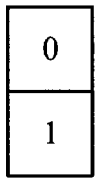
wrapst[3:2] = 11   // exactly 4 wide
                wrapst[1:0] = 00   : no wrap
                wrapst[1:0] = 01   : 2 tall
                wrapst[1:0] = 10   : 4 tall
Fig. 82
8300
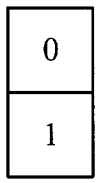
wrapst[3:2] = 10   // exactly 2 wide
                wrapst[1:0] = 00   : no wrap
                wrapst[1:0] = 01   : 2 tall
                wrapst[1:0] = 10   : 4 tall
Fig. 83

```
                    8500
                       ↘

B  B B B B B B B         A  A A A A A A A
  X
            xW   1 0 1 1 0 1 1 1     x(1-w)  0 1 0 0 1 0 0 0                                    +
  Y
                                        A A A A A A A A        A A A A A A A
  A
                 B B B B B B B B        0 0 0 0 0 0 0 0        B B B B B B B
  B
               B B B B B B B B 0        0 0 0 0 0 0 0 0 0      B B B B B B B B
  0
             B B B B B B B B 0 0        0 0 0 0 0 0 0 0 0 0    B B B B B B B B 0
  0
             0 0 0 0 0 0 0 0 0 0        A A A A A A A 0 0 0    A A A A A A A A 0 0
  0
           B B B B B B B B 0 0 0 0      0 0 0 0 0 0 0 0 0 0 0  B B B B B B B B 0 0 0
  0
         B B B B B B B B 0 0 0 0 0      0 0 0 0 0 0 0 0 0 0 0 0 B B B B B B B B 0 0 0 0
  0
         0 0 0 0 0 0 0 0 0 0 0 0 0      A A A A A A A 0 0 0 0 0 A A A A A A A 0 0 0 0 0
  0
       B B B B B B B B 0 0 0 0 0 0      0 0 0 0 0 0 0 0 0 0 0 0 0 B B B B B B B B 0 0 0 0 0 0
       0
  X  X X X X X X X X X X X X X X X X    Y Y Y Y Y Y Y Y Y Y Y Y Y Y Y Y Y   Z Z Z Z Z Z Z Z Z Z Z Z Z Z
  Z
```

8700

| | require all 4 texels? | Description |
|---|---|---|
| Color Substitution = 0<br>bilinear RGB = 0<br>bilinear alpha = 0 | No | Color substitution is turned off, so chroma match sets texel color to transparent black.<br>Point sampled ARGB. |
| Color Substitution = 0<br>bilinear RGB = 1<br>bilinear alpha = 0 | No | Color substitution is turned off, so chroma match sets texel color to transparent black on any or all of 4 bilinear texels.<br>Bilinear RGB, point-sampled alpha. |
| Color Substitution = 0<br>bilinear RGB = 0<br>bilinear alpha = 1 | No | Color substitution is turned off, so chroma match sets texel color to transparent black on any or all of 4 bilinear texels.<br>Point-sampled RGB, bilinear alpha. |
| Color Substitution = 0<br>bilinear RGB = 1<br>bilinear alpha = 1 | No | Color substitution is turned off, so chroma match sets texel color to transparent black on any or all of 4 bilinear texels.<br>Bilinear RGB, bilinear alpha. |
| Color Substitution = 1<br>bilinear RGB = 0<br>bilinear alpha = 0 | No | Color substitution is turned on. Point-sampled RGB, so a chroma match preserves the color but alpha is set to zero. Three other texels flow through. |
| Color Substitution = 1<br>bilinear RGB = 1<br>bilinear alpha = 0 | Yes | Color substitution is turned on. Bilinear RGB, so all 4 texels are needed for RGB substitution. When 4 texels match chroma, point sample to preserve chroma match through bilinear operation.<br>Point sample alpha. |
| Color Substitution = 1<br>bilinear RGB = 0<br>bilinear alpha = 1 | No | Color substitution is turned on. Bilinear alpha, but since chroma modification to alpha doesn't require adjacent texels only fetch 4 when needed for bilinear. Point sampled RGB, so a chroma match preserves RGB and only affects alpha (sets alpha to 0 for that texel). |
| Color Substitution = 1<br>bilinear RGB = 1<br>bilinear alpha = 1 | Yes | Color substitution is turned on. Bilinear RGB, so all 4 texels are needed for RGB substitution. When 4 texels match chroma, point sample to preserve chroma match through bilinear operation.<br>Bilinear alpha. |

Fig. 87

S is clamped to 1

S is clamped to 1,
T is clamped to 0

10100

<A,R,G,B> = Rt*Ri + Gt*Gi + Bt*Bi + At*Ai

10200

<A,R,G,B> = Rt*Ri + Gt*Gi + Bt*Bi $\langle R,G,B \rangle = \langle ds, dt, dw \rangle =$ $\langle DS \quad DT \rangle \begin{vmatrix} C0r & C0g & C0b \\ C1r & C1g & C1b \end{vmatrix}$ $= \langle DS^*C0r + DT^*C1r,$
$DS^*C0g + DT^*C1g,$
$DS^*C0b + DT^*C1b \rangle$

11100

| bit field | symbolic name | description |
|---|---|---|
| 3:0 | SST_LFB_FORMAT | Linear frame buffer write format select (many argb formats) |
| 5:4 | SST_LFB_RGBA_LANES | Linear frame buffer RGBA lanes select (rgba combinations) |
| 6 | SST_LFB_WRITE_SWAP16 | Word swap enable (upper and lower words) |
| 7 | SST_LFB_WRITE_BYTE_SWAP | Byte swizzle enable (big endian and little endian) |
| 8 | SST_LFB_ENPIXPIPE | Pixel pipeline processing enable (data munge or not) |
| 9 | SST_LFB_WSELECT | W (Qp) select (Qp is Z from LFB or the taLfbDConst) |
| 31:10 | | Reserved |

| Value | LFB Symbolic Name | LFB 32 bit data word |
|---|---|---|
| 0 | SST_LFB_565 | {rgb565[15:0], rgb565[15:0]} |
| 1 | SST_LFB_555 | {1'bx, rgb555[14:0], 1'bx, rgb555[14:0]} |
| 2 | SST_LFB_1555 | {argb1555[15:0], argb1555[15:0]} |
| 3 | | Reserved |
| 4 | SST_LFB_888 | {8'bx, rgb888[23:0]} |
| 5 | SST_LFB_8888 | {argb8888[31:0]} |
| 10:6 | | Reserved |
| 11 | SST_LFB_Z32 | {Z[31:0]} |
| 12 | SST_LFB_Z565 | {Z[15:0], rgb565[15:0]} |
| 13 | SST_LFB_Z555 | {Z[15:0], 1'bx, argb555} |
| 14 | SST_LFB_Z1555 | {Z[15:0], argb1555[15:0]} |
| 15 | SST_LFB_ZZ | {Z[15:0], Z[15:0]} |

| bit field | symbolic name | description |
|---|---|---|
| 15:0 | SST_LFB_D_CONST | LFB Depth Constant |
| 31:16 | SST_LFB_A_CONST | LFB Alpha Constant |

| taLfbMode[7] | Data Input [31:0] | Data Output [31:0] |
|---|---|---|
| 0 or physical-lfb | [31:0] | [31:0] |
| 1 | [31:0] | {[7:0], [15:8], [23:16], [31:24]} |

| taLfbMode[6] | Data Input [31:0] | Data Output [31:0] |
|---|---|---|
| 0 or physical-lfb | [31:0] | [31:0] |
| 1 | [31:0] | {[15:0], [31:16]} |

| taLfbMode[5:4] | Data Input Pixel | Data Output Pixel |
|---|---|---|
| 0 or physical-lfb | ARGB | ARGB |
| 1 | ABGR | ARGB |
| 2 | RGBA | ARGB |
| 3 | BGRA | ARGB |
| X (don't care) | Z | Z |

| taLfbMode [3:0] | LFB Data Input [31:0] | LFB Left Pixel Color (argb) and Depth (z) | LFB Right Pixel Color (argb) and Depth (z) |
|---|---|---|---|
| 0 | {rgb565[15:0], rgb565[15:0]} = {r0[4:0], g0[5:0], b0[4:0], r1[4:0], g1[5:0], b1[4:0]} | a[7:0] = ColorAR1[23:16]<br>r[7:0] = {r0[4:0], r0[4:2]}<br>g[7:0] = {g0[5:0], g0[5:4]}<br>b[7:0] = {b0[4:0], b0[4:2]}<br>z[35:0] = {DConst[15:0], 19'b0} | a[7:0] = ColorAR1[23:16]<br>r[7:0] = {r1[4:0], r1[4:2]}<br>g[7:0] = {g1[5:0], g1[5:4]}<br>b[7:0] = {b1[4:0], b1[4:2]}<br>z[35:0] = {1'b0, DConst[15:0], 19'b0} |
| 1 | {1'bx, rgb555[14:0], 1'bx, rgb555[14:0]} = {1'bx, r0[4:0], g0[4:0], b0[4:0], 1'bx, r1[4:0], g1[4:0], b1[4:0]} | a[7:0] = ColorAR1[23:16]<br>r[7:0] = {r0[4:0], r0[4:2]}<br>g[7:0] = {g0[4:0], g0[4:2]}<br>b[7:0] = {b0[4:0], b0[4:2]}<br>z[35:0] = {DConst[15:0], 19'b0} | a[7:0] = ColorAR1[23:16]<br>r[7:0] = {r1[4:0], r1[4:2]}<br>g[7:0] = {g1[4:0], g1[4:2]}<br>b[7:0] = {b1[4:0], b1[4:2]}<br>z[35:0] = {1'b0, DConst[15:0], 19'b0} |
| 2 | {argb1555[15:0], argb1555[15:0]} = {a0, r0[4:0], g0[4:0], b0[4:0], a1, r1[4:0], g1[4:0], b1[4:0]} | a[7:0] = {8{a0}}<br>r[7:0] = {r0[4:0], r0[4:2]}<br>g[7:0] = {g0[4:0], g0[4:2]}<br>b[7:0] = {b0[4:0], b0[4:2]}<br>z[35:0] = {1'b0, DConst[15:0], 19'b0} | a[7:0] = {8{a1}}<br>r[7:0] = {r1[4:0], r1[4:2]}<br>g[7:0] = {g1[4:0], g1[4:2]}<br>b[7:0] = {b1[4:0], b1[4:2]}<br>z[35:0] = {1'b0, DConst[15:0], 19'b0} |
| 4 | {8'bx, rgb888[23:0]} = {8'bx, r[7:0], g[7:0], b[7:0]} | a[12:0] = ColorAR1[23:16]<br>r[12:0] = r[7:0]<br>g[12:0] = g[7:0]<br>b[12:0] = b[7:0]<br>z[35:0] = {1'b0, DConst[15:0], 19'b0} | same as left |
| 5 | {argb8888[31:0]} = {a[7:0], r[7:0], g[7:0], b[7:0]} | a[12:0] = a[7:0]<br>r[12:0] = r[7:0]<br>g[12:0] = g[7:0]<br>b[12:0] = b[7:0]<br>z[35:0] = {1'b0, DConst[15:0], 19'b0} | same as left |
| 11 | {z[31:0]} | a[7:0] = {ColorAR1[23:16]}<br>r[7:0] = {ColorAR1[7:0]}<br>g[7:0] = {ColorGB1[23:16]}<br>b[7:0] = {ColorGB1[7:0]}<br>z[35:0] = {1'b0, z[31:0], 4'b0} | same as left |
| 12 | {z[15:0], rgb565[15:0]} = {z[15:0], r[4:0], g[5:0], b[4:0]} | a[12:0] = ColorAR1[23:16]<br>r[12:0] = {r[4:0], r[4:2]}<br>g[12:0] = {g[5:0], g[5:4]}<br>b[12:0] = {b[4:0], b[4:2]}<br>z[35:0] = {1'b0, z[15:0], 19'b0} | same as left |
| 13 | {z[15:0], 1'bx, argb555} = {z[15:0], 1'bx, r[4:0], g[5:0], b[4:0]} | a[7:0] = {ColorAR1[23:16]}<br>r[7:0] = {r[4:0], r[4:2]}<br>g[7:0] = {g[4:0], g[4:2]}<br>b[7:0] = {b[4:0], b[4:2]}<br>z[35:0] = {z[15:0], 19'b0} | same as left |
| 14 | {z[15:0], argb1555[15:0]} = {z[15:0], a, r[4:0], g[4:0], b[4:0], } | a[7:0] = {8{a}}<br>r[7:0] = {r[4:0], r[4:2]}<br>g[7:0] = {g[4:0], g[4:2]}<br>b[7:0] = {b[4:0], b[4:2]}<br>z[35:0] = {z[15:0], 19'b0} | same as left |
| 15 | {z[15:0], z[15:0]} = {z0[15:0], z1[15:0]} | a[7:0] = {ColorAR1[23:16]}<br>r[7:0] = {ColorAR1[7:0]}<br>g[7:0] = {ColorGB1[23:16]}<br>b[7:0] = {ColorGB1[7:0]}<br>z[35:0] = {1'b0, z0[15:0], 19'b0} | a[7:0] = {ColorAR1[23:16]}<br>r[7:0] = {ColorAR1[7:0]}<br>g[7:0] = {ColorGB1[23:16]}<br>b[7:0] = {ColorGB1[7:0]}<br>z[35:0] = {1'b0, z1[15:0], 19'b0} |

| tdpe_lfb_type[1:0] | Decode Equation | Description |
|---|---|---|
| 00 | !cetd_lfb_valid | normal rendering – not LFB |
| 01 | cetd_lfb_valid & !cetd_lfb_phy & taLfbMode[8] | XY address based LFB with 3D processing |
| 10 | cetd_lfb_valid & !cetd_lfb_phy & !taLfbMode[8] | XY address based LFB without 3D processing |
| 11 | reserved | reserved |

| tdpe_lfb_type[1:0] | tdpe_mask[19:0] |
|---|---|
| 00 or 01 or 10 | {mask_pix3[4:0], mask_pix2[4:0], mask_pix1[4:0], mask_pix0[4:0]} where pixels {3, 2, 1, 0} = {lr, ll, ur, ul} pixels and each pixel maskN[4:0] = {center, lr, ll, ur, ul} sub-pixels. The XY address based LFBs set the fully covered masks based on the LFB mode and XY address LSBs. A 16-bit LFB may enable write to two horizontal pixels and the 32-bit LFB may enable coverage to any single pixel. |
| 11 | reserved |

| tdpe_lfb_type[1:0] | tdpe_xy_addr[19:0] |
|---|---|
| 00 or 01 or 10 | {X[10:1], Y[10:1]} |
| 11 | reserved |

| taLfbMode[9] | tdpe_z_pix0[35:0] | tdpe_z_dx[38:0] |
|---|---|---|
| don't_care | {z_lfb_left[35:0]} | {3'b0, z_lfb_right[35:0]} |

| taLfbMode[9] | tdpe_q_pix0[35:0] | tdpe_q_dx[38:0] |
|---|---|---|
| 0 | {z_lfb_left[35:0]} | {3'b0, z_lfb_right[35:0]} |
| 1 | {1'b0, DConst[15:0], 19'b0} | {4'b0, DConst[15:0], 4'b0} |

| upper-left<br>lfb-left<br>ARGBZ | upper-right<br>lfb-right ARGB |
|---|---|
| lower-left<br>lfb-left ARGB | lower-right<br>lfb-left ARGB |

| tformat Value | Symbolic Name/ Texture format | 8-bit Alpha | 8-bit Red | 8-bit Green | 8-bit Blue |
|---|---|---|---|---|---|
| 0 | SST_TA_RGB332 8-bit RGB (3-3-2) | 0xff | {r[2:0],r[2:0],r[2:1]} | {g[2:0],g[2:0],g[2:1]} | {b[1:0],b[1:0],b[1:0],b[1:0]} |
| 1 | Reserved | | | | |
| 2 | SST_TA_A8 8-bit Alpha | a[7:0] | a[7:0] | a[7:0] | a[7:0] |
| 3 | SST_TA_I8 8-bit Intensity | 0xff | i[7:0] | i[7:0] | i[7:0] |
| 4 | SST_TA_AI44 8-bit Alpha, Intensity (4-4) | {a[3:0],a[3:0]} | {i[3:0],i[3:0]} | {i[3:0],i[3:0]} | {i[3:0],i[3:0]} |
| 5 | SST_TA_P8 8-bit Palette to RGB | 0xff | palette r[7:0] | palette g[7:0] | palette b[7:0] |
| 6 | SST_TA_P8_ARGB6666 8 bit Palette to RGBA | {palette_r[7:2], palette_r[7:6]} | {palette_r[1:0], palette_g[7:4], palette_r[1:0]} | {palette_g[3:0], palette_b[7:6], palette_g[3:2]} | {palette_b[5:0], palette_b[5:4]} |
| 7 | Reserved | | | | |
| 8 | SST_TA_ARGB8332 16-bit ARGB (8-3-3-2) | a[7:0] | {r[2:0],r[2:0],r[2:1]} | {g[2:0],g[2:0],g[2:1]} | {b[1:0],b[1:0],b[1:0],b[1:0]} |
| 9 | Reserved | | | | |
| 10 | SST_TA_RGB565 16-bit RGB (5-6-5) | 0xff | {r[4:0],r[4:2]} | {g[5:0],r[5:4]} | {b[4:0],b[4:2]} |
| 11 | SST_TA_ARGB1555 16-bit ARGB (1-5-5-5) | {a[0],a[0],a[0],a[0], a[0],a[0],a[0],a[0]} | {r[4:0],r[4:2]} | {g[4:0],g[4:2]} | {b[4:0],b[4:2]} |
| 12 | SST_TA_ARGB4444 16-bit ARGB (4-4-4-4) | {a[3:0],a[3:0]} | {r[3:0],r[3:0]} | {g[3:0],g[3:0]} | {b[3:0],b[3:0]} |
| 13 | SST_TA_AI88 16-bit Alpha, Intensity (8-8) | a[7:0] | i[7:0] | i[7:0] | i[7:0] |
| 14 | SST_TA_AP88 16-bit Alpha, Palette (8-8) | a[7:0] | palette r[7:0] | palette g[7:0] | palette b[7:0] |
| 15 | Reserved | | | | |
| 16 | SST_TA_FBCMP | | | | |
| 17 | SST_TA_FXT1 | | | | |
| 18 | SST_TA_ARGB8888 | a[7:0] | r[7:0] | g[7:0] | b[7:0] |
| 19 | SST_TA_YUYV422 | V[31:24] | Y1[23:16] | U[15:8] | Y0[7:0] |
| 20 | SST_TA_UYVY422 | Y1[31:24] | V[23:16] | Y0[15:8] | U[7:0] |
| 21 | SST_TA_AVYU444 | K[31:24] | Y[23:16] | U[15:8] | V[7:0] |
| 22 | SST_TA_DXT1 | | | | |
| 23 | SST_TA_DXT2 | | | | |
| 24 | SST_TA_DXT3 | | | | |
| 25 | SST_TA_DXT4 | | | | |
| 26 | SST_TA_DXT5 | | | | |

Fig. 147

Pixel Depth = 4bits

Micro Tiled Address (MA[6:0]) = {X[4:3], Y2, X2,0,0,0} tag group 00    tag group 10 tag group 01    tag group 11

0, 1, 2, 3 are RAM0, RAM1, RAM2, RAM3 respectively 0, 1 .... E, F are st[3:0]

16000
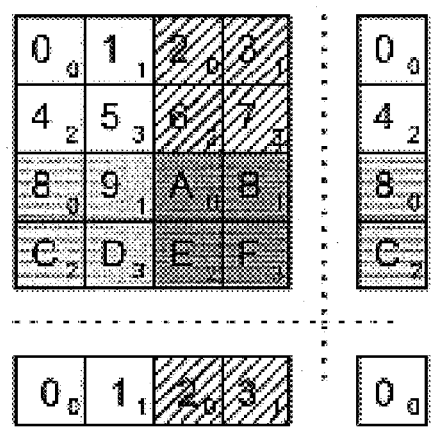
 cache slot 00  cache slot 10
 cache slot 01  cache slot 11
0, 1, 2, 3 are RAM0, RAM1, RAM2, RAM3 respectively
0, 1 .... E, F are st[3:0]
Fig. 160

| Type | Signal | Description |
|---|---|---|
| input | suta_start[50:0] | Start parameter bus<br>Start data is transferred over two DVS cycles for parameters determined from the parameter select bus.<br>• 1) W, X & Y parameters (one each per triangle)<br>cycle1: suta_start[50:0] == {23'bx, x[11:0], 4'bx, y[11:0]}<br>X & Y are 12b (int).<br>cycle2: suta_start[50:0] == {15'bx, start_w[35:0]}<br>W is 1.35b (int.frac).<br>• 2) Z parameter (up to one per triangle)<br>cycle1: suta_start[50:0] == {51'bx}<br>cycle2: suta_start[50:0] == {15'bx, start_z[35:0]}<br>Z is 1.35b (int.frac).<br>• 3) Qfbi parameter (up to one per triangle)<br>cycle1: suta_start[50:0] == {51'bx}<br>cycle2: suta_start[50:0] == {15'bx, start_z[35:0]}<br>Z is 1.35b (int.frac).<br>• 4567) ARGB (up to one each per texture)<br>cycle1: suta_start[50:0] == {51'bx}<br>cycle2: suta_start[50:0] == {26'bx, start_[argb][24:0]}<br>ARGB is 1.4.8.12b (sign.ovr.int.extra).<br>• 89) ST (up to one each per texture)<br>cycle1: suta_start[50:0] == {51'bx}<br>cycle2: suta_start[50:0] == {15'bx, start_[st][50:0]}<br>ST is 8.43b (int.frac).<br>• 10) Qtmu (up to one per texture)<br>cycle1: suta_start[50:0] == {51'bx}<br>cycle2: suta_start[50:0] == {start_Qtmu[50:0]}<br>Qtmu is 16.35b (int.frac). |

Fig. 176A

17600

| Type | Signal | Description |
|---|---|---|
| input | suta_slope[50:0] | <u>Start parameter bus</u><br>Start data is transferred over two DVS cycles for parameters determined from the parameter select bus.<br>• 1) W, X & Y parameters (one each per triangle)<br><u>cycle1</u>: suta_start[50:0] == {15'bx, dw/dx[35:0]}<br><u>cycle2</u>: suta_start[50:0] == {15'bx, dw/dy[35:0]}<br>W is 1.35b (int.frac).<br>• 2) Z parameter (up to one per triangle)<br><u>cycle1</u>: suta_start[50:0] == {15'bx, dz/dx[35:0]}<br><u>cycle2</u>: suta_start[50:0] == {15'bx, dz/dy[35:0]}<br>Z is 1.35b (int.frac).<br>• 3) Qfbi parameter (up to one per triangle)<br><u>cycle1</u>: suta_start[50:0] == {15'bx, dqfbi/dx[35:0]}<br><u>cycle2</u>: suta_start[50:0] == {15'bx, dqfbi/dy[35:0]}<br>Z is 1.35b (int.frac).<br>• 4567) ARGB (up to one each per texture)<br><u>cycle1</u>: suta_start[50:0] == {26'bx, d[argb]/dx[23:0]}<br><u>cycle2</u>: suta_start[50:0] == {26'bx, d[argb]/dy[23:0]}<br>ARGB is 1.4.8.12b (sign.ovr.int.extra).<br>• 89) ST (up to one each per texture)<br><u>cycle1</u>: suta_start[50:0] == {15'bx, d[st]/dx[50:0]}<br><u>cycle2</u>: suta_start[50:0] == {15'bx, d[st]/dx[50:0]}<br>ST is 8.43b (int.frac).<br>• 10) Qtmu (up to one per texture)<br><u>cycle1</u>: suta_start[50:0] == {dqtmu/dx[50:0]}<br><u>cycle2</u>: suta_start[50:0] == {dqtmu/dy[50:0]}<br>Qtmu is 16.35b (int.frac). |

| Type | Signal | Description |
|---|---|---|
| input | suta_prmsel[3:0] | Parameter select bus<br>Start and slope parameter select decode:<br>0 : null<br>1 : WXY (up to one per triangle – always sent)<br>2 : Z (up to one per triangle)<br>3 : Qfbi (up to one per texture)<br>4, 5, 6, 7: A, R, G, B (up to one per texture)<br>8, 9: S, T (up to one per texture)<br>10: Qtmu (up to one per texture)<br>11-15: reserved (decoded to load no parameters in VTA)<br>The parameters are received in the following order:<br>Wxy, [Z, Qp], [Qt, S, T, A, R, G, B]*.<br>• One Wxy per polygon.<br>• Up to one each of Z & Qp per polygon.<br>• Up to one each of Qt, S, T, A, R, G & B per iteration. |
| input | suta_newtri | New triangle indicator<br>Identifies the first parameter transfer cycle for a polygon.<br>The signal is active for the first cycle of the parameter data transfer. |
| input | suta_newitr | New iteration indicator<br>Identifies the first parameter transfer cycle for each texture iteration. The signal is active for the first cycle of the parameter data transfer. |
| input | suta_prmend | Parameter end indicator<br>Identifies the last parameter transfer cycle-pair for a polygon. The signal is active for both cycles of the parameter data transfer. |
| input | suta_itrnum[2:0] | Iteration number<br>Identifies the iteration number of the current parameters.<br>This signal is valid for all data transfer cycles. Its behavior is as follows:<br>itr0 for WXYZQfbi and itrN to 0 for ARGBSTQtmu. |
| input | suta_valid | DVS valid |
| output | suta_stall | DVS stall |

| Type | Signal | Description |
|---|---|---|
| input | rata_newtri | New triangle<br>Identifies the first quad of a new triangle. |
| input | rata_newstate[2:0] | New State<br>Three newstate bits. Each bit progresses down the pipe triggering loads of active state from pending state at the sideband. Bit [0] is dedicated for the TA module, bit [1] is dedicated for the TD module and bit [2] is dedicated for the PE module. |
| input | rata_push[1:0] | Push pixel iteration state<br>Encodes three push commands to save iteration state. The two bits decode pushes as follows:<br>00: none<br>01: right<br>10: left<br>11: down<br>Note: Simultaneous push/pop/dir evaluates in time as push->pop->dir. |
| input | rata_pop[1:0] | Pop pixel iteration state<br>Encodes three pop commands to restore iteration state. The two bits decode pops as follows:<br>00: none<br>01: right<br>10: left<br>11: down |
| input | rata_dir[1:0] | Pixel iteration direction<br>Sets the parameter iterator direction, decoded as follows:<br>00: up<br>01: right<br>10: left<br>11: down |
| input | rata_mask[19:0] | Pixel0,1,2,3 coverage mask<br>Indicates the combined coverage masks of the pixel quad.<br>rata_mask[19:0] == {LR, LL, UR, UL} 5-bit pixel coverage masks.<br>Where a coverage mask[5:0] == {c, lr, ll, ur, ul} sub-samples. |
| input | rata_valid | DVS valid |
| output | rata_stall | DVS stall |

| Type | Signal | Description |
|---|---|---|
| output | tdpe_newstate | New state<br>Pixel Engine newstate bit. This was bit [2] of rata newstate [2:0]. |
| output | tdpe_lfb_type[1:0] | LFB Type<br>Linear Frame Buffer Write Type decoded as follows:<br>0: non LFB<br>1: 3D LFB processed<br>2: 3D LFB bypasses<br>3: reserved |
| output | tdpe_mask[19:0] | Pixel Coverage Masks<br>When non-LFB,<br>[19:0] = {LR[5:0], LL[5:0], UR[5:0], UL[5:0]} pixel masks.<br>where a pixel mask equals mask[4:0] = {center, lr, ll, ur, ul}. |
| output | tdpe_xy_addr[19:0] | X and Y address<br>When non-LFB or XY-addressed LFB,<br>addr[19:0] == {X[10:1], Y[10:1]} |
| output | tdpe_r_pix0,1,2,3[12:0] | Red of 4 pixels (1.4.8)<br>Pixels: {0, 1, 2, 3} == {UL, UR, LL, LR}. |
| output | tdpe_g_pix01,2,3[12:0] | Green of 4 pixels (1.4.8)<br>Pixels: {0, 1, 2, 3} == {UL, UR, LL, LR}. |
| output | tdpe_b_pix0,1,2,3[12:0] | Blue of 4 pixels (1.4.8)<br>Pixels: {0, 1, 2, 3} == {UL, UR, LL, LR}. |
| output | tdpe_a_pix0,1,2,3[12:0] | Alpha of 4 pixels (1.4.8)<br>Pixels: {0, 1, 2, 3} == {UL, UR, LL, LR}. |
| output | tdpe_z_pix0[35:0] | Z of upper left pixel (1.35)<br>When non-LFB,<br>pix0[35:0] = Z of the upper left pixel.<br>When XY address based LFB,<br>pix0[35:0] = {1'b0, lfb-left-depth[15:0], 20'b0} or<br>pix0[35:0] = {1'b0, lfb-left-depth[31:0], 4'b0}.<br>where lfb-left-depth come from the LFB Unit. |

| Type | Signal | Description |
|---|---|---|
| output | tdpe_z_dx[38:0] | dZ/dX of a quad (4.35)<br>When non-LFB,<br>dx[38:0] = dZ/dx of the upper left pixel.<br>When XY address based LFB,<br>dx[38:0] = {4'b0, lfb-right-depth[15:0], 20'b0} or<br>dx[38:0] = {4'b0, lfb-right-depth[31:0], 4'b0} or<br>where lfb-right-depth come from the LFB Unit. |
| output | tdpe_z_dy[38:0] | dZ/dY of a quad (4.35)<br>When non-LFB, this bus equals the dZ/dy of the upper left pixel.<br>When LFB, this bus is set low. |
| output | tdpe_q_pix0[35:0] | Qpe of upper left pixel (1.35)<br>When non-LFB,<br>pix0[35:0] = Q of the upper left pixel.<br>When XY address based LFB,<br>pix0[35:0] = {1'b0, lfb-left-qpe[15:0], 20'b0} or<br>pix0[35:0] = {1'b0, lfb-left-qpe[31:0], 4'b0}.<br>where lfb-left-qpe come from the LFB Unit. |
| output | tdpe_q_dx[38:0] | dQ/dX of a quad (4.35)<br>When non-LFB,<br>dx[35:0] = dQ/dx of the upper left pixel.<br>When XY address based LFB,<br>dx[35:0] = {1'b0, lfb-right-qpe[15:0], 20'b0} or<br>dx[35:0] = {1'b0, lfb-right-qpe[31:0], 4'b0}<br>where lfb-right-qpe come from the LFB Unit. |
| output | tdpe_q_dy[38:0] | dQ/dY of quad (4.35)<br>When non-LFB, this bus equals the dQ/dy of the upper left pixel.<br>When LFB, this bus is set low. |
| output | tdpe_valid | DVS valid |
| input | tdpe_stall | DVS stall |

| Type | Signal | Description |
|---|---|---|
| input | ceta_valid | Side-band transfer valid |
| input | ceta_addr[11:0] | Side-band adr<br>Decoded as,<br>[11:8] == TMU Unit & Palette decode<br>[7:0] == TMU register space. |
| input | ceta_data[31:0] | Side-band data<br>Data of register or palette writes. |
| output | tace_rcvstate | Texture address unit receive state<br>Indicates the completion of newstate within the TA pipeline.<br>This signal is merely a feedback version of the TA newstate extracted from the bottom of the TA pipe. |
| output | tace_busy | Texture addres unit busy<br>Indicates the existence of a valid active data within the pipeline or a FIFO in the Texture Address Unit. |

| Type | Signal | Description |
|---|---|---|
| input | cetd_valid | Side-band transfer valid |
| input | cetd_addr[21:0] | Side-band address<br>Decoded as<br>1) [21:0] == {10'bx, TMU Unit Select [3:0], register select [7:0]}<br>2) [21:0] == {LFB X address [10:0], LFB Y address [10:0]} |
| input | cetd_data[31:0] | Side-band data<br>Data for register writes, palette loads and LFB transfers. |
| input | cetd_lfb_be_n[3:0] | Side-band lfb byte enables<br>The byte enables for XY and Physically addresses LFBs.<br>XY address based LFBs may have byte pairs enabled. For these transactions, the byte enable pairs enable writes to the left and right pixels of the quad.<br>Physical address based LFBs may have individual bytes enabled. For these transactions, the byte enables effect no data; the byte enables are merely transferred to the PE through the pixel coverage mask bus.<br>This signal is invalid during non-LFB transations. |
| input | cetd_lfb_valid | Side-band LFB transfer valid<br>Identifies a valid LFB data transfer. |
| output | cetd_lfb_stall | Side-band LFB stall<br>Indicates a stalled LFB data transfer. |
| output | tdce_rcvstate | Texture data unit receive state<br>Indicates the completion of newstate within the TD pipeline.<br>This signal is merely a feedback version of the TD newstate extracted from the bottom of the TD pipe. |
| output | tdce_busy | Texture data unit busy<br>Indicates the existence of a valid active data within the pipeline or a FIFO in the Texture Data Unit. |
| output | tcce_busy | Texture cache unit busy<br>Some module or FIFO in the texture cache has valid active data. |

| Type | Signal | Description |
|---|---|---|
| output | tamc_maddress[31:5] | texture request memory address |
| output | tamc_mmode[2:0] | texture memory address mode |
| output | tcmc_valid | DVS valid |
| input | tcmc_stall | DVS stall |

18400

| Type | Signal | Description |
|---|---|---|
| input | mctc_mdata[255:0] | texture memory data |
| input | mctc_valid | DVS valid |
| output | mctc_stall | DVS stall |

18500

| purpose | unit | count | read | write | depth | width | comments |
|---|---|---|---|---|---|---|---|
| ta sideband registers (9 in ta) | ta | 1 | 1 | 1 | 16 | 15 | All of these rams could be made from 1r1w_16d32w RAMs. |
| | | 1 | 1 | 1 | 16 | 17 | |
| | | 1 | 1 | 1 | 16 | 24 | |
| | | 1 | 1 | 1 | 16 | 30 | |
| | | 1 | 1 | 1 | 16 | 31 | |
| | | 4 | 1 | 1 | 16 | 32 | |
| td sideband registers (12 in td) | td | 2 | 1 | 1 | 16 | 26 | All of these rams could be made from 1r1w_16d32w RAMs. |
| | | 2 | 1 | 1 | 16 | 28 | |
| | | 2 | 1 | 1 | 16 | 29 | |
| | | 4 | 1 | 1 | 16 | 32 | |
| ta setup fifos (3 in ta) | ta | 2 | 3 | 1 | 64 | 36 | s,t: 64x36b |
| | | 1 | 3 | 1 | 64 | 51 | qt: 64x51b |
| td setup fifos (7 in td) | td | 1 | 1 | 1 | 32 | 22 | xy: 32x22b |
| | | 4 | 3 | 1 | 64 | 25 | a,r,g,b: 64x25b |
| | | 2 | 1 | 1 | 64 | 36 | qp,z: 64x36b |
| td iterator state (4 in td) | ta | 2 | 1 | 1 | 32 | 36 | s,t: 32x36b |
| | | 1 | 1 | 1 | 32 | 51 | qt: 32x51b |
| ta iterator state (3 in ta) | td | 4 | 1 | 1 | 32 | 25 | a,r,g,b: 32x25b |
| accumulate fifo (1) | td | 2 | 1 | 1 | 16 | 128 | Depth of 16 supports packets of 10 to16 quads. Two rams of 128b are used to create a 16x256b RAM equivalent. |

| purpose | unit | count | read | write | depth | width | comments |
|---|---|---|---|---|---|---|---|
| recursion fifo (1) | ta | 1 | 1 | 1 | 60 | 190 | Depth of 60 supports 6 packets of 10 quads. Width of 190 supports RGB*13b*4pix + pstate (34 bits). |
| color cache (4) | tc | 4 | 1 | 1 | 16 | 128 | The 4 read ports read 128 bits into 4 sets of 4-to-1 muxs to generate 4 32-bit buses. |
| raw cache | tc | 1 | 1 | 1 | 16 | 256 | |
| color context | tc | 1 | 1 | 1 | 128 | 188 | |
| raw context | tc | 1 | 1 | 1 | 128 | 16 | |
| palette | tc | 1 | 1 | 1 | 256 | 24 | |
| totals | ta<br>td<br>tc<br>all | 16<br>24<br>8<br>48 | - | - | - | - | Ideal RAMs. Many will likely be split. |

18600 

| | | | | | | | |
|---|---|---|---|---|---|---|---|
| TextureCache | | 2 | | | 0 | 89139 | | |
| | Logic (T Estimate) | 2 | 1 | 20931 | 20931 | | | |
| | Cache RAMs | 2 | 8 | 4096 | 32768 | | 16384 | |
| | Cache RAM Ports | 2 | 24 | 200 | 4800 | | | |
| | Fifos for Fractions, Texture Tags, and Kernal ID (100 deep) | 2 | 1 | | 0 | | 5200 | |
| | Pallette, 1w4r 256x32 | 2 | 1 | 640 | 640 | | 8192 | |
| | Texture Decompression Unit | 2 | 1 | 20000 | 20000 | | | |
| | Misc | 2 | 1 | 10000 | 10000 | | | |
| Filter | | 2 | | | 0 | 85488 | | |
| | Lerp Unit | 2 | 48 | 1468 | 70464 | | | |
| | Chroma Key Unit | 2 | 2 | 1332 | 2664 | | | |
| | Adder | 2 | 16 | 300 | 4800 | | | |
| | Coefficient Lookup | 2 | 1 | 200 | 200 | | | |
| | Multiplier | 2 | 16 | 460 | 7360 | | | |
| ColorIterator | | 2 | | | 0 | 12780 | | |
| | Attribute FIFO | 2 | | | 0 | | 3072 | |
| | Initial Color Iterator | 2 | 4 | 2138 | | | | |
| | Additional Color Iterator | 2 | 4 | 891 | 3564 | | | |
| | RAMs | 2 | 12 | 768 | 9216 | | | 2304 |
| CombineUnit | | 2 | | | 0 | 52224 | | |
| | f(a-b)+c modules | 2 | 24 | 1756 | 42144 | | | |
| | Accumulator | 2 | 8 | 1260 | 10080 | | | |
| RecursionPath | | 2 | | | 0 | 13248 | | |
| | 2x2 Transform: a*b+c*d | 2 | 8 | 1576 | 12608 | | | |
| | Register stage | 2 | 2 | 320 | 640 | | | |
| Slop | | | | | 30% | 123931.5 | | |
| | | | | | | | | |
| Total gate Count | | | | | | 537036.5 | 32848 | 7296 |

| STG – S and T Generator | Test |
|---|---|
| Test iterator SOW, TOW and OOW limits and iterations | TA_STG_IT.EXE |
| Test Quad neighbor generation | TA_STG_IT.EXE |
| Test delta adds to SOW, TOW,OOW (recursion push, pop) | TA_STG_FI_RECUR.EXE |
| Test integer to float math | TA_STG_IT.EXE<br>Many others |
| Test negative W clamp of S,T | TA_LMS_RC.EXE<br>TA_STG_IT.EXE<br>TA_LMS_FI.EXE |
| Test S, T and W shifts | TA_STG_RC_RECUR.EXE |
| Test limits of W reciprocal unit | TA_STG_IT.EXE |
| Test post W multiply | TA_STG_FI_RECUR.EXE |
| Test log2 ST bias | TA_STG_FI_RECUR.EXE |
| Test post perturb LMS | TA_STG_FI_RECUR.EXE |
| Test register variations as defined in Table 1. | TA_STG_RC.EXE |

| LMS – Log of Map Size Calculation | Test |
|---|---|
| Test generation of all valid LMS values (0-11) | TA_LMS_FI.EXE<br>TC_STP.EXE |
| Test range of aniratio | TA_LMS_FI.EXE |
| Test aniratio clamping | TA_LMS_FI.EXE |
| Test aniratio scaling | TA_LMS_FI.EXE |
| Test limits of dsdc and dsdt outputs | TA_LMS_MO_DPDC.EXE |
| Test register variations as defined in Table 1. | TA_LMS_RC.EXE |

| KER – Kernel Walker | Test |
|---|---|
| Test bilinear, trilinear, and anisotropic modes | TA_LMS_FI.EXE |
| Test texturing modes with defined and random anisotropic ratios to exercise different number of kernel step sizes and steps | TA_LMS_FI.EXE |
| Test lookup table to ensure all 256 entries are touched | TA_LMS_FI.EXE??? |

| TAD/TC – Texture Address / Cache Units | Test |
|---|---|
| Test legacy modes (split, odd, 0frac, old trilinear) | TC_LEG.EXE |
| Test linear and tiled textures | TC_STP.EXE |
| Test ST wrap modes | TC_STP.EXE |
| Test NPT textures | TC_NPT.EXE |
| Test textures up to 2048x2048 | TC_STP.EXE |
| Test texture aspect ratios | TC_STP.EXE |
| Test all texture formats | TC_FMT.EXE |
| Test LMS dither | TC_DIT.EXE<br>TA_LMS_RC.EXE |
| Test memory base address modes | TC_MBA.EXE |
| Test AGP/Local memory access | TC_MBA.EXE |
| Test staggered tiling mode | TC_MBA.EXE |
| Test register variations as defined in Table 1 | TC_MBA.EXE<br>TC_NPT.EXE |

| FLT – Filter Unit | Test |
|---|---|
| Test point sampling, bilinear, trilinear, anisotropic bilinear and anisotropic trilinear | Many tests |
| Test chromakey functions | TD_RANDCHROMA.EXE |
| Test LIRP equation W*(A-B)+B | Many tests |
| Test clamping | Many tests |

| COM – Combine Unit | Test |
|---|---|
| TCC Test each of 10 possible source inputs | TD_TCU.EXE |
| TCC Test each of 4 invert functions | TD_TCU.EXE |
| TCC Test (A+B)*C +D equation | TD_TCU.EXE |
| TCC Test min/max select mux | TD_TCU.EXE |
| TCC Test Output Clamp function | TD_TCU.EXE |
| TCA Test each of 6 possible source inputs | TD_TCU.EXE |
| TCA Test each of 4 invert functions | TD_TCU.EXE |
| TCA Test (A+B)*C +D equation | TD_TCU.EXE |
| TCA Test min/max select mux | TD_TCU.EXE |
| TCA Test Output Clamp function | TD_TCU.EXE |
| CCC Test each of 15 possible source inputs | TD_CCU.EXE |
| CCC Test override mux select for B,C, & C inputs | TD_CCU.EXE |
| CCC Test chroma key function | TD_RANDCHROMA.EXE |
| CCC Test zero/A mux | TD_CCU.EXE |
| CCC Test each of 4 invert functions | TD_CCU.EXE |
| CCC Test (A+B)*C +D equation | TD_CCU.EXE |
| CCC Test min/max select mux | TD_CCU.EXE |
| CCC Test Output Clamp function | TD_CCU.EXE |
| CCA Test each of 9 possible source inputs | TD_CCU.EXE |
| CCA Test alpha mask function | TD_CCU.EXE |
| CCA Test zero/A mux selection | TD_CCU.EXE |
| CCA Test each of 4 invert functions | TD_CCU.EXE |
| CCA Test (A+B)*C +D equation | TD_CCU.EXE |
| CCA Test min/max select mux | TD_CCU.EXE |
| CCA Test Output Clamp selection | TD_CCU.EXE |
| Test overbright color paths | TD_RANDTRI.EXE |
| Test 4 term dot product, 3 term dot product, 2x3 matrix multiply | |
| Test limits of output clamping modes | TD_COM_IT.EXE |
| Test corner cases for math functions | TD_COM_IT.EXE |

Fig. 192

19300 

| ACC – Accumulator | Test |
|---|---|
| Test accumulator add | TD_ACC.EXE |
| Test accumulator load | TD_ACC.EXE |
| Test 4 accumulator shift positions | TD_ACC.EXE |
| Test limits of output clamp function | TD_ACC.EXE |

Fig. 193

19400 

| Iterators | Test |
|---|---|
| Test iterator widths | TA_STG_IT.EXE<br>TD_COM_IT.EXE |
| Test multiple TMU iterations | TD_RANDTRI.EXE<br>TA_LMS_RC.EXE |
| Test AA coverage mask correction | |

Fig. 194

19500 

| Sideband | Test |
|---|---|
| Test state changes (last used) | TA_LMS_RC.EXE |

| Texture mapping: | Test |
|---|---|
| 8-Iterations of different texture maps, combine | TD_RANDTRI.EXE |
| 4 levels of texture recursions | |
| several tests with different combinations of push/pop states | |
| Render a texture suitable to test clamp/repeat/mirror and clamp to black caps | TC_STP.EXE |
| Texture combining | TA_LMS_FI_LMS2TCU.EXE TA_LMS_FI_DETAIL.EXE |
| Texture recursion (address perturbation) | |
| Bump mapping | |
| Shadow mapping | |
| Different texture formats | TC_FMT.EXE |
| Non-power of two textures | TC_NPT.EXE |

| Lighting | Test |
|---|---|
| Overbright and underbright light handling | LIGHT.EXE |

| Math | Test |
|---|---|
| Test Dot Product and Matrix Multiply | MATH.EXE |

| REGISTER | Mod. | Test Name | Comments |
|---|---|---|---|
| TaControl Fields | | | |
| NUM_TMUS | STG, REC | Ta_stg_fi_recur.c, ta_stg_rc.c | _grRebuildDataList, _grValidateState |
| REC_PUSH | STG, REC | Ta_stg_fi_recur.c, ta_stg_rc.c | _grValidateState, grTexRecursionExt |
| REC_POP | STG, REC | Ta_stg_fi_recur.c, ta_stg_rc.c | _grValidateState, grTexRecursionExt |
| DISPATCH_ID | | Not in CSIM | ?? |
| PUSH_LIMIT | REC | | ?? |
| RAW_CACHE_DISABLE | | Not in CSIM | Not exposed by GlideX |
| COLOR_CACHE_DISABLE | | Not in CSIM | Not exposed by GlideX |
| taMode Fields | | | |
| EN_TEXTUREMAP | LMS | All | GrTexSource=1, grTexSourceExt=1 |
| MINFILTER | LMS, FLT | Ta_lms_fi.c, Ta_lms_rc.c | GrTexFilterMode |
| MAGFILTER | LMS, FLT | Ta_lms_fi.c, Ta_lms_rc.c | GrTexFilterMode |
| MAX_ANI_RATIO | LMS | Ta_lms_fi.c, Ta_lms_rc.c | GrTexAnisotropicMaxRatioExt |
| UNIT_STEP_SIZE | LMS | Ta_lms_fi.c, Ta_lms_rc.c | Not exposed by glide |
| ANI_RSCALE_LOG2 | LMS | Ta_lms_fi.c, Ta_lms_rc.c | ?? |
| ANI_MIN_FORCE_AR1 | LMS | Ta_lms_rc.c | ?? |
| CLAMPW | LMS | Ta_lms_rc.c | GrTexSource=1, grTexSourceExt=1 |
| LMS_DITHER | LMS | TC_DIT.c | GrTexMipMapMode |
| LOD_2_TCU_SEL | LMS | ta_lms_fi_lms2tcu.c | GrTexLODSelectExt, grTexCombine |
| OLD_TRILINEAR | LMS | TC_LEG.c | GrTexMipMapMode |
| WRAP_S | TAD | TC_STP.c | GrTexClampMode |
| WRAP_T | TAD | TC_STP.c | GrTexClampMode |
| TEX_IS_TILED | TAD | TC_STP.c | GrTexSource, grTexSourceExt |
| FORMAT | TAD | TC_FMT.c | GrTexSource, grTexSourceExt |

| REGISTER | Mod. | Test Name | Comments |
|---|---|---|---|
| taLMS Fields | | | |
| LMS_MIN | LMS | Ta_lms_fi.c, Ta_lms_rc.c | GrTexSource, grTexSourceExt, grTexMipMapMode |
| LMS_MAX | LMS | Ta_lms_fi.c, Ta_lms_rc.c | GrTexSource, grTexSourceExt, GrTexMipMapMode |
| LMS_BIAS | LMS | Ta_lms_fi.c, Ta_lms_rc.c | GrTexLodBiasValue |
| LMS_LAR | LMS, TAD | TC_STP.c | GrTexSource |
| LMS_S_IS_LARGER | LMS, TAD | TC_STP.c | GrTexSource |
| LMS_ZERO_FRAC | LMS | TC_LEG.c | ?? |
| LMS_ODD | LMS | TC_LEG.c | GrTexMipMapMode, grTexSource, grTexCombine |
| LMS_TSPLIT | LMS, TAD | TC_LEG.c | GrTexMipMapMode |
| LMS_MBA_MODE | LMS, TAD | TC_MBA.c | GrTexMultibase, grTexMultiBaseModeExt |
| EN_NPT | LMS, TAD | TC_NPT.c | GrTexSourceExt |
| | | | |
| taShiftBias Fields | | | |
| REC_POST_WMULT | STG | Ta_stg_fi_recur.c | GrTexPerturbExt |
| REC_ST_SHIFT | STG | Ta_stg_fi_recur.c | GrTexPerturbExt |
| REC_W_SHIFT | STG | Ta_stg_fi_recur.c | GrTexPerturbExt |
| S_BIAS_LOG2 | LMS | Ta_stg_fi_recur.c | GrTexPerturbExt |
| T_BIAS_LOG2 | LMS | Ta_stg_fi_recur.c | GrTexPerturbExt |
| POST_PERTURB_LMS | LMS | Ta_stg_fi_recur.c | GrTexPerturbExt |
| | | | |
| taDetail Fields | | | |
| DETAIL_MAX | LMS | Ta_lms_fi_detail.c | GrTexDetailControl |
| DETAIL_BIAS | LMS | Ta_lms_fi_detail.c | GrTexDetailControl |
| DETAIL_SCALE | LMS | Ta_lms_fi_detail.c | GrTexDetailControl |
| TEXEL_AREA_SCALE_LOG2 | LMS | Ta_lms_fi_detail.c | ?? |
| | | | |
| taNPT Fields | | | |
| NPT_S_MAX | TAD | TC_NPT.c | GrTexSourceExt |
| NPT_S_STRIDE | TAD | TC_NPT.c | GrTexSourceExt |
| NPT_T_MAX | TAD | TC_NPT.c | GrTexSourceExt |

Fig. 199B

19900

| REGISTER | Mod. | Test Name | Comments |
|---|---|---|---|
| taBaseAddr0 Fields | | | |
| TEX_AGP | TAD | TC_MBA.c | GrTexSource, grTexSourceExt |
| TEX_STAGGERED | TAD | TC_MBA.c | GrTexSource, grTexSourceExt |
| NPT_TM | TAD | TC_NPT.c | ?? |
| TEX_BASE_ADDR | TAD | TC_MBA.c | GrTexSource, grTexSourceExt |
| taTcuColor Fields | | | |
| TCC_A_SELECT | COM | TD_TCU.c | grTexCombineColorExt |
| TCC_B_SELECT | COM | TD_TCU.c | grTexCombineColorExt |
| TCC_C_SELECT | COM | TD_TCU.c | grTexCombineColorExt |
| TCC_D_SELECT | COM | TD_TCU.c | grTexCombineColorExt |
| TCC_A_MODE | COM | TD_TCU.c | grTexCombineColorExt |
| TCC_B_MODE | COM | TD_TCU.c | grTexCombineColorExt |
| TCC_C_MODE | COM | TD_TCU.c | grTexCombineColorExt |
| TCC_D_MODE | COM | TD_TCU.c | grTexCombineColorExt |
| TCC_OUT_CLAMP | COM | TD_TCU.c | grTexCombineColorExt |
| TCC_EN_MIN_MAX | COM | TD_TCU.c | grTexCombineColorExt |
| TCC_TEX_SHIFT | COM | TD_TCU.c | grTexCombineColorExt |
| taTcuAlpha Fields | | | |
| TCA_A_SELECT | COM | TD_TCU.c | grTexCombineAlphaExt |
| TCA_B_SELECT | COM | TD_TCU.c | grTexCombineAlphaExt |
| TCA_C_SELECT | COM | TD_TCU.c | grTexCombineAlphaExt |
| TCA_D_SELECT | COM | TD_TCU.c | grTexCombineAlphaExt |
| TCA_A_MODE | COM | TD_TCU.c | grTexCombineAlphaExt |
| TCA_B_MODE | COM | TD_TCU.c | grTexCombineAlphaExt |
| TCA_C_MODE | COM | TD_TCU.c | grTexCombineAlphaExt |
| TCA_D_MODE | COM | TD_TCU.c | grTexCombineAlphaExt |
| TCA_OUT_CLAMP | COM | TD_TCU.c | grTexCombineAlphaExt |
| TCA_EN_MIN_MAX | COM | TD_TCU.c | grTexCombineAlphaExt |
| TCA_TEX_SHIFT | COM | TD_TCU.c | grTexCombineAlphaExt |

| REGISTER | Mod. | Test Name | Comments |
|---|---|---|---|
| taCcuColor Fields | | | |
| CCC_A_SELECT | COM | TD_CCU.c | grColorCombineColorExt |
| CCC_B_SELECT | COM | TD_CCU.c | grColorCombineColorExt |
| CCC_C_SELECT | COM | TD_CCU.c | grColorCombineColorExt |
| CCC_D_SELECT | COM | TD_CCU.c | grColorCombineColorExt |
| CCC_A_MODE | COM | TD_CCU.c | grColorCombineColorExt |
| CCC_B_MODE | COM | TD_CCU.c | grColorCombineColorExt |
| CCC_C_MODE | COM | TD_CCU.c | grColorCombineColorExt |
| CCC_D_MODE | COM | TD_CCU.c | grColorCombineColorExt |
| CCC_OUT_MODE | COM | TD_CCU.c | grColorCombineColorExt |
| CCC_OUT_CLAMP | COM | TD_CCU.c | grColorCombineColorExt |
| CCC_EN_MIN_MAX | COM | TD_CCU.c | grColorCombineColorExt |
| CCC_OVERRIDE_ATEX | COM | Needs to be added to td_ccu.c | _grUpdateCCU |
| CCC_A_ZERO | COM | TD_CCU.c | _grUpdateCCU |
| ACC_LOAD | ACC | TD_ACC.c | grAccumCombineExt |
| ACC_ADD | ACC | TD_ACC.c | grAccumCombineExt |
| taCcuAlpha Fields | | | |
| CCA_A_SELECT | COM | TD_CCU.c | grColorCombineAlphaExt |
| CCA_B_SELECT | COM | TD_CCU.c | grColorCombineAlphaExt |
| CCA_C_SELECT | COM | TD_CCU.c | grColorCombineAlphaExt |
| CCA_D_SELECT | COM | TD_CCU.c | grColorCombineAlphaExt |
| CCA_A_MODE | COM | TD_CCU.c | grColorCombineAlphaExt |
| CCA_B_MODE | COM | TD_CCU.c | grColorCombineAlphaExt |
| CCA_C_MODE | COM | TD_CCU.c | grColorCombineAlphaExt |
| CCA_D_MODE | COM | TD_CCU.c | grColorCombineAlphaExt |
| CCA_OUT_MODE | COM | TD_CCU.c | grColorCombineAlphaExt |
| CCA_OUT_CLAMP | COM | TD_CCU.c | grColorCombineAlphaExt |
| CCA_EN_MIN_MAX | COM | TD_CCU.c | grColorCombineAlphaExt |
| CCA_EN_ALPHA_MASK | COM | TD_CCU.c | ?? |
| CCA_A_ZERO | COM | TD_CCU.c | _grUpdateCCU |
| ACC_SHIFT | ACC | TD_ACC.c | ?? |
| taTexChromaKey Fields | | | |
| TCHROMA_KEY_BLUE | FLT | TD_RANDCHROMA.c | |
| TCHROMA_KEY_GREEN | FLT | TD_RANDCHROMA.c | |
| TCHROMA_KEY_RED | FLT | TD_RANDCHROMA.c | |
| TCHROMA_MODE | FLT | TD_RANDCHROMA.c | |

| REGISTER | Mod. | Test Name | Comments |
|---|---|---|---|
| taTexChromaRange Fields | | | |
| TCHROMA_RANGE_BLUE_UPPER_LIMIT | FLT | TD_RANDCHROMA.c | |
| TCHROMA_RANGE_GREEN_UPPER_LIMIT | FLT | TD_RANDCHROMA.c | |
| TCHROMA_RANGE_RED_UPPER_LIMIT | FLT | TD_RANDCHROMA.c | |
| TCHROMA_RANGE_BLUE_EX | FLT | TD_RANDCHROMA.c | |
| TCHROMA_RANGE_GREEN_EX | FLT | TD_RANDCHROMA.c | |
| TCHROMA_RANGE_RED_EX | FLT | TD_RANDCHROMA.c | |
| TCHROMA_RANGE_BLOCK_OR | FLT | TD_RANDCHROMA.c | |
| | | | |
| taChromaKey Fields | | | |
| CHROMA_KEY_BLUE | COM | TD_RANDCHROMA.c | |
| CHROMA_KEY_GREEN | COM | TD_RANDCHROMA.c | |
| CHROMA_KEY_RED | COM | TD_RANDCHROMA.c | |
| CHROMA_MODE | COM | TD_RANDCHROMA.c | |
| | | | |
| taChromaRange Fields | | | |
| CHROMA_RANGE_BLUE_UPPER_LIMIT | COM | TD_RANDCHROMA.c | |
| CHROMA_RANGE_GREEN_UPPER_LIMIT | COM | TD_RANDCHROMA.c | |
| CHROMA_RANGE_RED_UPPER_LIMIT | COM | TD_RANDCHROMA.c | |
| CHROMA_RANGE_BLUE_EX | COM | TD_RANDCHROMA.c | |
| CHROMA_RANGE_GREEN_EX | COM | TD_RANDCHROMA.c | |
| CHROMA_RANGE_RED_EX | COM | TD_RANDCHROMA.c | |
| CHROMA_RANGE_BLOCK_OR | COM | TD_RANDCHROMA.c | |
| | | | |
| taColorAR0 Fields | | | |
| CONSTANT_COLOR0_RED | COM | TD_CCU.c | |
| CONSTANT_COLOR0_ALPHA | COM | TD_CCU.c | |
| | | | |
| taColorGB0 Fields | | | |
| CONSTANT_COLOR0_BLUE | COM | TD_CCU.c | |
| CONSTANT_COLOR0_GREEN | COM | TD_CCU.c | |
| | | | |
| taColorAR1 Fields | | | |
| CONSTANT_COLOR1_RED | COM | TD_CCU.c | |
| CONSTANT_COLOR1_ALPHA | COM | TD_CCU.c | |
| | | | |
| taColorGB1 Fields | | | |
| CONSTANT_COLOR1_BLUE | COM | TD_CCU.c | |
| CONSTANT_COLOR1_GREEN | COM | TD_CCU.c | |

| Module Under Test<br>• Software Interaction | Module Level Diagnostic | Comments |
|---|---|---|
| Dispatcher (ta_dis) | | |
| • ta_num_tex[2:0] | | |
| • ta_rec_push[7:1] | | |
| • ta_rec_pop[6:0] | | |
| • ta_rec_dispatch_id | | |
| • ta_rec_push_limit[2:0] | | |
| • ta_dis_raw_cache | | |
| • ta_dis_color_cache | | |
| S and T Generator (ta_stg) | | |
| • ta_rec_pop[6:0] | | |
| • ta_rec_st_shift[7:0] | | |
| • ta_rec_w_shift[7:0] | | |
| Log of Map Size (ta_lms) | | |
| • ta_en_texture | | |
| • ta_min_filter[1:0] | | |
| • ta_mag_filter[1:0] | | |
| • ta_max_ani_ratio[3:0] | | |
| • ta_clamp_w | | |
| • ta_lms_dither | | |
| • ta_lms2tcu_sel[1:0] | | |
| • ta_old_trilinear | | |
| • ta_lms_min[5:0] | | |
| • ta_lms_max[5:0] | | |
| • ta_lms_bias[5:0] | | |
| • ta_lms_zero_frac | | |
| • ta_lms_odd | | |
| • ta_lms_log_aspect[3:0] | | |
| • ta_lms_s_is_larger | | |
| • ta_lms_tsplit | | |
| • ta_s_bias_log2[3:0] | | |
| • ta_t_bias_log2[3:0] | | |
| • ta_detail_max[7:0] | | |
| • ta_detail_bias[5:0] | | |
| • ta_detail_scale[2:0] | | |

| Module Under Test<br>• Software Interaction | Module Level Diagnostic | Comments |
|---|---|---|
| Kernel Walker (ta_ker) | | |
| • ta_min_filter[1:0] | | |
| • ta_mag_filter[1:0] | | |
| • ta_max_ani_ratio[3:0] | | |
| Texture Address (ta_tad) | | |
| • ta_wrap_s[1:0] | | |
| • ta_wrap_t[1:0] | | |
| • ta_tex_is_tiled | | |
| • ta_tex_format[4:0] | | |
| • ta_lms_log_aspect[3:0] | | |
| • ta_lms_s_is_larger | | |
| • ta_lms_tsplit | | |
| • ta_lms_mba_mode[1:0] | | |
| • ta_lms_en_npt | | |
| • ta_npt_s_max[10:0] | | |
| • ta_npt_s_stride[8:0] | | |
| • ta_npt_t_max[10:0] | | |
| • ta_tex_agp | | |
| • ta_tex_staggered | | |
| • ta_tex_base_addr[31:5] | | |
| Filter Unit (ta_flt) | | |
| • ta_min_filter[1:0] | | |
| • ta_mag_filter[1:0] | | |
| • ta_max_ani_ratio[3:0] | | |

Fig. 200B

20000

| Module Under Test<br>• Software Interaction | Module Level Diagnostic | Comments |
|---|---|---|
| Combine Unit (ta_com) | | |
| • ta_tcc_a_select[3:0] | | |
| • ta_tcc_b_select[3:0] | | |
| • ta_tcc_c_select[3:0] | | |
| • ta_tcc_d_select[3:0] | | |
| • ta_tcc_a_mode[1:0] | | |
| • ta_tcc_b_mode[1:0] | | |
| • ta_tcc_c_mode[1:0] | | |
| • ta_tcc_d_mode[1:0] | | |
| • ta_tcc_out_clamp | | |
| • ta_tcc_en_min_max | | |
| • ta_tcc_tex_shift[2:0] | | |
| • ta_tca_a_select[3:0] | | |
| • ta_tca_b_select[3:0] | | |
| • ta_tca_c_select[3:0] | | |
| • ta_tca_d_select[3:0] | | |
| • ta_tca_a_mode[1:0] | | |
| • ta_tca_b_mode[1:0] | | |
| • ta_tca_c_mode[1:0] | | |
| • ta_tca_d_mode[1:0] | | |
| • ta_tca_out_clamp | | |
| • ta_tca_en_min_max | | |
| • ta_tca_tex_shift[2:0] | | |
| • ta_ccc_a_select[3:0] | | |
| • ta_ccc_b_select[3:0] | | |
| • ta_ccc_c_select[3:0] | | |
| • ta_ccc_d_select[3:0] | | |
| • ta_ccc_a_mode[1:0] | | |
| • ta_ccc_b_mode[1:0] | | |
| • ta_ccc_c_mode[1:0] | | |
| • ta_ccc_d_mode[1:0] | | |
| • ta_ccc_out_mode[1:0] | | |
| • ta_ccc_out_clamp | | |
| • ta_ccc_en_min_max | | |
| • ta_ccc_override_atex | | |
| • ta_ccc_a_zero | | |
| • ta_acc_load | | |

| Module Under Test<br>• Software Interaction | Module Level Diagnostic | Comments |
|---|---|---|
| Combine Unit (ta_com) | | |
| • ta_acc_add | | |
| • ta_cca_a_select[3:0] | | |
| • ta_cca_b_select[3:0] | | |
| • ta_cca_c_select[3:0] | | |
| • ta_cca_d_select[3:0] | | |
| • ta_cca_a_mode[1:0] | | |
| • ta_cca_b_mode[1:0] | | |
| • ta_cca_c_mode[1:0] | | |
| • ta_cca_d_mode[1:0] | | |
| • ta_cca_out_mode[1:0] | | |
| • ta_cca_out_clamp | | |
| • ta_cca_en_min_max | | |
| • ta_cca_en_alpha_mask | | |
| • ta_cca_a_zero | | |
| • ta_acc_shift[1:0] | | |
| • ta_color0,1_a[12:0] | | |
| • ta_color0,1_r[12:0] | | |
| • ta_color0,1_g[12:0] | | |
| • ta_color0,1_b[12:0] | | |
| • ta_tchroma_r[7:0] | | |
| • ta_tchroma_g[7:0] | | |
| • ta_tchroma_b[7:0] | | |
| • ta_tchroma_mode[1:0] | | |
| • ta_tchroma_min_alpha | | |
| • ta_tchroma_max_alpha | | |
| • ta_tchroma_range_r[7:0] | | |
| • ta_tchroma_range_g[7:0] | | |
| • ta_tchroma_range_b[7:0] | | |
| • ta_tchroma_range_r_ex | | |
| • ta_tchroma_range_g_ex | | |
| • ta_tchroma_range_b_ex | | |
| • ta_tchroma_range_block_or | | |
| • ta_cchroma_r[7:0] | | |
| • ta_cchroma_g[7:0] | | |
| • ta_cchroma_b[7:0] | | |

| Module Under Test<br>• Software Interaction | Module Level Diagnostic | Comments |
|---|---|---|
| Combine Unit (ta_com) | | |
| • ta_cchroma_mode[1:0] | | |
| • ta_cchroma_range_r[7:0] | | |
| • ta_cchroma_range_g[7:0] | | |
| • ta_cchroma_range_b[7:0] | | |
| • ta_cchroma_range_r_ex | | |
| • ta_cchroma_range_g_ex | | |
| • ta_cchroma_range_b_ex | | |
| • ta_cchroma_range_block_or | | |

| Features | Modes | Diags |
|---|---|---|
| • All module level tests | consistent state | |
| • Small to large polygons | random state | |
| 0 to 8 textures | | |
| • 0 to 8 RGBAs | | |
| • Q and Z iteration | | |
| • composite & recursive textures | | |
| • accumulation textures | | |
| bi, tri & ani filtering | | |
| sgram & agp texturing | | |
| texture base addresses | | |
| texture formats | | |
| texture cache flush | | |
| illegal dispatches | | |
| over bright textures and iteration | | |
| bump mapping | | |
| shadow mapping | | |
| • matrix multiply | | |
| dot products | | |
| LFBs | | |
| Legacy features | | |
| Real application performance | | |
| Benchmark performance | | |

```
RRRRRRRR
. . . . . . . .
. . . . . . . .
. . . . . . . .
. . . . . . . .
. . . . . . . .
. . . . . . . .
GGGGGGGG
```

```
        tmu #

20600 tmu0
```
........
........
........
........
........
........
........
.......X
```
Fig. 206

20700

```
tmu1       tmu0       tmu1 > tmu0
........   ........   ........
........   ........   ........
........   ........   ........
........   ........   ........
........   ........   ........
........   ........   ........
........   ......X.   ......X.
......X.   .......X   ......XX
```
Fig. 207

20800

```
tmu2        tmu1        tmu0        (tmu2 # tmu1) > tmu0
........    ........    ........    ........
........    ........    ........    ........
........    ........    ........    ........
........    ........    ........    ........
........    ........    ........    ........
........    ........    ........    ........
........    ........    .....XX.    .....XX.
.....X..    ......X.    .......X    .....XXX
```
Fig. 208

21902  21904

LOD N  LOD N+1

22000

22200

| State | Bump Map | Refl map | Specular Surface | diffuse Light | diffuse Surface |
|---|---|---|---|---|---|
| Texture # | Tex 4 | Tex 3 | Tex 2 | Tex 1 | Tex 0 |
| SST_TPERSP_ST | 1 | 1 | 1 | 1 | 1 |
| SST_TCU0_TOTHER_SRC | TEX1 | TEX1 | TEX1 | TEX1 | TEX1 |
| SST_TCU0_TLOCAL_SRC | TEX0 | TEX0 | TEX0 | TEX0 | TEX0 |
| SST_TCU1_TLOCAL_SRC | Feedback | Feedback | Feedback | Feedback | Feedback |
| SST_TMINFILTER(0/1) | Bilin/Bilin | Bilin/Bilin | Bilin/Bilin | Bilin/Bilin | Bilin/Bilin |
| SST_TMAGFILTER(0/1) | Bilin/Bilin | Bilin/Bilin | Bilin/Bilin | Bilin/Bilin | Bilin/Bilin |
| SST_TLODDITHER(0/1) | 0/0 | 0/0 | 0/0 | 0/0 | 0/0 |
| SST_TLFORMAT(0/1) | Bump/Bump | ARGB1555 | ARGB1555 | ARGB1555 | ARGB155 |
| SST_TC_ZERO_OTHER_0 | Cother | Cother | Cother | Cother | Cother |
| SST_TC_ZERO_OTHER_1 | 0 | x | Cother | x | Cother |
| SST_TC_SUB_CLOCAL_0 | Local | Local | Local | Local | Local |
| SST_TC_SUB_CLOCAL_1 | Local | 0 | 0 | 0 | 0 |
| SST_TC_MSELECT_0 | LODFrac | LODFrac | LODFrac | LODFrac | LODFrac |
| SST_TC_MSELECT_1 | CONST1 (2x2 xform mults) | 0 | Local | 0 | Local |
| SST_TC_REVERSE_BLEND(0/1) | 0/1 | 0/0 | 0/0 | 0/0 | 0/0 |
| SST_TC_CLAMP_F | 0 | 0 | 0 | 0 | 0 |
| SST_TC_CLAMP_OUT_RANGE | 3 | 2 | 2 | 2 | 2 |
| SST_TC_ADD_CLOCAL, SST_TC_ADD_ALOCAL | 0/1 | 0/1 | 0/1 | 0/1 | 0/1 |
| SST_TC_INVERT_OUTPUT | 0 | 0 | 0 | 0 | 0 |
| SST_RECURSION_ENABLE | 0 | 1 | 0 | 0 | 0 |
| COMBINE UNIT BITS: | | | | | |
| SST_RGBSELECT | 1 | 1 | 1 | 1 | 1 |
| SST_LOCALSELECT | CtexSwizzle | x | x | x | x |
| SST_LOCALSELECT_OVERRIDE_WITH ATEX | 0 | x | x | x | x |
| SST_CC_ZERO_OTHER | 0 | 0 | 0 | 0 | 0 |
| SST_CC_SUB_CLOCAL | 0 | 0 | 0 | 0 | 0 |
| SST_CC_MSELECT | 0 | 0 | 0 | 0 | 0 |
| SST_CC_REVERSE_BLEND | 1 | 1 | 1 | 1 | 1 |
| SST_CC_ADD_CLOCAL | 1 | 0 | 0 | 0 | 0 |

Fig. 222

GRAPHICS PROCESSING SYSTEM HAVING A VIRTUAL TEXTURING ARRAY

RELATED APPLICATION(S)

This application claims the priority of a provisional patent application filed Dec. 7, 2000 under Ser. No. 60/254,022, and which is incorporated herein by reference in its entirety.

FIELD OF THE INVENTION

The present invention relates generally to the field of image processing, and more particularly to an apparatus for combining texel images to generate graphics images.

BACKGROUND OF THE INVENTION

Recent advances in computer performance have enabled graphics systems to provide more realistic graphical images using personal computers and home video game computers. In such graphics systems, some procedure must be implemented to "render" or draw graphics primitives to the screen of the system. "Graphics primitives" are a basic component of a graphics picture, such as a polygon, e.g., a triangle, or a vector. All graphics pictures are formed with combinations of these graphic primitives. Many procedures may be utilized to perform graphics primitives rendering.

Conventional graphics systems perform these graphics rendering procedures using a frame buffer. A frame buffer generally comprises a plurality of computer memory chips that store information concerning pixel activation on the system's display screen. Generally, the frame buffer includes all of the graphics data information that will be written onto the screen.

In the past, there have been many attempts to design hardware implementations of the various components of the standard graphics-processing pipeline. Such designs have primarily focused on increasing speed, efficiency, and an overall performance of the processing architecture.

DISCLOSURE OF THE INVENTION

A graphics processing system is provided. The graphics processing system includes a front end module for receiving pixel data. A setup unit is coupled to the front end module and generates parameter coefficients. A raster unit is coupled to the setup unit and generates stepping information. A virtual texturing array engine textures and colors the pixel data based on the parameter coefficients and stepping information. Also provided is a pixel engine adapted for processing the textured and colored pixel data received from the virtual texturing array engine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3 shows 8-bit textures that may be supported by one embodiment of the virtual texturing array.

FIG. 4 depicts several 16-bit textures that can be supported by an embodiment of the virtual texturing array.

FIG. 5 illustrates several other textures that can be supported according to an embodiment of the virtual texturing array.

FIG. 11 illustrates examples of recursion equations.

FIG. 14 is a table depicting pixel state, its functions, and destinations.

FIG. 15 is a table depicting triangle state, its functions, and destinations.

FIG. 16 is a table showing Mode State per VTA.

FIGS. 17A–E together depict a table describing Mode State per texture.

FIG. 28 is a table listing outputs to the ST Scaler.

FIG. 29 is a table listing outputs to a Log of Mipmap Side (LMS) calculation.

FIG. 30 is a diagram that illustrates the parameters used in the calculation of LMS for the locations of a 2×2 pixel quad in texture space.

FIG. 31 is a diagram that illustrates the parameters used in the calculation of Anisotropic Area for the locations of a 2×2 pixel quad in texture space.

FIG. 54 illustrates the packaging for 4 bbp and an AR of 32, 64, 128, 256, 512, 1024, 2048 where T is larger.

FIG. 82 illustrates alignment blocks and wrapst values for Mode E with a 4 wide surface, wrapst[3:2]=11.

FIG. 83 illustrates alignment blocks and wrapst values for Mode E with a 2 wide surface in Mode E, wrapst[3:2]=10.

FIG. 87 is a table that shows all the combinations of color substitution, bilinear RGB, and bilinear alpha.

FIG. 111 is a chart that describes each of the control bits of the LFB mode register.

FIG. 112 is a table that decodes VIDDEV_LFB_FORMAT of the LFB Mode register.

FIG. 113 is a chart listing the control bits of the LFB Depth Constant Register.

FIG. 114 is a table describing the functions of an LFB Byte-Swizzle Unit.

FIG. 115 is a table describing the functions of an LFB Word-Swap Unit.

FIG. 116 is a table describing the function of an LFB Color-Lane Unit.

FIG. 117 is a table that details the processing for true-color and 1fb-constants of the LFB Color Format Unit.

FIG. 118 is a table that defines equations for determining the LFB Type sent to the PE.

FIG. 119 is a table that details the interpretation of the coverage mask based on the state of the LFB Type bus.

FIG. 120 is a table that details the interpretation of the XY address bus based on the state of the LFB Type bus.

FIG. 121 is a table that details interpretation of the tdpez_pix0, tdpe_z_dx, tdpe_q_pix0 and tdpe_q_dx buses for LFB transactions.

FIG. 122 depicts a full pixel quad created by replicating left and right pixels in the combine unit.

FIG. 123 illustrates one of four physical address request ports of the cache of the VTA.

FIG. 124 depicts input fields to the texture cache.

FIG. 125 depicts the data fields in the memory request port.

FIG. 126 illustrates the field of the return data.

FIG. 127 shows the data fields in the color output port.

FIG. 128 illustrates a texel map in 4-bit per texel tiled mode.

FIG. 129 illustrates a texel map in 8-bit per texel tiled mode.

Figure 130:
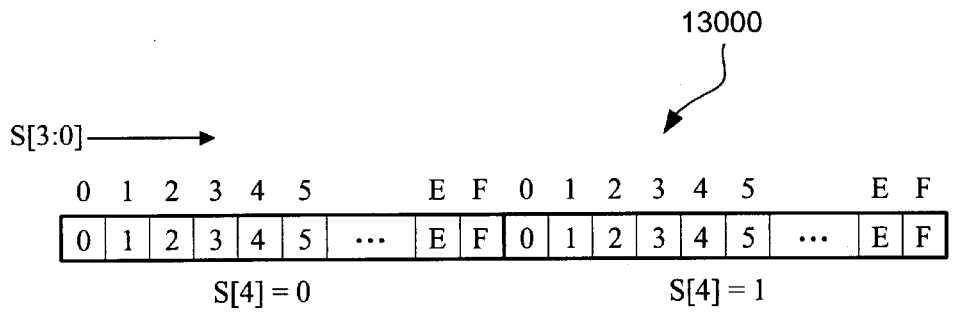

FIG. 130 illustrates a texel map in 8-bit per texel linear mode.

Figure 131:
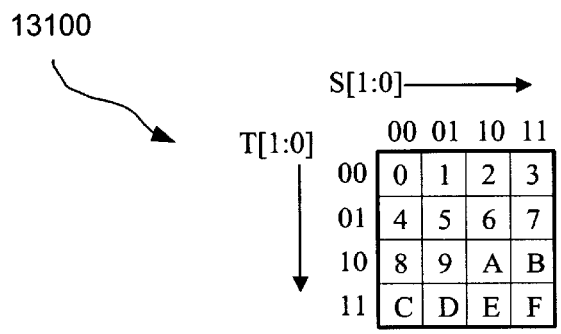

FIG. 131 depicts a texel map in 16-bit per texel mode.

Figure 132:
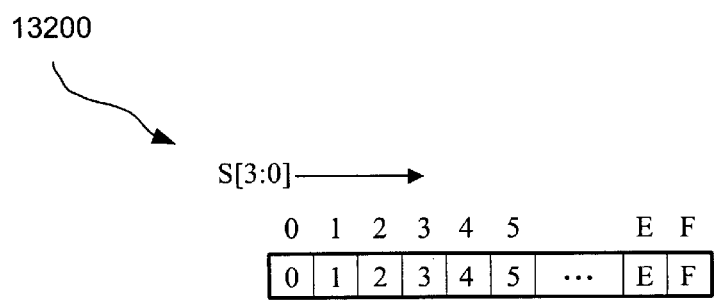

FIG. 132 illustrates a texel map in 16-bit per texel linear mode.

Figure 133:
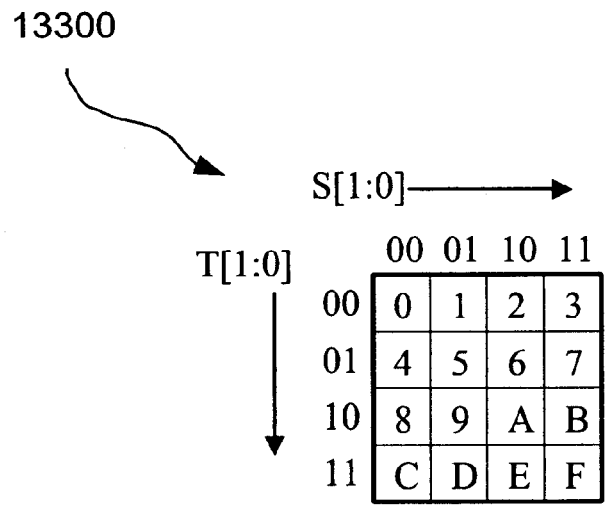

FIG. 133 illustrates a texel block for 32-bit per texel tiled mode.

Figure 134:
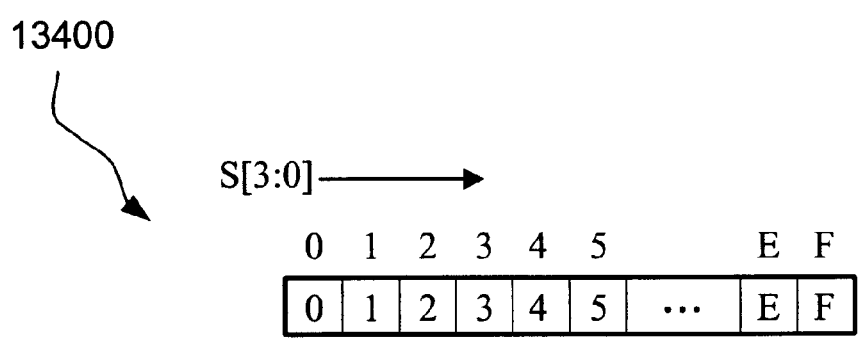

FIG. 134 depicts a row of texels for 32-bit per texel linear mode.

Figure 135:
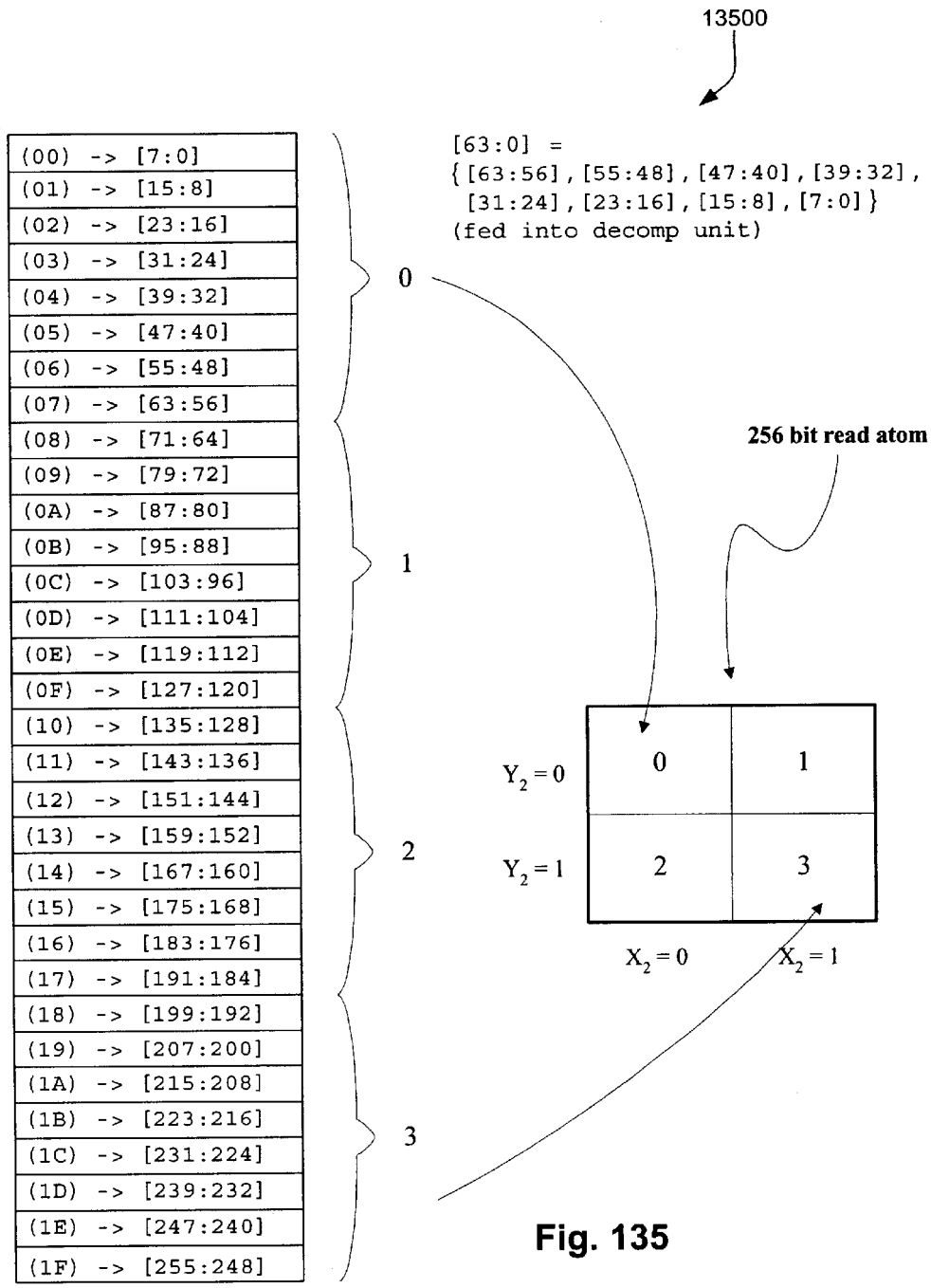

FIG. 135 shows the mappings for tiled mode 4 bit per texel textures.

Figure 136:
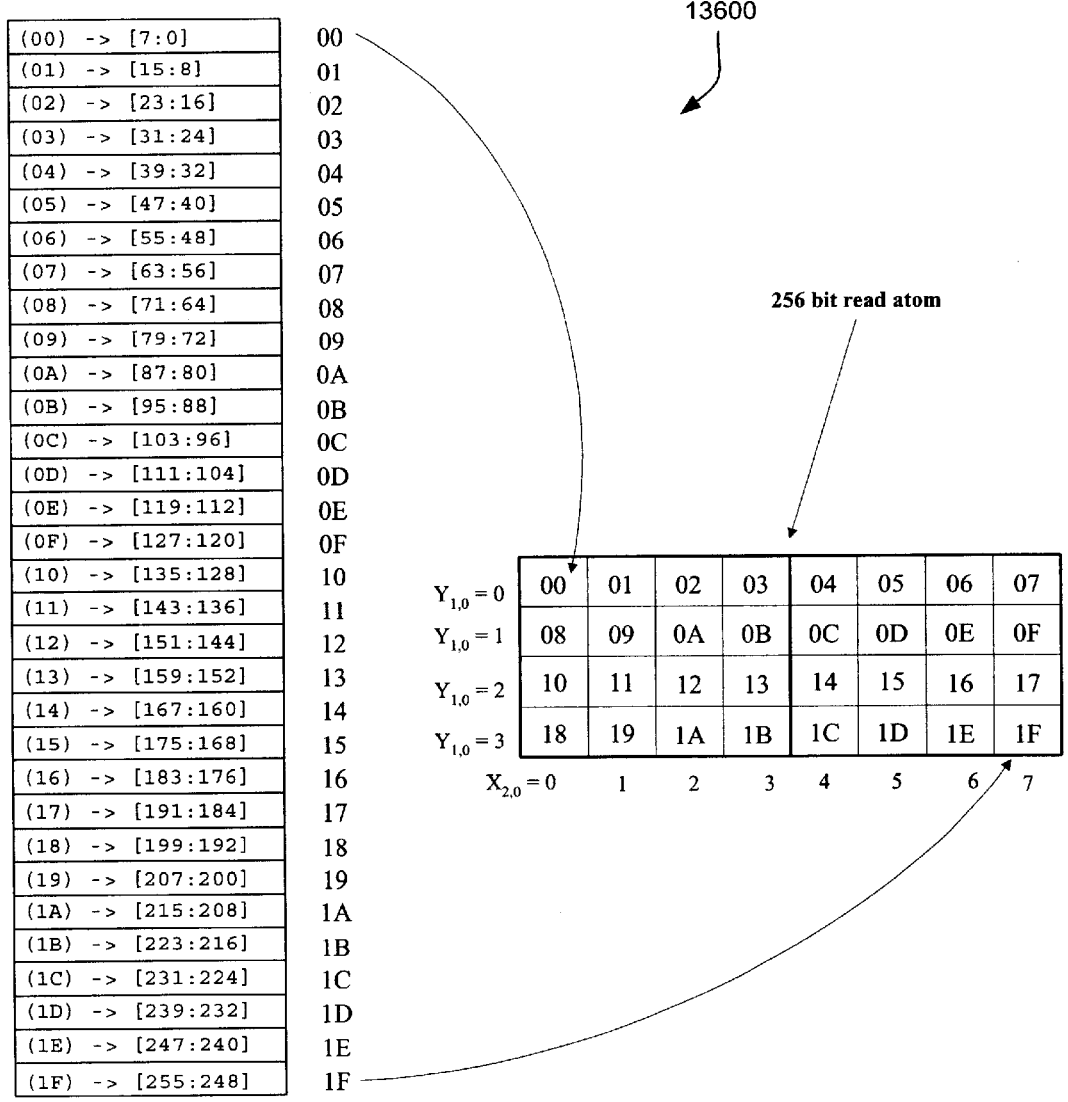

FIG. 136 shows the mappings for tiled mode 8 bit per texel textures.

Figure 137:
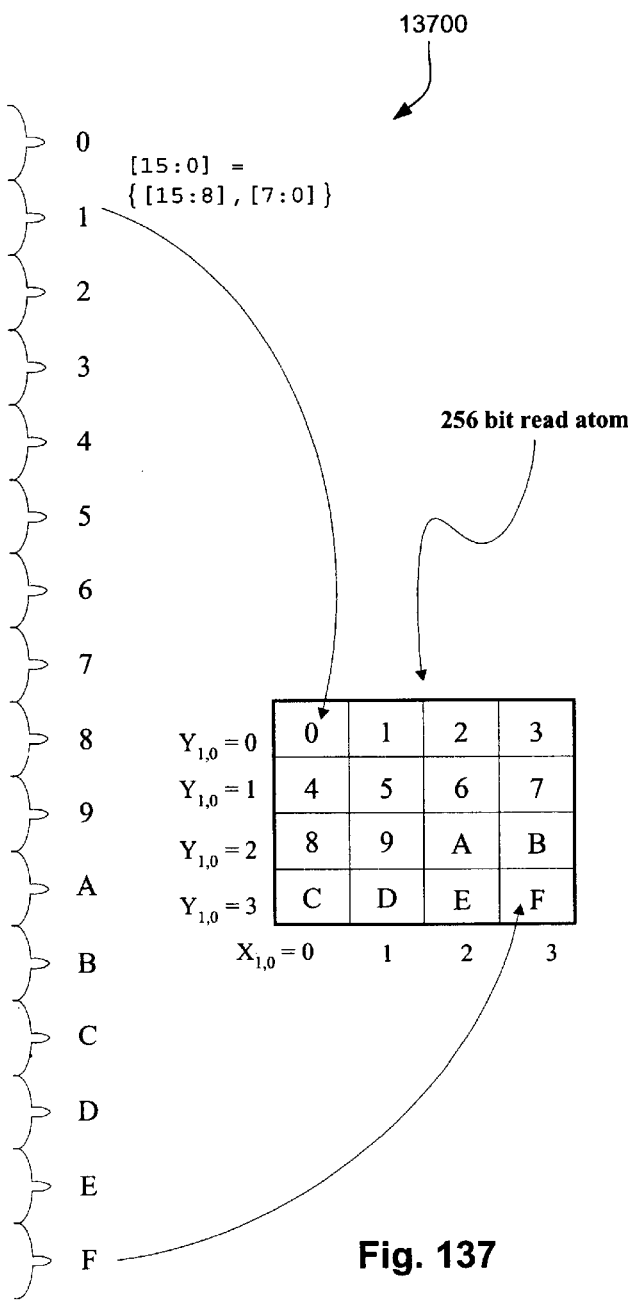

FIG. 137 shows the mappings for tiled mode 16 bit per texel textures.

Figure 138:
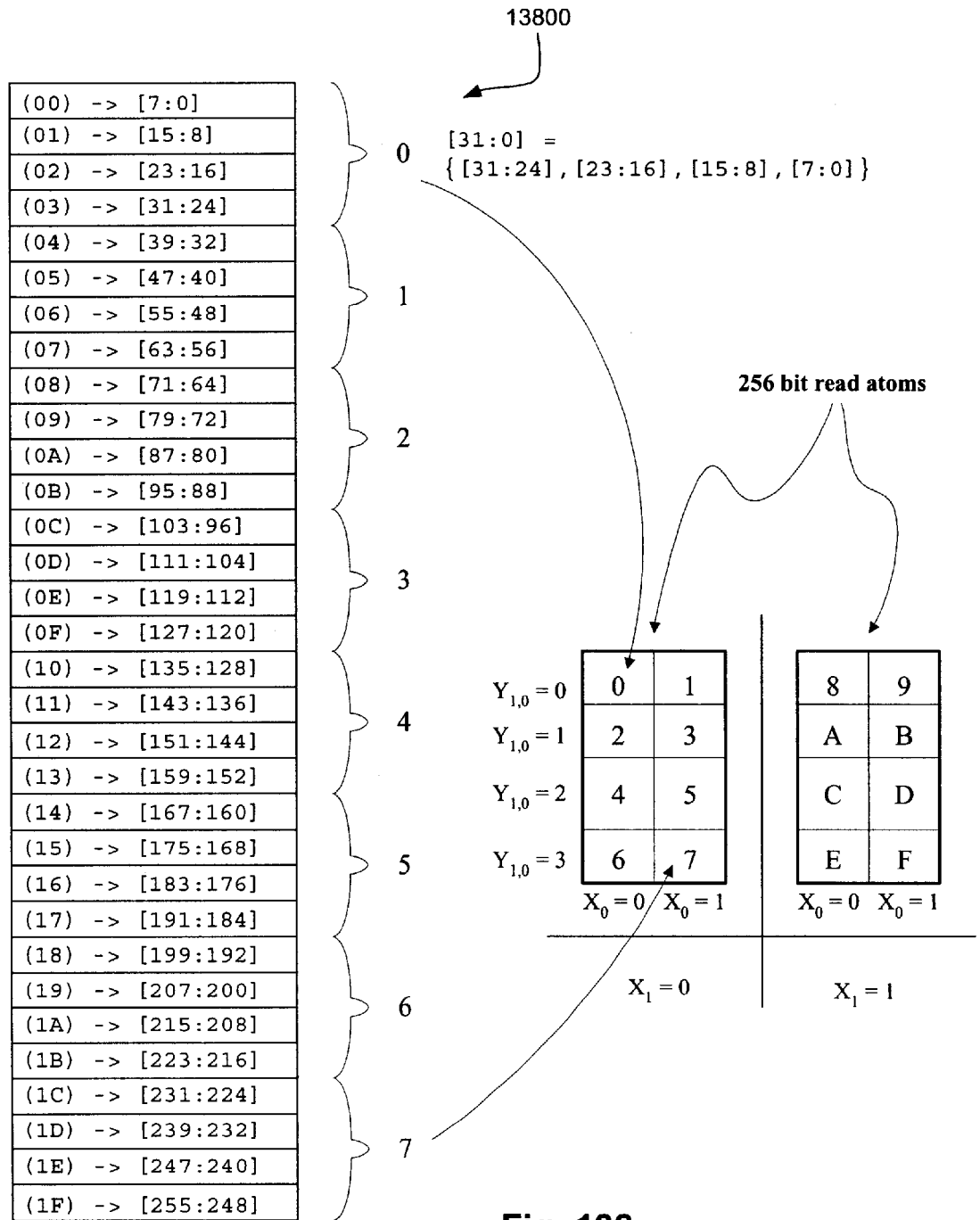

FIG. 138 shows the mappings for tiled mode 32 bit per texel textures.

Figure 139:
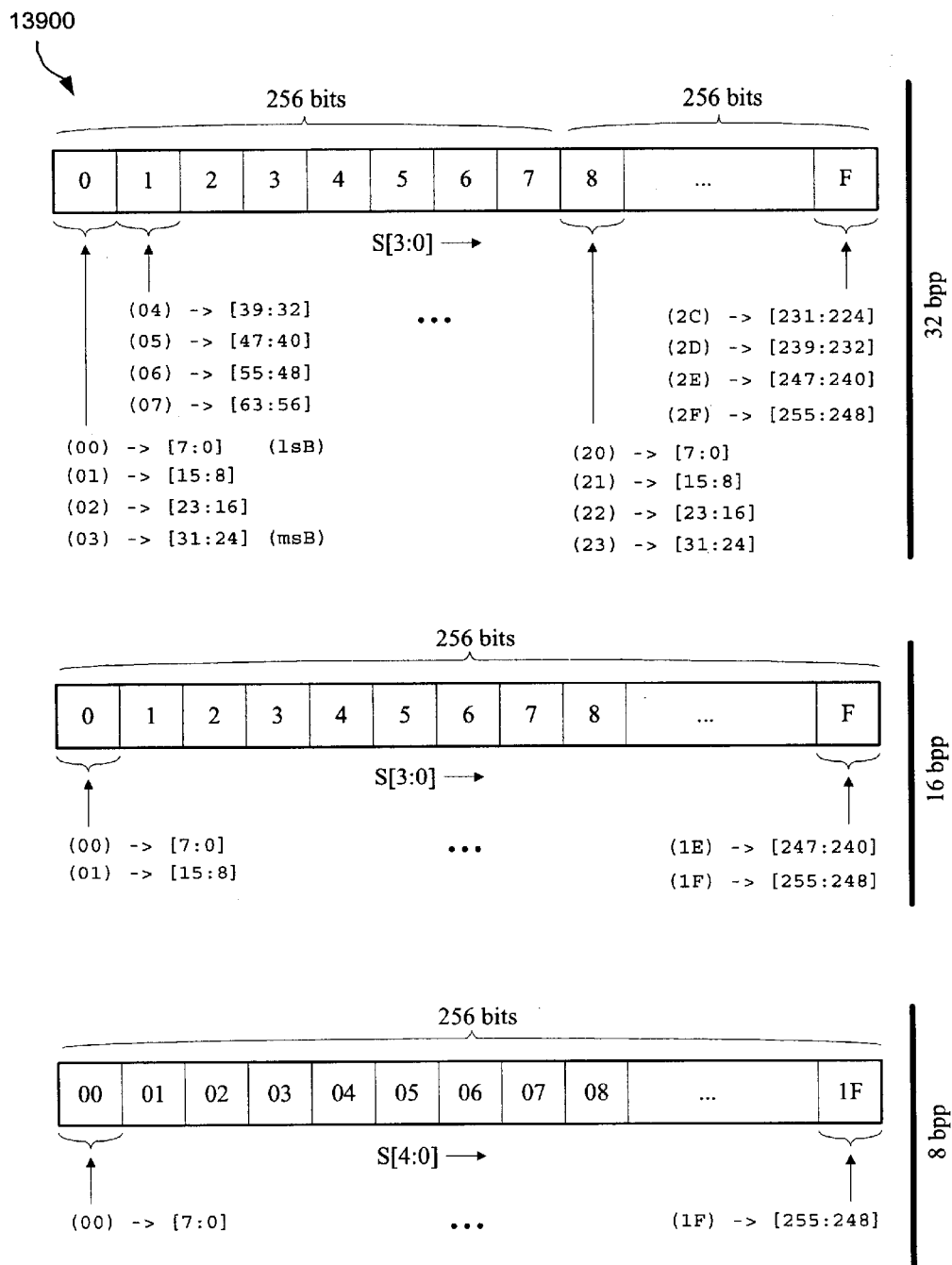

FIG. 139 illustrates the mappings in linear mode for 8, 16, and 32 bpp.

Figure 140:
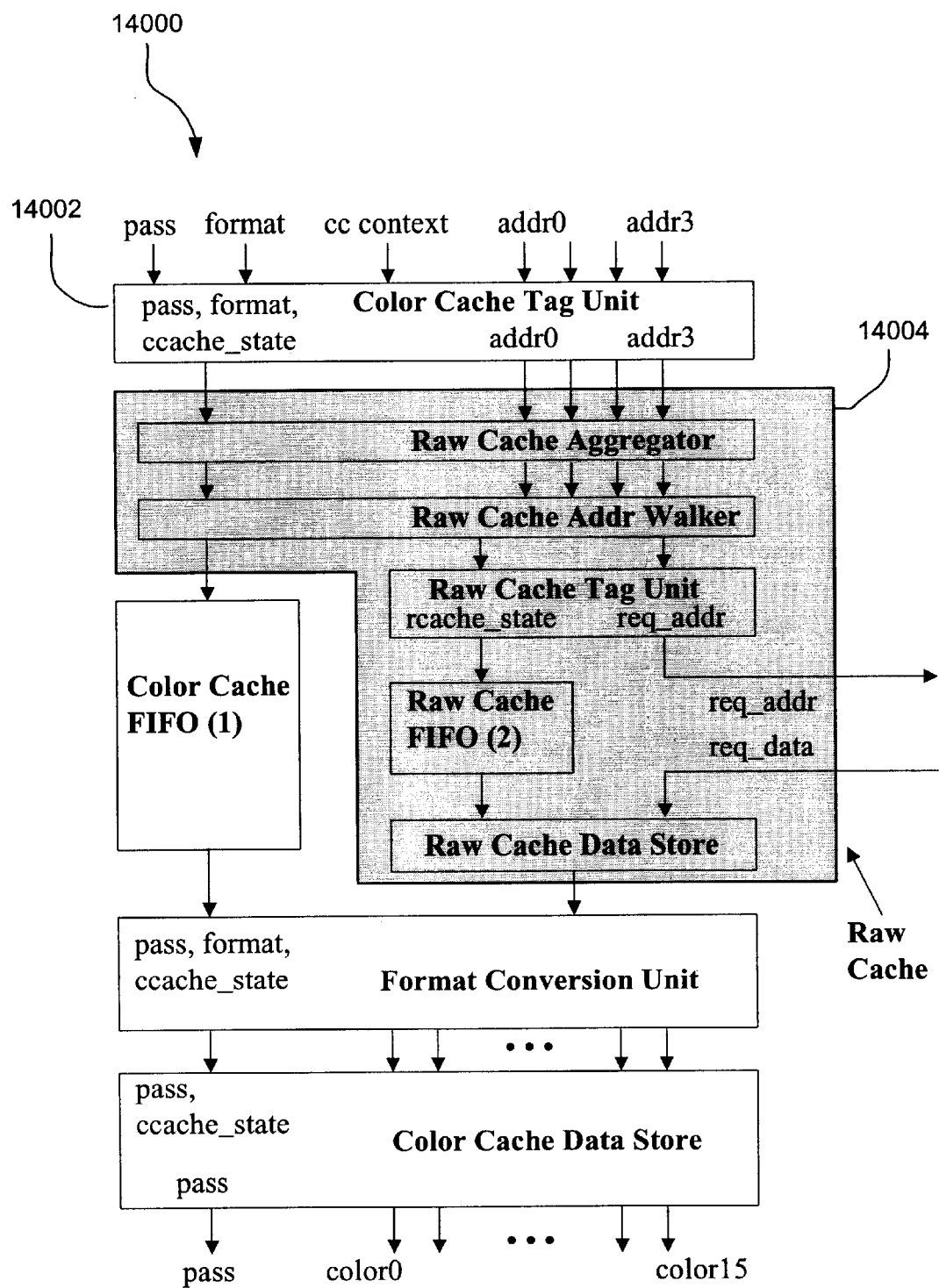

FIG. 140 shows the block level organization of the color cache and the raw cache.

Figure 141:
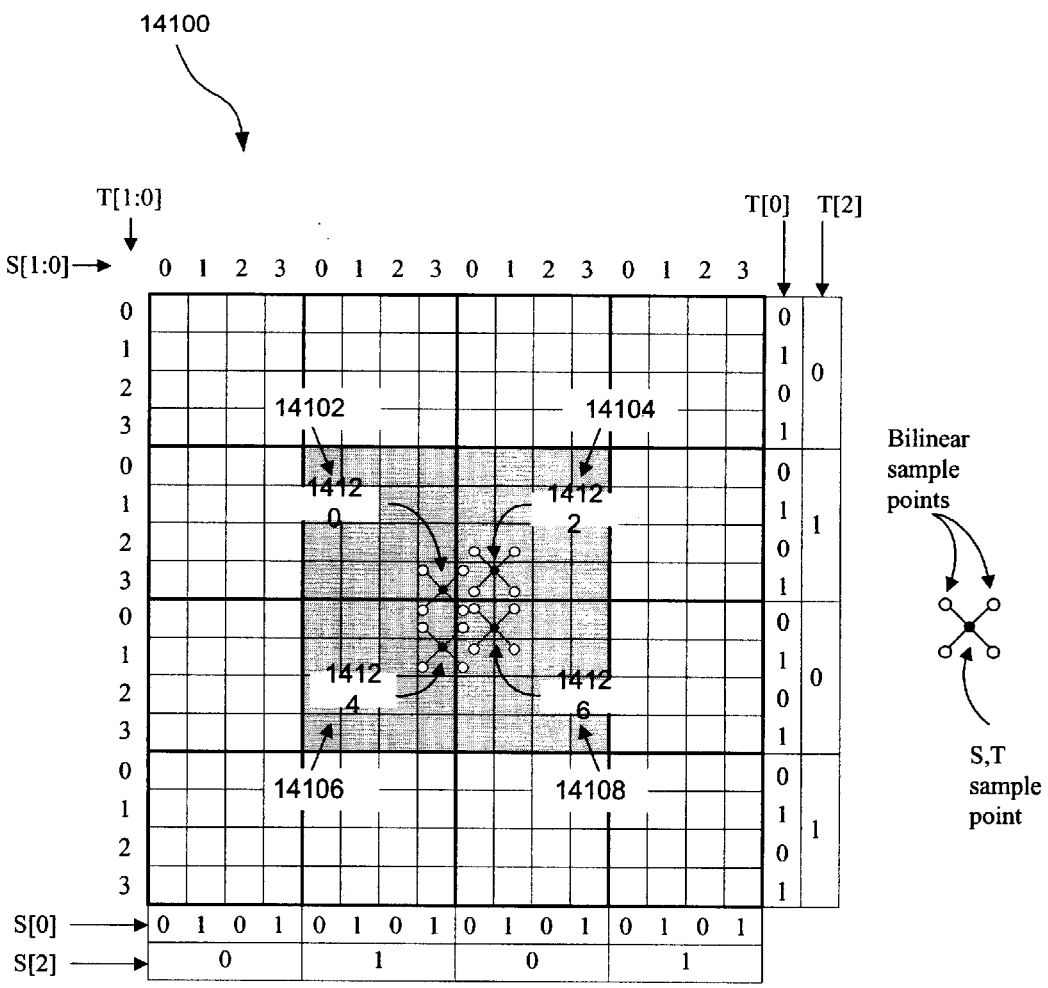

FIG. 141 illustrates the concept of a unique request group in S and T space.

Figure 142:
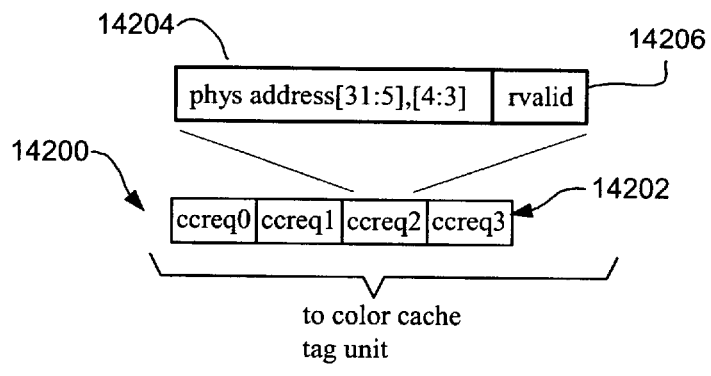

FIG. 142 depicts the data fields directly entering the color cache tag unit.

Figure 143:
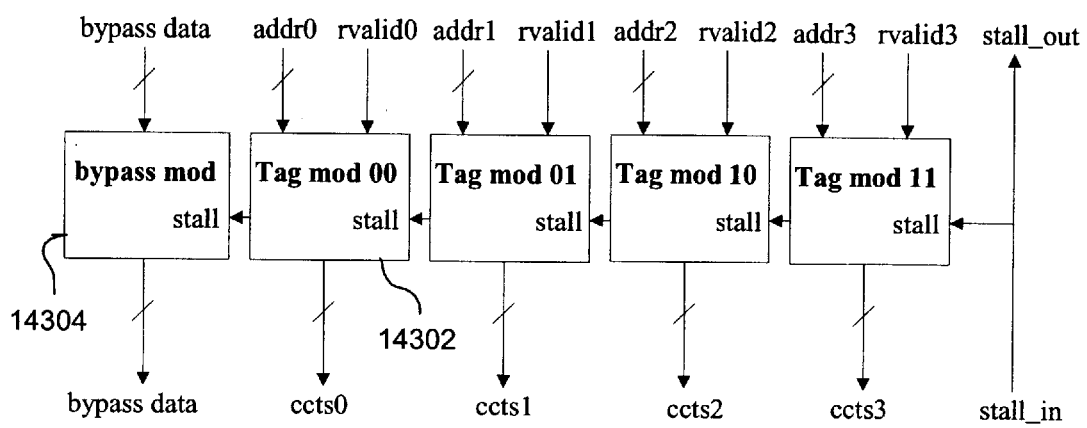

FIG. 143 shows the arrangement of the color cache tag unit.

Figure 144:
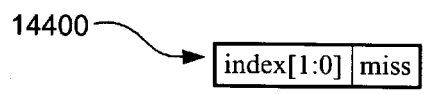

FIG. 144 shows the data fields within each ccts signal.

Figure 145:
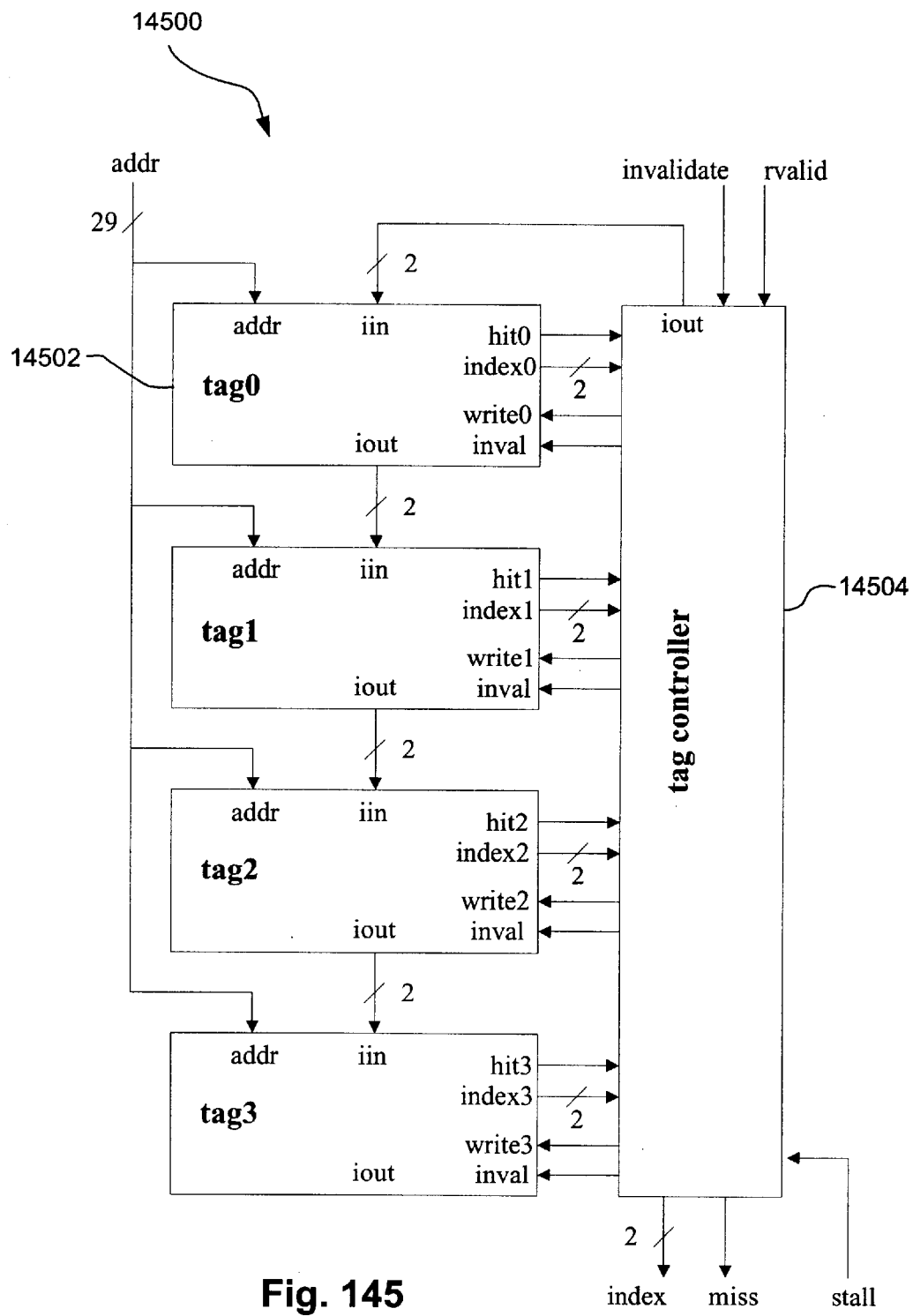

FIG. 145 shows the block level construction of a tag module.

Figure 146:
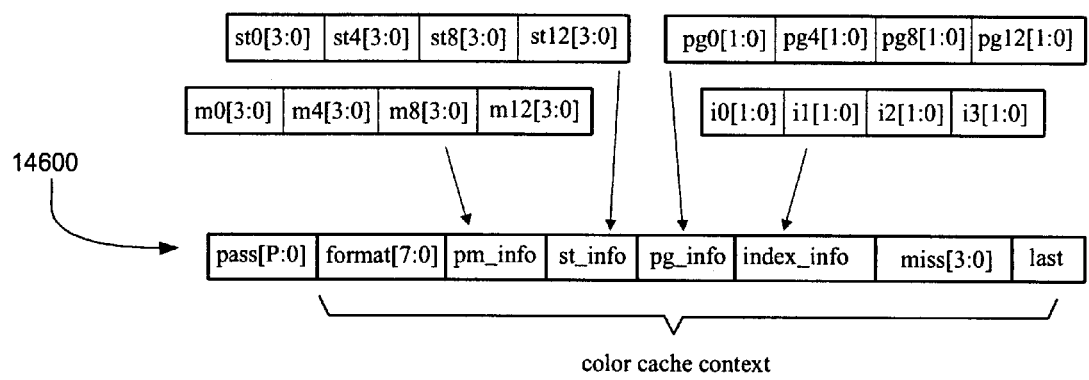

FIG. 146 depicts the inputs from the raw cache unit.

FIG. 147 is a table where format[4:0] indicates the format of the data, "tformat".

Figure 148:
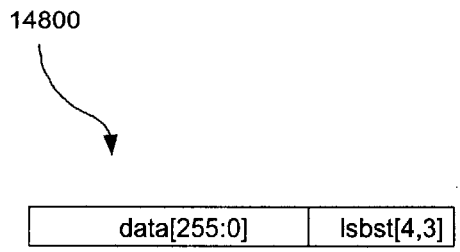

FIG. 148 illustrates fields for input from the raw cache.

Figure 149:
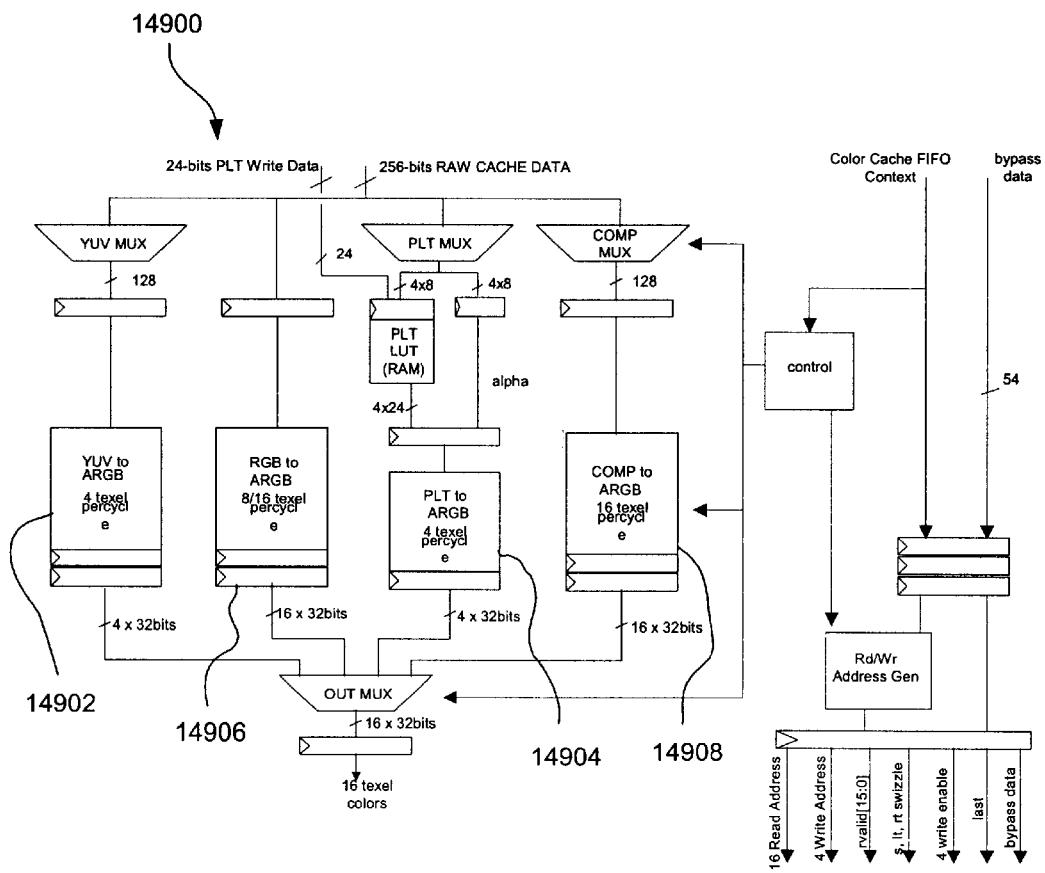

FIG. 149 is a block diagram of the format conversion unit.

Figure 150:
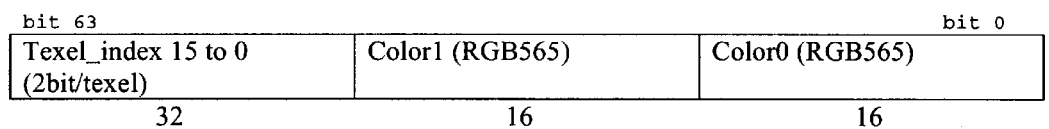

FIG. 150 illustrates opaque and one bit alpha transparency blocks (DXT1) in DirectX.0:Compressed Texture Format.

Figure 151:
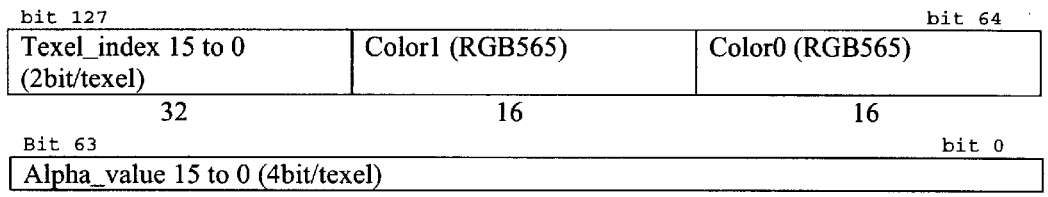

FIG. 151 illustrates explicit texture transparency (Alpha Channel) encoding (DXT2).

Figure 152:
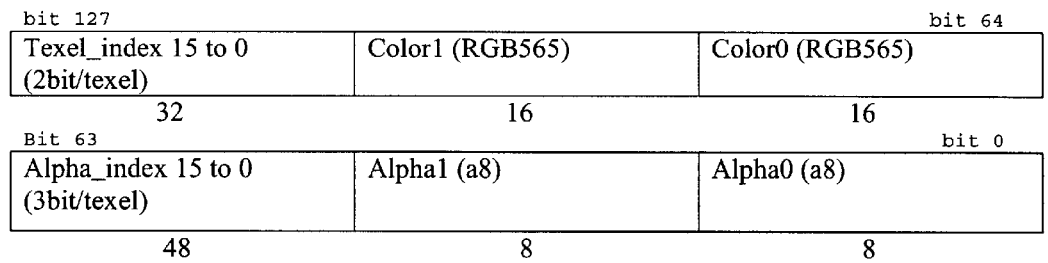

FIG. 152 illustrates 3-Bit Linear Alpha Interpolation (DXT3).

Figure 153:
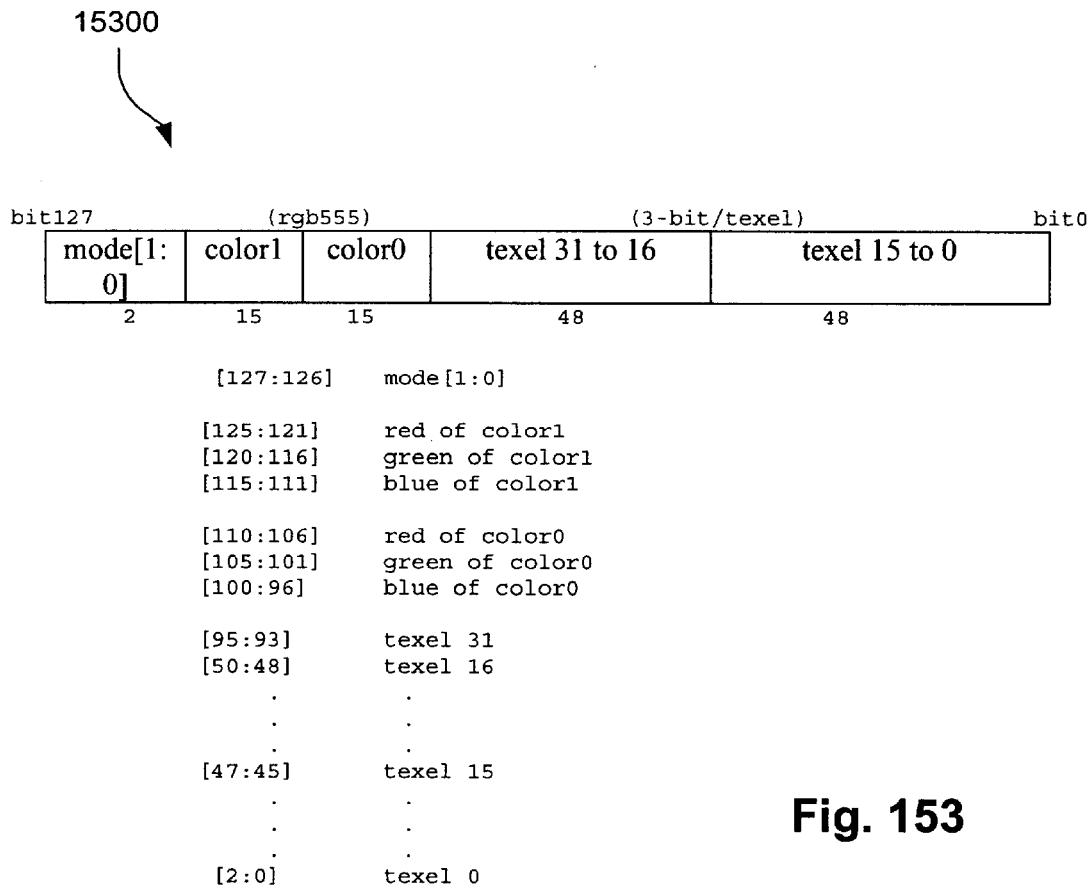

FIG. 153 depicts compressed texture format (CC_HI).

Figure 154:
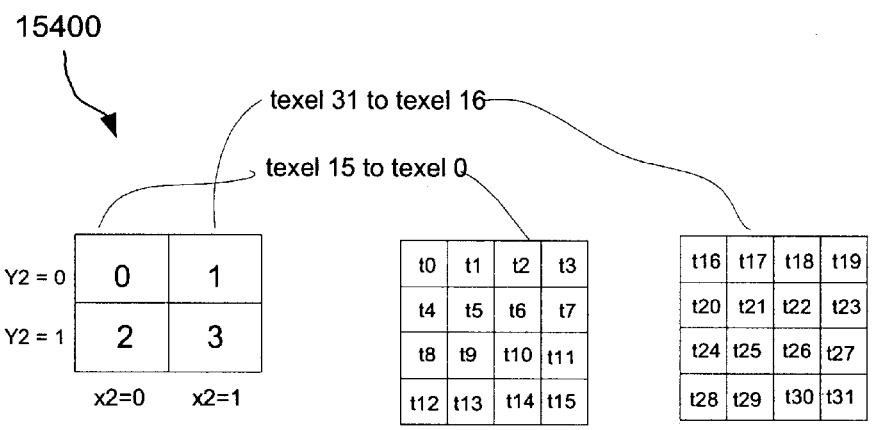

FIG. 154 depicts a memory mapping of texel 31 to texel 0.

Figure 155:
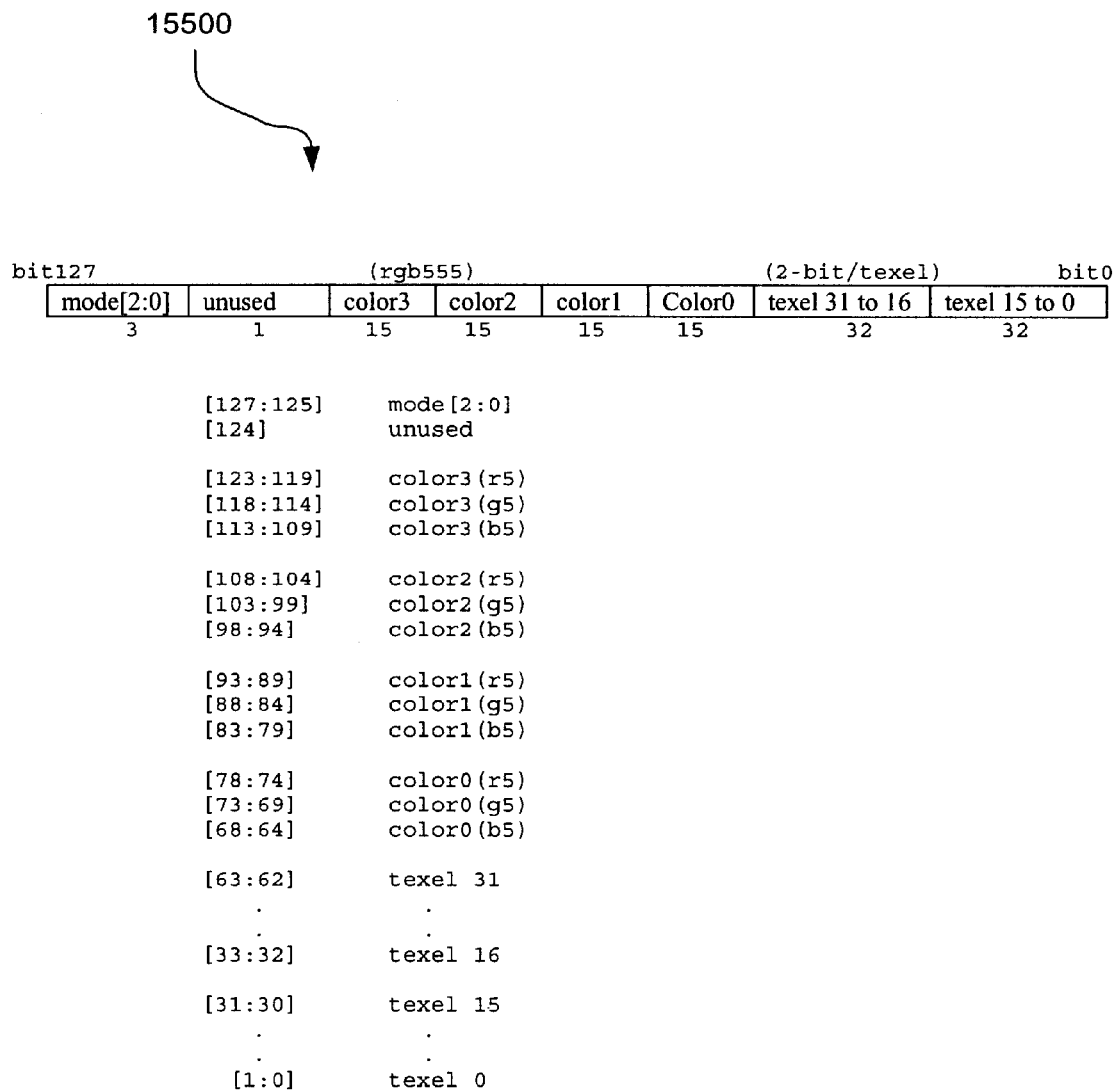

FIG. 155 shows the Compressed Texture Format (CC_CHROMA).

Figure 156:
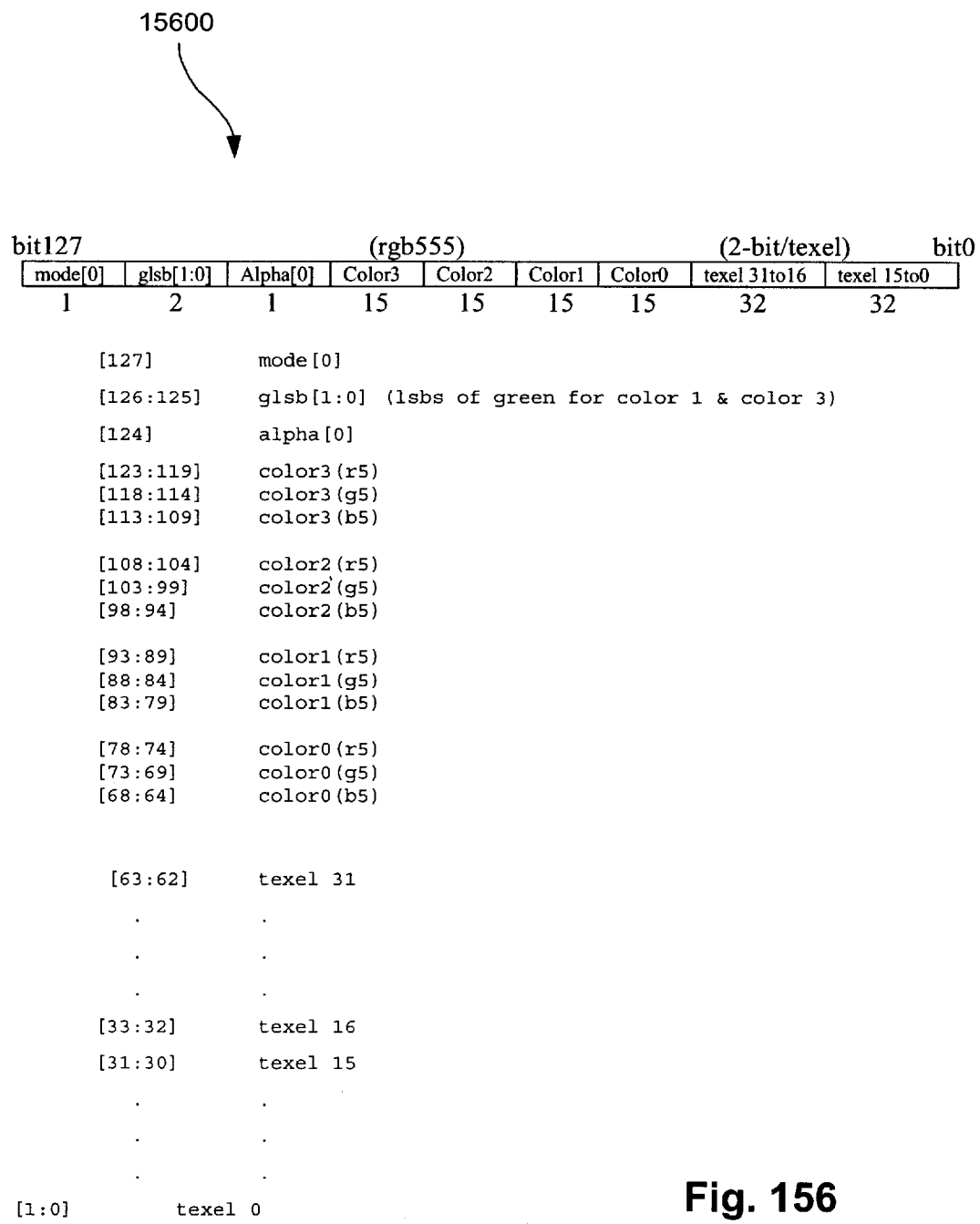

FIG. 156 depicts the Compressed Texture Format (CC_MIXED).

Figure 157:
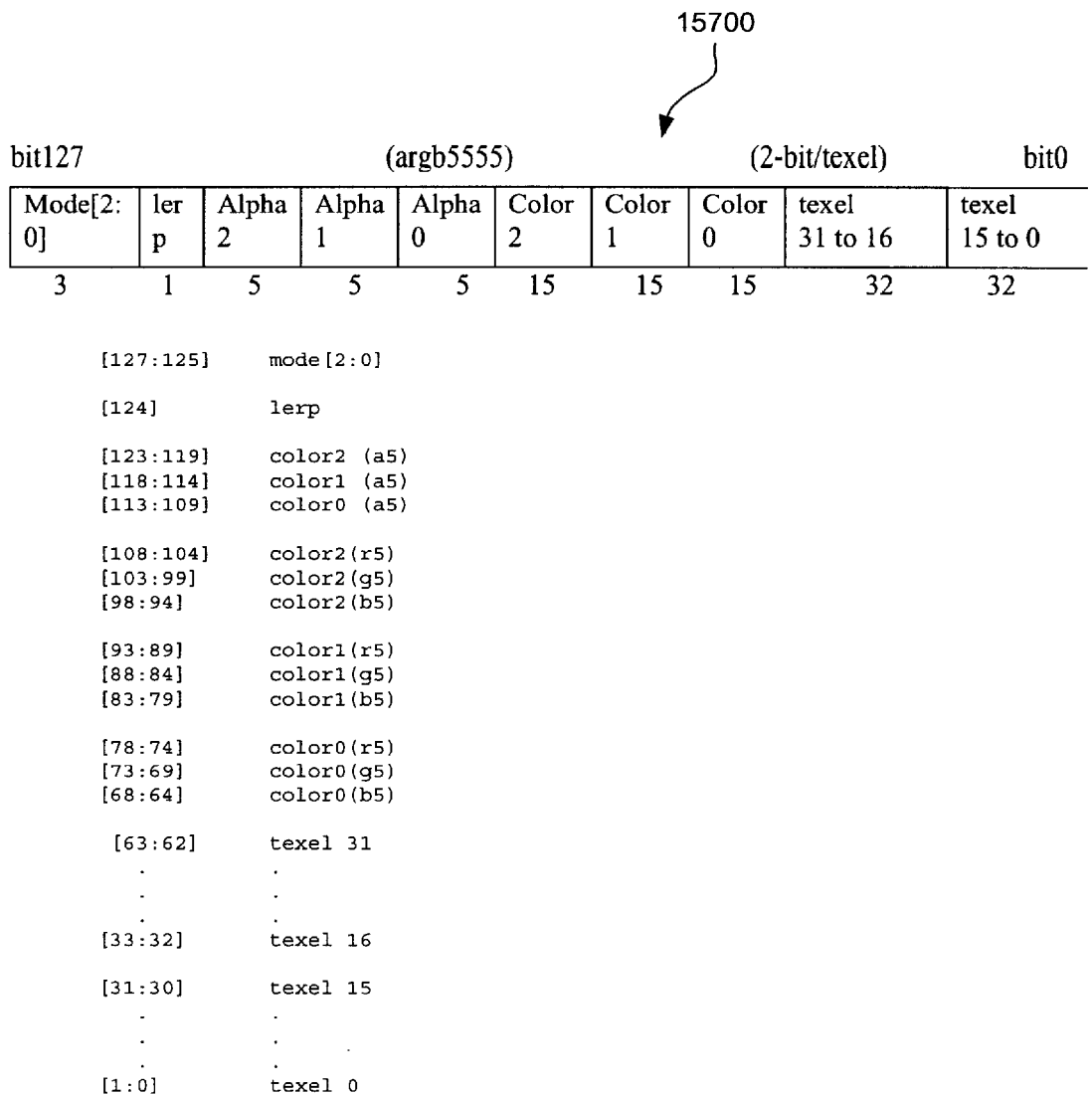

FIG. 157 depicts the Compressed Texture format (CC_ALPHA).

Figure 158:
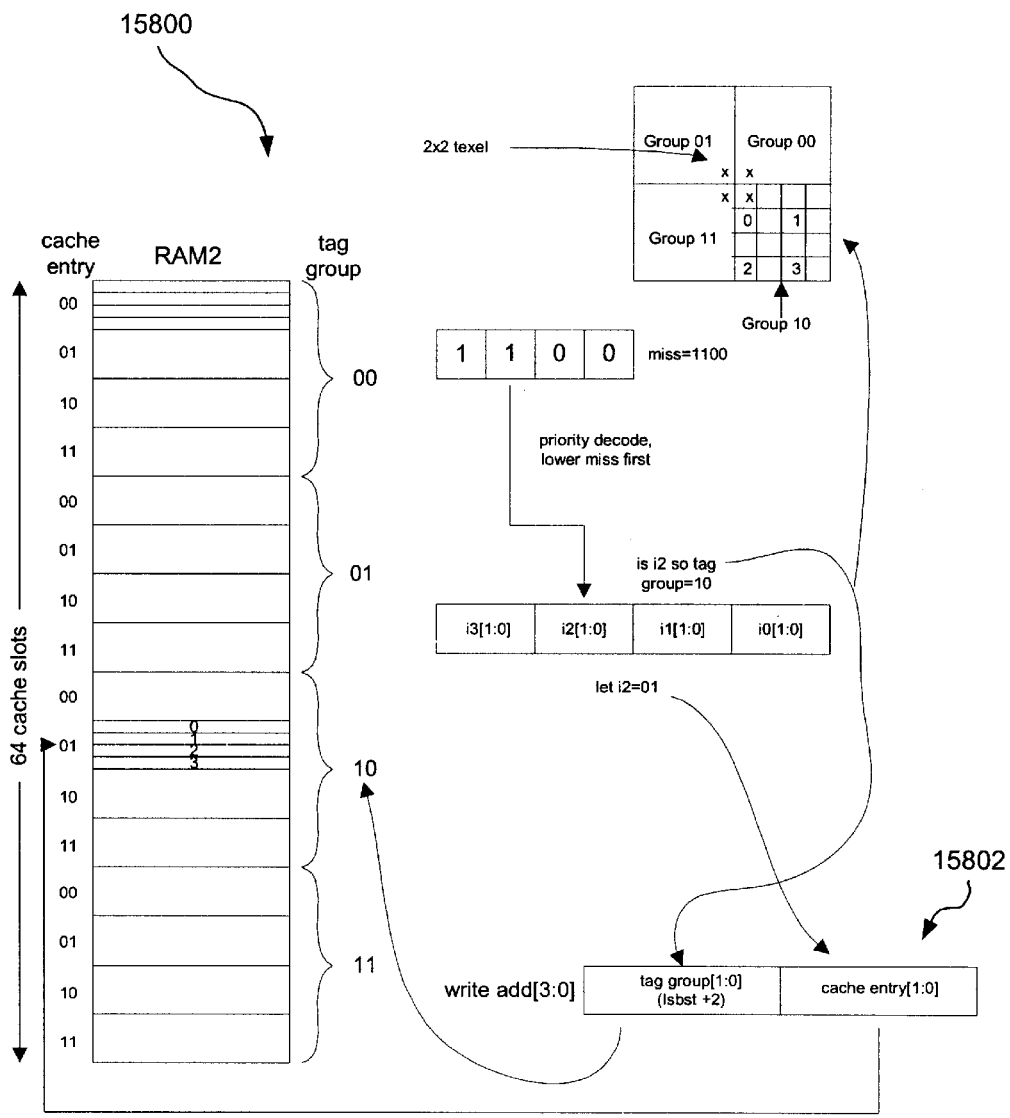

FIG. 158 graphically describes write address generation for tiled storage mapping.

Figure 159:

FIG. 159 depicts a cache tag group for tiled storage mapping.

FIG. 160 illustrates a cache slog for tiled storage mapping.

Figure 161:
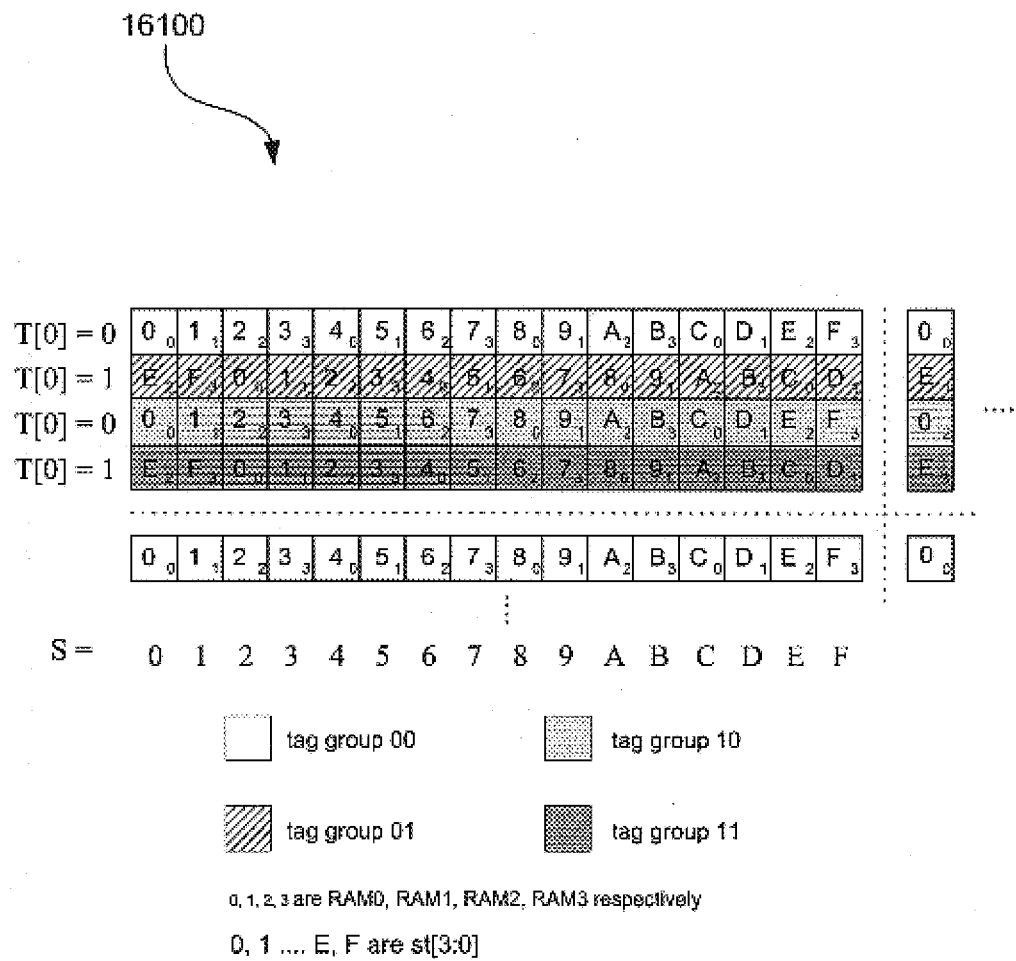

FIG. 161 shows a cache tag for linear storage mapping.

Figure 162:
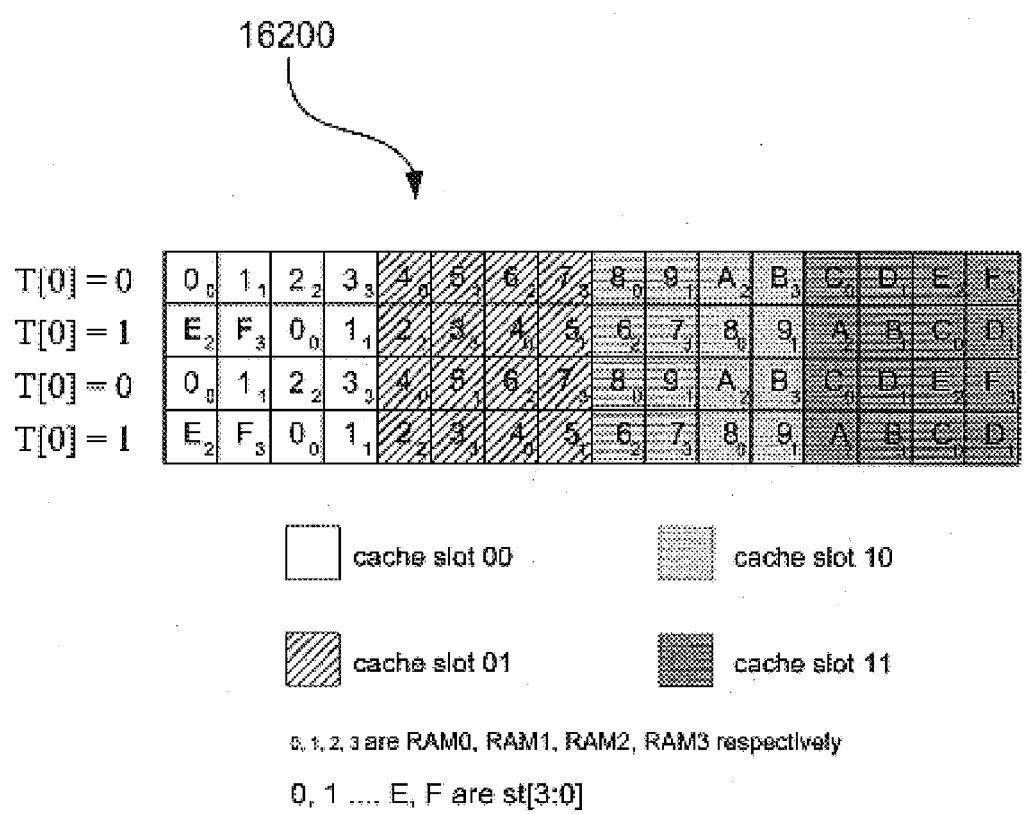

FIG. 162 illustrates a cache slot for linear storage mapping.

Figure 163:
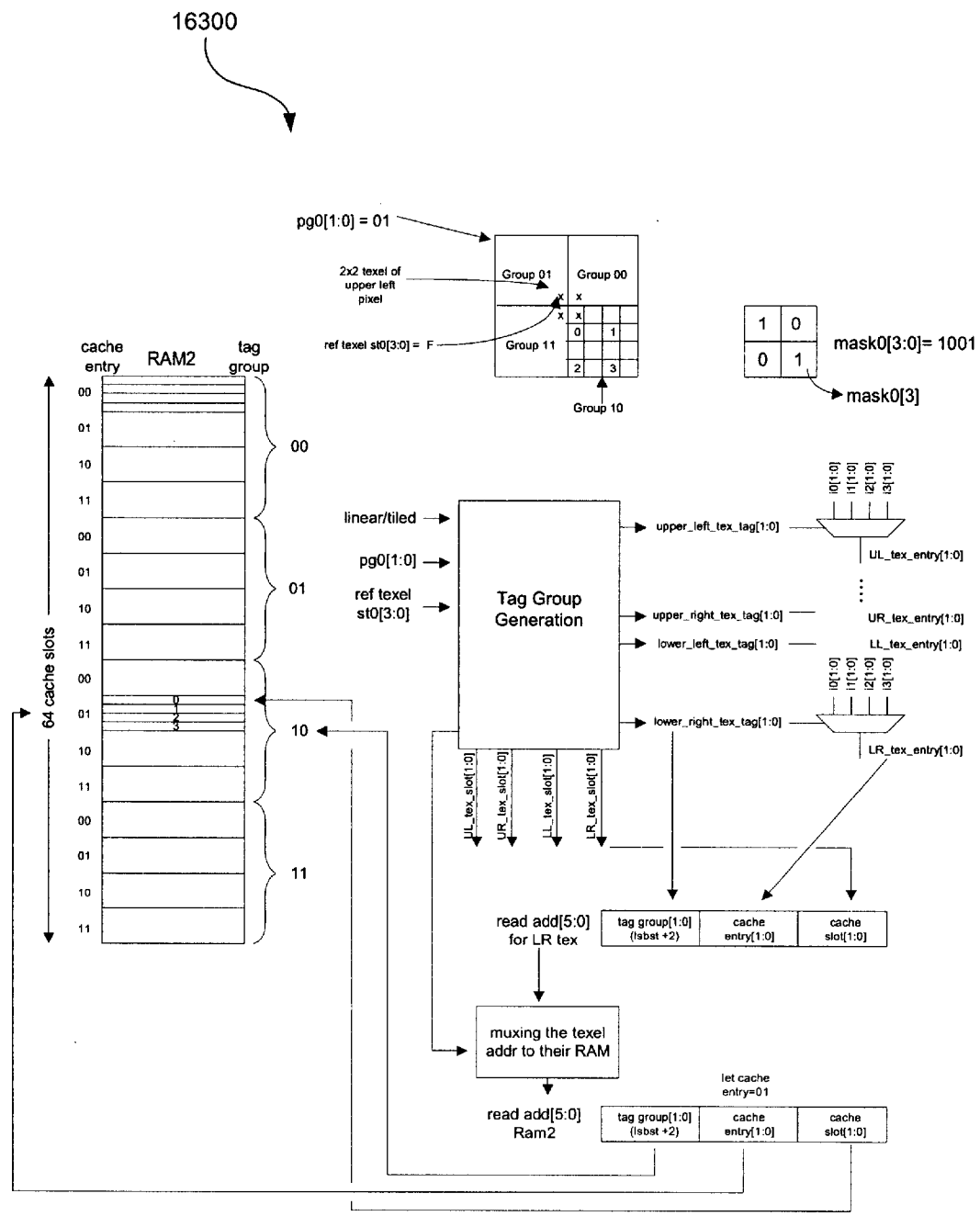

FIG. 163 illustrates read address generation.

Figure 164:
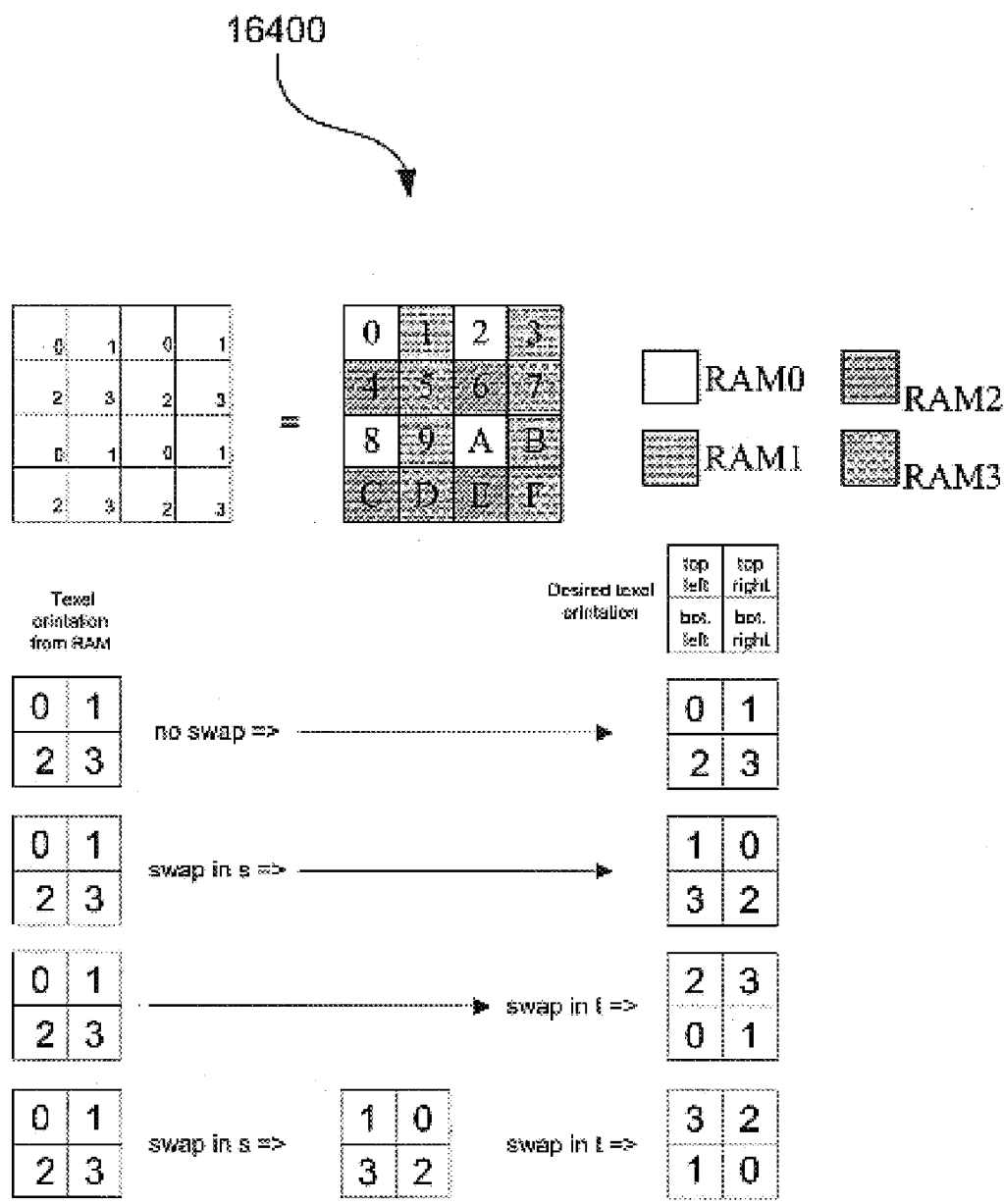

FIG. 164 illustrates the S, T Swizzle for a tiled storage map.

Figure 165:
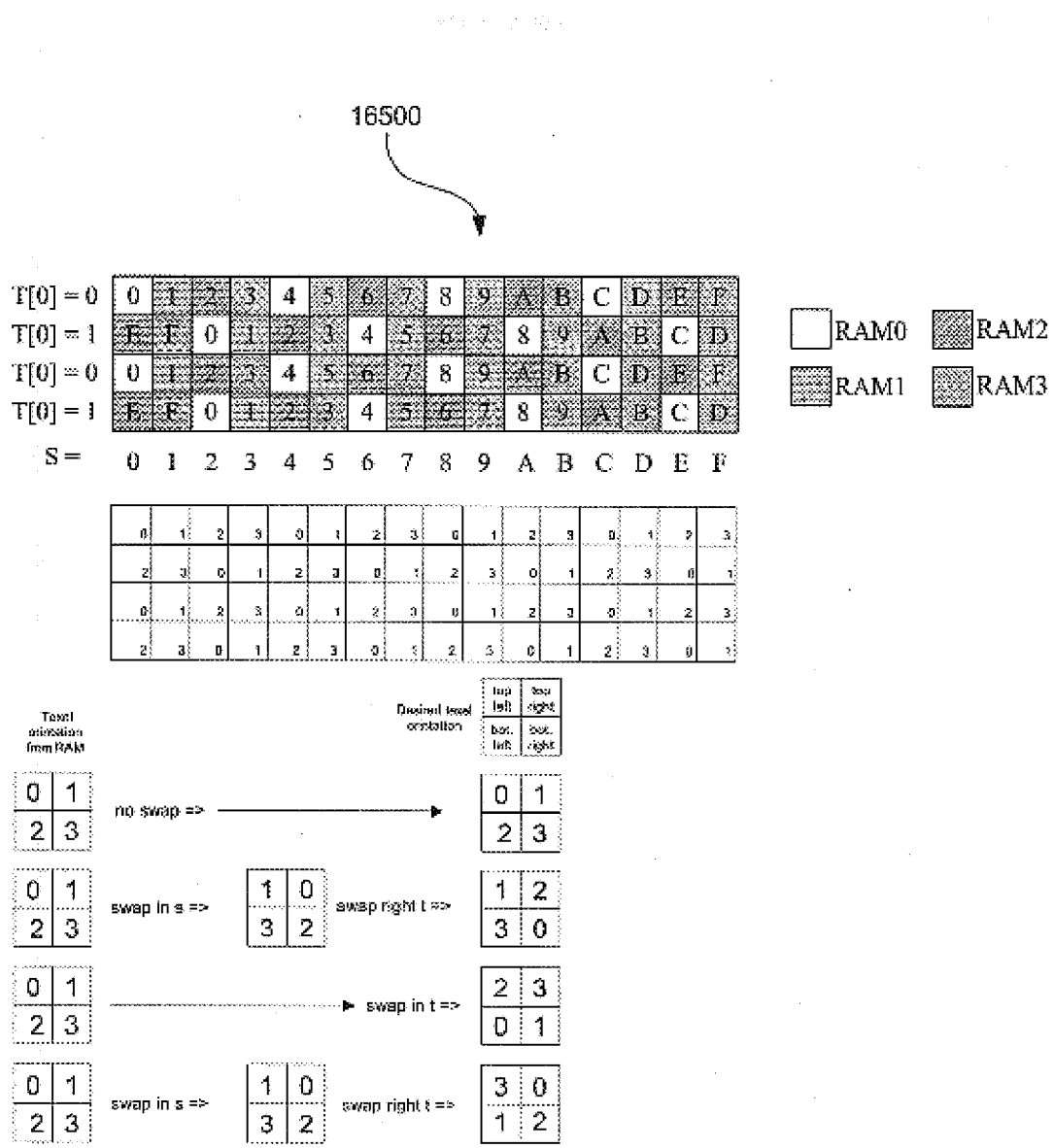

FIG. 165 shows the S, T Swizzle for a linear storage map.

Figure 166:
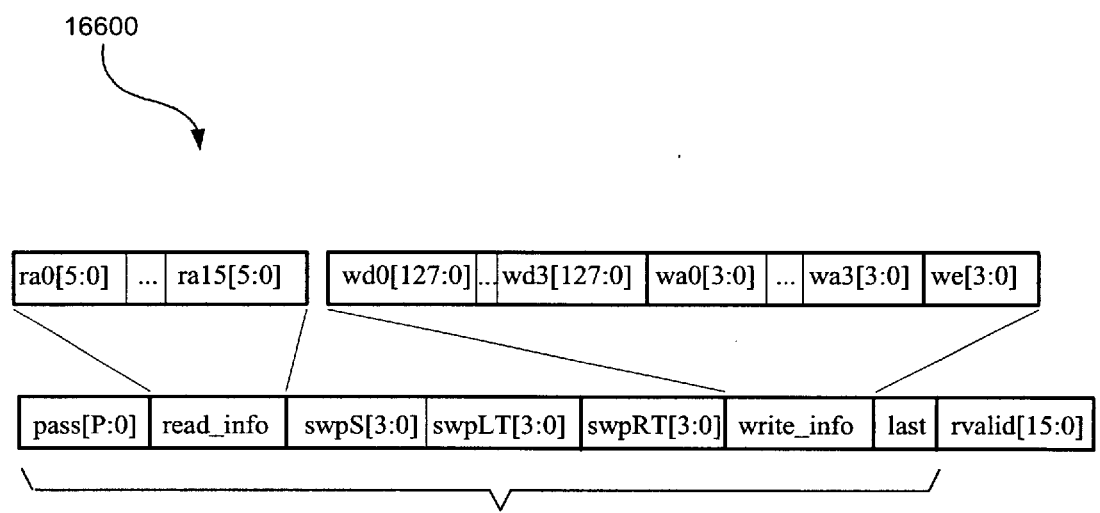

FIG. 166 illustrates the output fields from the format conversion unit.

Figure 167:
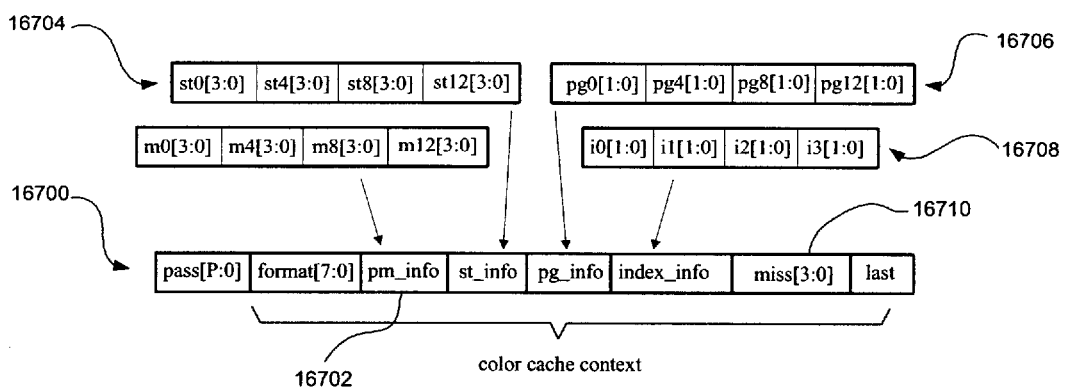

FIG. 167 shows the data fields pushed into this FIFO.

Figure 168:
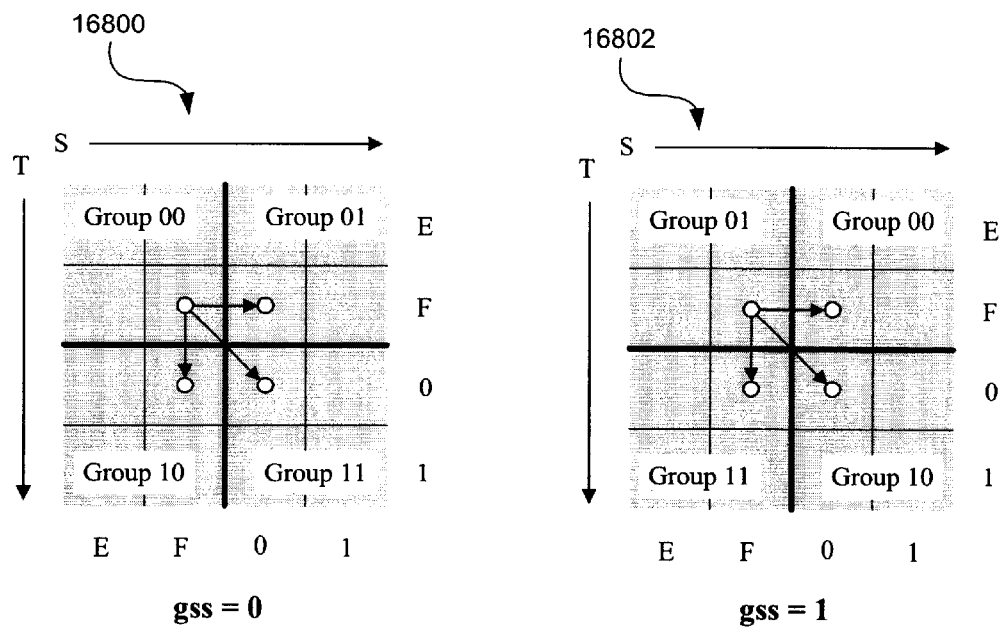

FIG. 168 illustrates the S, T calculation process from a FIFO context when the extracted texel coordinates cross a cache entry boundary.

Figure 169:
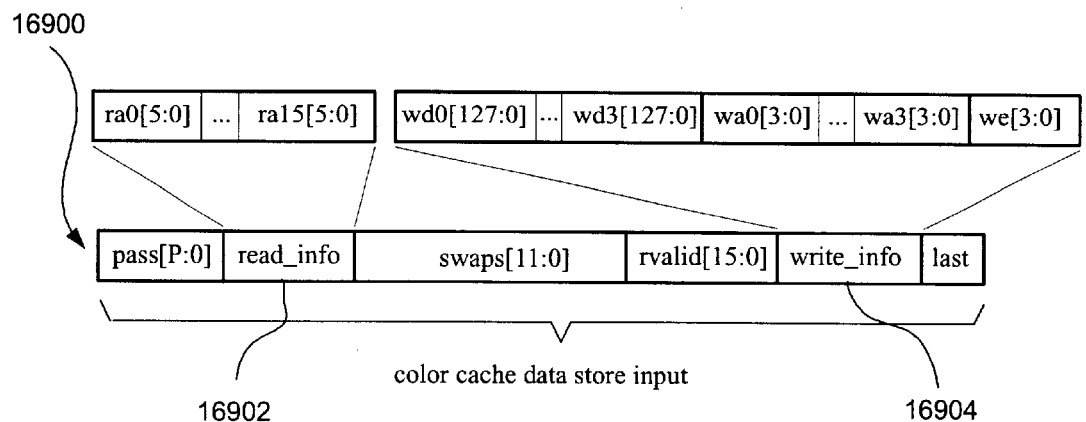

FIG. 169 shows the bit fields in the color cache data store input token.

Figure 170:
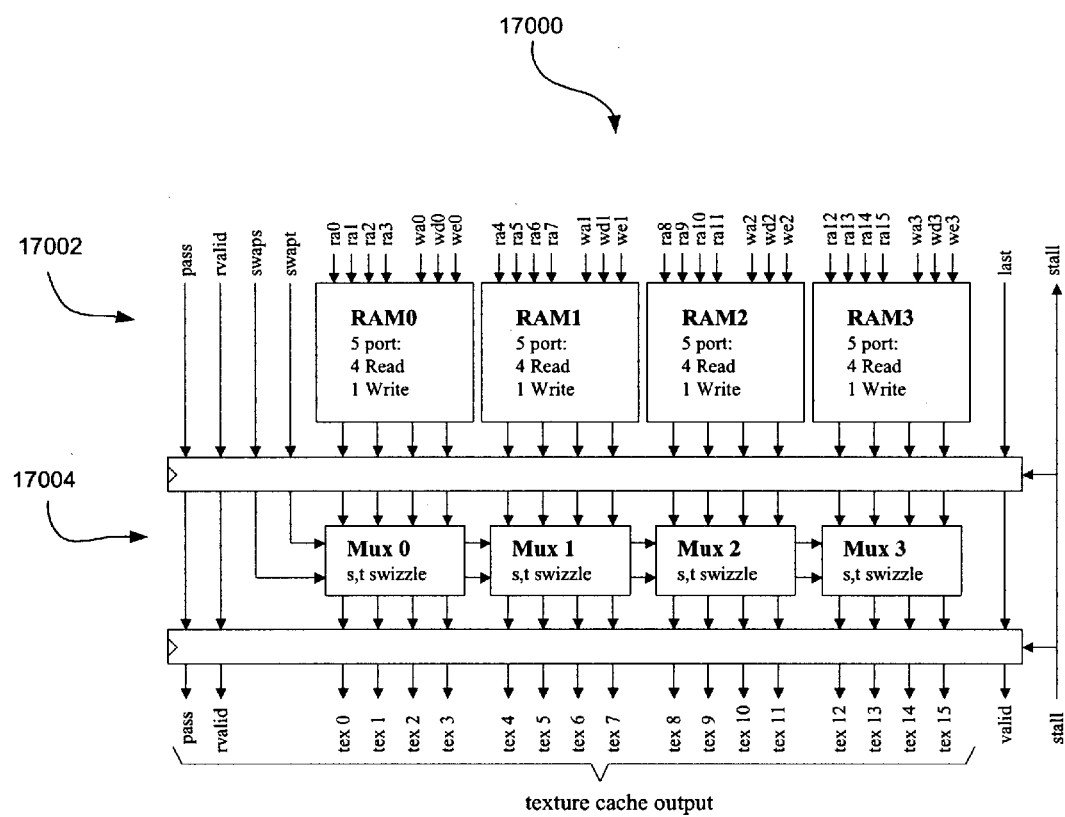

FIG. 170 illustrates a color cache data store unit.

FIG. 171 shows a tiled space mapping of cache entry to physical RAMS.

FIG. 172 depicts a linear space storage mapping according to one embodiment.

FIG. 173 shows the data entering the raw cache data store from the raw cache context FIFO.

Figure 174:
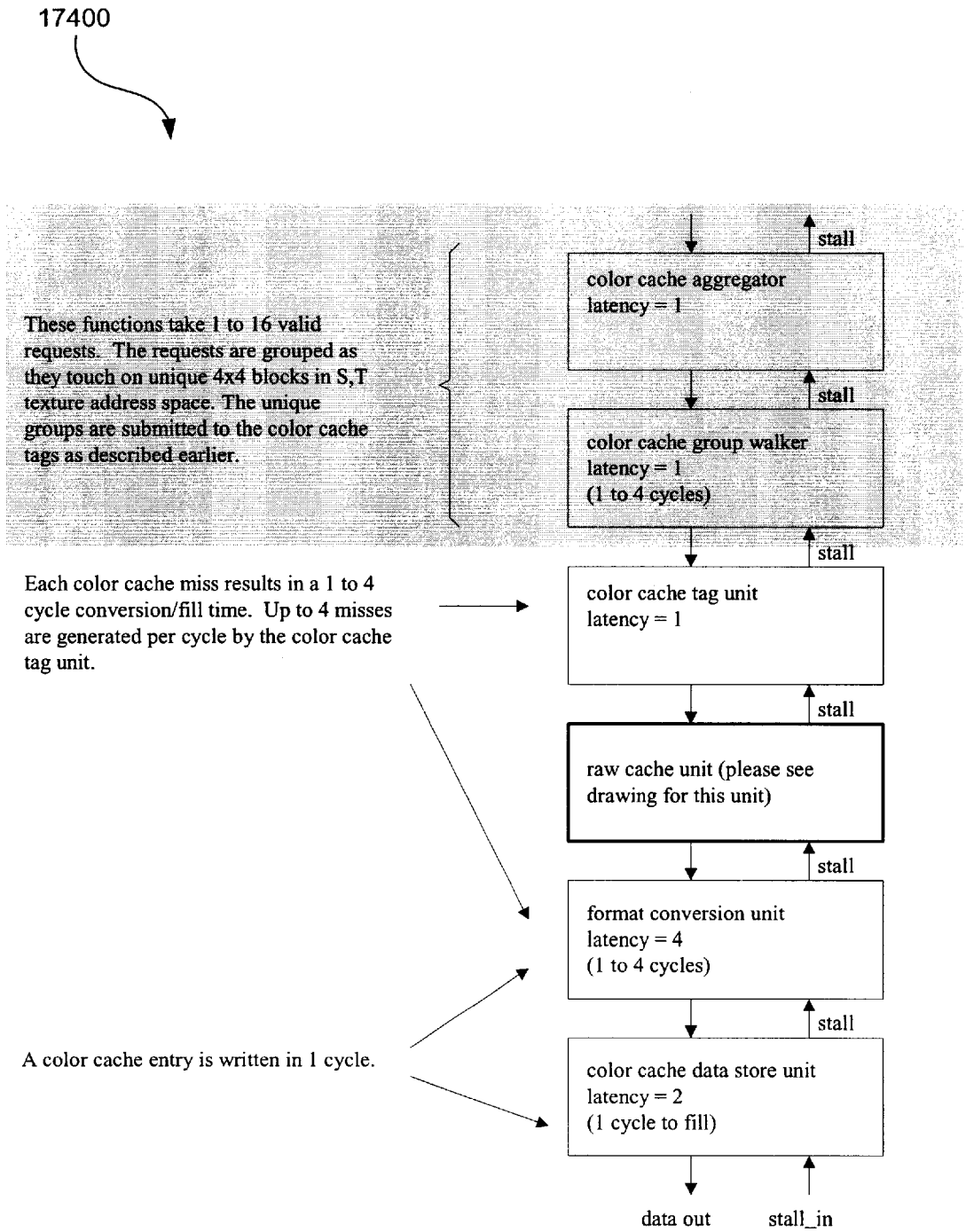

FIG. 174 shows a color cache performance model.

Figure 175:
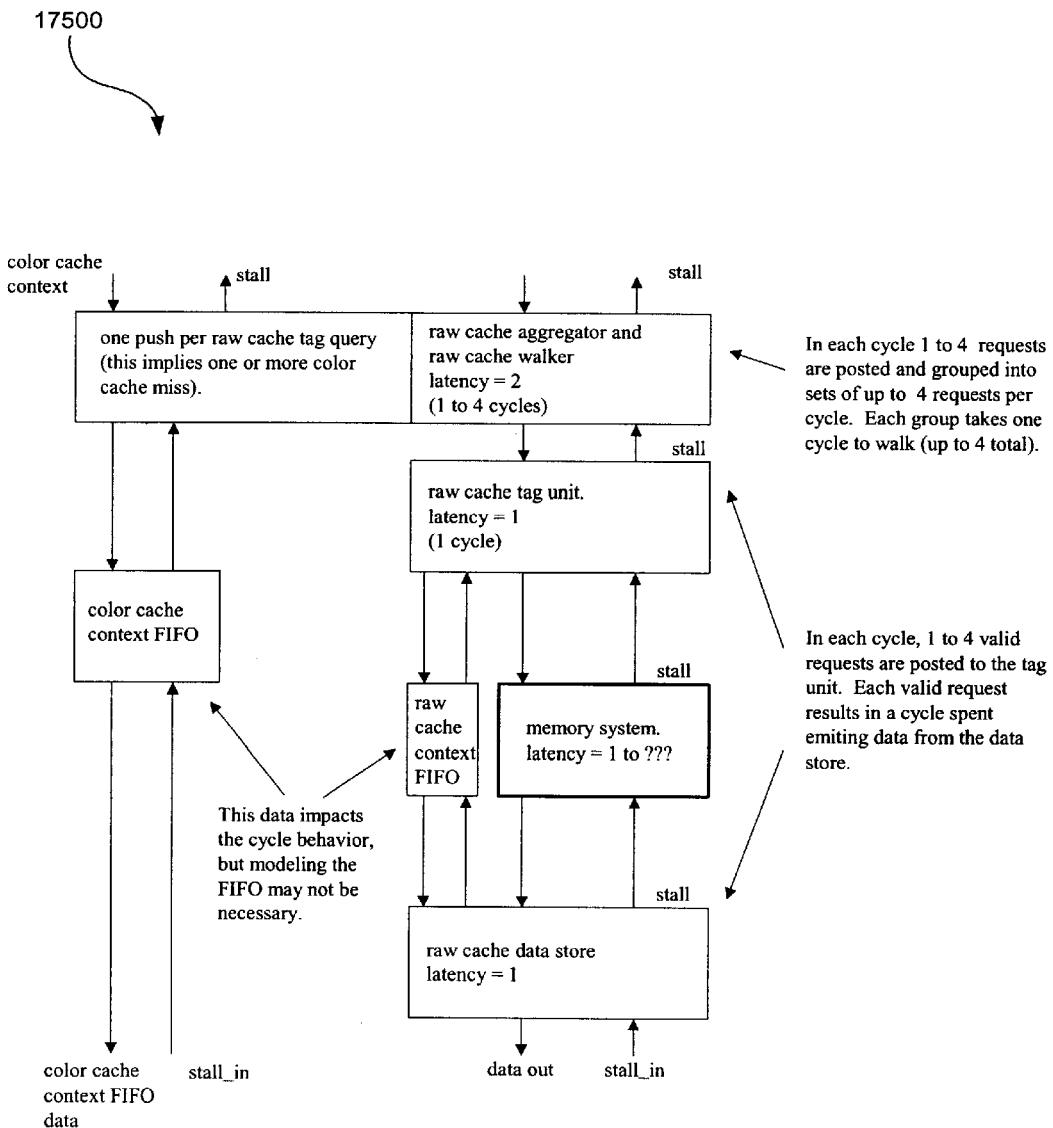

FIG. 175 depicts a raw cache performance mode.

FIGS. 176A–C is a table listing parameter data and parameter control within a single DVS packet received from the setup unit.

Figure 177:
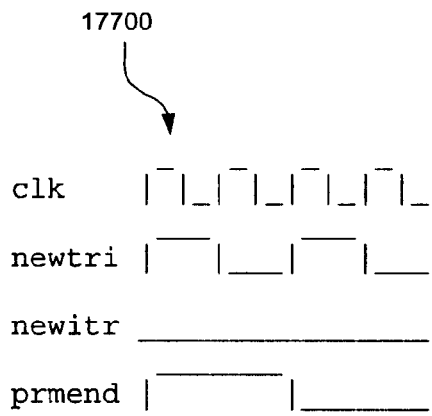

FIG. 177 illustrates behavior patterns for a one iteration polygon with no per-iteration parameter.

Figure 178:
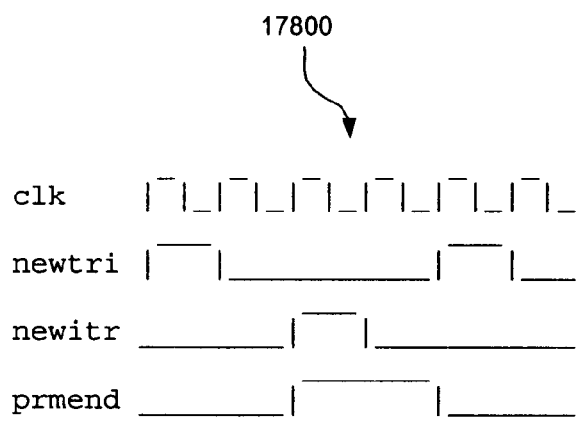

FIG. 178 illustrates behavior patterns for a one iteration polygon with one per-iteration parameter.

Figure 179:
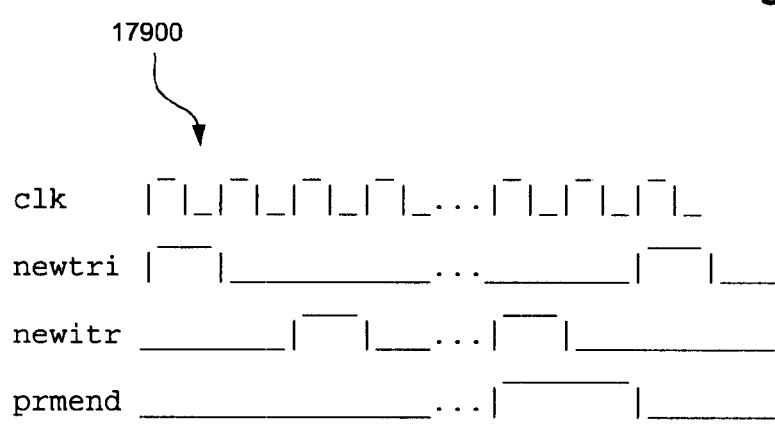

FIG. 179 illustrates behavior patterns for a N iteration polygon with N per-iteration parameters.

FIG. 180 is a table listing raster unit instructions including per-pixel stepping-state and coverage-control.

FIGS. 181A–B together show a table listing pixel data signals delivered to the PE.

FIGS. 182A–B show a table of address and data buses for the CETA and CETD interfaces.

Figure 183:

FIG. 183 illustrates a table defining input and output signals associated with the memory controller.

Figure 184:

FIG. 184 illustrates another table defining input and output signals associated with the memory controller.

Figure 185B:

FIGS. 185A–B depict a table setting forth several physical characteristics of the RAMs of the VTA.

Figure 186A:
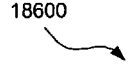
Figure 200E:

FIGS. 186A–B depict a table listing exemplary gate counts of the VTA.

FIG. 187 is a table listing tests for testing the S and T generator according to an embodiment.

FIG. 188 is a table listing tests for testing the log of map size calculation unit according to an embodiment.

FIG. 189 is a table listing tests for testing the kernel walker according to an embodiment.

FIG. 190 is a table listing tests for testing the texture address and cache units according to an embodiment.

FIG. 191 is a table listing tests for testing the filter unit according to an embodiment.

FIG. 192 is a table listing tests for testing the combine unit according to an embodiment.

FIG. 193 is a table listing tests for testing the accumulator according to an embodiment.

FIG. 194 is a table listing tests for testing the iterators according to an embodiment.

FIG. 195 is a table listing tests for testing the sideband according to an embodiment.

FIG. 196 is a table listing texture mapping tests.

FIG. 197 is a table listing lighting tests.

FIG. 198 is a table listing math tests.

FIGS. 199A–199E is a table listing VTA registers and fields, specifies which modules they control, and the name of the test that ensures the coverage.

FIGS. 200A–200F together show a VTA module level test matrix that itemizes each of the modules of the VTA and their interaction with software.

FIG. 201 illustrates a VTA unit level test matrix that itemizes each of the modules of the VTA and their interaction with software.

FIG. 202 shows a texture for an ani ratio test.

FIG. 203 shows the patches for 8 pixels, numbered 0 to 7, that correspond to the texture shown in FIG. 202.

FIG. 204 shows a texture for an ani weight test.

FIG. 205 shows an 8×8 grid for every tmu.

FIG. 206 illustrates a texture resulting if the tmu does not pop from the recursion FIFO.

FIG. 207 illustrates a grid of textures if the tmu does pop from the recursion FIFO.

FIG. 208 depicts a resulting grid if the push and pop mask are configured to do "(tmu2 #tmu1)>tmu0".

Figure 209:
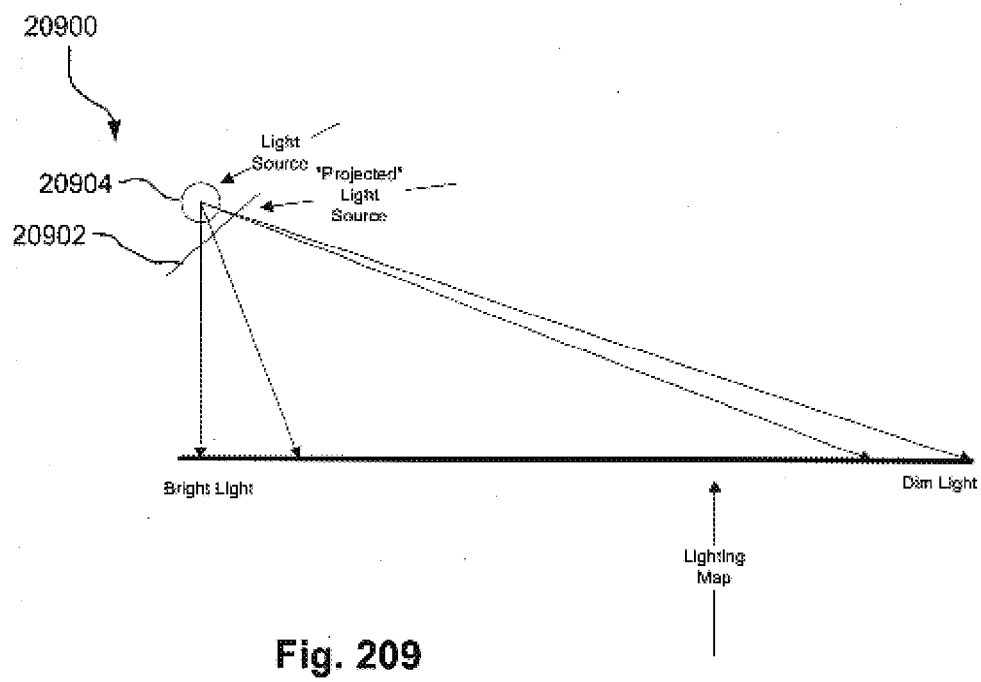

FIG. 209 illustrates a model for building light maps using projected textures.

Figure 210:
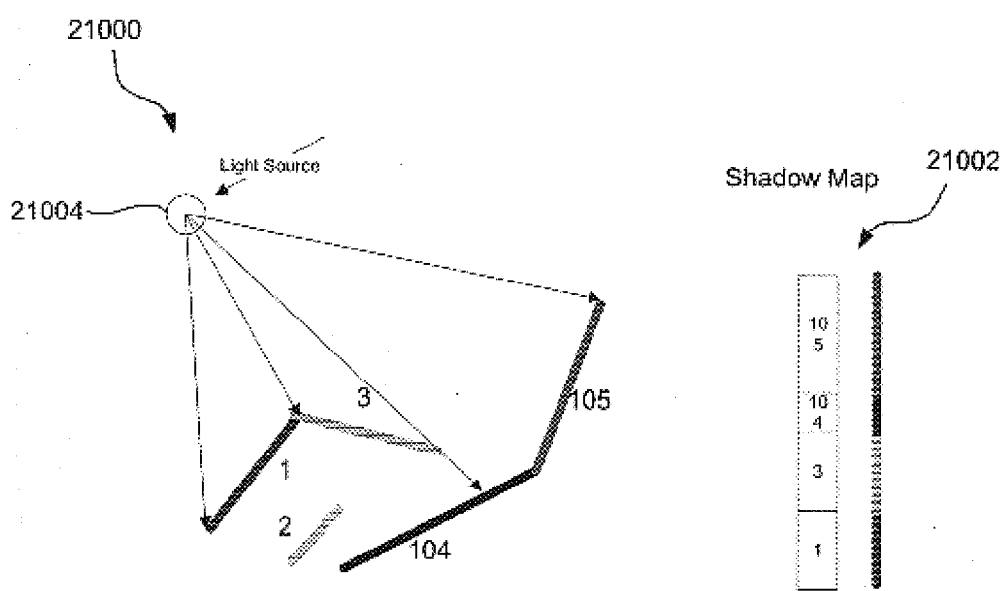

FIG. 210 illustrates a model for building shadows.

Figure 211:
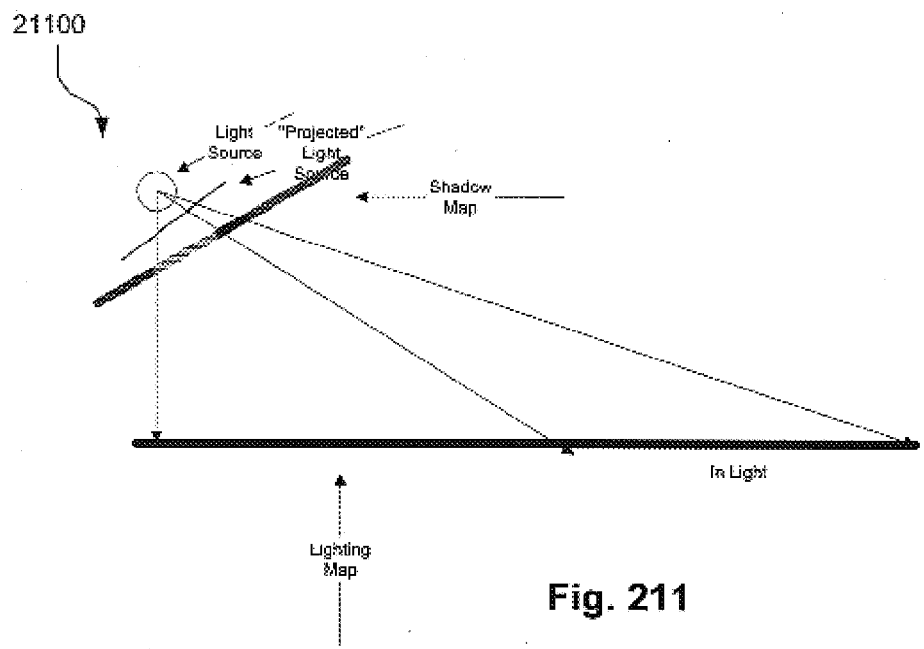

FIG. 211 depicts a model for determining occlusion using shadow.

Figure 212:
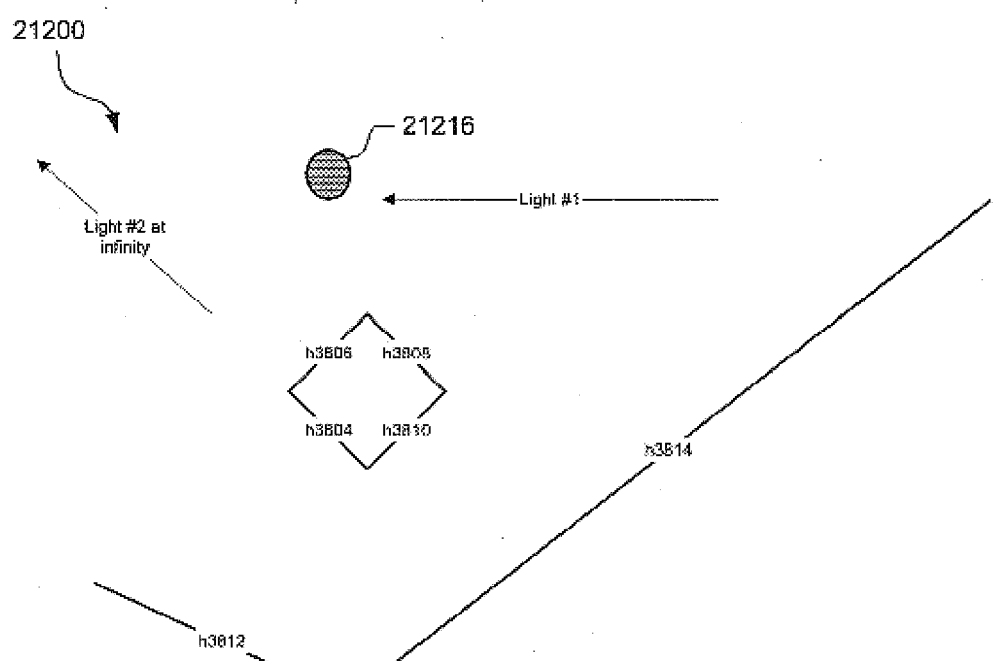

FIG. 212 shows a model for simple lightmap generation.

Figure 213:
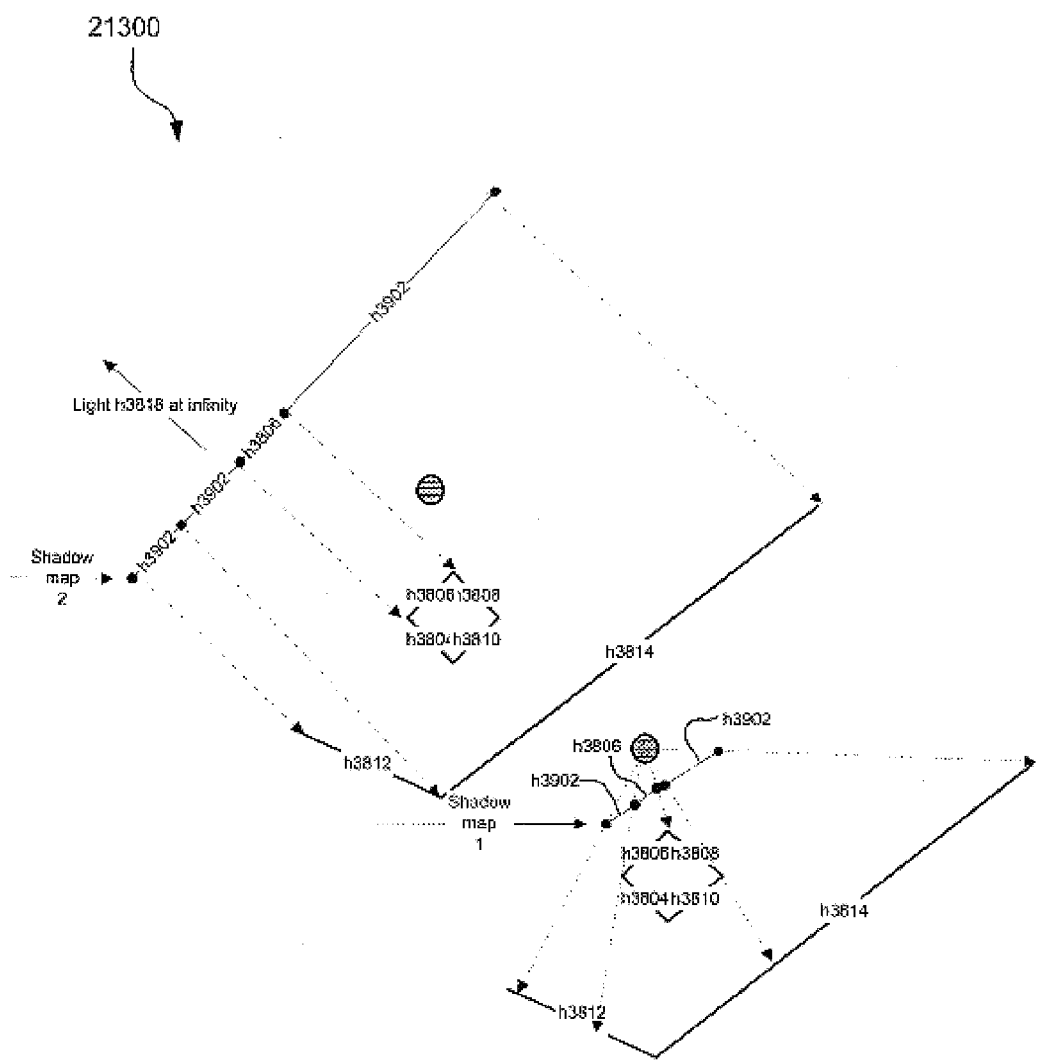

FIG. 213 is an illustration of a model for generating a shadow map.

Figure 214:
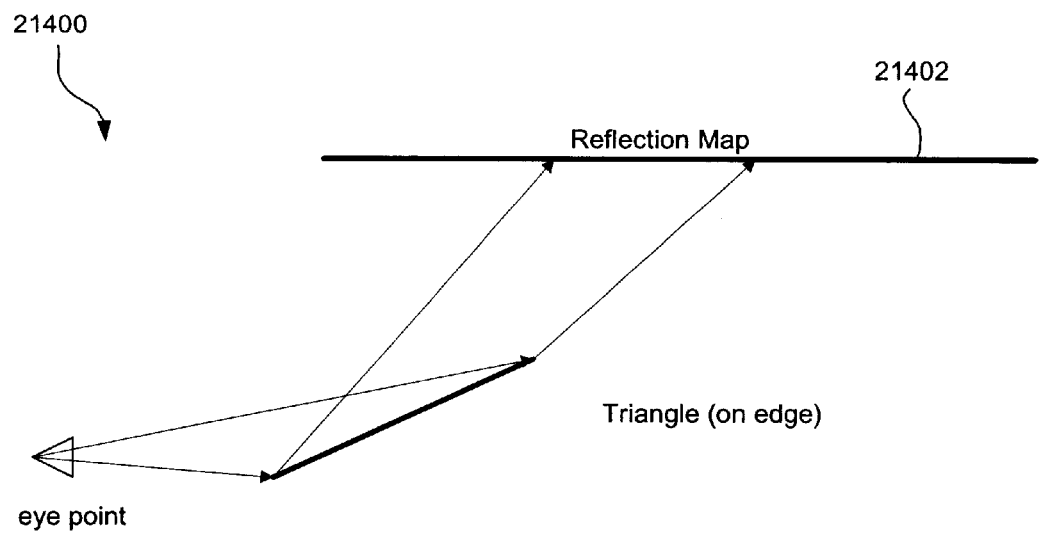

FIG. 214 is a drawing that describes how reflection mapping works.

Figure 215:
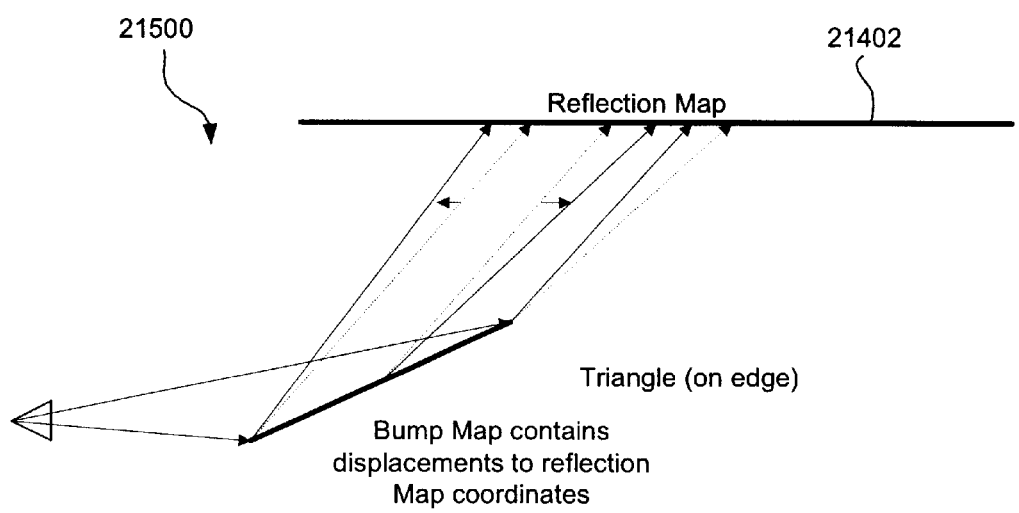

FIG. 215 shows a model for bump mapping.

Figure 216:
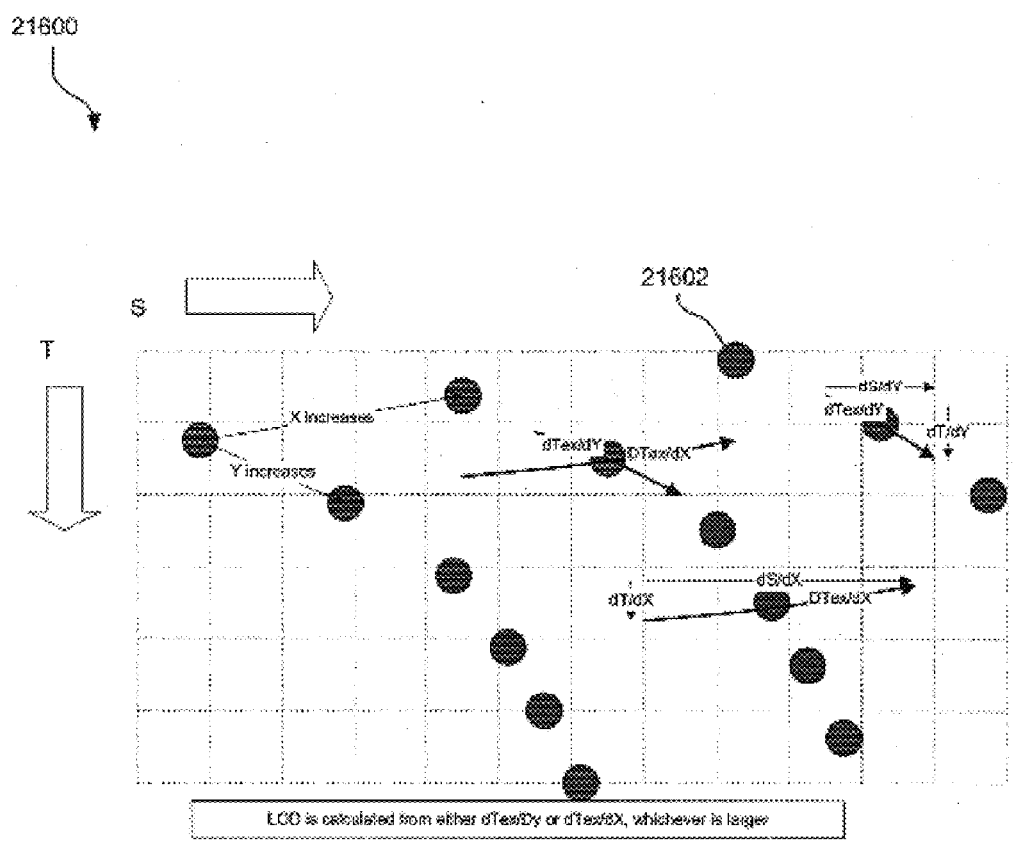

FIG. 216 illustrates a model for mapping pixels in texture space.

Figure 217:
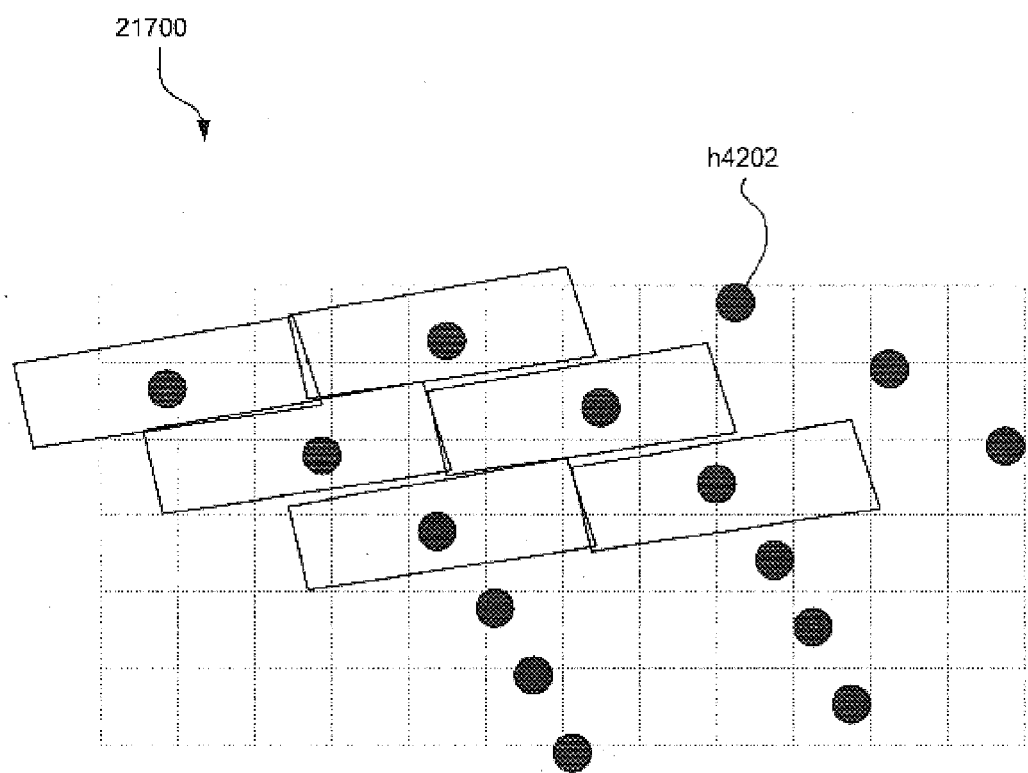

FIG. 217 shows a model for mapping pixels into texture space for anisotropic texturing.

Figure 218:
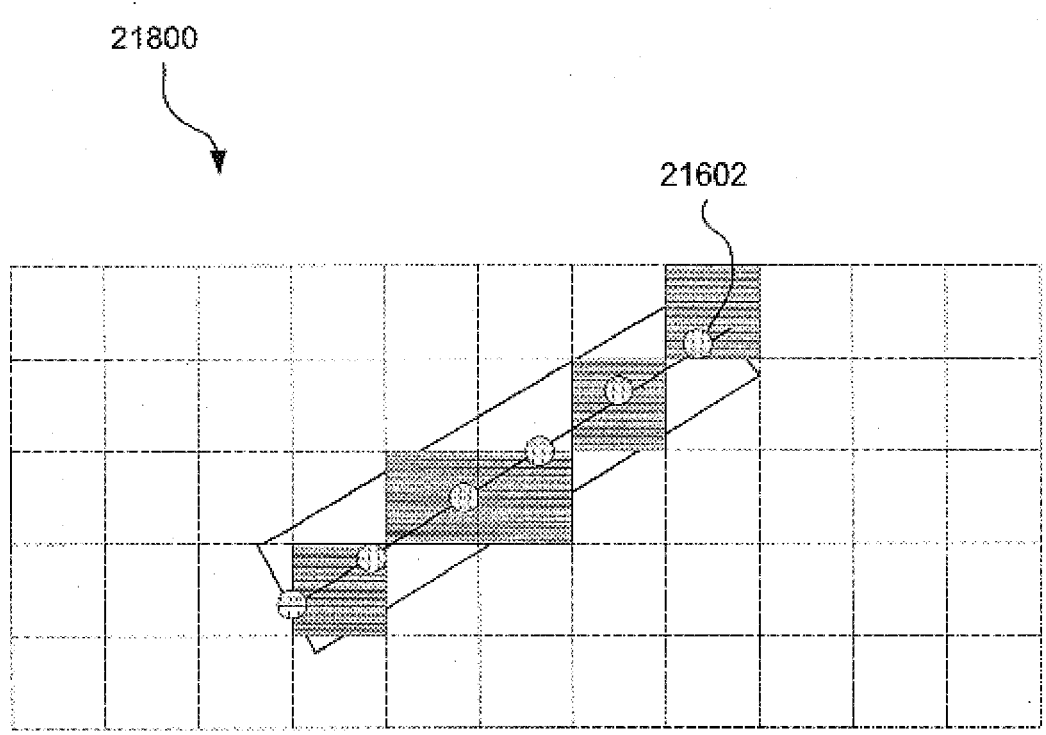

FIG. 218 illustrates a model for bilinear interpolations across the line of anisotropy.

Figure 219:
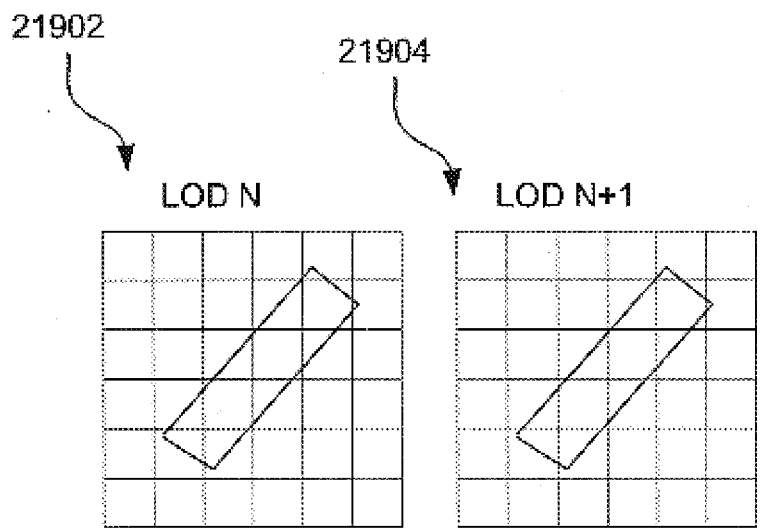

FIG. 219 depicts the distance walked along the line of anisotropy.

Figure 220:
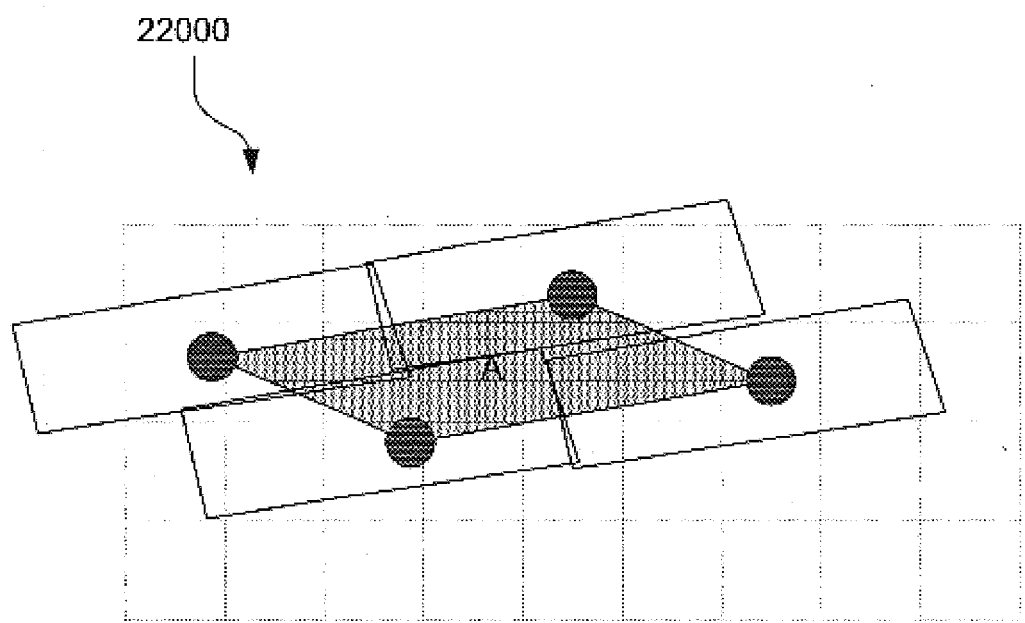

FIG. 220 illustrates a model for mapping pixels into texture space for anisotropic texturing for a 2×3 quad.

Figure 221:
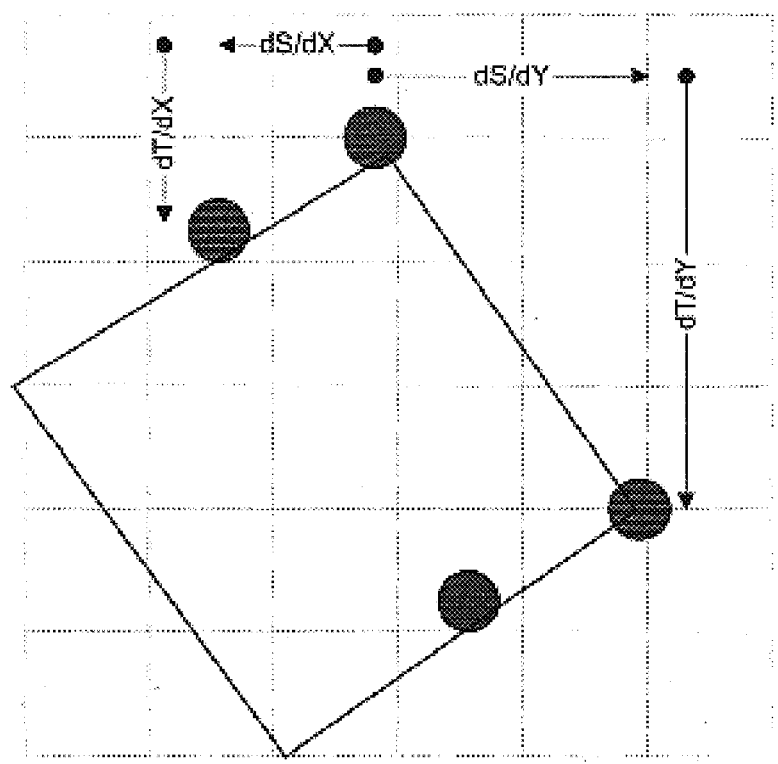

FIG. 221 illustrates a model for generating four pixels/2clk.

FIG. 222 is a table illustrating values that can be used when processing multiple textures per pixel.

DESCRIPTION OF THE PREFERRED EMBODIMENTS

Figure 1:
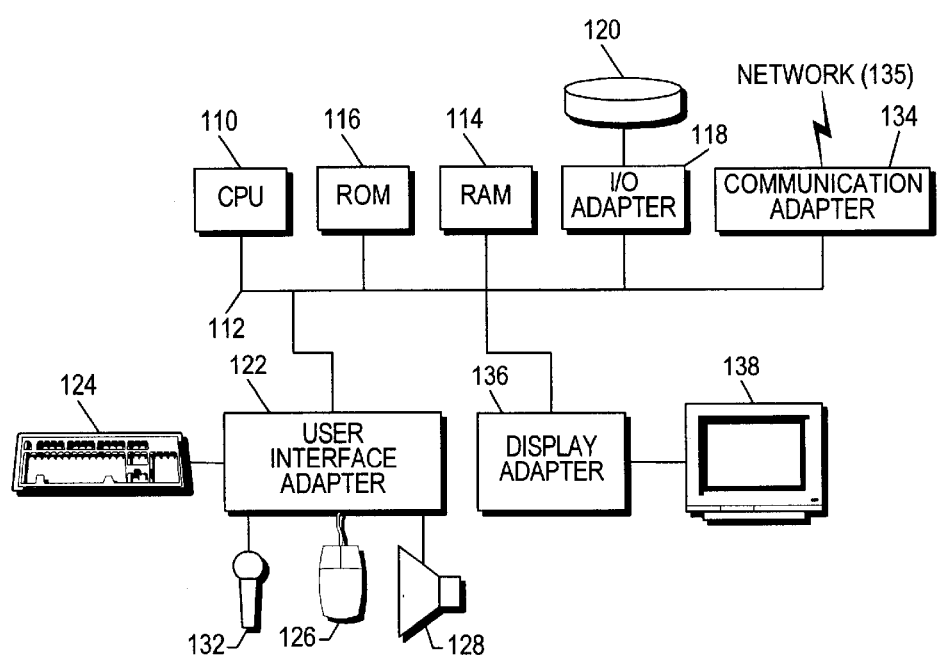
FIG. 1 illustrates a typical hardware configuration of a workstation in accordance with a preferred embodiment.

FIG. 1 illustrates a typical hardware configuration of a workstation in accordance with a preferred embodiment having a central processing unit 110, such as a microprocessor, and a number of other units interconnected via a system bus 112.

The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 328, a microphone 132, and/or other user interface devices such as a touch screen (not shown) to the bus 112, communication adapter 134 for connecting the workstation to a communication network 1173 (e.g., a data processing network) and a display adapter 136 for connecting the bus 112 to a display device 138.

The workstation typically has resident thereon an operating system such as the Microsoft Windows NT or Windows Operating System (OS), the IBM OS/2 operating system, the MAC OS, or UNIX operating system. Those skilled in the art may appreciate that the present invention may also be implemented on platforms and operating systems other than those mentioned.

VTA Overview

This specification describes the micro-architecture of the texturing unit of a video device, also generically referred to herein as VIDDEV. The unit is named the Virtual Texturing Array (VTA) as it provides a virtual array of eight texture mapping units.

Figure 2:
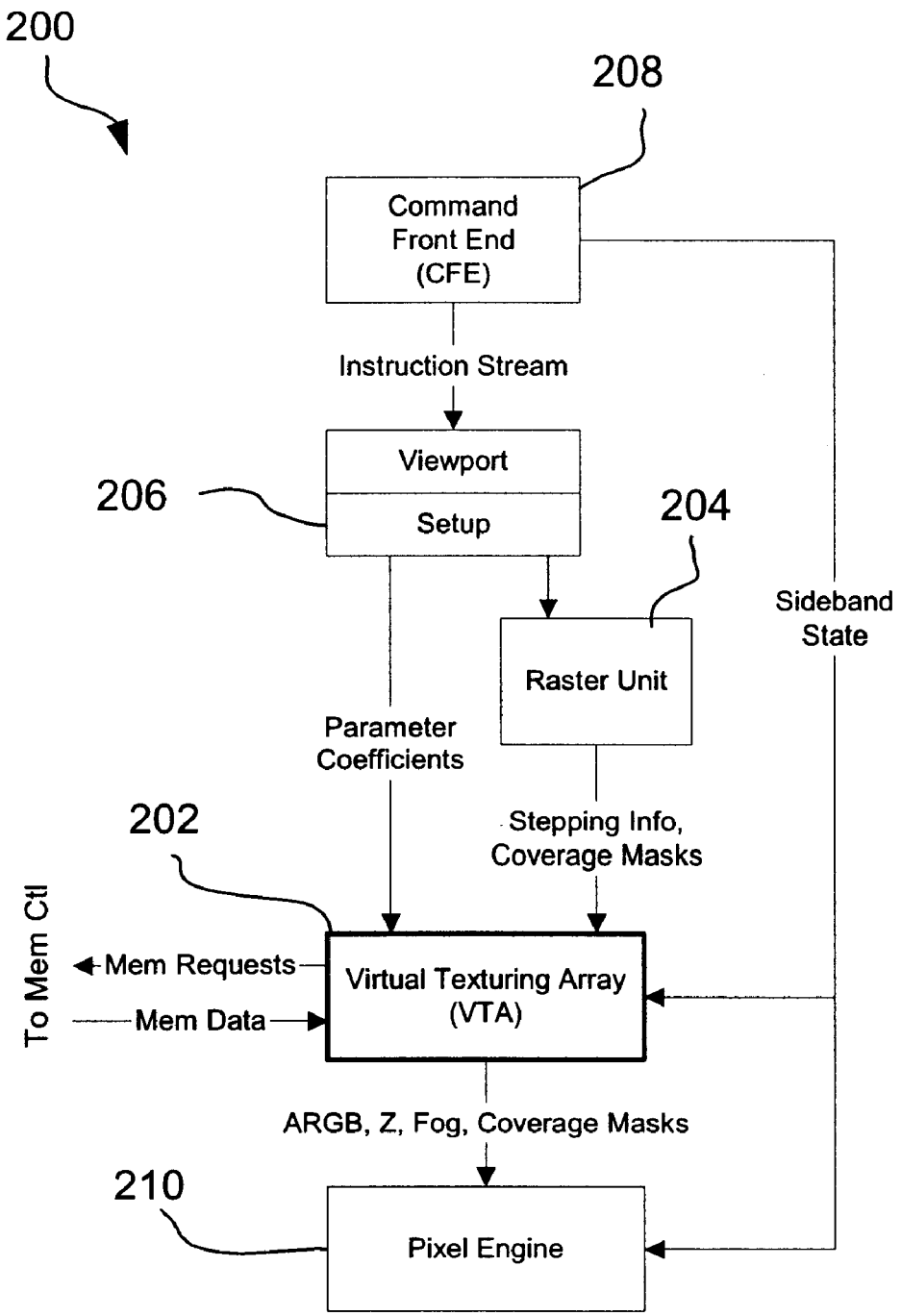
FIG. 2 is a diagram of a system implementing a virtual texturing array according to one embodiment.

FIG. 2 is a diagram of a system 200 implementing the VTA 202. The VTA processes pixels of a 2×2 quadrant as described by inputs from the Raster and Setup Units 204, 206. Pixels are textured and colored based on mode information from the Command Front End (CFE) 208, per-triangle parameter coefficients from the Setup Unit, and per-pixel stepping information from the Raster Unit.

Concurrently, the VTA generates texture cache fetch requests to the Memory Controller (not shown), layering up to eight or more textures on every polygon, before delivering pixel data (evaluated (i.e. iterated) X, Y, Z, Fog and colored/textured ARGB) to the Pixel Engine 210.

The following section contains the basic theory of operation of the VTA.

The VTA combines texture mapping, texture combining, color iterating, and color combining into a processing array. It extends the concept of multiple textures per pixel by using the same texture pipeline to handle multiple textures in multiple clocks. The design processes four pixels of a 2×2 screen quadrant in every clock allowing up to 8 or more layers of texture and color in as many clocks.

Table 1 sets forth several exemplary features of the VTA system according to a preferred embodiment.

TABLE 1

Backwards compatible with legacy systems/software at the API level.
4 pixels (a 2×2 pixel quad) processed in every clock.
0 to 8 texture and color/parameter evaluations in as many clocks.
Composite texturing (data combine).
Recursive texturing (address perturbation - bump mapping).
Bilinear, trilinear, anisotropic and percentage-passed filtering.
Overbright and underbright lighting.
Integrated color and texture combine units.
Lightmap construction, including shadows and distance attenuation.
Occlusion (shadow) maps.
8-bit textures: A8, I8, AI44 & RGB-palette.
16-bit textures: RGB565, ARGB8332, ARGB1555, AR181044, AI88 & ARGB-palette.
Other textures: 4-bit texture compress, 32-bit ARGB, YUV422 & YUV420.
Non-power of two textures (no mip-mapping, mirroring and wrapping; clamping only).
Integrated 256×24 Palette RAM.
OpenGL texture borders.
Constant color borders.
Wrapping, mirroring and mip-mapping on non-power of two textures.
4 bilinear filtered pixels per clock (full speed).

Table 2 illustrates several illustrative performance characteristics according to one embodiment.

TABLE 2

4 bilinear filtered pixels per clock.
2 trilinear filtered pixels per clock.
2 bilinear surface mapped + bilinear light mapped pixels per clock.
2 bilinear bump mapped pixels per clock.
1.33 bilinear bump mapped + bilinear light mapped pixels per clock.

The VTA preferably supports a variety of 8-bit, 16-bit and 32-bit textures in raw, compressed and palette index formats. FIGS. 3–5 describe several such formats that can be supported. As shown, FIG. 3 shows 8-bit textures 300 that may be supported, while FIG. 4 depicts several 16-bit textures 400 that can be supported. FIG. 5 illustrates several other textures 500 that can be supported.

According to one embodiment, the VTA supports palette textures through an integrated palette RAM. The palette RAM includes a 256×24 array with one write port and four read ports. This solution provides indexed texture performance through 4 palette reads per clock (1 to 4 cycles per quad) with an overhead for writing and reading the RAM.

Figure 6:
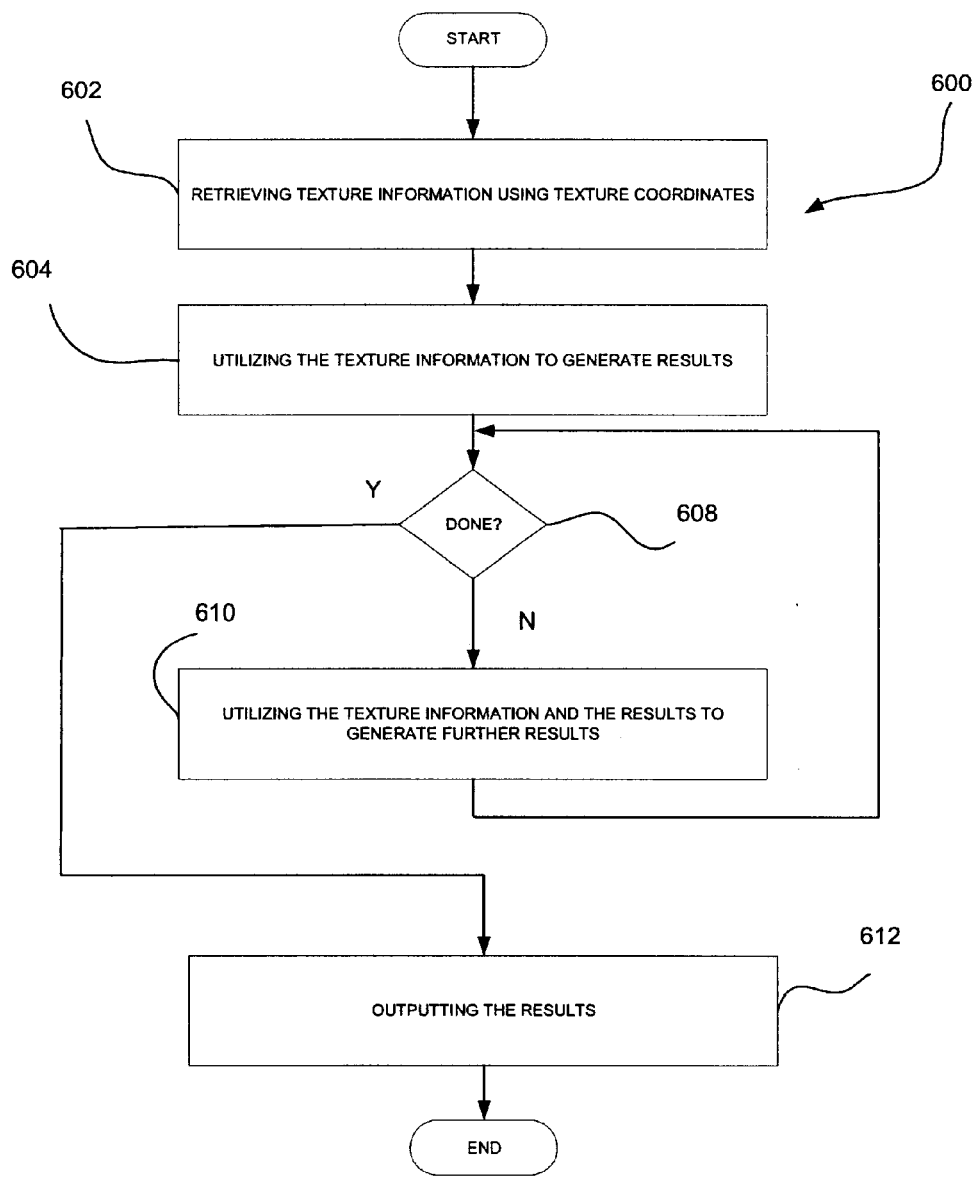
FIG. 6 shows a method for texture sampling in a graphics pipeline, in accordance with one embodiment.

FIG. 6 shows a method 600 for texture sampling in a graphics pipeline, in accordance with one embodiment. Initially, in operation 602, texture information is retrieved using texture coordinates. Such texture coordinates may be generated by a previous rasterizer such as Raster Unit 204 or any other rasterizer-type unit in a manner that is well known to those of ordinary skill.

As an option, the texture information may include color information (i.e. filtered texture color information), texture coordinates, texels, etc. In the context of the present description, texture information may refer to any information relating to textures, texturing, etc.

Thereafter, in operation 604, the texture information is utilized to generate results in any well known manner. As an option, the results may include diffuse output colors, fog output values, specular output colors, depth output values, texture color output values, a level of detail (LOD) value, a Z-slope value, interpolated per-vertex data, and/or interpolated vector coordinates. Of course, the results may refer to any output capable of being produced utilizing the texture information.

Next, it may be determined whether the current method 600 is done in decision 608. If so, the results may be outputted in operation 612 for being processed by subsequent modules such as a pixel engine.

If, however, it is determined that the current method 600 is not done in decision 608, the texture information and the results are utilized to generate additional results. Note operation 610. It should be noted that the texture information and the results may be utilized in any desired way to generate additional results. One exemplary method will be set forth hereinafter in greater detail during reference to FIG. 6A. It should be noted that operation 610 may be repeated as desired.

Figure 6A:
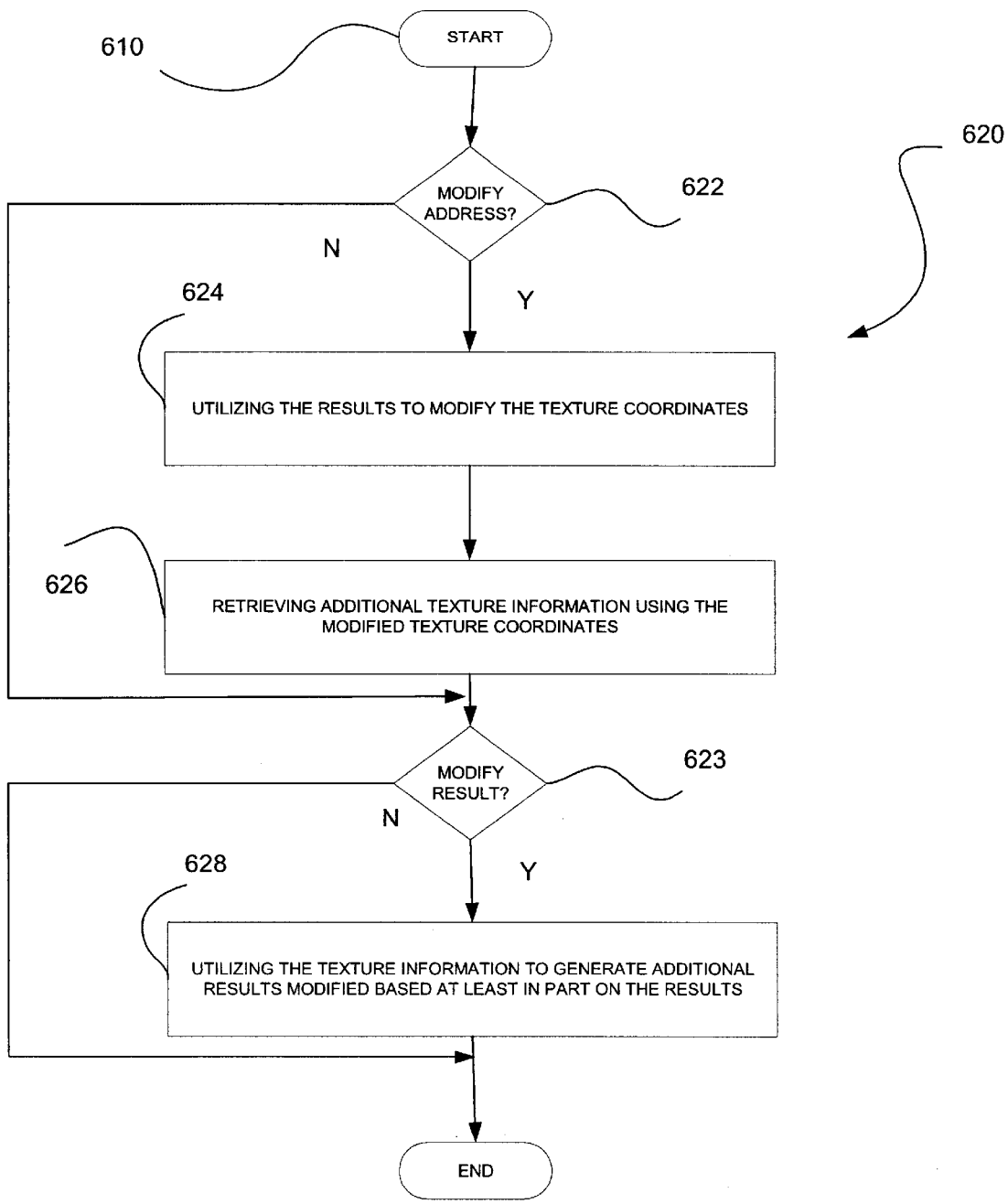
FIG. 6A shows a method illustrating various techniques associated with operation 610 of FIG. 6, in accordance with one embodiment.

FIG. 6A shows a method 620 illustrating various techniques associated with operation 610 of FIG. 6, in accordance with one embodiment. It should be noted that the present techniques are illustrative in nature and should not be construed as limiting in any manner. The texture information and the results may be utilized in any desired way to generate additional results.

As shown in FIG. 6A, it is first determined whether a first technique or a second technique should be employed in decisions 622 and 623. Such decisions may be made based on a command and/or a signal, or in any other desired manner.

During the first technique, the aforementioned results are used to modify the texture coordinates. Note operation 624. Such modification may, for example, include replacement, multiplication and/or addition, dot products, and/or any other mathematical function. Of course, any technique capable of modifying the texture coordinates based on the results may be used.

As such, additional texture information may be retrieved in operation 626 using the modified texture coordinates. Such additional texture information may or may not be further processed to generate the additional results.

During the second technique, the texture information may be used to generate additional results modified based at least in part on the results. See operation 628. For example, partial results may be combined from multiple texture fetches using multiplies and/or adds, dot products, and/or any other mathematical function. This combination of partial results can be outputted from the texture pipeline without retrieving more texture data. Of course, any technique capable of modifying the additional results based on the previous results may be used.

As an option, results relating to neighboring pixels may be utilized in order to generate level-of-detail (LOD) values for use during the retrieval of the texture information.

As such, the foregoing operations may optionally be repeated, and the results outputted, as desired. In another embodiment, the various operations of the foregoing embodiment may be programmable.

Figure 7:
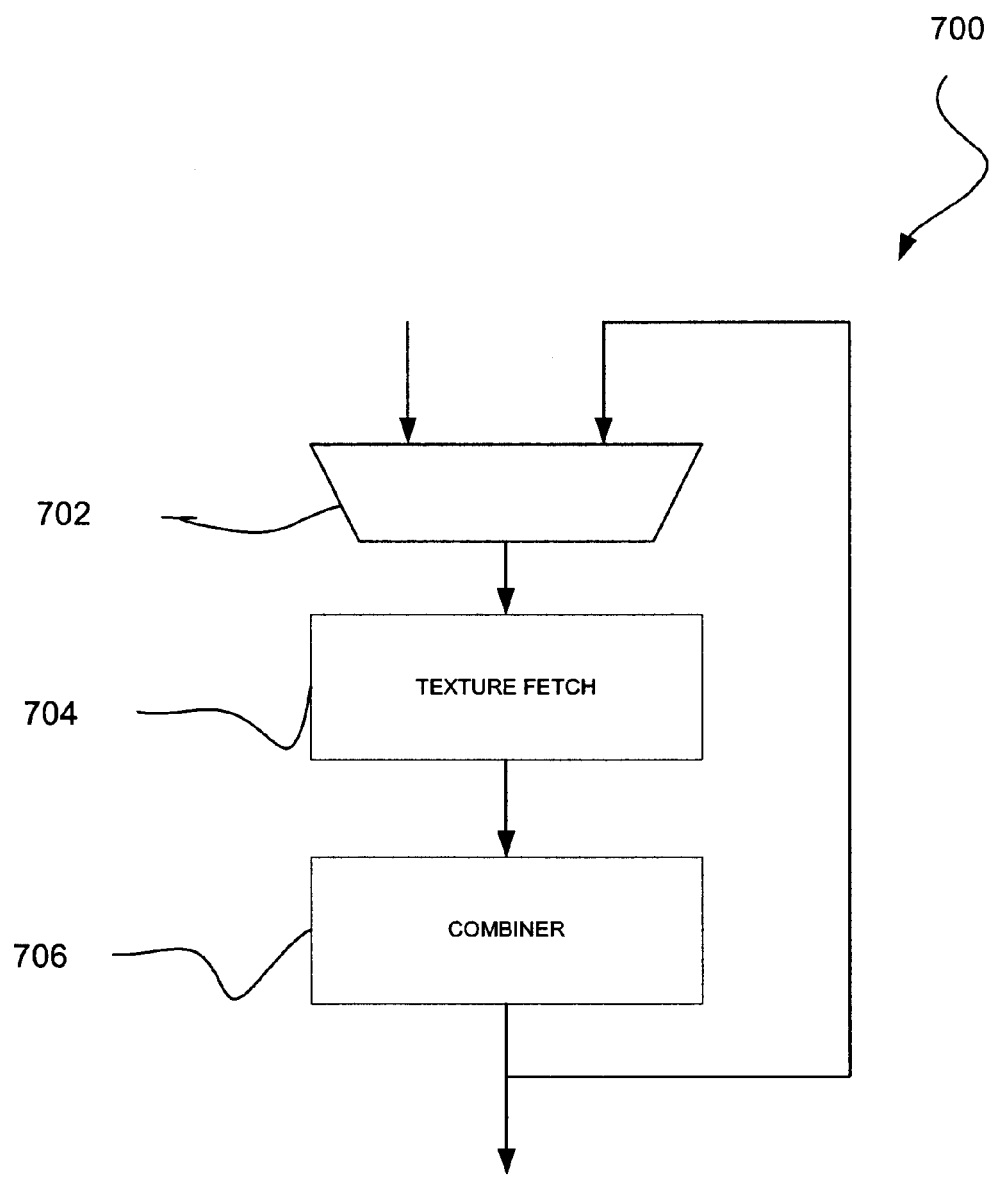
FIG. 7 illustrates an exemplary architecture for texture sampling in a graphics pipeline, in accordance with one embodiment.

FIG. 7 illustrates an exemplary architecture 700 for texture sampling in a graphics pipeline, in accordance with one embodiment. As shown, a multiplexer 702 is provided which is capable of feeding the texture coordinates to a texture fetch module 704. The texture fetch module 704 is in turn capable of retrieving the texture information in accordance with operation 602 of FIG. 6.

Also provided is a combiner module 706 capable of utilizing the texture information to generate results in accordance with operation 604 of FIG. 6. At this point, a feedback path may be utilized in conjunction with the multiplexer 702 to input additional texture coordinate in combination with the results of previous operations in order to look up additional texture information and generate further results. See operation 610. At any point, the results may be outputted, as mentioned earlier.

An example of an application of the aforementioned method 600 and architecture 700 will now be set forth for calculating a pixel color based on texture address mapping. Initially, texture information in the form of texels is fetched. This is accomplished by selecting a texture map, computing an offset into the selected texture map, and determining a texel based on the offset. Next, at least one offset is calculated. Further, the calculated offsets are used to fetch texels from selected texture maps. Additional offsets are then calculated to fetch texels from selected texture maps. The texels are then combined to produce a final pixel value.

More information will now be set forth regarding another architecture capable of carrying out the method 600 of FIG. 6. Also included in the following descriptions are texturing implementation details that may be employed in the context of the exemplary architecture, or any architecture for that matter.

VTA Pipeline Description

Figure 8:
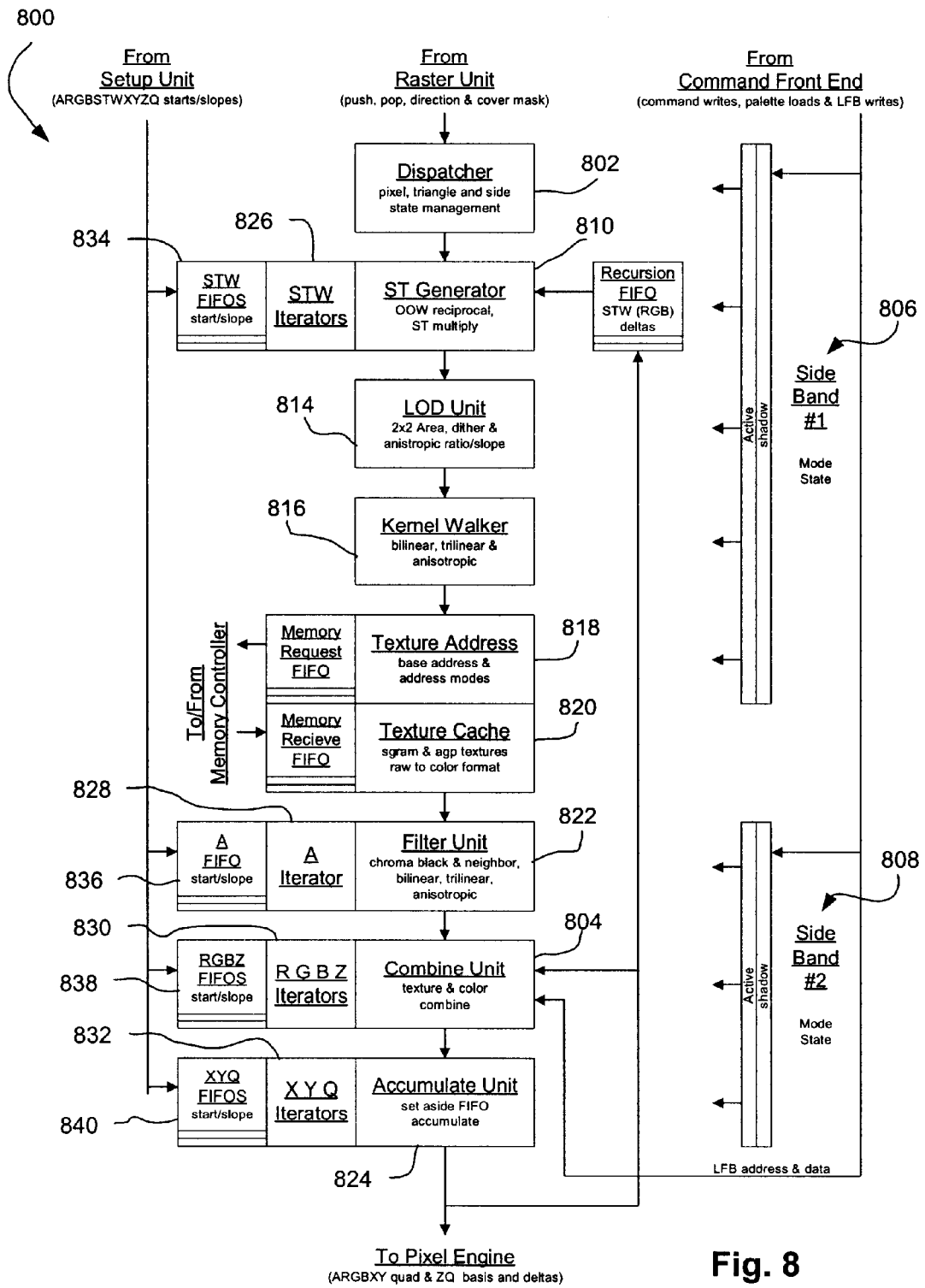
FIG. 8 is a diagram of a pipeline of the virtual texturing array (VTA) according to one embodiment.

FIG. 8 is a diagram of a pipeline 800 of the VTA according to one embodiment. The VTA processes triangles, defined by the Setup and Raster Units 206, 204 (see FIG. 2), generating a 2×2 quadrant of textured and colored pixels in every clock. Triangles, described by the Setup Unit, are processed, in screen space, as defined by instructions received from the Raster Unit. Each triangle is processed in a fashion allowing the combination of up to eight or more filtered textures and evaluated (i.e. iterated) colors in as many cycles. Each of the components of the VTA pipeline will be first discussed briefly in the context of the pipeline, with a detailed discussion of various components following.

With continued reference to FIG. 8, the Dispatch Unit 802 assembles pixel packets for composite and recursive arithmetic processing within the VTA pipeline 800. Each pixel packet, determined in length by the depth of the Combine Unit 804, is processed according to pixel state received from the Raster Unit, triangle state captured from the Setup Unit and mode state delivered through the Side-Band 806, 808. Dispatch packets, assembled from small polygons or extracted from large polygons, begin processing in-order at the top of the VTA, continue processing in-parallel within the VTA and complete processing back in-order at the bottom of the VTA.

The ST Generator 810 creates perspective correct S and T addresses from iterated SOW, TOW and OOW parameters. First, SOW, TOW and OOW are iterated for the upper left pixel of the 2×2 pixel quad. Second, SOW, TOW and OOW are derived for the neighbors of the 2×2 quad of pixels. Third, each OOW is reciprocated and multiplied against their respective SOWs and TOWs to generate perspective-correct S and T addresses.

The LOD Unit 814 generates Level-Of-Detail (LOD), pixel area in texel space, anisotropic slope and anisotropic ratio. The LOD and anisotropic ratio are determined from the S and T values of the 2×2 pixel quad. This simplification yields great hardware benefit at the expense of having only 2×2 screen space accuracy for these terms. The unit additionally generates scaled S and T addresses per the calculated LOD and programmed LOD bias.

The Kernel Walker 816 generates 2×2 neighborhoods of S and T addresses for advanced filtering. Neighborhoods are generated for multiple clocks to perform trilinear, anisotropic and percentage passed filtering. The walker utilizes S and T integer values to fetch the pixel neighborhood and S and T fraction values to select filter coefficients.

The Texture Cache 820, Address Unit 818, and Data Unit support SGRAM and AGP texturing of textures in raw and compressed formats. At the periphery, the Address Unit converts texture requests to physical addresses destined for the Memory Controller and the Data Unit converts raw texture data into true color data destined for the Texture Cache. Raw uncompressed textures arrive in 8, 16 and 32 bit formats and compressed texture arrive in 4 (texture) and 16 (frame) bit formats. Each format is retrieved in order and entered into the two level texture cache pipeline. The first cache level stores texture data in raw form (compressed, RGB, YUV, etc.) and the second cache level stores texture data in true color form (32-bit RGBA).

The Filter Unit 822 performs advanced filtering on data generated by the Kernel Walker. Data received from the texture cache at a rate of 4 texels per 4 pixels is collected, chroma-keyed and combined to form bilinear, trilinear, anisotropic, or percentage pass filtered pixels. In each clock, four filtered pixels are generated allowing the execution of bilinear in 1 clock, trilinear in 2 clocks, and anisotropic in 4 to 16 clocks (mode/area dependent).

The Combine Unit performs all legacy texture and color combine operations along with many extensions to allow for lightmap generation, advanced lighting, and over-bright lighting. Additionally, for recursive-address texturing, the combine unit can be configured to take two color channels and perform a rotation of parameters.

The Accumulate Unit 824 provides for the capture, accumulation, and bypass of data coming from the Combine Unit. Data from the combine unit may be conditionally added to a previously captured accumulator output and the current accumulator output may be conditionally captured into the accumulation FIFO. As a result, sets of texture iterations may be independently combined and accumulated to form the equation $[(T*T \ldots )+(T*T \ldots )+ \ldots ]$.

The VTA iterators generate slope accumulated parameters for S, T, W, A, R, G, B, X, Y, Z and F. The S, T and W iterators 826 generate data for the S and T Generator. The alpha iterator 828 sends data to the Filter Unit as a reference for percentage passed filtering. The R, G, B and A iterators 830 send data to the Combine Unit for use with textures. And, the X & Y iterators 832 send coordinate information to the Pixel Engine.

The Triangle State FIFOs 834–840 store triangle iteration parameters received from the Setup Unit. The FIFOs provide data to the iterators allowing simultaneous processing of multiple triangles across multiple texture iterations. Data is written to the FIFO in polygon setup order and data is read on demand by texture iteration order.

The Side-Band 806, 808 delivers mode state to the pipeline. This state comprises all state which is not modified on a per pixel or per triangle basis. State is maintained through upper VTA and lower VTA side-band interfaces. The upper interface supports the address half of the VTA and the lower interface supports the data half of the VTA. Both interfaces operate identically, utilizing double buffered "active" and "shadow" registers. In addition, the side-band provides for LFB rendering data receiving data directly off of the side-band with state coherency managed at the CFE of the 3D pipeline.

As mentioned earlier, the output of the Texture Combine unit can be fed back into the pipeline to affect the address or data of another texture iteration. The recursive feedback path allows for the perturbation of S, T and LOD values and the composite feedback path allows for the combination of texture data values. More information on such texture iteration will now be set forth.

Dispatcher (DIS) 802 (see FIG. 8)

The dispatcher controls the processing of triangles and pixel quads within the VTA. Triangle parameters, received from the Setup Unit, are captured into Triangle State FIFOs and processed in 2×2 pixel quads defined by instructions from the Raster Unit. Polygons begin processing in-order at the top of the VTA, commence iterative processing within the VTA and complete processing in-order at the base of the VTA.

The dispatcher gathers pixel quads into "packets" and "bundles". Packets assemble pixel quads from polygons of equivalent texture iteration sequence while bundles assemble packets of equivalent pixels dispatched across descending texture iterations. This dispatch arrangement provides for simple composite feedback alignment at the Combine Unit and convenient recursion feedback scheduling at the Recursion FIFO.

Figure 9:
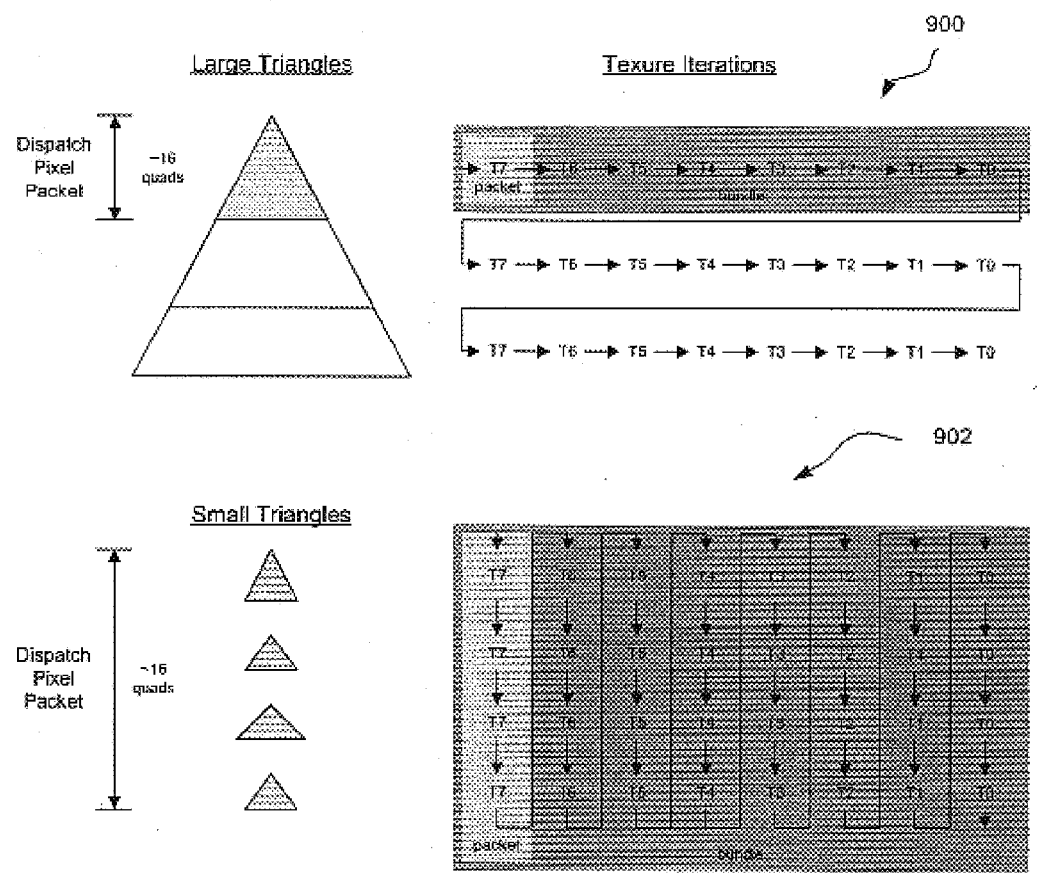
FIG. 9 illustrates triangle dispatch diagrams.

FIG. 9 illustrates triangle dispatch diagrams 900, 902. Dispatch packets assemble pixel quads from small and large polygons to a depth defined by the length of the composite feedback loop. As shown, large polygons consisting of more quads than the packet size are processed in chunks and small polygons consisting of fewer quads than the packet size are processed in combination. Similarly, dispatch bundles assemble dispatch packets processed across active texture iterations.

The VTA dispatch theory utilizes a "scheduled packet release" mechanism to satisfy composite and recursive texturing. The scheduled mechanism satisfies composite texture feedback through dispatch packets sized to force alignment at the Combine Unit. Similarly, the scheduled mechanism also satisfies recursive texture feedback through a balanced recursion release and feedback rate.

Dispatch packets and bundles support composite and recursive texturing through simplistic consistency. Each packet dispatches with a consistent length to guarantee a proper feedback-alignment for composite texturing and each bundle dispatches with a consistent length to guarantee to create an agreeable throughput rate for recursive texturing.

Packets and bundles group pixel quads of equivalent texture sequence (the number and recursion order of active textures). Unfilled packets, resulting from differing texture sequence state, complete with "void" quads to assure a consistent packet length. Similarly, unfilled bundles, resulting from texture iterations waiting for recursion, dispatch with "void" packets to assure a consistent bundle length. In either case, void quads or packets act as placeholders within the pipeline. Voids modify nothing while only consuming space to achieve the desired dispatch schedule.

Figure 10:
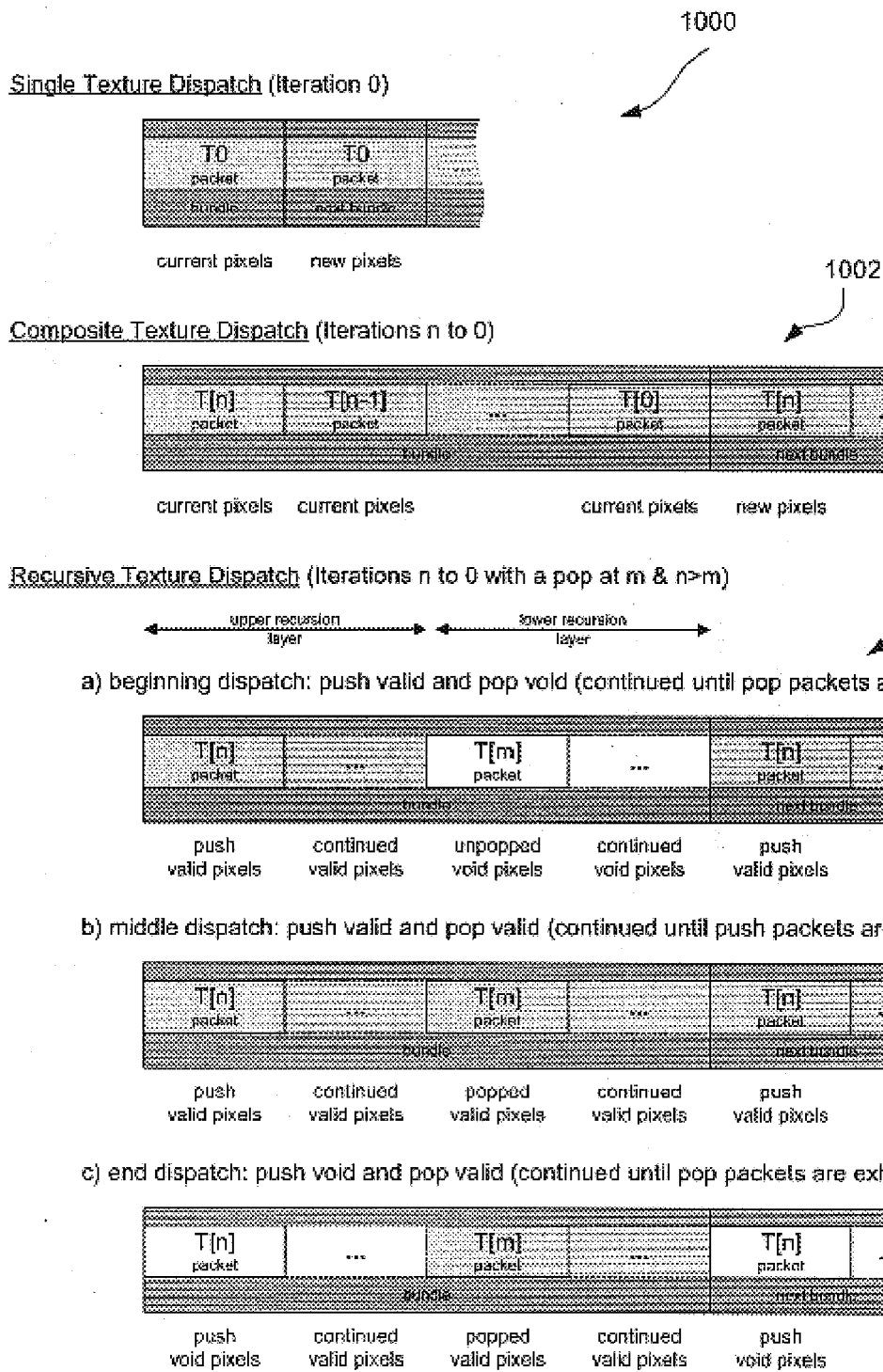
FIG. 10 shows a dispatch mechanism for single, composite and recursive texture processing.

Single, composite and recursive texture processing can utilize the dispatch mechanisms 1000 1002, 1004 depicted in FIG. 10 and described in the text below.

Single texture processing requires no dispatch complexity. The dispatcher simply submits pixels in consecutive raster order for processing on texture iteration zero.

Composite texture processing can utilize a dispatch that aligns feedback between texture iterations at the Combine Unit. The dispatcher achieves this alignment through a dispatch of consecutive pixel packets in descending texture iteration order. This dispatch schedule combined with bubble collapsing and stalling at the Combine Unit assures a proper alignment for composite texturing.

All arithmetic functions of the Combine Unit and Accumulator may be applied to composite texture iterations. The arithmetic options include two passes of combine arithmetic ((o−s) m+a) and an optional accumulation (i+j). For convenience of expression, the arithmetic option of composite texturing is indicated though the "#" symbol.

Composite Texturing: # T[n]# T[n−1] . . .

Accumulation is a subset of the composite texturing function. Unlike features of the Combine Unit, allowing only arithmetic options between adjacent texture iterations, the accumulation option allows arithmetic action with any previous texture iteration output. However, arithmetic action is limited to a single level of composite capture and accumulation between textures on the same recursion layer. For convenience of expression, the arithmetic option of composite accumulation is indicated though the "+" symbol.

Composite Accumulation: (# T[n]# T[n−1] . . . )+(# T[n−m]# T[n−m−1] . . . )+ . . . .

Recursive texture processing can utilize a dispatch to support texture circulation across the length of the VTA. The dispatcher satisfies this requirement through a scheduled dispatch enabling simultaneous processing of packets at varying levels of recursion. As a result, the recursive dispatch bundle combines texture iterations from new packets for higher iterations and old packets for lower iterations (below the first level of recursion).

Recursive dispatch bundles texture iteration packets to completion with absolute regularity. Bundles are released from the highest to the lowest texture iteration with packets marked valid when available for dispatch and void when unavailable for dispatch. This dispatch method provides efficient packet processing while guaranteeing a matched dispatch recursion release and acceptance rate (preferred, as it avoids recursion FIFO overflow).

Recursive texturing is achieved through the designation of "push" and "pop" texture iterations. Push textures load data onto the recursion FIFO from the Accumulator and pop textures unload data from the recursion FIFO to the S and T Generator. Data pushed to the recursion FIFO collects to complete a packet before combining with the addresses of the pop texture packet in the next dispatch bundle.

The push/pop dispatch structure of recursive texturing provides for both serial and parallel recursion. Multiple pushes followed by multiple pops produce parallel recursion and multiple pushes interlaced with multiple pops results in serial recursion. For convenience of expression, the arith metic option of recursive texturing is indicated though the ">" symbol.

Recursive Texturing: T[n]>T[n−1]

The push/pop structure of the recursion dispatch allows both serial and parallel recursion effects. FIG. 11 illustrates examples of recursion equations 1100 with texture iterations numbered and push/pop states defined for parallel and serial recursive texturing.

Figure 12:
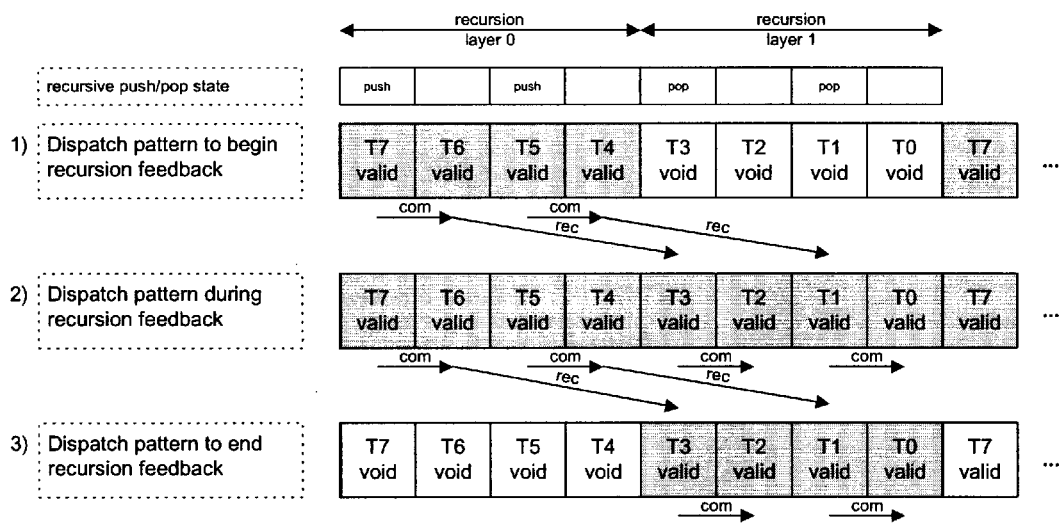
FIG. 12 illustrates recursion dispatch of one layer of recursion.
Figure 13:
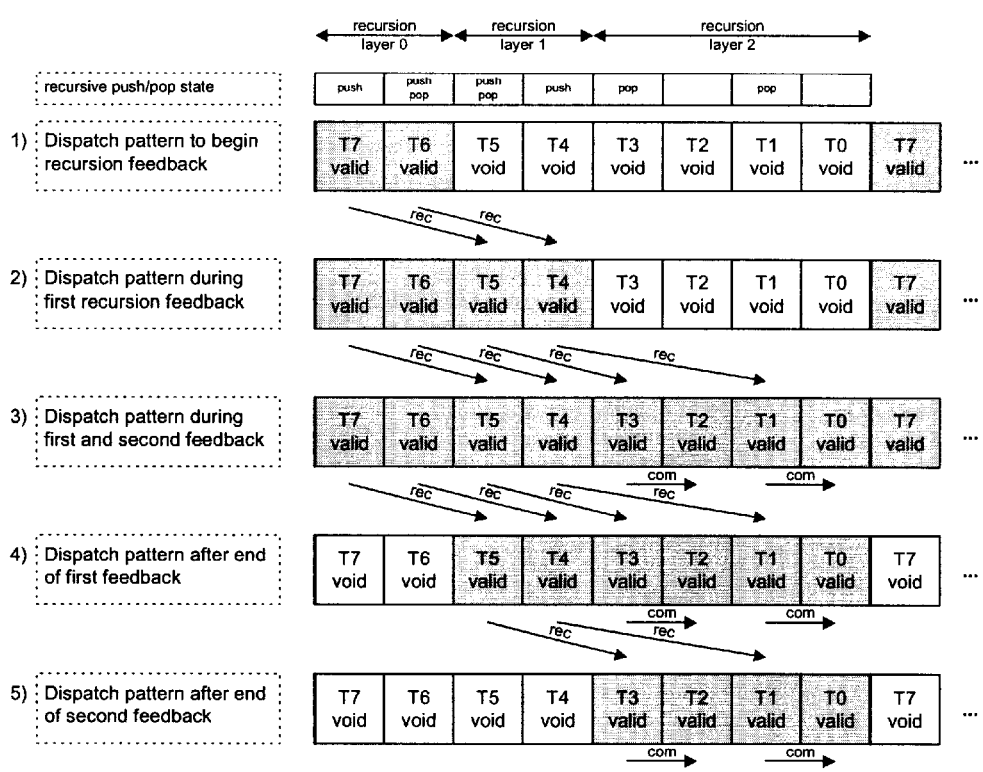
FIG. 13 illustrates recursion dispatch of two layers of recursion.
Figure 17E:

Recursive texturing can be performed utilizing multiple passes through the pipeline which results in a dispatch-inefficiency between recursion layers. To begin the layer, void packets fill pop dependent textures until recursion feedback occurs and, to end the layer, void packets fill completed push textures until recursion feedback completes. FIG. 12 illustrates recursion dispatch 1200 of one layer of recursion. FIG. 13 illustrates recursion dispatch 1300 of two layers of recursion.

Single texture dispatch performs at the peak rate of the VTA. Incoming polygons are dispatched as a continuous stream of quads requesting textures defined by texture iteration zero. The performance of this mode is limited to the efficiency of the texture cache and the throughput of external units.

Composite texture dispatch performs at a rate of one texture iteration per clock. Incoming polygons are dispatched in sets of sequential packets requesting textures in descending texture iteration order. The performance of this mode is limited to the texture iteration rate coupled with overhead from changes in composite layering state. Changes in layering state force a dispatch of void quads to fill the last packet of a closed-out texture sequence. This dispatch shortcoming results in a dispatch overhead equaling the number of void clocks to fill the last packet times the number of texture iterations of the composite sequence (16 clocks*2–8 iterations).

Recursive texture dispatch performs at a rate of one texture iteration per clock. Similar to composite texturing, the recursive dispatch releases sets of sequential packets requesting textures in descending texture iteration order. The performance of this mode is limited to the texture iteration rate coupled with overhead from changes in recursive layering state. Changes in layering state force void packet dispatches at the beginning and ending of feedback for each layer of recursion. This dispatch shortcoming results in a dispatch overhead equaling a full VTA pipeline worth of void packet dispatches (50 to 250 clocks) for each recursion layer.

Both composite and recursive dispatch mechanisms raise performance concerns over how texture iteration changes could thrash the texture cache thrash and break memory pages. Changes in texture access every packet may impact the memory system, however, the reduced fill rates require less frame buffer bandwidth.

Table 3 sets forth several dispatch rules that can be used to optimize processing.

TABLE 3

1. Dispatch pixels from triangles in the order that they are received from the Setup Unit.
2. Dispatch pixels from triangles of the same texture iteration sequence.
3. Dispatch void pixels to fill packets between triangles of differing texture sequence.
4. Dispatch packets in descending texture iteration order to fill a bundle.
5. Dispatch void packets to fill bundles waiting for recursive data feedback.

Table 4 illustrates several program rules according to a preferred embodiment.

TABLE 4

1. Number texture iterations in linear order from iteration zero.
2. Set the composite state for combine options between texture N and N + 1.
3. Set the composite state for accumulate options between texture N and textures greater than N.
4. Set the number of recursion texture pushes and pops to be equal.
5. Push recursive textures before they are popped with a limit of 4 each.

The VTA controls pixel processing through a state distributed within the VTA. This state includes pixel state received from the Raster Unit, triangle state received from the Setup Unit and mode state received from the Side-Band.

FIG. 14 is a table 1400 depicting pixel state 1402, its functions 1404, and destinations 1406. Pixel state, assembled at the Dispatch Unit, travels alongside pixels throughout the VTA. This state supports the iteration of pixels across multiple VTA iterations. The state bits include state received from the Raster Unit describing pixel movements and state generated by the VTA to manage texture iteration.

FIG. 15 is a table 1500 depicting triangle state 1502, its functions 1504, and destinations 1506. Triangle state, collected from the Setup Unit into the Triangle State FIFOs, describes the start and slope values of parameters iterated within the VTA. This state provides the basis for per pixel calculations of polygons and their texture iterations. The triangle state includes start values for X and Y, and startX, startY, deltaX and deltaY values for the sloped parameters (W, Z, R, G, B, A, S, T, and Q) of each VTA iteration.

Mode State is sampled off of the Side-Band to control polygon and pixel processing throughout the VTA. This state includes general VTA register state stored in flops and per texture iteration state stored in RAMs. Each register is sampled at it highest usage point in the pipeline and in some cases fields of the register are transported to lower points in the pipeline.

FIG. 16 is a table 1600 showing Mode State per VTA. FIGS. 17A–E together depict a table a2400 showing Mode State per texture. FIGS. 16 and a24 itemize the register-field usage of global and per-texture-iteration mode state within the VTA. Units marked by "*" use a register field and units marked with ">" transport a register field.

Performance of the VTA can be described by a math ignorant model which describes the pipeline by dispatch, latency, throughput, stalls, bubble generation, bubble reduction and FIFOs. Table 5 provides a performance overview of the VTA pipeline.

TABLE 5

Triangle setup data is received from the Setup Unit into Triangle State FIFOs.
Pixel state is received from the Raster Unit.
Mode state is received off of the Side-Band.
Polygons are processed by descending texture iteration number.
Pixels are dispatched in per texture iteration packets defined by the length of the Combine Unit.
Packets dissect pixels from large triangles and group pixels from small triangles.
Composite packets are dispatched one after another.
Recursive packets are dispatched in two passes.
Void pixels are dispatched to fill packets between dispatch sequence state changes.
Void packets are dispatched to provide space within pipe for the second pass recursive data.

TABLE 5-continued

Pixel State travels along side pixel quads to support parameter and texture iteration.
Parameter iterators read triangle state off of the Triangle state FIFO as pixels packets are processed.
Parameter iterators manipulate per texture iteration state for all active polygons within the pipe.
S and T addresses are calculated for a 2x2 pixel quad.
LOD is calculated from 2x2 pixel quad.
Kernel Walker logic expands the dispatch for advanced filtering.
Trilinear and Anisotropic filtering expand the dispatch magnitude by 2, 4 & 2-16, respectively.
Texture Cache space provides data from the Memory Controller in two levels.
Texture Cache level one stores raw memory data to support multiple textures and filtering modes.
Texture Cache level two stores real color texels to support full-speed 2x2 quad pixel bilinear filtering.
Filter Unit logic compresses the dispatch of the Kernel Walker through bilinear accumulation.
Combine Unit logic computes data from texture, color and composite iterations.
Accumulator Unit logic sets aside data and accumulate composite outputs.
Recursion path logic allows ST perturbation of subsequent texturing, and palette emulation).

Figure 18:
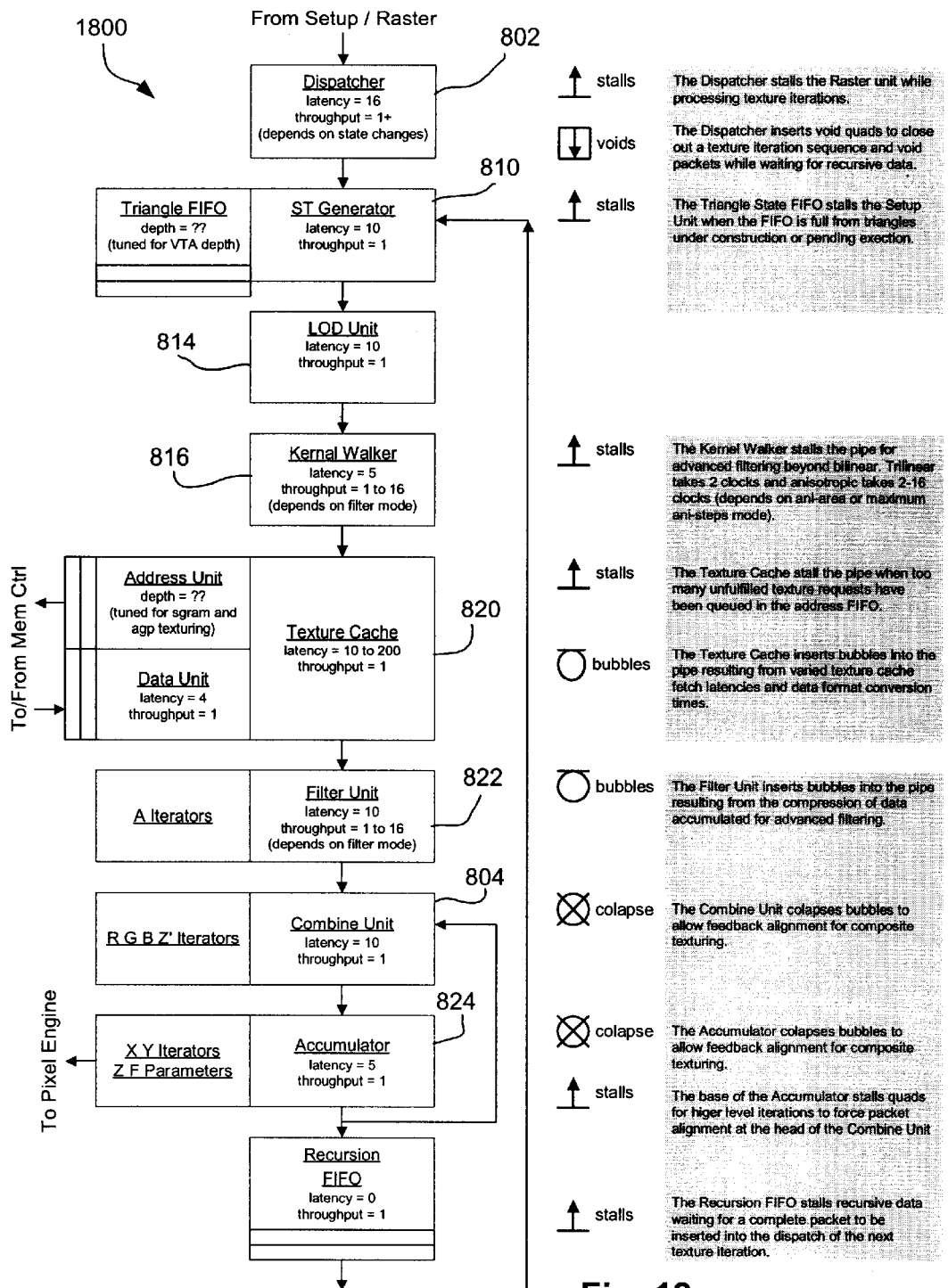
FIG. 18 is a flow diagram that describes the VTA pipeline performance model according to an illustrative embodiment.

FIG. 18 is a flow diagram that describes the VTA pipeline performance model 1800 according to an illustrative embodiment. Each major block of the pipeline defines it latency throughput along with an indication of where in the pipe stalls generate, bubbles form, bubbles collapse, and data is FIFOed.

Side-band Register Interface

Mode State is managed through "shadow" and "active" state captured off of the side-band. The double buffered solution allows software to set a shadow state as polygons are processed for an active state. Software updates the shadow state through writes down the side-band as hardware manages the transfer of shadow state to active state through controls from the arithmetic pipeline.

Figure 19:
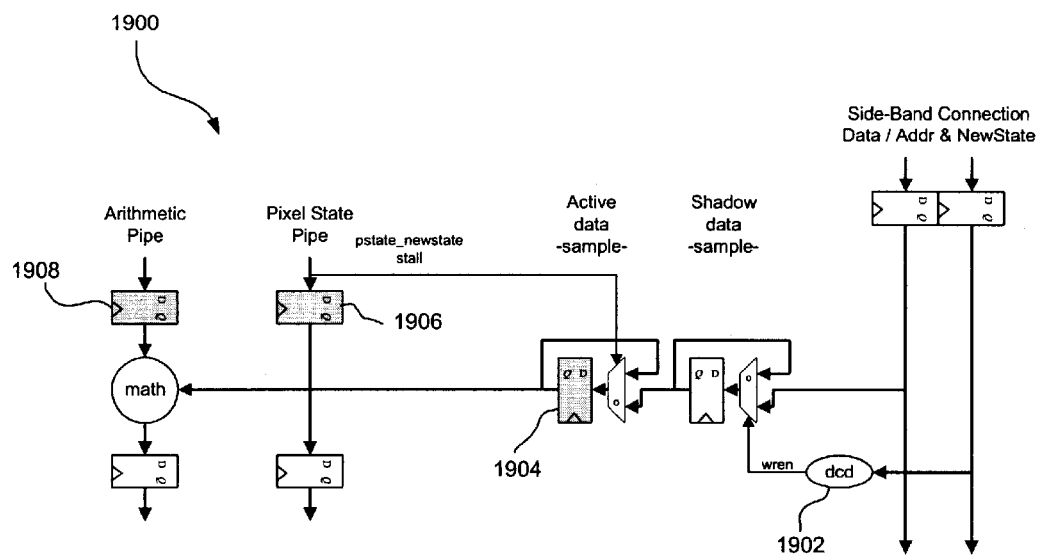
FIG. 19 is a diagram depicting global mode register for a global mode state from the VTA side-band interface.

The VTA manages Side-band mode state through global registers and per-texture iteration registers. FIG. 19 is a diagram depicting global mode register 1900 for a global mode state from the VTA side-band interface. As shown, the global mode register utilizes a double-buffered flip-flop-based design. A dcd operation 1902 enables a load of the shadow register. The shadow state is loaded by writes down from the side band. The active state is updated by newstate from the pixel state pipeline. Flip-flops 1904, 1906, 1908 stall in lock-step. Software writes shadow registers as hardware uses the active registers.

Figure 20:
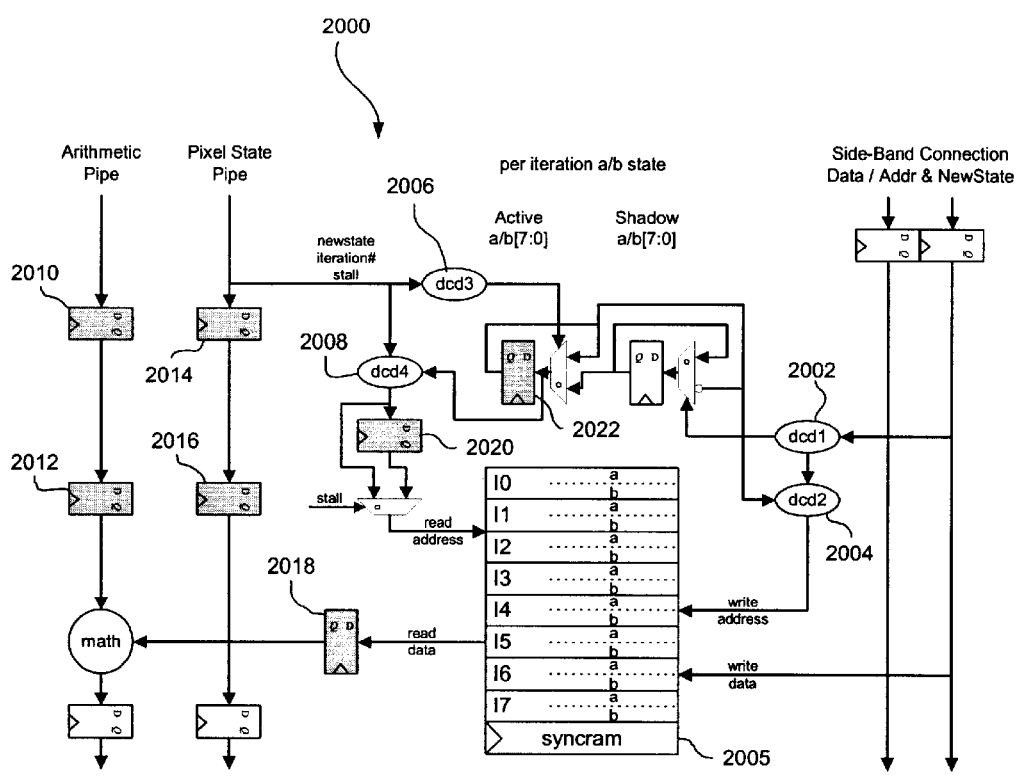
FIG. 20 illustrates a per-texture mode register for a per-texture mode state from the VTA side-band interface.

FIG. 20 illustrates a per-texture mode register 2000 for a per-texture mode state from the VTA side-band interface. The per-texture mode register utilizes a double buffered 16-entry RAM-based design. Dcd operation 12002 enables a load of the shadow ab-state to the inverse of the active ab-state for the decoded texture iteration. Dcd operation 2 2004 generates a write to the register RAM 2005 from the active ab-state and the decoded texture iteration. Dcd operation 3 2006 enable a load of the active ab-state from the shadow ab-state for a higher numbered texture iterations. Dcd operation 4: 2008 generates a read to the register RAM from the active ab-state and the decoded texture iteration.

With continued reference to FIG. 20, the per texture shadow and active state is interpreted from per texture shadow and active RAM A/B selects. RAM A/B selects determine the LSB of the RAM for active-register reads and shadow-register writes. Writes to shadow registers load the inverse of the active A/B state to the shadow A/B state. The register updates pend when the A/B state of the shadow register is set to the inverse of the active register. New state updates from the pixel pipe enable an update of the active A/B selects for all higher numbered textures. Flip-flops 2010–2022 stall in lock-step. The RAM address switches to stalled address while stall is active. Again, software writes shadow registers as hardware uses the active registers.

Software updates to the registers of the side-band are coordinated through the CFE. To set a new mode state, the CFE writes registers on the side-band, drops a "newstate" token down the pixel-pipe and waits for a "rcvstate" token to return from the data-path. Correspondingly, to receive a new mode state, the data path transfers shadow state to active state as the new state token progresses through the pipeline.

Figure 21:
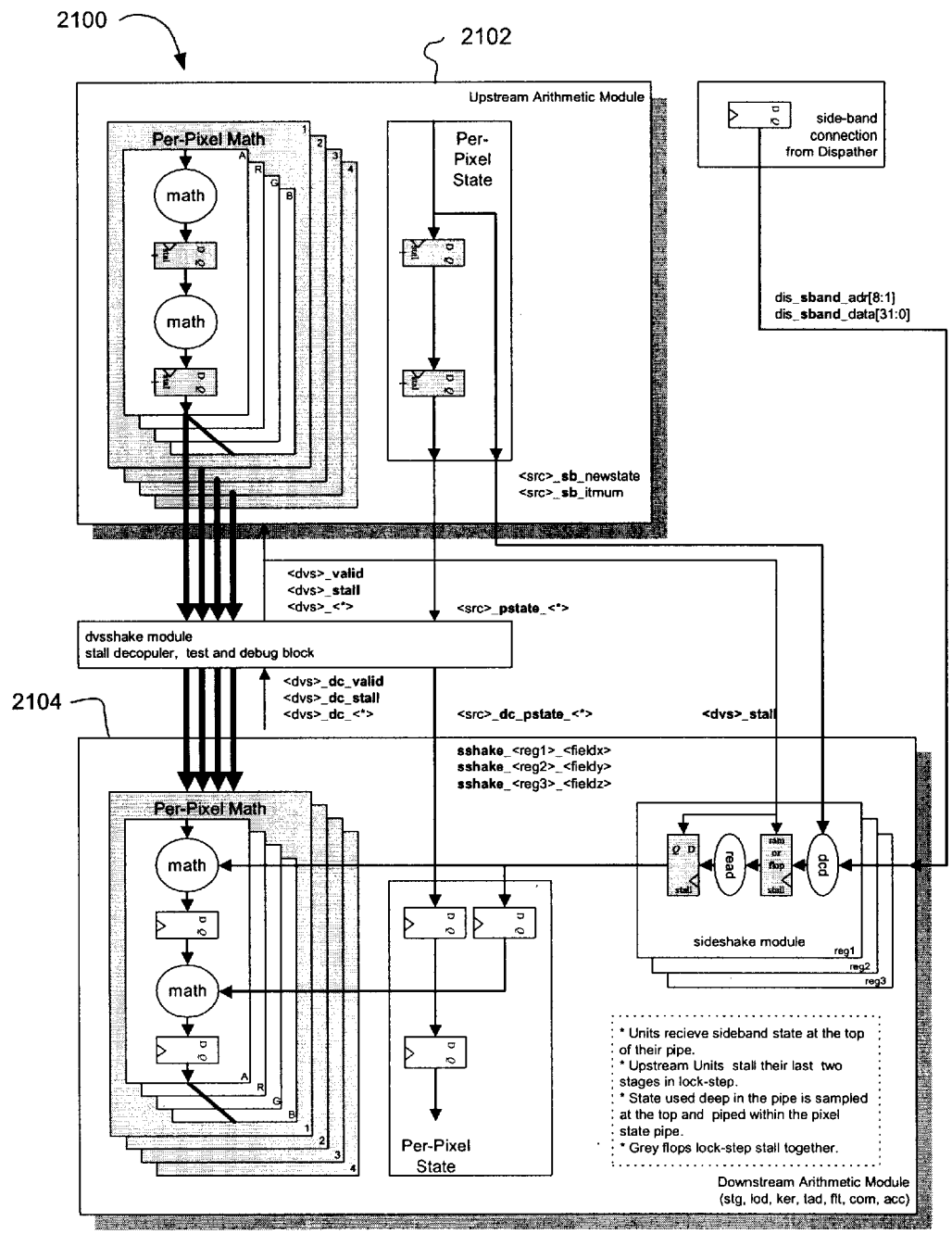
FIG. 21 is a diagram illustrating the preferred method for coding an arithmetic unit as well as a uniform side-band connection scheme.

The VTA pipeline generates four pixels per clock from modules assembled from per-pixel math pipelines, per-quad state pipelines and a variety of side-band connections. To aid in design speed and accuracy, a modular design philosophy has been adopted. FIG. 21 is a diagram 2100 illustrating the preferred method for coding an arithmetic unit as well as a uniform side-band connection scheme. Following the coding scheme, the upstream modules 2102 send a two-cycle early "newstate" and "itrnum" to the down stream module 2104. Upstream modules 2102 stall their last two pipe stages with a lockstep stall. Downstream modules 2104 receive early quad-state signals to sample side-band state at the top of the module. Downstream modules 2104 pipe side-state within their pixel-state pipelines for side-state usage within the module.

S and T Generator (STG) 810 (see FIG. 8)

Figure 22:
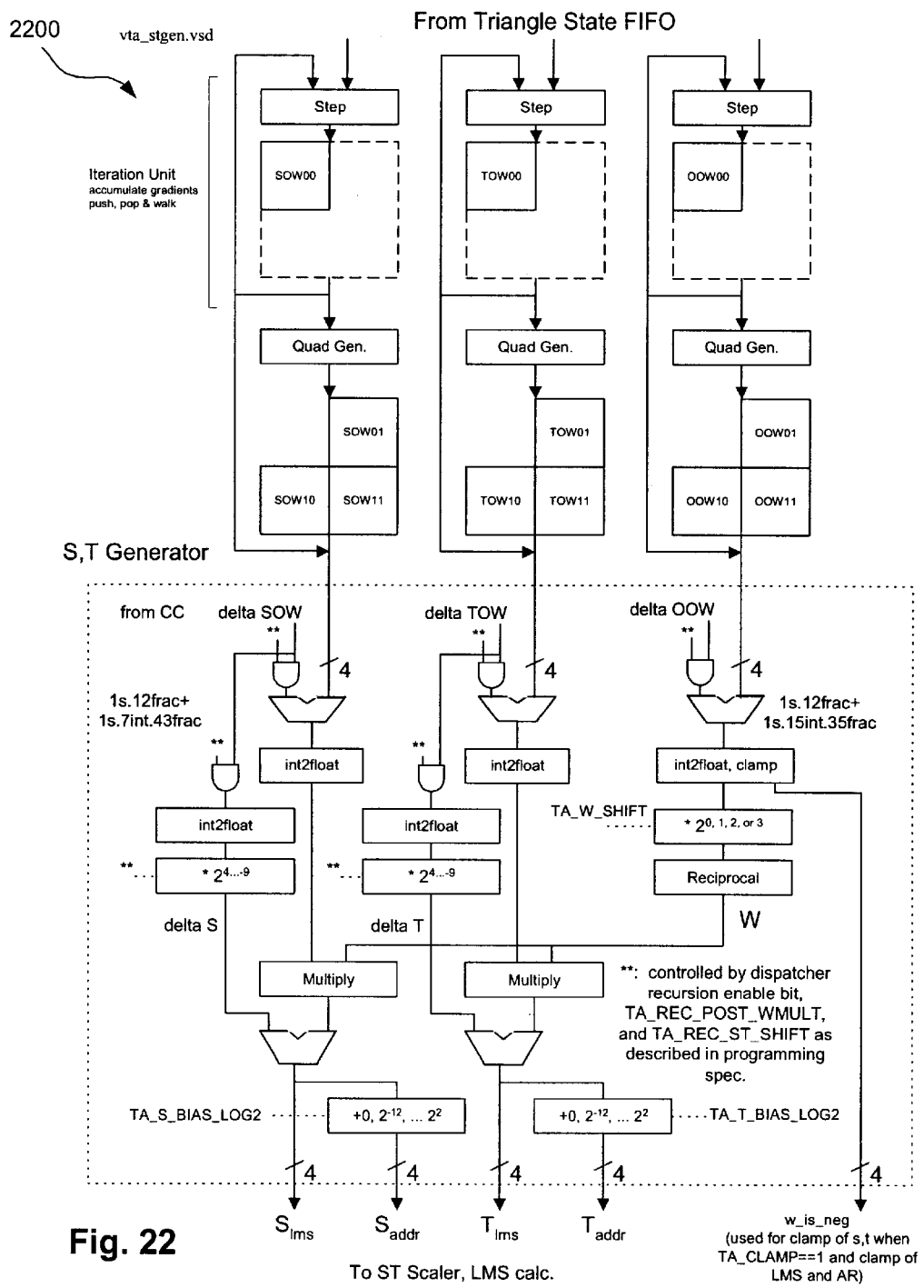
FIG. 22 shows the S and T generator according to one embodiment.
Figure 23:
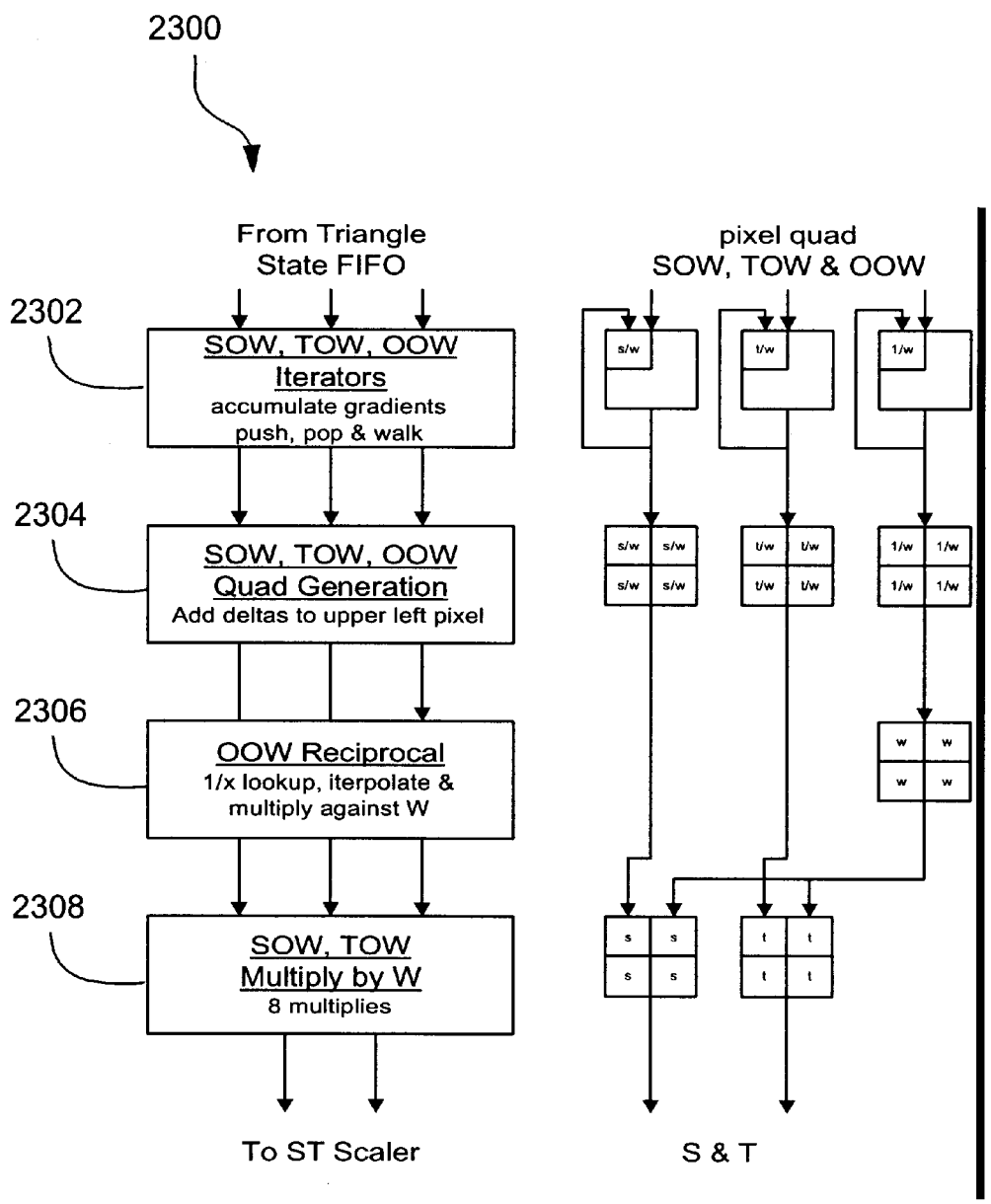
FIG. 23 depicts an SOW, TOW, OOW Iterator, a Quad Generator, a W Reciprocal, and a W Multiply of the S and T generator.

FIG. 22 shows the S and T generator 2200 according to one embodiment. A portion of the ST generator 2300, is illustrated in FIG. 23, includes an SOW, TOW, OOW Iterator 2302, a Quad Generator 2304, a W Reciprocal 2306, and a W Multiply 2308. FIG. 23 shows the SOW and TOW iterators maintained at the same time as the OOW. They may be moved to a later point, just before the end of OOW reciprocal.

Figure 24:
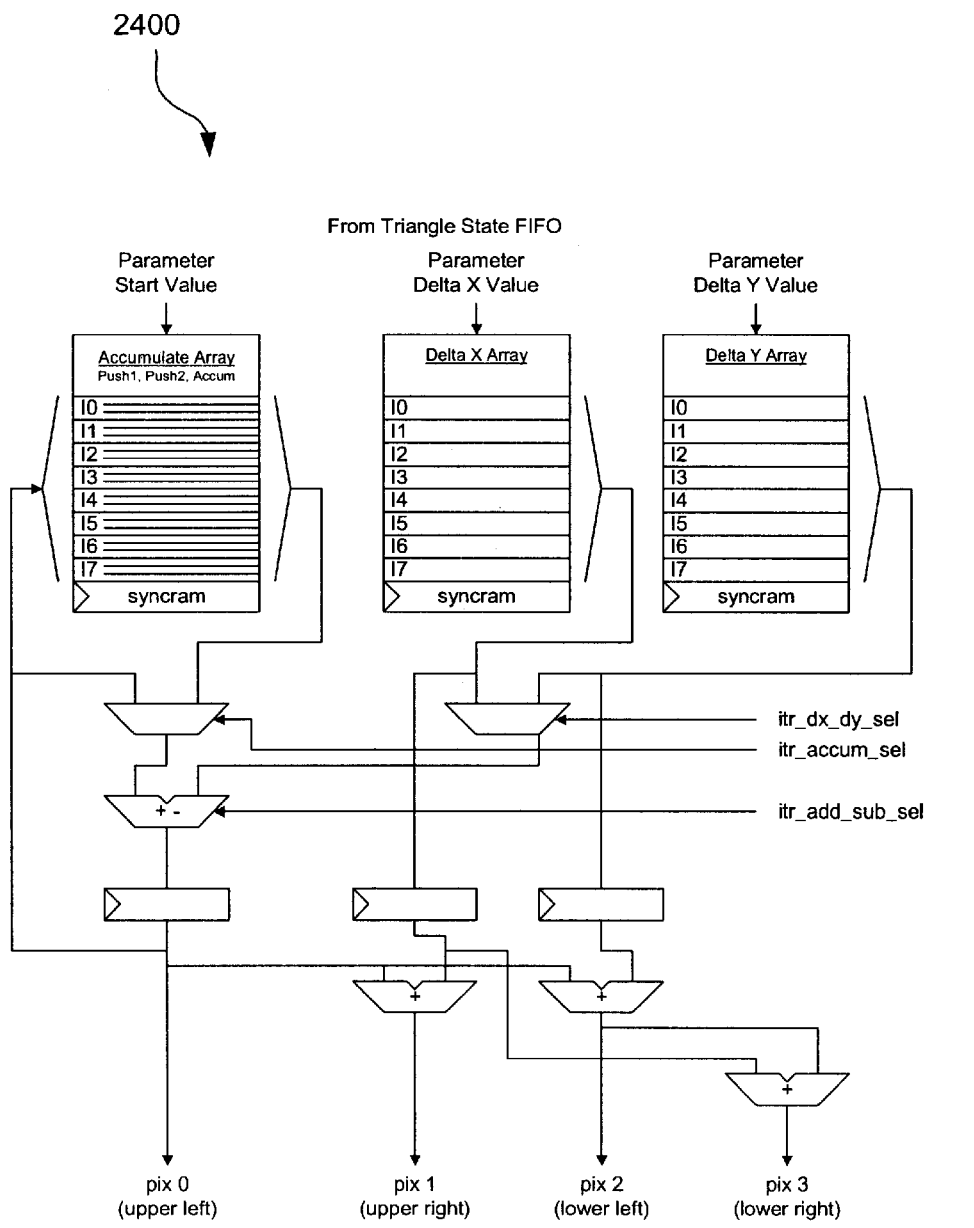
FIG. 24 depicts the VTA iterator and quad generator.

FIG. 24 depicts the VTA iterator and quad generator 2400. The SOW, TOW, OOW Iterators are based on the Generic VTA iterator described in the following paragraphs. The STW parameter iteration units of the VTA are 51 bits, expressed as 8.43 integer fraction with respect to 0.0 to 1.0 spanning one texture repetition.

The Generic VTA iterator takes Texture tags from two consecutive pipe stages, and allows for the iteration of up to 8 or more sets of components.

Figure 25:
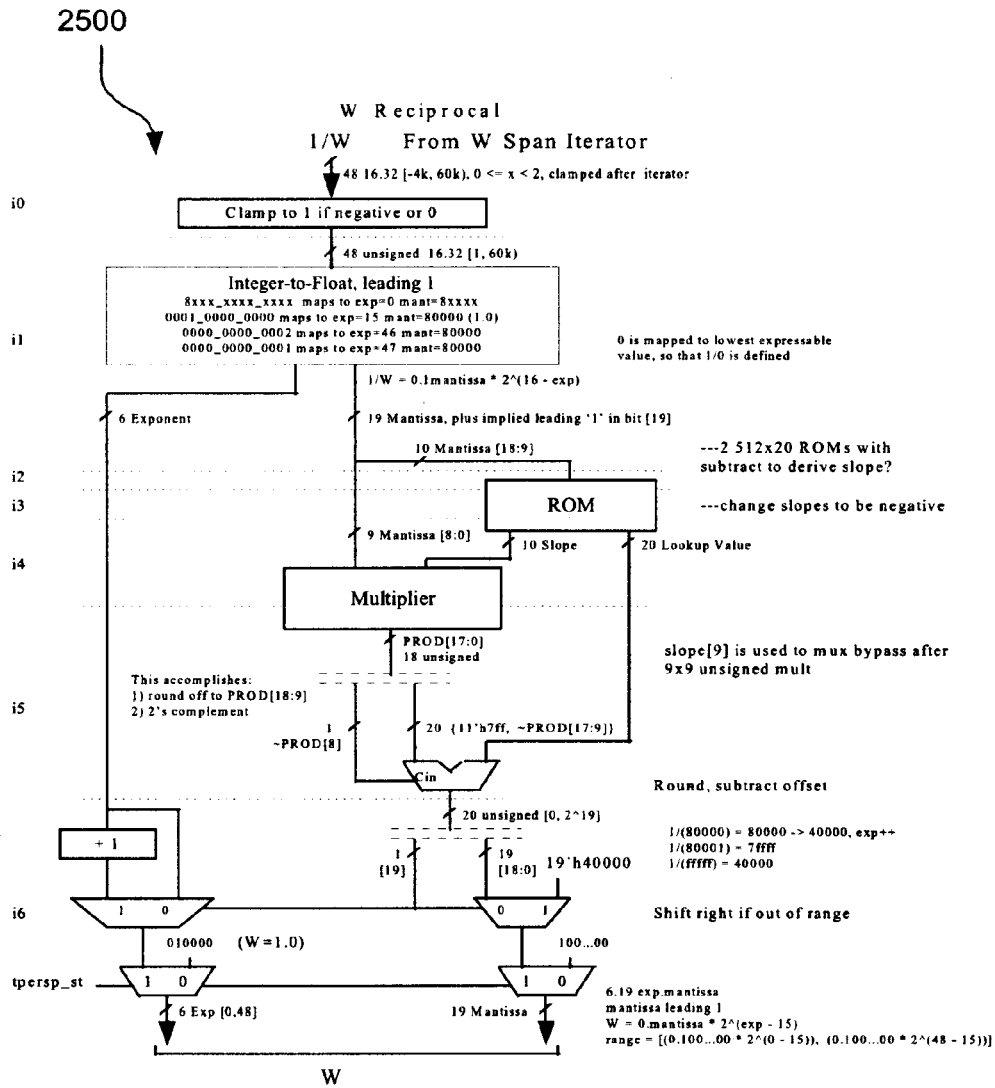
FIG. 25 illustrates a unit for generating a W reciprocal.

FIG. 25 illustrates a unit 2500 for generating a W reciprocal. A reciprocal can be calculated by looking up an initial value as a function of the MSBs of the input, and subtracting an offset equal to a second lookup value times the LSBs of the input.

As an alternative, the 1/w can use two 512×20 ROMs, and generates the slope by taking the difference between neighboring values.

Figure 26:
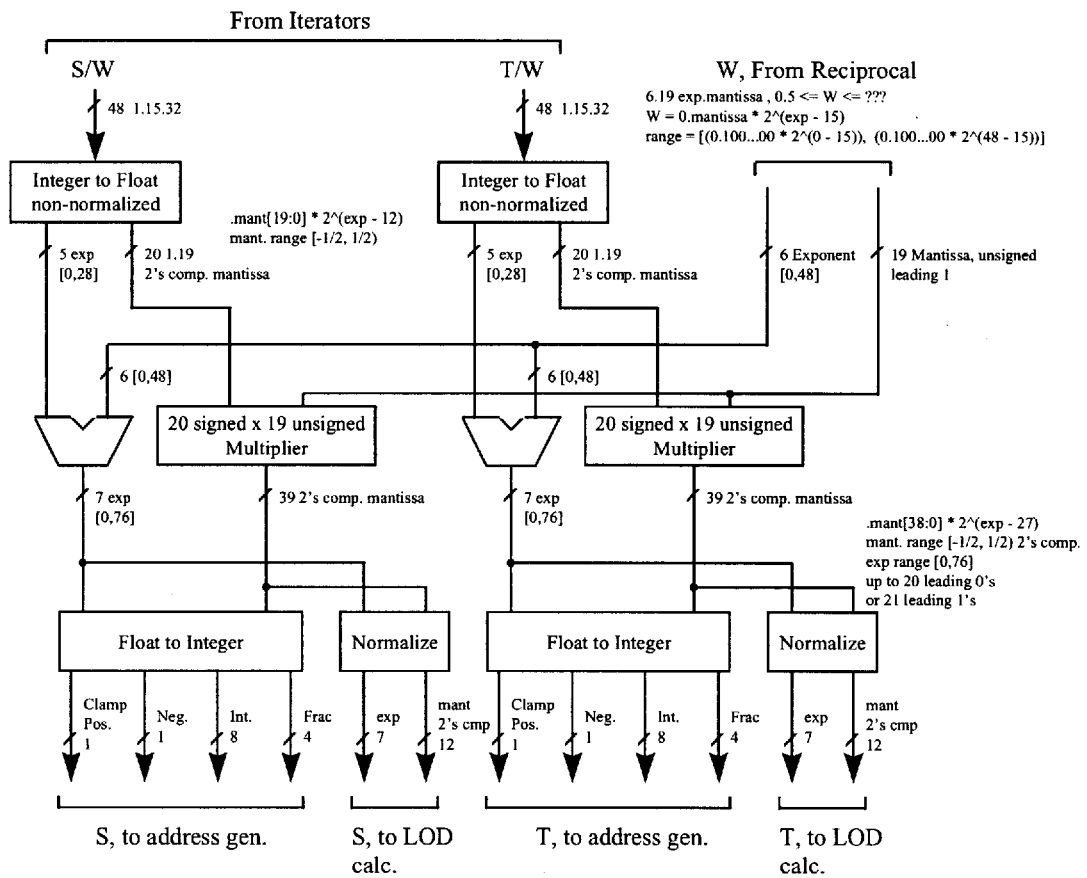
FIG. 26 shows a multiply unit used for perspective correction according to one embodiment.
Figure 27:
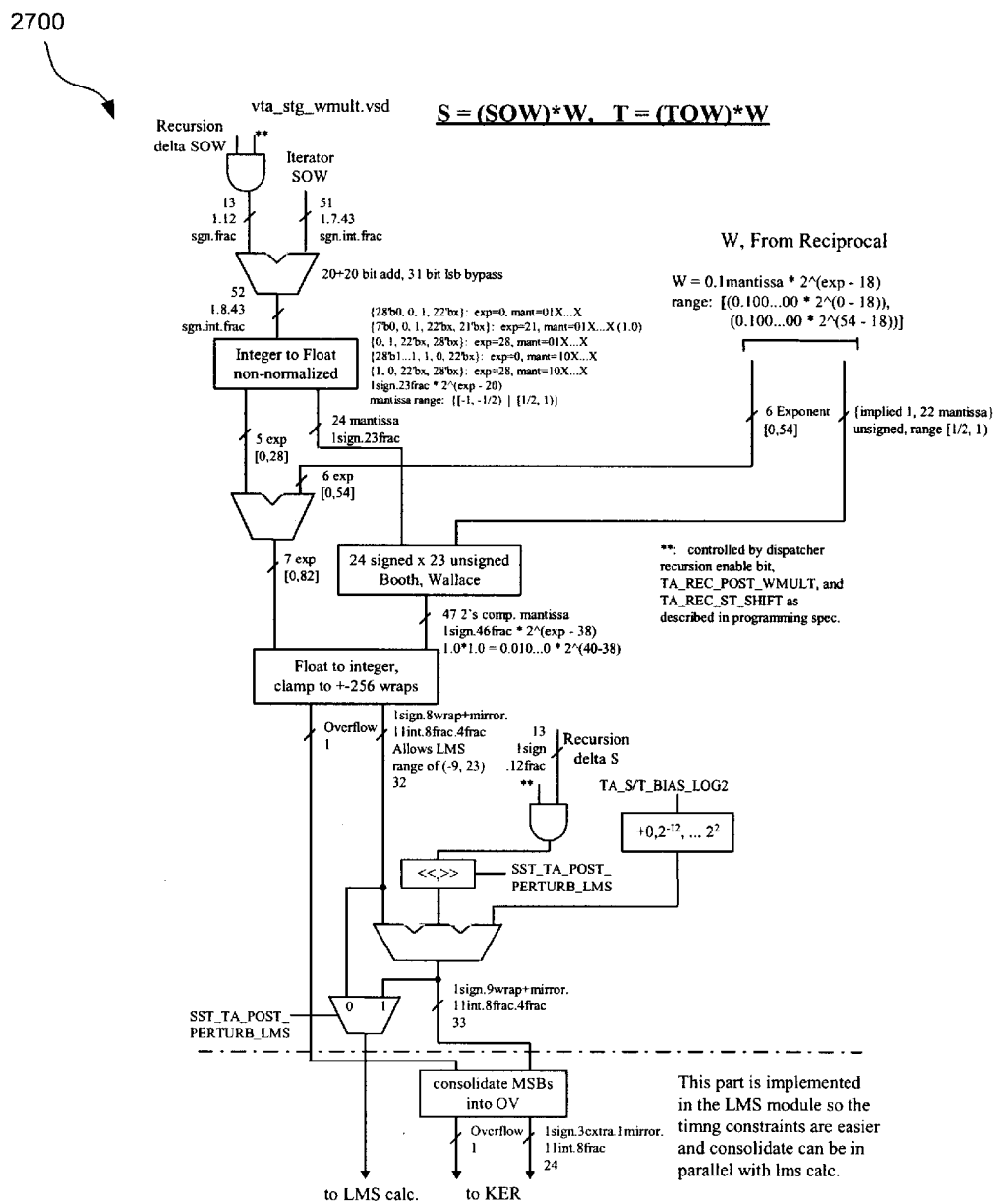
FIG. 27 shows a portion of the same multiply unit at a higher level of detail.

FIG. 26 shows a multiply unit 2600 according to one embodiment. S and T fraction of ½ is the texel center. The integer output includes 11 integer bits to enable 2 K×2 K textures. FIG. 27 shows a multiply unit 2700 according to another embodiment.

FIG. 28 is a table 2800 listing outputs to the ST Scaler.
FIG. 29 is a table 2900 listing outputs to LMS calculation.

Log of Map Size Calculation (LMS) of the Lod Unit 814 (see FIG. 8)

The LMS portion of the LOD Unit uses the S and T values for four pixels of the 2×2 quad to generate the LMS, Anisotropic Area (the area of the 2×2 quad in texture space), Anisotropic Ratio, and Anisotropic slope for each pixel. The same LMS and Anisotropic Ratio can be used for all four pixels. If this is the case, the projection of the 2×2 pixel area into texture space is assumed to be a scaled-up version of the projection of each of the four pixels. While not pixel accurate, this simplification prevents the need to pipeline four separate LMS calculations per clock.

Coordinates of the thin dimension of rectangular textures are not stretched to 1.0 so that the pitch of texels is appropriate for LMS calculation.

LOD and LMS are related as: $(LMS)=8-(LOD)$

FIGS. 30 and 31 are diagrams 3000, 3100 that illustrate the parameters used in the calculation of LMS and Anisotropic Area for the locations of a 2×2 pixel quad in texture space.

The Anisotropic Area is the area in texel space covered by the 2×2 pixel quad. This is the area of the parallelogram ABCD, or twice the area of triangle ABC. The formula for triangle area preferably computes twice the triangle area. The equation used is:

$$AniArea = dSdX*dTdY - dSdY*dTdX.$$

Because the area of a triangle is (base*height)/2, dSdX*dTdY gives twice the area of triangle AEC. Similarly, dSdY*dTdX gives twice the area of triangle ABF. Also, triangle BEF can be shown to have the same area as triangle BEC using BE as the base and EF as the height. So dSdY*dTdX represents the area of ABC not covered by AEC. In FIGS. 30 and 31, dTdX and dTdY have opposite signs, so the total area is a subtraction instead of a sum.

An alternate way to calculate the area of ABC is to sum the areas of the three triangles inside it, which shifts the reduction from geometric to algebraic:

```
AniArea = 2* (area of ABC) = 2*(area of AEB) +
  2* (area of ACE) + 2* (area of BCE) =
  dSdX* (-dTdX) + dSdX*dTdY + (dSdY - dSdX) * (-
  dTdX) =
  -dXdX*dTdX + dSdX*dTdY - dSdY*dTdX +
  dSdX*dTdX =
  dSdX*dTdY - dSdY*dTdX
```

To derive an Anisotropic Ratio (AR), the parallelogram is approximated as a rectangle of equal area, which has an AniLength equal to the long edge of the parallelogram and an AniWidth equal to the distance between the long edges of the parallelogram. This is accomplished by calculating the square of the length of each side of the parallelogram. The larger value indicates the longer side of the rectangle (AniLengthSquared=max(dTexdXSquared, dTexdYSquared)).

The AniWidth is computed by dividing AniArea by the AniLength, and the LMS is computed by taking the negative of the log of the AniWidth. Several types of clamping can be used to increase the AniWidth, as described in the equations below. Where L and W are the AniLength and AniWidth of the rectangle (in terms of texture wraps), AniRatio=L/W. A range of anisotropic ratios between one and sixteen or more can be supported. The Anisotropic ratio is clamped to a user-definable maximum value to limit the number of steps the kernel walker makes to perform proper filtering.

Anisotropic steps is the number of iterations the kernel walker performs to walk the anisotropic kernel. This is preferably set to be the smallest even number greater than the anisotropic ratio. The number is computed by adding a number as close to 2 as the fractional precision allows and then clearing the integer bit of the result to zero. The delta terms dSdC and dTdC represent the offset in ST space that needs to occur for each step walking the kernel. If the anisotropic ratio is greater than 2, the kernels do not overlap, so the full delta term can simply be divided by the number of steps.

For ratios between one and two, two kernels overlap. If sample points are taken from the middle of each kernel, the separation is the fractional part of the anisotropic ratio. This can be computed from the full delta term by multiplying by (AR−1)/AR.

```
Inputs:
  //Syx, Tyx:
    S00, S01,
    S10, S11,
    T00, T01,
    I32, I33,
    VIDDEV_TA_LMS_BIAS,
    VIDDEV_TA_LMS_DITHER,
    VIDDEV_TA_OLD_TRILINEAR,
    VIDDEV_TA_MAX_ANI_RATIO,
    VIDDEV_TA_DETAIL_MAX,
    VIDDEV_TA_DETAIL_BIAS,
    VIDDEV_TA_DETAIL_SCALE,
    VIDDEV_TA_POST_PERTURB_LMS,   // 1: calculate LMS
    from post perturb S's and T's, 0: pre-perturb
    VIDDEV_TA_UNIT_ANI_STEP_SIZE,   //1:unit ani step size,
    0: width ani step size
    VIDDEV_TA_ANI_RSCALE_LOG2,   //expand width by
    this factor
    VIDDEV_TA_TEX_AREA_SCALE_LOG2,   //multiply
    area by this factor to get a TCU factor
// distance in texture space to neighboring pixels in the 2x2 quad,
// to obtain 4 vectors that define the sides of the quad
    DS0100 = S01 - S00;
    DS1110 = S11 - S10;
    DS1000 = S10 - S00;
    DS1101 = S11 - S01;
    DT0100 = T01 - T00;
    I49310 = I33 - I32;
    I49200 = I32 - T00;
    I49301 = I33 - T01;
// average screenspace horizontal and vertical differences to obtain
// 2 vectors which define the parallelogram, dTEXdX and dTEXdY
    dSdX = ((DS0100) + (DS1110))/2; // S component of dTEXdX
    vector
    dTdX = ((DT0100) + (I49310))/2; // T component of dTEXdX
    vector
    dSdY = ((DS1000) + (DS1101))/2; // S component of dTEXdY
    vector
    dTdY = ((I49200) + (I49301))/2; // T component of dTEXdY
    vector
// Types of clamping that happen:
// 1) AniArea clamp to min
// 2) AniLength clamp to min
// 3) AniWidth clamp to min
// 4) AniRatio clamp, which effectively widens the AniWidth
// 5) LMS clamp to LMS_max, which effectively widens the AniWidth
// 6) LMS clamp to LMS_min
// 7) AniLength clamp to AniWidth
// After any of these occur, the original AniArea is invalid.
    log2_AniArea = log2(max(abs(dSdX*dTdY -
    dSdY*dTdX), (2^(-64))^2));// log2(L * W_orig)
    tex_area = min(0x1.FF, flt2int(2^(log2_AniArea +
    log2(VIDDEV_TA_TEX_AREA_SCALE_LOG2))));
// Clamping length distance^2 to (2^(-64))^2 clamps length and
LMS to 64.
```

-continued

```
// This clamp reduces the calculated width, but this is ok because
// there's a min. applied to width later
    dTexdXSquared = | segment AB |^2 = max((dSdX^2 +
dTdX^2), (2^(-64))^2 );
    dTexdYSquared = | segment AC |^2 = max((dSdY^2 +
dTdY^2), (2^(-64))^2;
// pick the major axis of anisotropy
    if (dTexdXSquared > dTexdYSquared) {
        AniLengthSquared = dTexdXSquared;
        dSdMajor = dSdX;
        dTdMajor = dTdX;
    } else {
        AniLengthSquared = dTexdYSquared;
        dSdMajor = dSdY;
        dTdMajor = dTdY;
    }
// bias,dither LMS
// This is applied to both dimensions of the patch
    if (!VIDDEV_TA_LMS_DITHER) {
        LMS_dither_bias = 0;
    } else {
        case (y[0], x[0]) {
            //these are negative to be compatible
with LOD, they're checked VIDDEV against verilog
                00: LMS_dither bias = 0/4;
                01: LMS_dither bias = 2/4;
                10: LMS_dither bias = 3/4;
                11: LMS_dither bias = 1/4;
        }
    }
    log2_AniLength_pre_bias =
log2(AniLengthSquared)/2;
    log2_AniWidth_pre_bias = max((log2_AniArea −
log2_AniLength_pre_bias), −64.0);
// (8.0 − lms_b) is input to this block instead of LOD
// Is a function of the pre-bias length.
    detail_factor = min(VIDDEV_TA_DETAIL_MAX,
(VIDDEV_TA_DETAIL_BIAS − 8.0 −
log2_anilength_pre_bias) <<
VIDDEV_TA_DETAIL_SCALE);
    log2_AniLength = log2_AniLength_pre_bias −
(VIDDEV_TA_LMS_BIAS + LMS_dither_bias);
    log2_AniWidth = log2_AniWidth_pre_bias −
(VIDDEV_TA_LMS_BIAS + LMS_dither_bias);
// ani ratio scale increases width, but not more than the length, so that
// LMS is not biased
    log2_AniWidth = min((log2_AniWidth +
        VIDDEV_TA_ANI_RSCALE_LOG2), log2_AniLength);
// AniWidth may be near zero, even when AniLength is large,
// in which case AniRatio clamping expands AniWidth to a
// larger value. One case where the original AniWidth is zero is
// where each pair of endpoints of the quad are identical,
// which may be common in near-edge-on surfaces.
// When the AniWidth is expanded by maxAniRatio clamping,
// the AniWidth (and thus LMS) effectively becomes a function
// of the AniLength. This is always true for bilinear.
    if (VIDDEV_TA_MAX_ANI_RATIO==0)
        log2_maxAniRatio = 0;    // AR=1, bilinear
    else
        log2_maxAniRatio =
log2(VIDDEV_TA_MAX_ANI_RATIO*2);
    log2_min_ar_AniWidth = log2_AniLength −
log2_maxAniRatio; // W_min = L / AR min, range
down to −68.0
    log2_AniWidth_arclamped =
max(log2_min_ar_AniWidth, log2_AniWidth);
// Calculate the full-range LMS from this width, which can span
// approx. +/−64.0 This indicates the map size at which 1 pixel
    width >= 1 texel width LMS_biased_dithered = −
// log2_AniWidth_arclamped; old trilinear, clamp LMS
    if ((w_is_negative for any of the 4 pixels) ||
    (LMS_biased_dithered > VIDDEV_TA_LMS_MAX)) {
        LMS_clamped = VIDDEV_TA_LMS_MAX;    //
largest map
        filter = VIDDEV_TA_MAGFILTER;
    } else if (LMS_biased_dithered =<
VIDDEV_TA_LMS_MIN    ) {
        LMS_clamped = VIDDEV_TA_LMS_MIN;    //
smallest map
        filter = VIDDEV_TA_MINFILTER;
    } else {
        LMS_clamped = LMS_biased_dithered;
        filter = VIDDEV_TA_MINFILTER;
    }
// LMS_frac_inv = (1.0 − LMS_frac) & 0xff and is equal
// to old lod_frac, which was range [0, 0xff]
    if (VIDDEV_TA_LMS_ZERO_FRAC) {
        LMS_frac_inv = 0x00;
    } else {
        LMS_frac_inv = (0x100 − (LMS_clamped &
0xff)) & 0xff;
    }
    LMS_int = (LMS_clamped + 0xff) >> 8;    //
ceiling to get integer LMS
    if ((VIDDEV_TA_OLD_TRILINEAR) &&
(VIDDEV_TA_LMS_ODD^ (LMS_int & 1))) {
        // lsb of LMS isn't same as LMS_odd, so
change the integer of LMS to other near integer
LMS
        if (LMS_int == 0) {
            LMS_int = 1;
        } else {
            LMS_int−−;
        }
    }
// expand the width for LMS_max clamping
    log2_AniWidth_lmsclamped =
max(log2_AniWidth_arclamped, −LMS_clamped);
// if width exceeded length from min clamping, make them equal
    log2_AniLength_lmsclamped = max(log2_AniLength,
    log2_AniWidth_lmsclamped);
    log2_AniRatio_lmsclamped =
    log2_AniLength_lmsclamped −
    log2_AniWidth_lmsclamped // AR=L/W
    AniRatio_4int_10frac =
    round(float2int(2^log2_AniRatio_lmsclamped));
        // round is to 10-bit fraction
    if ((AniRatio_4int_10frac == 1.0)
        || w_is_negative for any of the 4
pixels)
        || (lms was clamped to min &&
        VIDDEV_TA_ANI_MIN_FORCE_AR1)) {
        // minified, so do bilinear
// AR == 1.0, one bilinear kernel
// this case may not need to be separate from the next one, but it
makes diags easier
        AniSteps = 1;
        dSdC = 0.0;
        dTdC = 0.0;
        AniRatio_4int_10frac = 1.0;
    } else if(AniRatio_4int_10frac <= 2.0) {
        // AR = (1.0, 2.0]
        // as AniRatio approaches 1.0 (log2_AniRatio_lmsclamped ==
0.0) the steps become 0.0
        AniSteps = 2;
        if(VIDDEV_TA_UNIT_ANI_STEP_SIZE) {
            //*** this may need more than 4frac bits of AR??
            // a table in HW:
            log2(AniRatio_4int_10frac −1)
            dSdC = dSdMajor * 2^(−log2_AniLength_prebias −
LMS_int
            +log2(AniRatio_4int_10frac −1));
            dTdC = dTdMajor * 2^(−log2_AniLength_prebias −
LMS_int
            +log2(AniRatio_4int_10frac − 1));
        } else {
            dSdC = dSdMajor * 2^(−log2_AniLength_prebias +
log2_AniWidth_lmsclamped
            +log2(AniRatio_4int_10frac − 1));
            dTdC = dTdMajor * 2^(−log2_AniLength_prebias +
log2_AniWidth_lmsclamped
            +log2(AniRatio_4int_10frac − 1));
        }
    } else {
        // AR = (2.0, 16.0)
        // anisteps is ceiling to next even number, for example AR of (2.0,
4.0] maps to 4 steps
        AniSteps = ((AniRatio_4int_10frac + 0x7FF)
```

-continued

```
    >> 10) & 0x1E;
    // for 4.10 int.frac AniRatio
    // Original dS,TdMajor are based on the original AniLength.
    if (VIDDEV_TA_UNIT_ANI_STEP_SIZE) {
        // "old" - do unit magnitude step size
        // length_vector/((W*L))*W = length_vector/L
        // Walking one kernel width per step
        // was: dSdC = (dSdMajor/AniArea)*width
        // was: dTdC = (dTdMajor/AniArea)*width
        // divide vector L by its own magnitude
        dSdC = dSdMajor * 2^( -
    log2_AniLength_prebias - LMS_int);
        dTdC = dTdMajor * 2^( -
    log2_AniLength_prebias - LMS_int);
    } else {
        // "new" - do (|L|/AR) step size
        // Each step is the distance (magnitude) of the width of the
        // final clamped rectangle, but in the
        // direction of the original length vector. So, step_vector =
        // length_vector/AR_scalar.
        // These distances are in 1x1 texture space (1.0 is one
        // wrap).
        dSdC = dsdMajor * 2^( -
    log2_AniLength_prebias +
    log2_AniWidth_lmsclamped);
        dTdC = dTdMajor * 2^( -
    log2_AniLength_prebias +
    log2_AniWidth_lmsclamped);
        }
    }
    // this ceiling makes sure that 1.0+1lsb in 4i10f does not map
    // to 1.0 in the 4i4f and the value matches aniSteps
    aniratio_4int_4frac = (aniratio_4int_10frac +
    0x3f) >> 6;
    if (aniratio_4int_4frac > 0xFF) {
        // clamp
        aniratio_4int_4frac = 0xFF;
    }
    case (VIDDEV_LOD_2_TCU_SEL) {
        // produces a 9-bit value
        00: LMS_2_tcu_frac =
    {(VIDDEV_TA_OLD_TRILINEAR && LMS_int[0]),
    LMS_frac_inv};
        01: LMS_2_tcu_frac =
    {(VIDDEV_TA_OLD_TRILINEAR && LMS_int[0]),
    detail_factor};
        10: LMS_2_tcu_frac = tex_area;    // range
    [0, 1.FF]
        // 11:reserved;
    }
Outputs:
    LMS_int   //4bits
    AniRatio_4int_4frac //
    AniSteps //4bits
    dSdC, dTdC // in 0.0-1.0 texture space: 1sign.1int.19frac
    LMS_2_tcu_frac //
    new trilinear frac_1in130frac
    S, S_ov, T, T_ov // from STG with biases added in parallel
    with LMS calc.
```

Kernel Walker (KER) 816 (see FIG. 8)

The kernel walker is responsible for taking in the S and T addresses and anisotropic parameters computed upstream and generating the appropriate address requests to the texture cache, enabling the proper subsequent texture filtering for each pixel. There are 4 separate kernel walkers, one for each pixel in the quad. Every clock, each kernel walker is capable of generating a 2×2 texel kernel for its incoming pixel, based on the center S and T values sent down from the LMS block. This 2×2 texel kernel is the baseline used for point sampling, bilinear filtering, and small percentage-passed filtering. For advanced filtering modes, such as anisotropic or trilinear, the kernel walker generates a sequence of 2×2 kernels to comprise the complete kernel used for fetching all the data that is utilized for the advanced filtering mode. As it iterates on the kernel, the kernel walker will stall the LMS unit.

The kernel walker has two primary modes of operation, allowing either bilinear or anisotropic texture filtering. In bilinear mode, a single 2×2 kernel is sufficient for filtering. This mode is fully pipelined and allows Rampage to sustain 4 pixels per clock. In anisotropic mode, a variable number of 2×2 neighborhoods is walked to generate the filter pattern. This mode provides the highest level of realism, but has the largest performance penalty. The sustainable pixel rate in this mode depends on the number of neighborhoods walked. Any even number of iterations can be supported, including 16 2×2 neighborhoods, which would produce 4 pixels in 16 clocks. In addition to these modes, trilinear filtering can be applied, which first walks the filter pattern on one mipmap, and blends this with the results of walking the same filter pattern on the adjacent mipmap. Trilinear filtering is supported with all kernel walker modes, and results in further improved quality at the cost of reducing performance when it is enabled.

The basic operation of the kernel walker is as follows. A fixed-point S and T coordinate per clock is generated in the LMS unit, along with the aspect ratio of the anisotropic area (aniratio), delta terms that define the line of anisotropy, and the number of steps required (anisteps). If bilinear filtering is enabled, the S and T values from the LMS unit are simply forwarded downstream. If anisotropic texturing is enabled, the kernel walker proceeds to walk the line of anisotropy, generating up to 16 (or more) fixed-point S and T values. Finally, if trilinear is turned on, the above processes are duplicated for the second mipmap. The four kernel walkers work in lock-step, in that they all walk the same kernel at the same time. The output of each kernel walker is sent downstream to the TAD unit, where each of the four 2×2 neighborhoods is expanded, generating 16 S and T addresses per clock to be serviced by the texture cache. The kernel walker also generates state information that is piped through the cache unit, which enables the FLT block to recombine the expanded kernel into a final filtered texel result.

Figure 32:
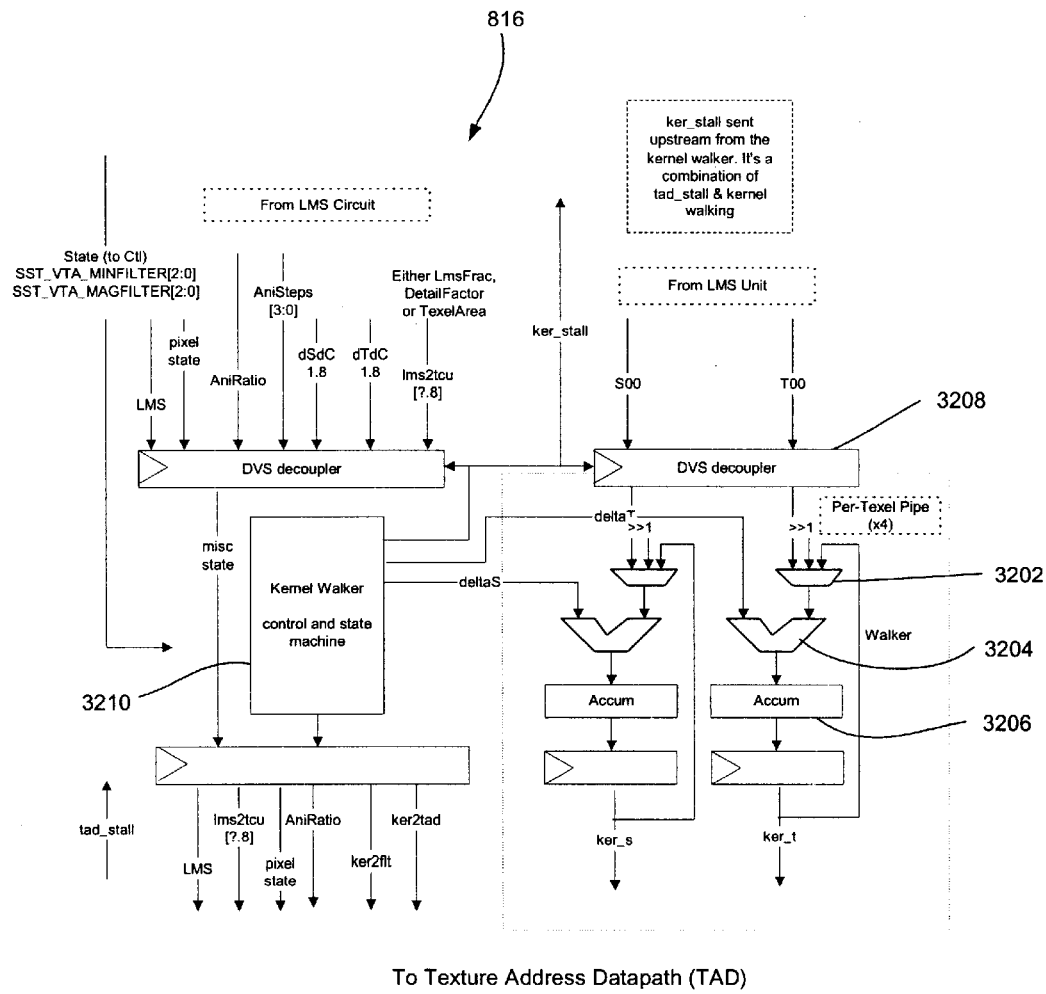
FIG. 32 is a block diagram of the kernel walker according to one embodiment.

FIG. 32 is a block diagram of the kernel walker according to one embodiment. The kernel walker datapath consists of a multiplexor 3202, adder 3204, and accumulator 3206 per S and T. There are four walkers, one per output pixel. A DVS decoupler 3208 exists on the input to the Walker to decouple flow control stalls.

The kernel walker takes incoming S and T address, and generates the initial kernel starting point by adding the setup delta outputs to S and T. It then uses the accumulator output, adding deltaS and deltaT to the accumulated value to walk the kernel. For trilinear filtering modes, after walking the kernel on the High-res mip map, the kernel is re-walked, this time calculating the Initial value by taking the LMS S and T divided by 2, and performing the same offset calculations.

The output S and T addresses is signed, with a dynamic range of 4× the maximum texture size, to allow correct wrap and clamp calculations, which are performed downstream in the texture address unit along with 2×2 neighborhood expansion. The format of S and T depends upon the LMS as follows, with the position of the upper msbs up to and including the mirror bits being fixed. The interpretation of the lower bits varies according to the LMS level, as shown in the table below. (See the section below describing a texture address unit for a more detailed description):

TABLE 6

| | | For a 2Kx2K texture | | | |
|---|---|---|---|---|---|
| Sign [22] | Extra [21:20] | Mirror [19] | Integer [18:8] | Fraction [7:0] | |
| | | For a 16x16 texture | | | |
| Sign [22] | Extra [21:20] | Mirror [19] | Integer [18:15] | Fraction [14:7] | Unused [6:0] |
| | | For a 1x1 texture | | | |
| Sign [22] | Extra [21:20] | Mirror [19] | | Fraction [18:11] | Unused [10:0] |

The kernel walker accumulates delta values onto these S and T coordinates to generate the neighborhood S and T values for the texture address unit. The LMS unit is responsible for shifting the anisotropic delta values such that they are added to the fractional portion of the S and T address. Thus, these s.8 values will arrive in the kernel walker pre-shifted for accumulation as signed 20-bit values. The extra msbs allow for multiple texture wraps for extreme delta cases with large anisotropic ratios.

The Kernel walker contains a ROM lookup table used for anisotropic filtering. The Anisotropic LUT is a 256-entry table which stores the center and end scalefactors that will be used to weight each 2x2 neighborhood in the full anisotropic kernel. The LUT takes in the anisotropic ratio (4.4 fmt) as an input, and outputs a center scalefactor equal to 1/Aniratio and an end scalefactor equal to (1−(AniSteps-2)/AniRatio)/2, where AniSteps is the next even number greater than Aniratio. In this way it is guaranteed that the sum of the scalefactors equals one.

In bilinear mode, the LUT outputs are bypassed such that hWeight=sFrac, vWeight=tFrac, Scalefactor=1.0.

The scale generation logic exists to account for trilinear filtering. When trilinear filtering is enabled, the raw scalefactor from either the lookup table or the 1.0 scalefactor for bilinear filtering is further scaled with an 8x8 multiplier to generate the final scalefactor taking into account the relative contributions of the two mipmaps. The scale generation logic outputs one of four possible scalefactors. If trilinear is disabled, the raw scalefactor from the LUTs is sent to mult/acc section. Enabling trilinear will adjust the raw scalefactor to send down either (scale*LMSfrac) or (scale*(1−LMSfrac)) depending upon whether a high or low mipmap is being used. This information is encoded into the ker2tad pixel state field that is sent downstream from the kernel walker. Finally point sampling can override the scalefactor with either 1.0 or 0.0 depending upon whether the any of the bilinear blend inputs were valid or not.

The control for the Anisotropic walker handles stalling the LMS circuit, and contains the state machine for controlling the data pipeline. Bilinear mode produces valid results each clock, and anisotropic mode utilizes a state machine, which is basically a counter that counts up to anisteps. In addition, there is a state bit to indicate anisotropic direction (add or subtract delta terms). Additionally there is an orthogonal state bit to indicate the enabling of trilinear. When this bit is enabled, the state machine repeats its behavior a second time to account for fetches from the other mipmap. One noteworthy feature related to trilinear filtering might be called the "trilinear toggle".

The "Trilinear Toggle" exists as an attempt to reduce thrashing in the texture cache. In order to increase cache efficiency and increase locality of addresses from cache misses, it would be nice to stay on one trilinear mipmap as long as possible. A simple optimization is to switch the order of mipmap evaluation from one 2x2 quad to the next when trilinear filtering is enabled. For instance, at the start of a triangle, the first 2x2 quad filters the low mipmap first, then the high mipmap. Then next quad filter the high first, then the low. Each new triangle starts with the lower miprnap to help ensure that the CSIM always matches the verilog.

The setup portion of the controller is responsible for calculating the incremental displacements from the S,T center of the Kernel to the subsequent 2x2 neighborhoods which need to be fetched. For bilinear filtering, this unit outputs zero. For anisotropic filtering, it outputs either dSdC or dSdC/2 for the S component and dTdC or dTdC/2 for the T component. (See Table 7, describing anisotropic filtering below). If trilinear is enabled, the full sequence is repeated for the second mipmap.

The control block 3210 also controls the multiplexers shown in FIG. 32, along with generating a control signals for the Filter and texture address unit (see below).

TABLE 7

| Name | Description |
|---|---|
| ker2flt[1] | Filter control, start walk or accumulate 0−>accumulate 1−>load accumulator |
| ker2flt[0] | Filter control, 0−>do not assert flt_valid 1−>assert flt_valid |
| ker2tad[3] | TAD scalegen control, if aniso, 0−>center scale, 1−>edge scale |
| ker2tad[2] | TAD scalegen control, filter mode/scale 0−>bilin, scalefactor = 1.0 1−>aniso, scalefactor from aniso LUT |
| ker2tad[1] | TAD scalegen control, trilinear enabled |
| ker2tad[0] | TAD scalegen control, trilinear mipmap level (0−>low, 1−>high) selects scale*LMSfrac or scale*(1−LMSfrac) |

The VIDDEV_VTA_*FILTER state (3*4=12 bits) is used at the top of the control pipe to decide how to run things.

The 2x2 Kernel is the baseline unit used for a simple bilinear blend operation and is used for all forms of filtering. The advanced filtering modes are performed by iterating over a series of 2x2 kernels and scaling and accumulating the results to achieve the desired effect. The fixed point S and T coordinates are split into integer and fraction. The S and T frac are sent directly to the Cache. The ker2flt state bits are set to always load the filter accumulator and assert valid. The neighborhood generator then generates the 2x2 block.

One disadvantage of both of the above kernels is that they are based on the simplification that a circular pixel in screen space maps to a circular region in texture space. This is generally only true if a texture mapped polygon is normal to the line of view. In most cases, as the polygon is rotated, a circular pixel will map to an elongated oval region in texture space. The LMS block computes the geometry and aspect ratio of this area, and generates the appropriate controls to setup the kernel walker, which then breaks down the rectangular region into the appropriate number of square 2x2 neighborhoods, for more accurate texture filtering. There are three different ways to walk a line of anisotropy. One is used if the anisotropic ratio is greater than 2, another if the ratio is between 2 and 1, and finally the kernel walker reduces to the baseline bilinear if the anisotropic ratio is set to one.

Figure 33:
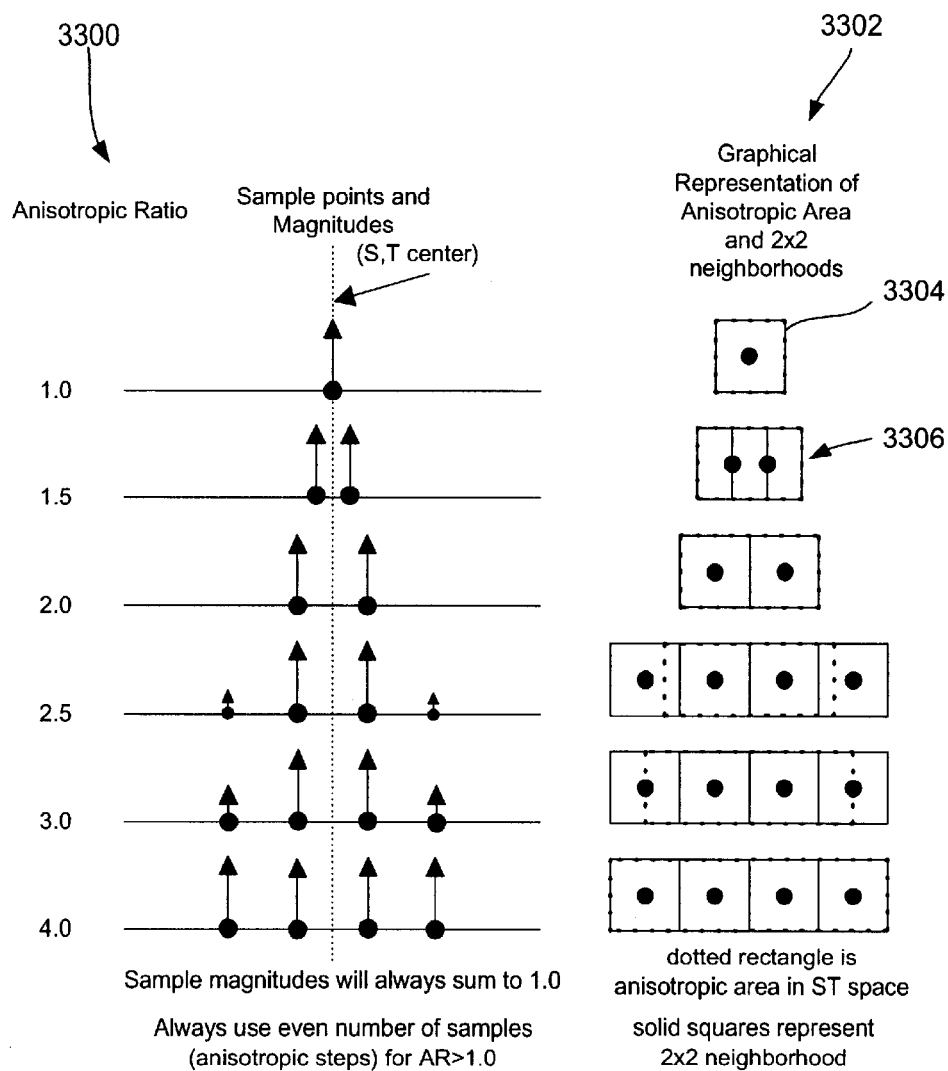
FIG. 33 is a graphical representation of sampling and neighborhoods with respect to anisotropic ratios.

FIG. 33 is a graphical representation of sampling 3300 and neighborhoods 3302 with respect to anisotropic ratios.

As shown, when the anisotropic ratio is at 1.0, a simple 2×2 neighborhood 3304 is walked. One sample is taken, with the AniScale factor set to 1.0 When the anisotropic ratio is between 1.0 and 2.0, the desired effect is that of sampling overlapping 2×2 neighborhoods 3306. The amount of overlap is determined by the anisotropic ratio. The LMS block uses this information to compute the offset of the two samples, represented by dSdC and dTdC. Since two samples are always taken, each has a scalefactor of 0.5, reflected in AniScale. Thus, the two neighborhoods are walked as follows:

Clock1:*Sout=Sin+dSdC/2; Tout=Tin+dTdC/2*; AniScale=5=0.5

Clock2: *Sout=Sout−dSdC; Tout=Tout−dTdC*; AniScale=0.5

For Anisotropic Ratios above 2.0, AniSteps is used to walk the line of anisotropy, using the following table.

TABLE 8

| Clock | Sout | Tout | AniScale |
|---|---|---|---|
| 0 | Sin + dSdC/2 (push Sin) | Tin + dTdC/2 (push Tin) | 1/AniRatio |
| 1 | Sout + dSdC | Tout + dTdC | 1/AniRatio |
| ... | | | |
| AniStep s/2 −1 | Sout + dSdC | Tout + dTdC | (1-(AniSteps-2)/AniRatio)/2 |
| AniStep s/2 | Sin − dSdC/2 (pop Sin) | Tin − dTdC/2 (pop Tin) | 1/AniRatio |
| ... | | | |
| AniStep s-2 | Sout −dSdC | Tout −dTdC | 1/AniRatio |
| AniStep s-1 | Sout − dSdC | Tout −dTdC | (1-(AniSteps-2)/AniRatio)/2 |

AniRatio is a fixed point number between 1.0 and 16.0

AniSteps is an even integer between 2 and 16, basically the next biggest even integer above AniRatio.

The Kernel walker starts at one end of the anisotropic line, and generates 2×2 neighborhoods walking up the line using the above AniScale factors. It then walks the same line on the other Level of Detail to perform the Trilinear part of the anisotropic walk. The AniScale factor and the LMS are used to determine the AccumScale factor used to the Filter. On the first walk of the anisotropic line, AccumScale=AniScale*LMSfrac. On the second walk of the anisotropic line AccumScale=AniScale−(AniScale*LMSfrac). The Aniscale values from the table above are stored in a ROM lookup table that exists in the filter block.

Figure 34:
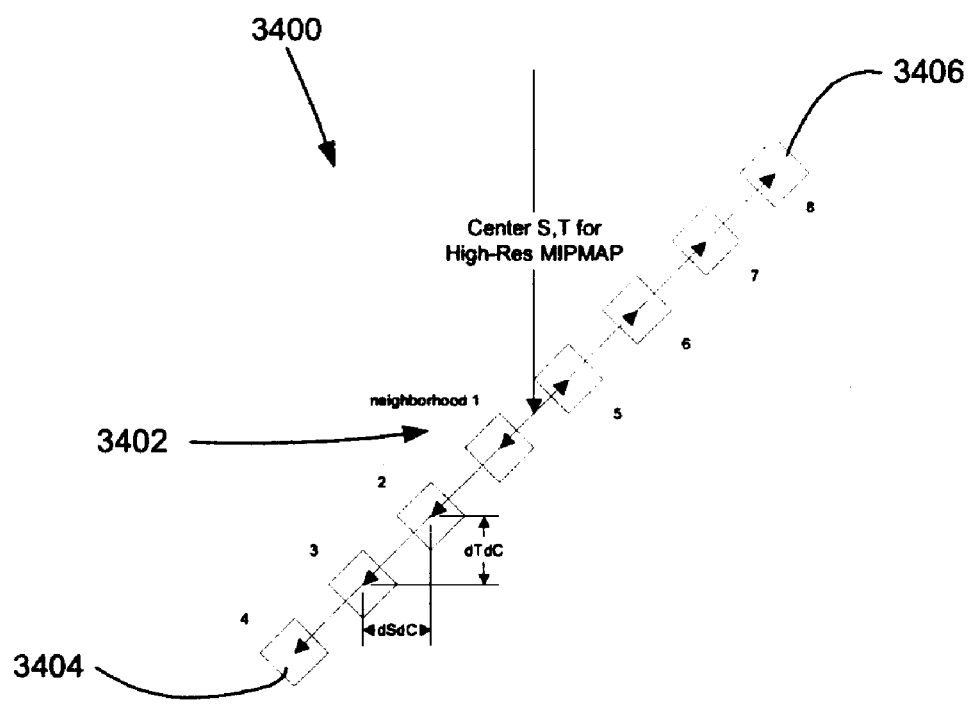
FIG. 34 illustrates anisotropic kernel walking according to one embodiment.

An optimization to the walking algorithm removes the need to multiply (Anisteps−1)*dSdC/2 to reach the first neighborhood. Instead, dSdC or dSdC/2 can simply be accumulated as shown in FIG. 34, which illustrates anisotropic kernel walking 3400 according to one embodiment. As shown, the center S,T are pushed initially and after walking half of the anisotropic line 3402, the starting value is popped and the walking direction is reversed. Middle neighborhoods are weighted by LOD*(1/AniRatio) while endpoints a 3304, 3406 are weighted to make total weight= 1.0. A Low Res Mip MAP uses exactly the same stepping pattern, but dSdC, dTdC don't scale with the resolution change.

Texture Address Unit (TAD) 818 (see FIG. 8)

The texture address unit (TAD) receives four s,t addresses along with LMS, mode, and format information. For each pixel in an input pixel quad, the TAD computes the s,t integer space address for the top left texel in that pixel's bilinear neighborhood. This top left texel will be referred to as that pixel's "reference texel". The s,t space address of a reference texel, combined with the wrap mode bits in s and t for the touched texture imply the locations of the remaining three texels associated with that pixel's bilinear neighborhood.

The 16 total texel requests (4 explicit, 12 implied) are aggregated by the TAD to a set of up to 4 or more requests with up to 4 or more physical addresses each. These requests are submitted to the color cache tag unit; enough information is presented by the TAD and escorted down the pipeline with the tag result to determine the location and cache entry association of each of the 16 total texels.

The TAD as described herein supports the following illustrative modes/options, among others:

1. Texture depths of 4, 8, 16, and 32 bits per texel, including texture compression (4 bpp) and S2/D3D compression (4 bpp/8 bpp), which has a linear style surface allocation of 4×4 blocks.
2. Edge modes of: clamp, wrap, mirror, and clamp to black (for cube mapping, etc).
3. Clamped, non-MIP-mapped non-power of 2 map sizes.
4. Map sizes up to 2048×2048 or more in all modes.
5. T-Split legacy mode.
6. Tiled/linear surfaces.

The TAD unit takes in 4 texture map indices s, t, 1 pixel LMS for all 4 pixels, and several texture map descriptors. The TAD unit then produces a set of 4 to 16 physical addresses that touch all memory locations used to fill the up to 16 or more texels associated with the requested pixel quad. In the process of going from a pixel quad to a physical address sequence, the TAD performs three distinct functions.

1. Address calculation from s, t, LMS, and map descriptors.
   The map descriptors include addressing modes (linear/tiled, tile format), base address(es), multi-base modes (multi-base enable, multi-base mode), sampling mode (point/non-point), texture format (is it 4, 8, 16, or 32 bit per texel), edge mode (wrap, mirror, clamp, clamp to black), computed texture resolution (in S or T), clamp size in S and T for npt textures, tsplit mode (odd/even map splitting for legacy support).
   The output of the address calculation is a set of s, t address space addresses. The addition of a base address to complete the conversion to physical addresses actually occurs in the texel group walker in a second s, t data path.
2. Texel aggregation into groups aligned to color cache footprint (4×4 or 16×1) boundaries.
   The texel aggregation process associates each of the 16 texels with their alignment to a color cache footprint (sa[2], ta[2] in tiled mode]). The combined status of the requested texels will be referred to as texel context.
3. Texel group walking of the 1 to 16 groups determined by the aggregation step.
   At the risk of being tarred and feathered, a group is defined as the set of texels that are associated with a given cache footprint on one color cache tag request cycle. A "group request" is therefore a request to a cache footprint where the footprint encompasses a set of texels in said group. Thus, with four available cache footprint alignments available, up to four or more "groups" may be requested per cycle. In each cycle, up to four or more groups are processed; one group in each of {S,T}={0,0}, {0,1}, {1,0}, {1,1} alignments. For example, a maximum of 4 TAD walker cycles are needed to process the worst case of 16 different physical addresses.

Address calculation uses per pixel data and per map data to arrive at a set of texture space addresses (sa and ta) for the pixel quad. The pixel quad s and t coordinates {(s0,t0), (s1,t1), (s2,t2), (s3,t3)}, their associated LMS, and each pixel's positive overflow bit in s and t (ovs and ovt) are taken in by address calculation. The map descriptors and the quad LMS (or per pixel LMS values if LMS dithering is enabled) are used to shift, clamp, invert, and otherwise manipulate the raw s and t values received by the TAD unit.

Each s and t is a signed with a total range of two times (+/−4095 versus +/−2048) the maximum S or T resolution with 8 fractional bits; thus each S and T has the following format.

TABLE 9

| negative | ov | m | integer [18:8] | fraction [7:0] |
| --- | --- | --- | --- | --- |

Each LMS can range from 0 to 11 with 8 fractional bits. The fractional bits are passed through the TAD and texture cache. The computed LMS integer component (clms) received by TAD is in following format:

TABLE 10

| clms [3:0] |
| --- |

The address calculation unit needs to know the number of bits per texel for a given map. This is determined by the map's texture format through a simple lookup.

Additional state data tells the address calculation unit how to handle edge cases, which will be discussed later in this section.

Figure 35:
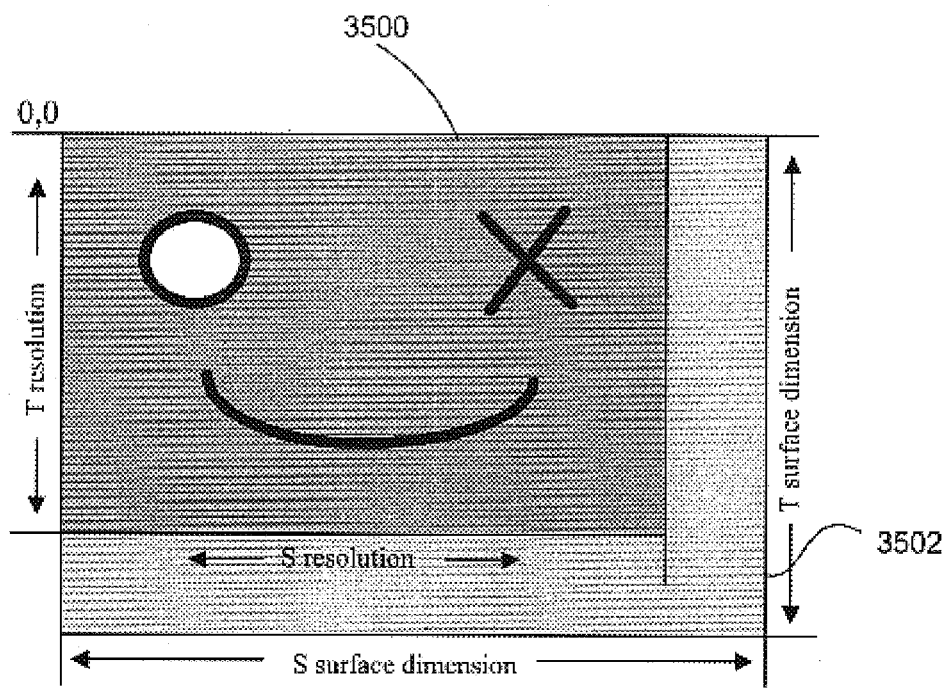
FIG. 35 shows a texture map inset on a drawing surface according to one embodiment.

FIG. 35 shows a texture map inset 3500 on a drawing surface 3502 according to one embodiment. If the S and T texture map dimensions are not integer multiples of a micro-tile size in each dimension for the current bit depth, then the texture map is padded to fill out the micro-tile in that dimension. For large power of two maps, the S and T resolution is the same as the S and T surface size. For maps with a smaller resolution than 32 texels in either dimension, special handling can be used, as will be understood by one skilled in the art.

The address calculation unit receives the maximum S and T resolution available for a given map. The minimum resolution is also set for the case of LMS clamping, but this is handled in the LMS calculation unit. The TAD unit responds to whatever calculated LMS values(s) it receives. Either 1 or 4 LMS values will be handed to the TAD unit, via the KER1 unit. Only 1 LMS is used in normal operation; this one value applies to all 4 pixels. 4 LMS values (one per pixel) are used per cycle if LMS dithering is turned on.

Figure 36:
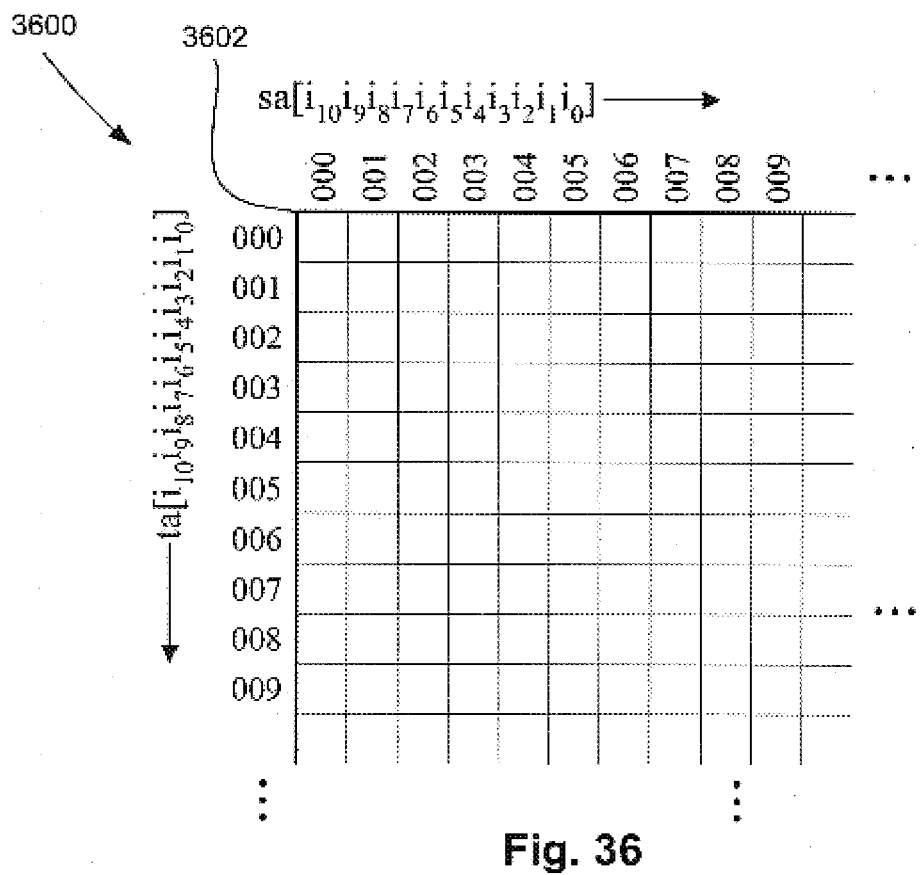
FIG. 36 is a graph illustrating the organization of sa, ta address space.

FIG. 36 is a graph 3600 illustrating the organization of sa, ta address space. i0 (sa or ta integer address bit 0) is defined to have a constant meaning in sa, ta space, that of the least significant integer selection bit in the texture map. The origin 3602 is in the upper left corner; thus, in the positive s and t direction the map builds to the right and down.

The S resolution and T resolution for each map is an input to the address calculation function and defines the extent in S and T before an edge condition. Edge conditions are handled by accepting an MSB bit (bit "m") above the MSB bit needed for addressing the specified map resolution (i10 for a 2K map dimension, i9 for a 1K dimension, etc.). The "m" bit determines if an sa or ta address hits a wrap, mirror, or clamp edge condition; edge conditions will be discussed in detail later.

Figure 37:
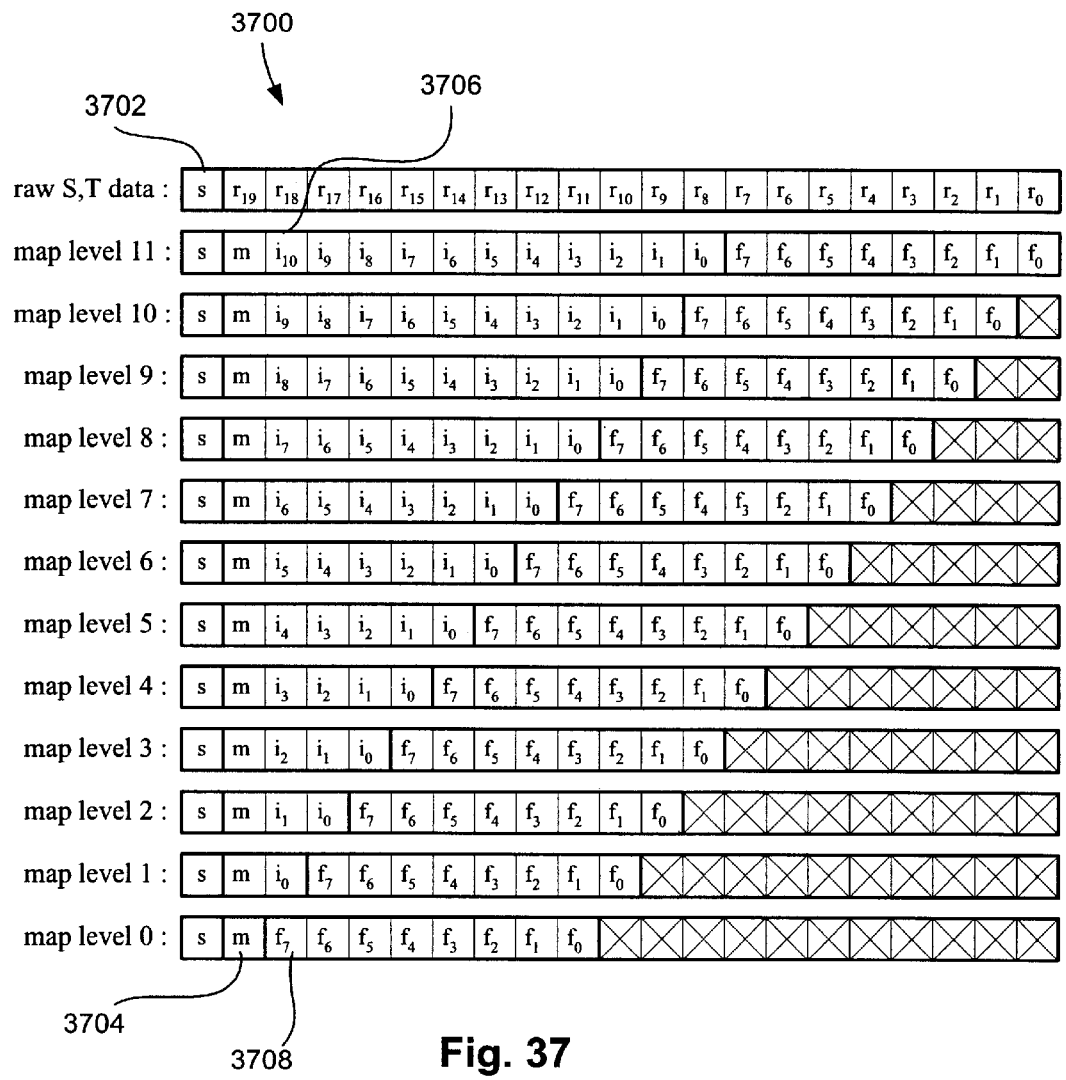
FIG. 37 is a graph showing how sa and ta indices are extracted from raw s and t values coming from the kernel walker.

FIG. 37 is a graph 3700 showing how sa and ta indices are extracted from raw s and t values coming from the kernel walker. In FIG. 37, the "s" bit 3702 is the sign bit, where "1" indicates negative and "0" indicates positive. The "m" or mirror bit 3704 indicates if the sample point is in the lower or upper portion of that dimension's range. The integer address bits, $i_{10}$ to $i_0$, 3706 indicate full texel increments. The fractional bits $f_7$ to $f_0$ 3708 indicate blend factors between texels.

For a given map resolution, the s and t inputs are each shifted right by a maximum map level minus the current map level for the pixel quad. The m bit is always taken as the most significant bit ($r_{19}$) presented by the kernel walker. The most significant bit for a given map size is then taken from $r_{18}$, and so on. Thus, at each map level the raw s and t values are shifted right by an appropriate amount to yield sa and ta texture address bits. Zeros are essentially shifted in from the left to fill the upper sa and ta bits.

The ovs and/or ovt bits are asserted when any of the s or t bits that are more significant than $r_{19}$ are set to 1. These overflow (ov) bits allows for proper clamping when the s or t value is greater than or equal to 2.00. The m bit alone does not convey enough information by itself.

After this processing of raw s and t values, values for sa and ta are obtained, which each consist of and integer component and a fractional component. Together these components are used to address texels for the purpose of bilinear sampling into the texture map.

Figure 38:
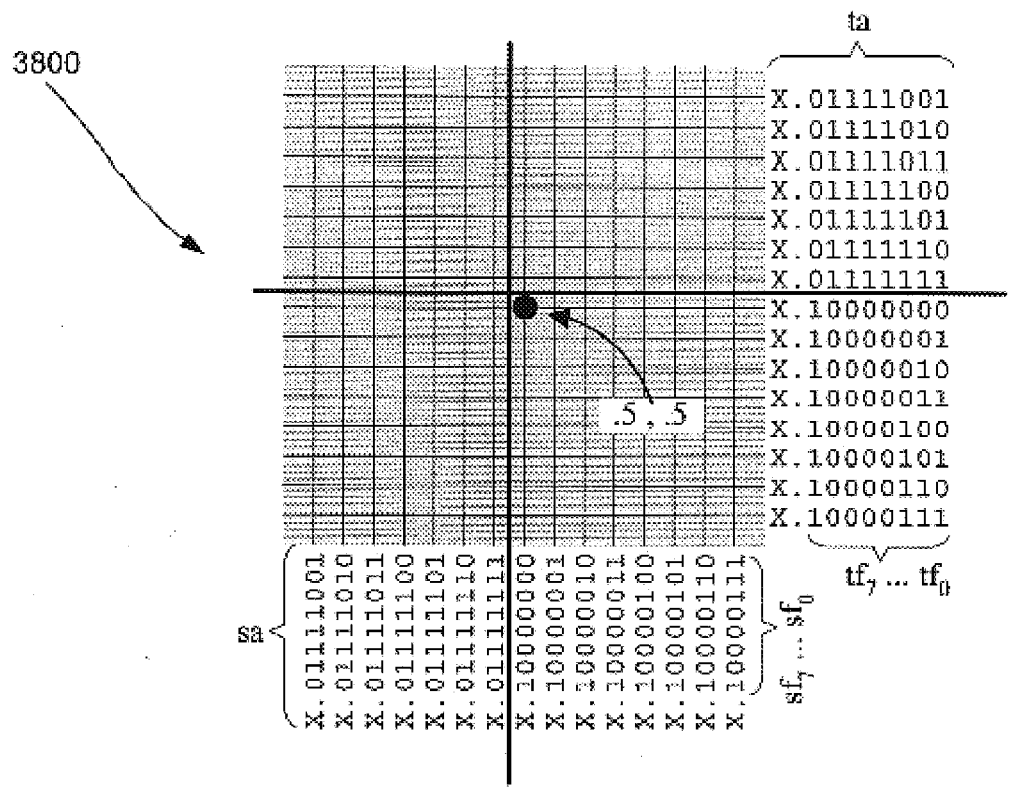
FIG. 38 shows a texel center.

The detailed selection process of texel colors for bilinear blending, from sa and ta values, will now be discussed. The first step is to define the meaning of a texel center. A texel center 3800 is shown in FIG. 38. A texel center is defined as being located at 0.500+k, where k is an integer in sa or ta.

Figure 39:
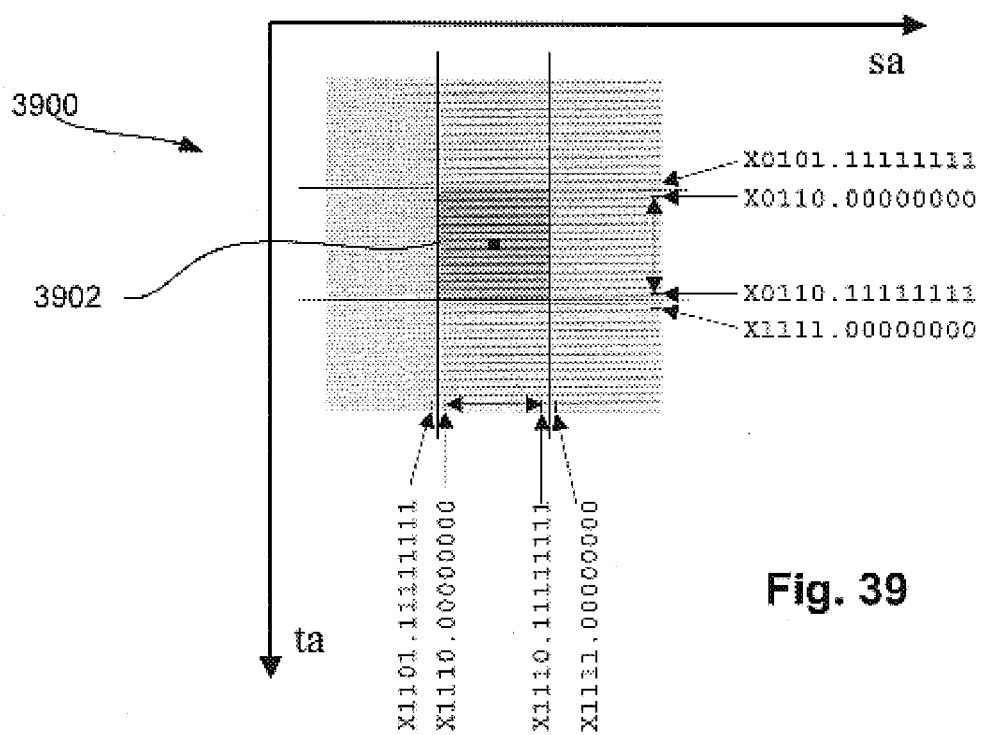
FIG. 39 is a graphical illustration of point sampling.

Now that a definition of a texel center has been provided, a definition of point sampling and bilinear sampling in to texture space will be presented. Point sampling is achieved by truncating the fractional bits of sa and ta and taking the integer portions of sa and ta as the selection address. FIG. 39 is a graphical illustration 3900 of point sampling. In FIG. 39, the darker texel 3902 is point sampled when the integer sa and ta bits point to that texel (in this example, sa= . . . 1110.frac, ta= . . . 0110.frac) and the fractional bits range from 0.00000000 to 0.11111111.

Figure 40:
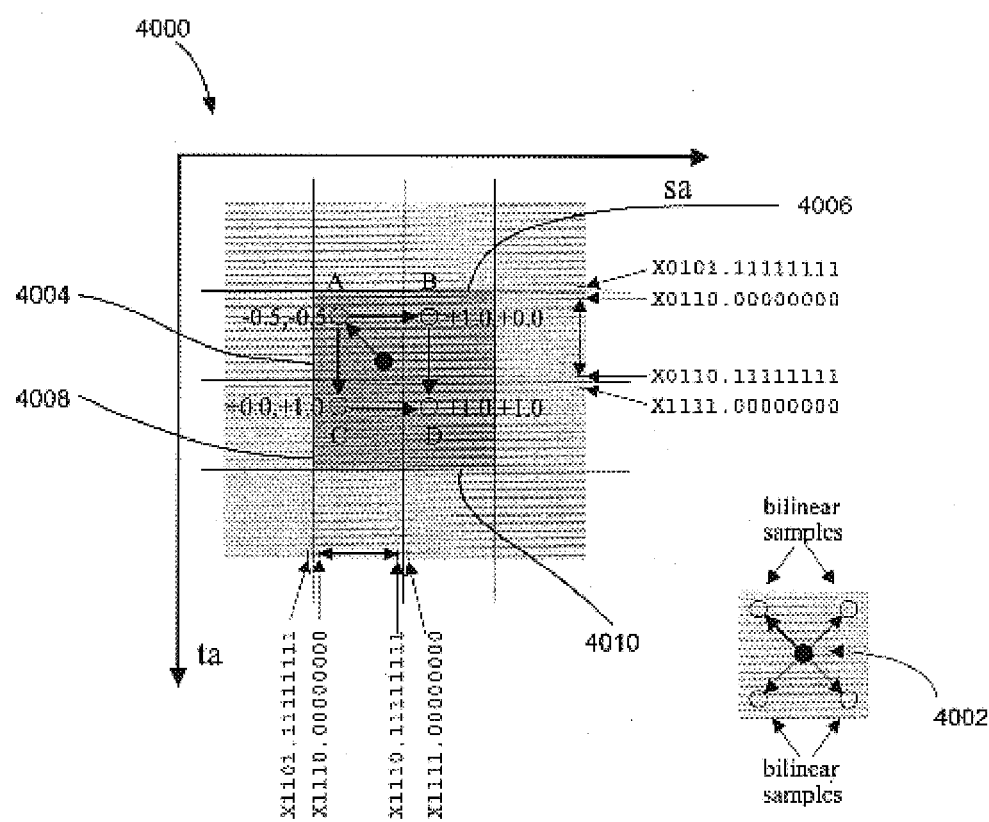
FIG. 40 is a graphical depiction of bilinear sampling.

FIG. 40 is a graphical depiction 4000 of bilinear sampling. Bilinear sampling is the primary texture sampling mode utilized in the VTA. Bilinear sampling needs four adjacent texels (a 2×2 block) and two blend weights (horizontal and vetical blend factors). The sample point defined by, sa, ta is centered in the four texels. To determine which four texels to use, subtract off 0.500 in sa and ta and truncate to the resulting integer components. In FIG. 40, the sa,ta sample point 4002 has 0.10000000 subtracted from each sa and ta component. The resulting integer component yields the integer address of the upper left texel 4004; this relationship holds even when crossing the positive to negative boundary in sa and ta. Now that the upper left texel is determined, the other three texels can be determined based on their relative offset from the upper left texel. Fortunately, this is a simple relationship. Texel B 4006 is immediately to the right of texel A (+1.00 in sa space, +0 in ta space). Texel C 4008 is immediately down from texel A (+1 in ta space, +0 in sa space), and texel D 4010 is down and to the right from texel A (+1.0 in both sa and ta dimensions).

The texture cache uses the relationship of texels B,C, and D to texel A to minimize the amount of context needed in its color cache context FIFO. Please see the description of the cache for more details.

Only four physical addresses are processed by the cache per cycle, according to one embodiment. Thus only 4 unique physical addresses are generated per cycle in the physical address generation phase. Each of the four physical addresses correspond to a 4×4 block (or a 16×1 line), a color cache entry. The LSB+2 bit in sa and the LSB+2 bit in ta together form an alignment pattern for the 4×4 blocks. One and only one physical address of each of the four sa,ta space alignments is permitted per cycle. The four physical address ports are labeled 00, 01, 10, 11, and always correspond to their respective alignments.

Because a 256 bit read atom can represent a 2×2 block of 4×4 texels, it is possible for compressed format textures to generate four identical physical addresses (there is an optimization for this handled in the raw cache-see the texture cache description for more details). But the lower significance sa and ta bits select which texel to extract from each 4×4 block.

Figure 41:
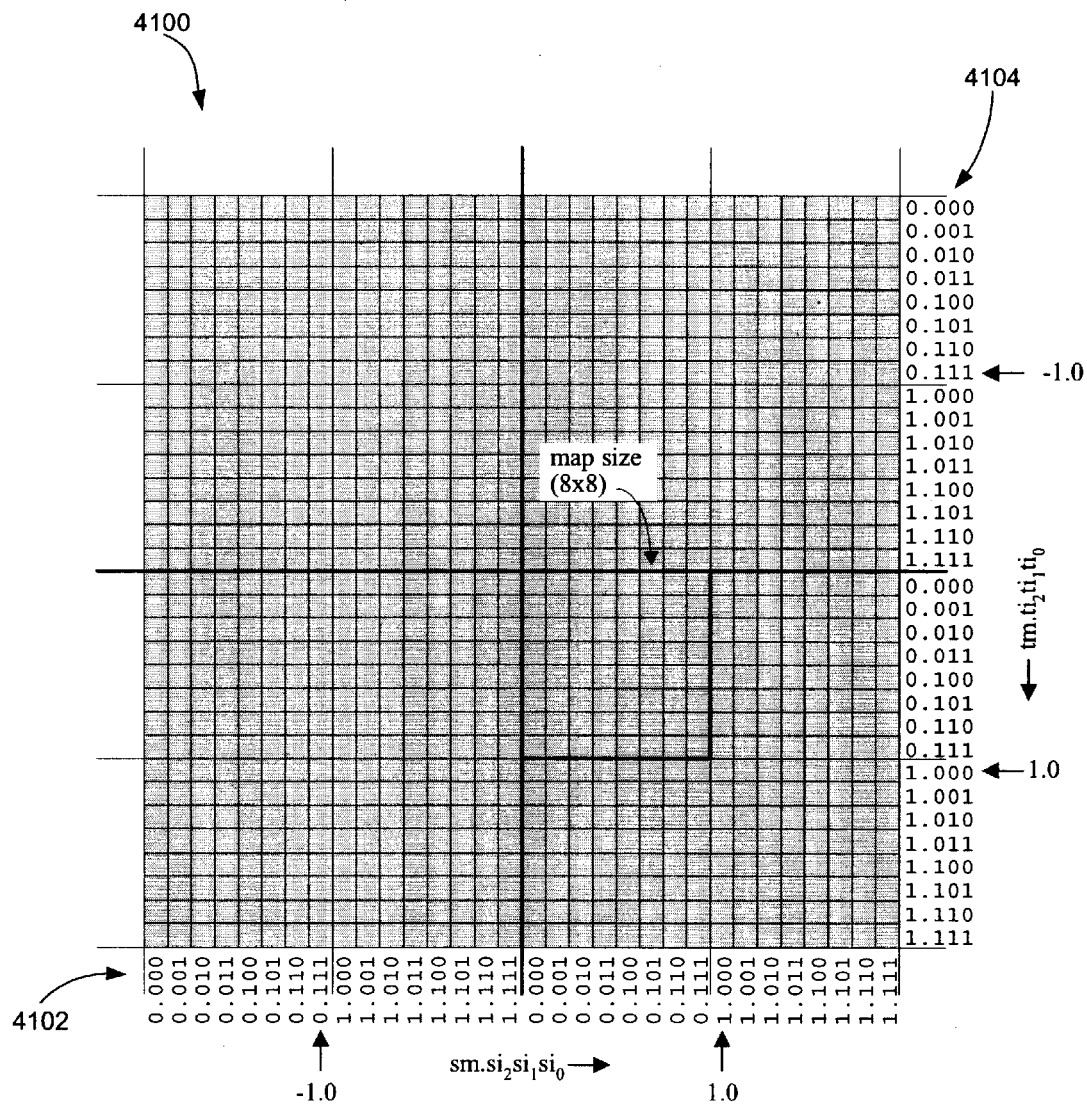
FIG. 41 is a graphical depiction of a plurality of texels that illustrates how the integer portion of sa and ta addresses build in the positive and negative directions.

FIG. 41 is a graphical depiction of a plurality of texels 4100 that illustrates how the integer portion of sa and ta addresses 4102, 4104 build in the positive and negative directions. The integer and fractional components both increase as the number increases, from negative to positive through zero. The sa and ta bits wrap, with the mirror (m) bit indicating if the sample is in the normal or wrapped part of the integer range. The ovs and ovt bits indicate a positive overflow out of this wrapped range. The ovs and ovt bits are only significant for clamping.

Figures 42, 43:
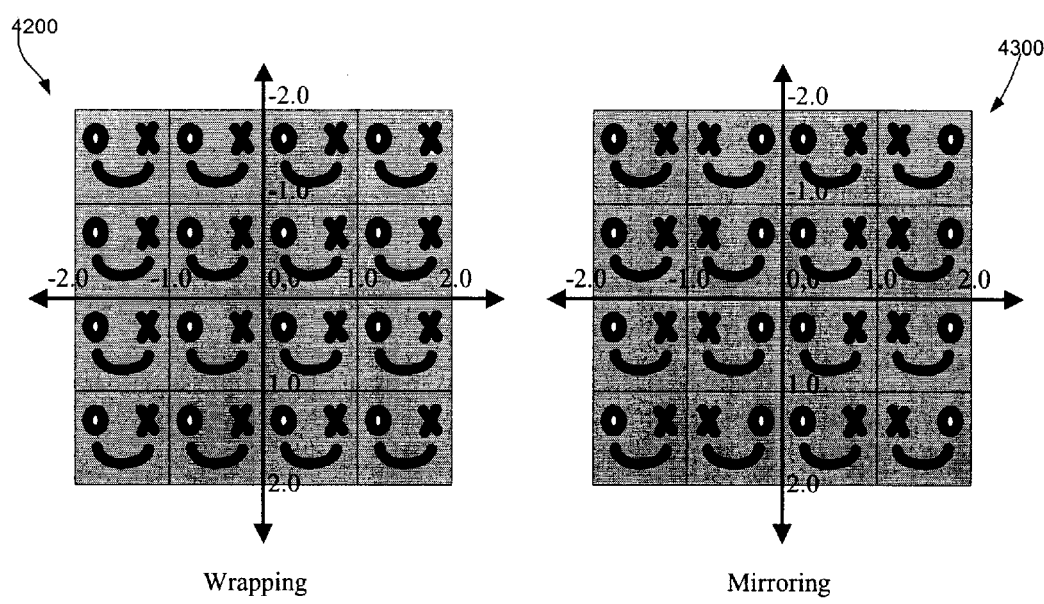
FIG. 42 is a texel map that illustrates wrapping.
FIG. 43 is a texel map that illustrates mirroring.
Figure 44:
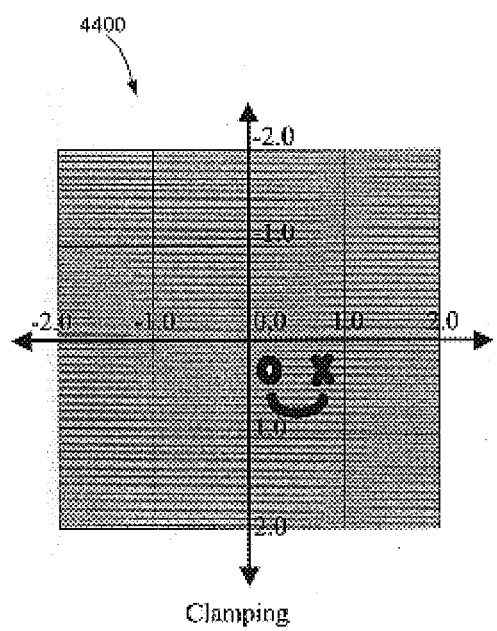
FIG. 44 is a texel map that illustrates clamping.

FIGS. 42, 43 and 44 are texel maps 4200, 4300, 4400 that illustrate wrapping, mirroring, and clamping, respectively. Wrapping, mirroring, and clamping occur when the vertex s or t value hits or exceeds the range 0.00 to 1.00.

Figure 45:
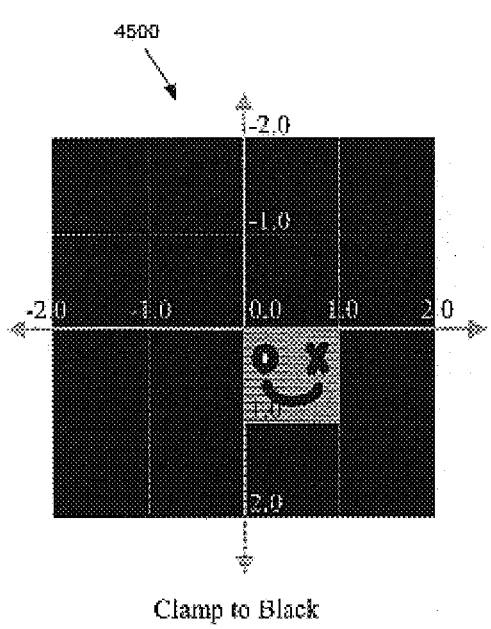
FIG. 45 illustrates clamp to black.

Regular clamping is illustrated in FIG. 44. FIG. 45 illustrates clamp to black 4500. Clamp to black clamps to transparent black when the s,t selection hits the clamp constraint, but maintains the fractional s and t values even after clamping.

The TAD unit accounts for Mip-Map pre-filtering of a texture image. The maximum dimension of the available map is given by the computed LMS value. The log2 of the aspect ratio and larger dimension (s or t) of the map is also specified and defines the smaller dimension. The s is larger signal indicates which dimension uses the larger of the two sizes. Thus, powers of two rectangles from 1×2 K to 2K×1 in size are defined for Mip-Mapped textures.

The specified base address always refers to the map with a 2K dimension. If the data for the largest map is not present the map base pointer still points to the largest dimension; by always defining the base pointer to reference the maximum resolution map, the LMS offset chain is fixed and easier to compute and verify. The max and min LMS clamp points prevent the texturing unit from reading non-valid map data. Each subsequent LMS level has a fixed offset from that base address. An example of a square map 4600 is shown in FIG. 46.

Figure 46:
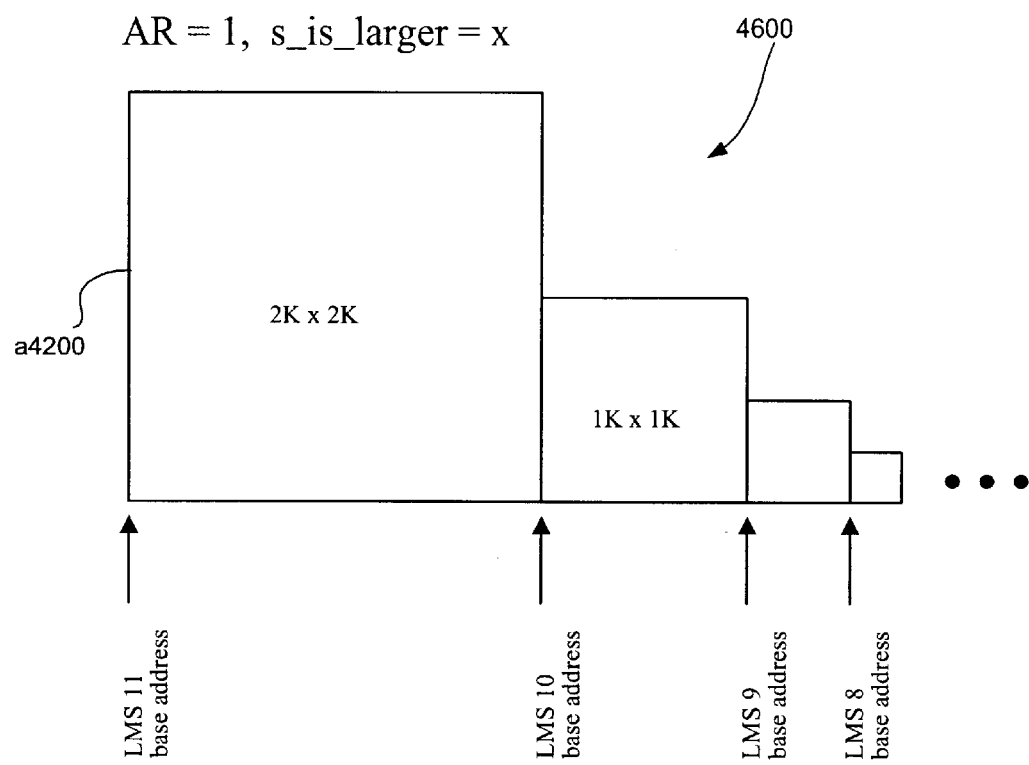
FIG. 46 depicts an example of a square map with an aspect ratio of 1.

In FIG. 46, an aspect ratio of 1 is specified. The LMS 11 base pointer references the first address location of the 2K by 2K map 4602. By way of example, if the maximum resolution map available is a 256×256 then the map base pointer still points to the LMS level 11, with the LMS maximum is set to 8. Non-related data may fill map levels 11, 10, and 9.

Figure 47:
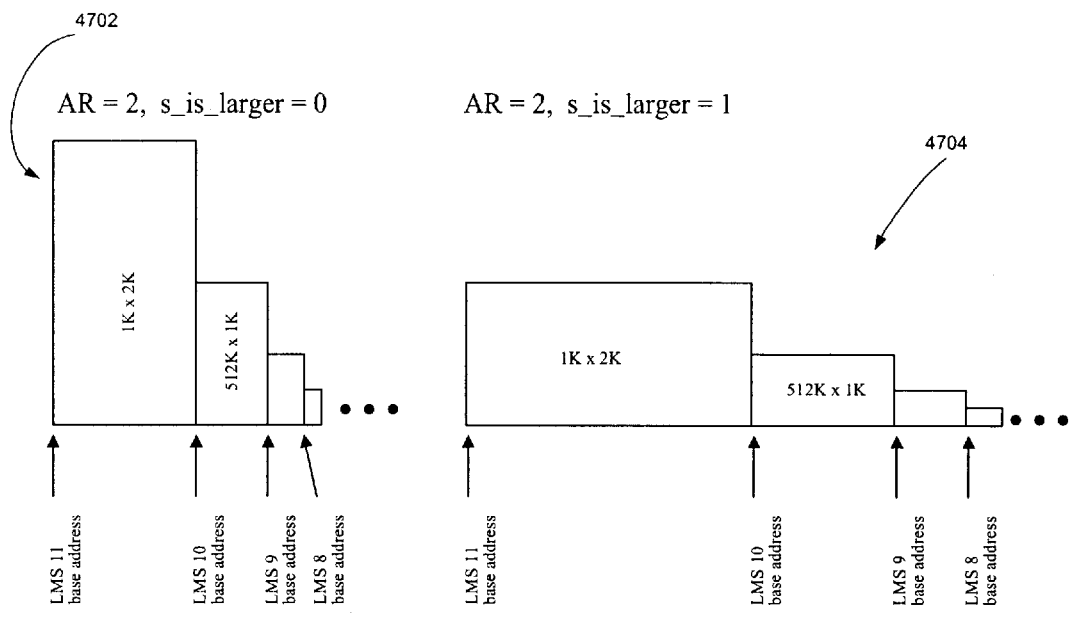
FIG. 47 shows two cases of maps with an aspect ratio of 2.

FIG. 47 shows the two cases 4702, 4704 of an aspect ratio of 2. The offset pointer is the same in both cases until the width hits 32 texels. At the LMS=5 mark the s and t values are special cased through a packing transform equation.

The function for computing the address offset of a given LMS is calculated from the summed address spaces from LMS=11 to the current LMS. LMS 5 through 0 all share the same address offset since LMS levels 5 to 0 are packed into one surface.

The following paragraphs describe LMS packing for LMS 5 through LMS 0 for 32, 16, 8, and 4 bbp over all allowable aspect ratios. This packing scheme may not take t split into account directly. The lower map levels may need to be redundantly allocated in the odd and even split spaces, with the odd or even split levels populated within the packed surface.

The packing transform equations are given below. This packing scheme and resulting equations handle all aspect ratio cases for LMS5 to 0.

S and T transforms packing transforms:

```
it (s_is_larger) {
    s1 = S0 + ( ( (clms < 4) ? (32 - 2 ^ (clms + 1) ) : 0
) ;
    t1 = T0 + ( (clms == 5) ? 0 : (lar > 4) ? 1 :
2^(5-lar) ) ;
}
else { /* !is_is_larger */
    s1 = S0 + ( ( (clms == 5) ? 0 : (lar > 4) ? 1 :
2^(5-lar) ) ;
    t1 = T0 + ( ( (clms < 4) ? (32 - 2 ^ (clms + 1)) : 0
) }
}
```

The surface size is calculated as follows:

```
if ( (s_is_larger) {
    s_dim = 32; /* pixels */
    if (bpp==4)
        t_dim = (lar>=2) ? 16 : (lar==1) ? 32 : 48;
    else /* bpp = 8 cr 16 or 32 **/
        t_dim = (lar>=3) ? 8 : (lar==2) ? 16 :
(lar==1) ? 24 : 48;
}
else { /* !s_is_larger */
    t_dim = 32; /* pixels */
    if ( (bbp==4) || (bpp==8) )
        s_dim = 32;
    else if (bpp == 16)
        s_dim = (lar==1) ? 32 : 16;
    else /* 32 bpp */
        s_dim = (lar==1) ? 24 : (lar==2) ? 16 : 8;
}
```

Where:
s_is_larger=indicates s is larger dimension
clms=calculated LMS for current pixel quad.
lar=log of aspect ratio (1=>0, 2=>1, 4=>2, 8=>3, etc)
bpp=bits per pixel, the pixel depth
t_dim=t dimension, given in pixels
s_dim=s dimension, given in pixels
s0=pre-transform s
s1=transformed s
t0=pre-transform t
t1=transformed t FIGS. 48–54 show the packing 4800, 4900, 5000, 5100, 5200, 5300, 5400 for several representative cases from LMS=5 to LMS=0. The gray and white checkerboard pattern indicates micro-tile boundaries. Color cache boundaries are 4×4 aligned blocks in each case; the alignment key is the upper left corner of the surface.

Figure 48:
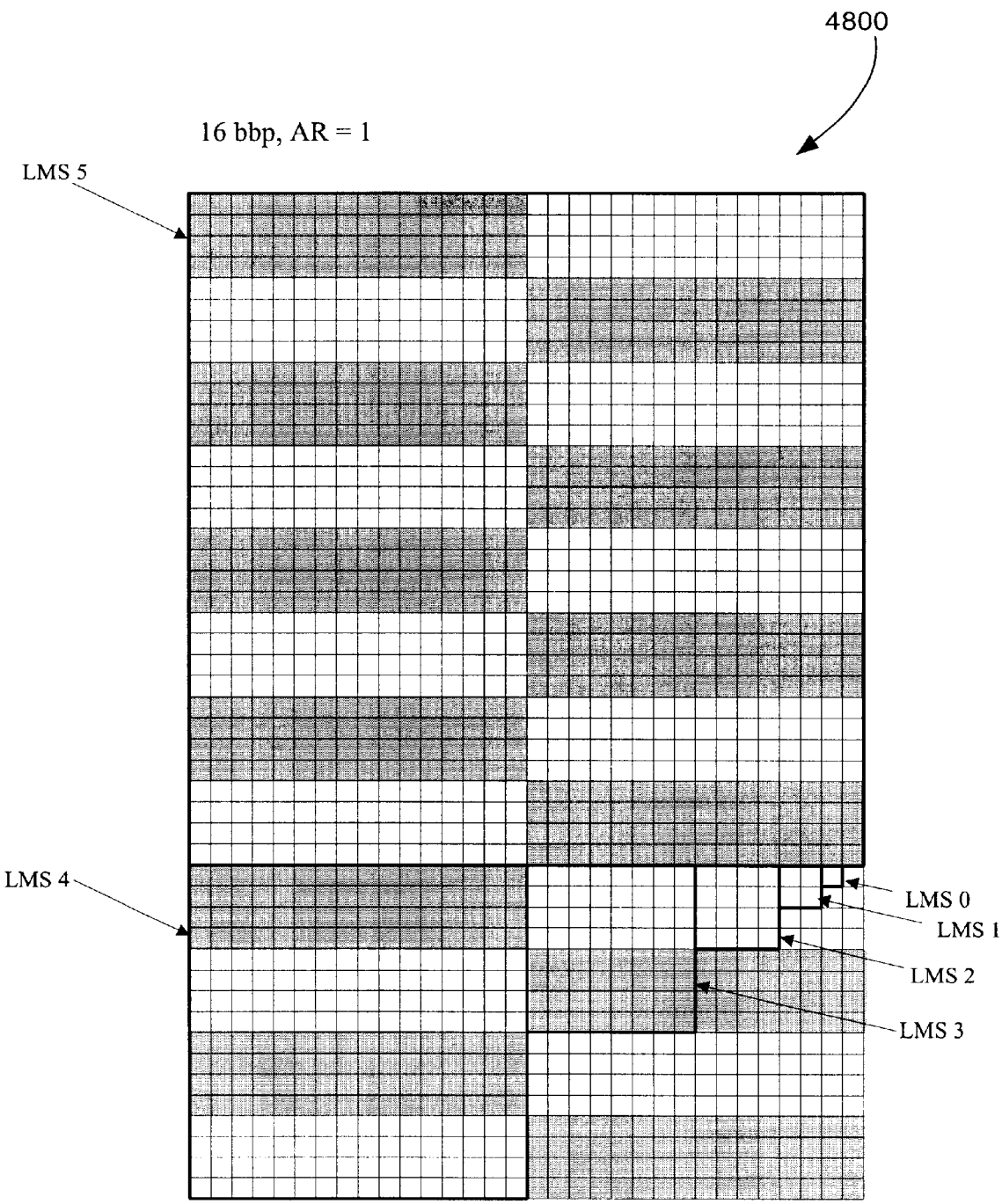
FIG. 48 illustrates the packaging for 16 bbp and an Anisotropic Ratio (AR) of 1.
Figure 49:
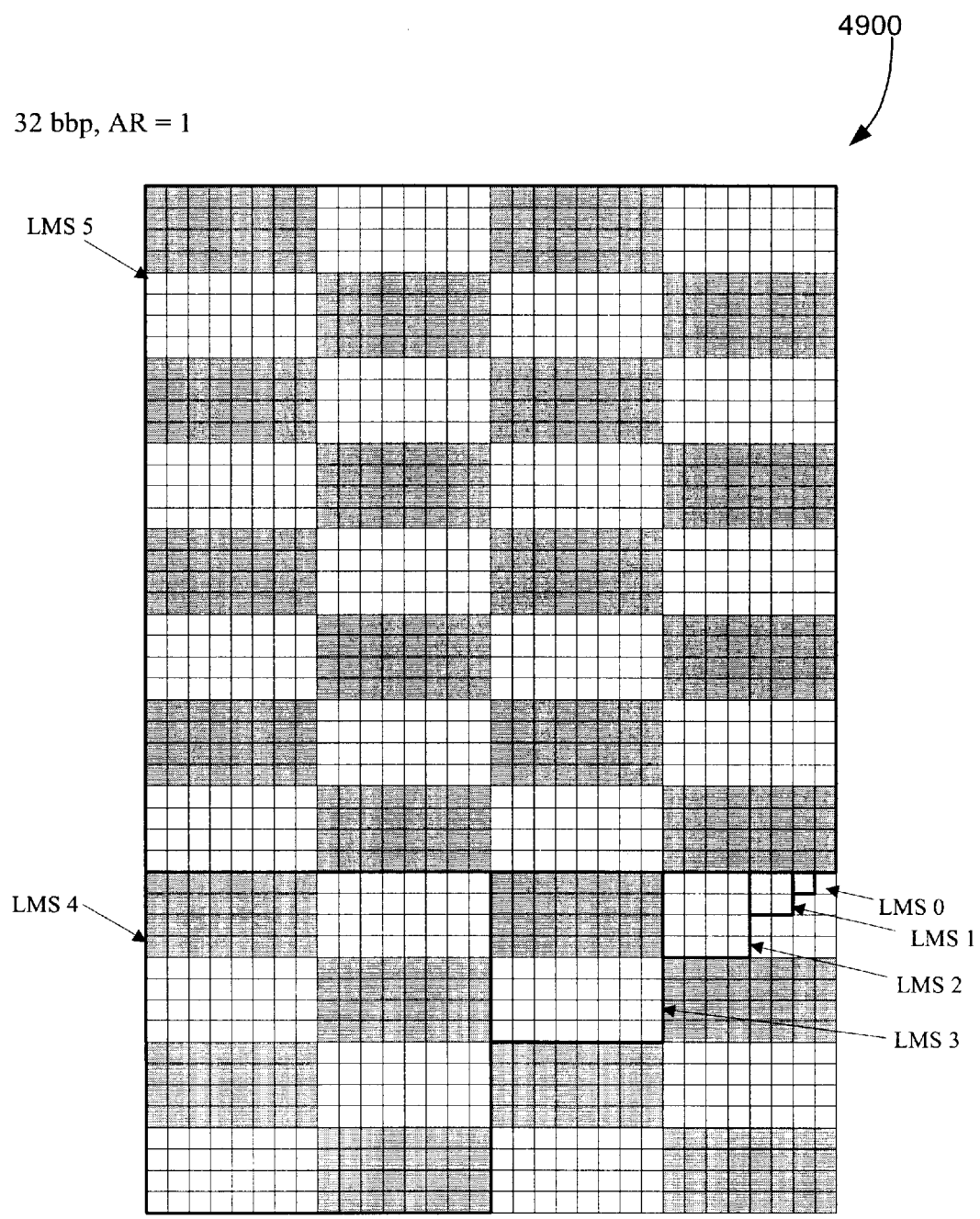
FIG. 49 illustrates the packaging for 32 bbp and an AR of 1.
Figure 50:
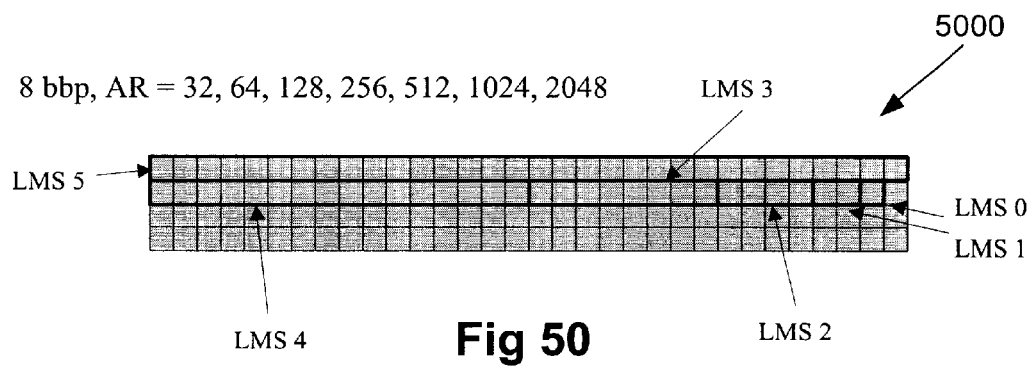
FIG. 50 illustrates the packaging for 8 bbp and an AR of 32, 64, 128, 256, 512, 1024, 2048 where S is larger.
Figure 51:
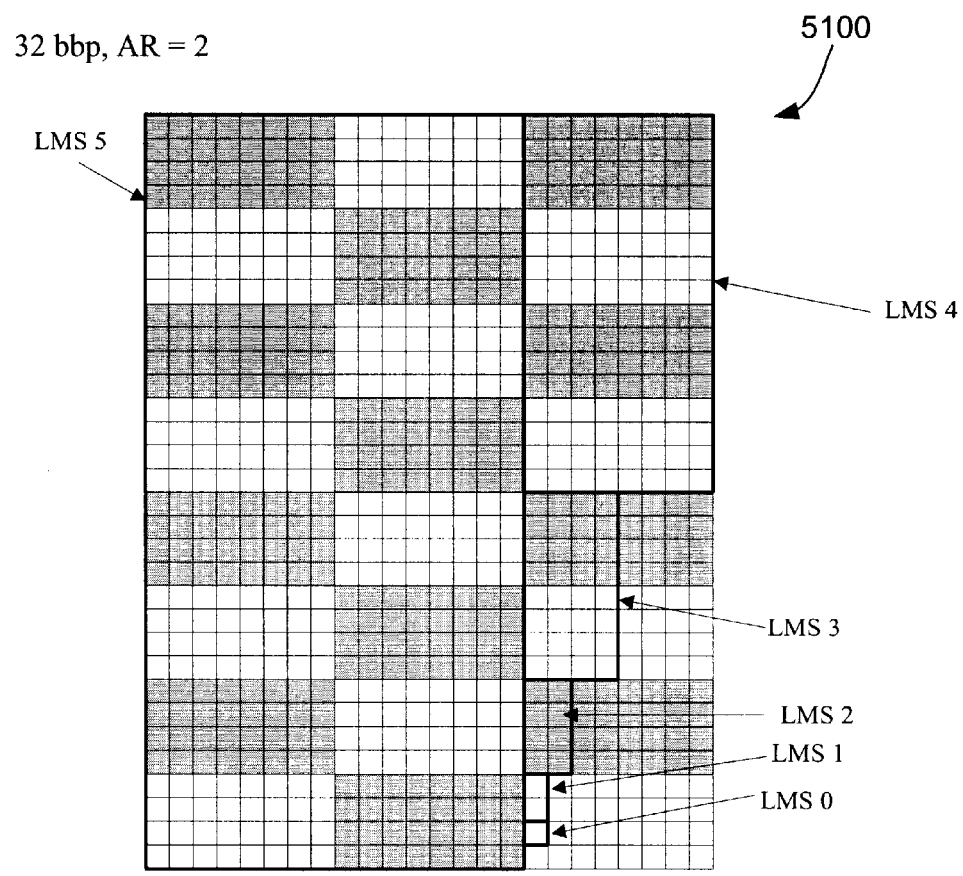
FIG. 51 illustrates the packaging for 32 bbp and an AR of 2 where T is larger.
Figure 52:
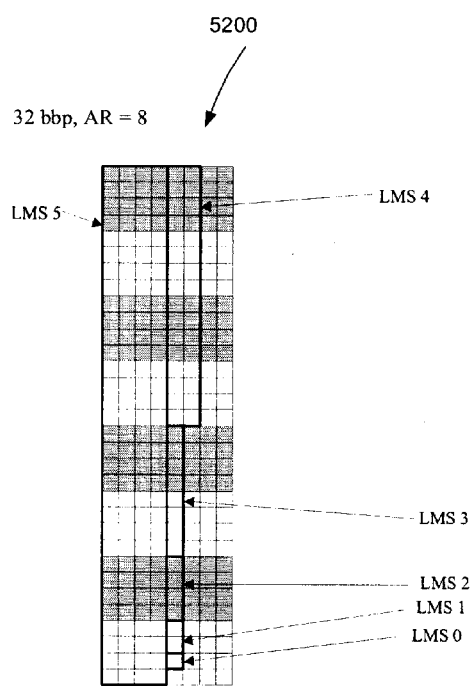
FIG. 52 illustrates the packaging for 32 bbp and an AR of 8 where T is larger.
Figure 53:
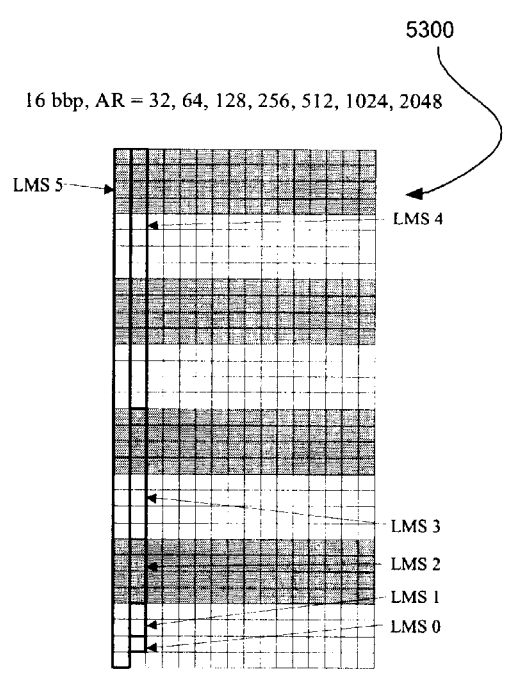
FIG. 53 illustrates the packaging for 16 bbp and an AR of 32, 64, 128, 256, 512, 1024, 2048 where T is larger.

FIG. 48 illustrates the packaging 4800 for 16 bbp and an Anisotropic Ratio (AR) of 1. FIG. 49 illustrates the packaging 4900 for 32 bbp and an AR of 1. FIG. 50 illustrates the packaging 5000 for 8 bbp and an AR of 32, 64, 128, 256, 512, 1024, 2048 where S is larger. FIG. 51 illustrates the packaging 5100 for 32 bbp and an AR of 2 where T is larger. FIG. 52 illustrates the packaging 5200 for 32 bbp and an AR of 8 where T is larger. FIG. 53 illustrates the packaging 5300 for 16 bbp and an AR of 32, 64, 128, 256, 512, 1024, 2048 where T is larger. FIG. 54 illustrates the packaging 5400 for 4 bbp and an AR of 32, 64, 128, 256, 512, 1024, 2048 where T is larger.

Linear surfaces are allocated with a width that is a multiple of 16 texels. Two options can be utilized for handling the cases where the native width of the surface is less than 16 texels:

1) Allocate an individual surface for each LMS level
2) Pack in the lower LMS surfaces to the right of the larger maps.

Figure 55:
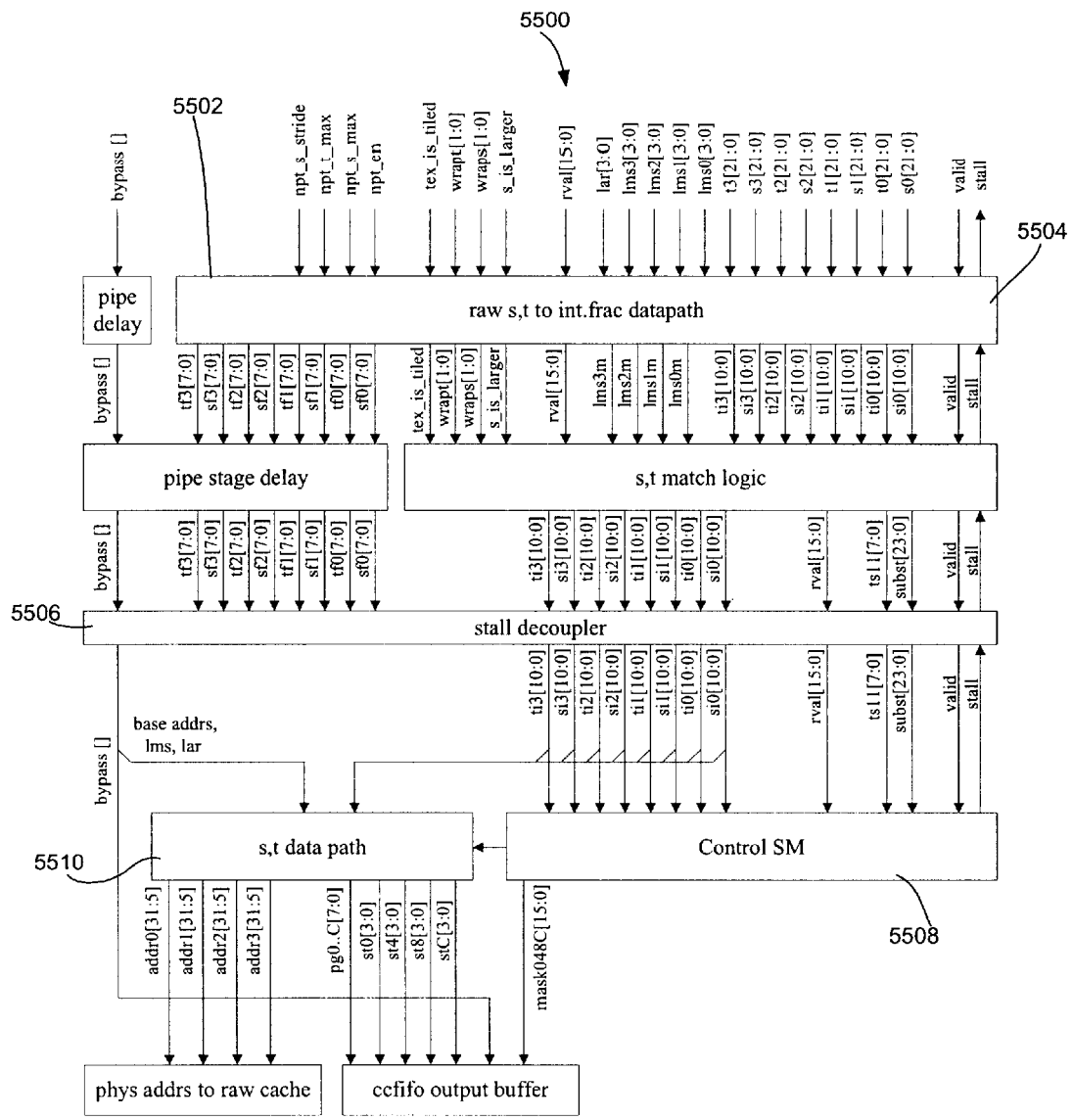
FIG. 55 shows the texture address module's overall architecture.

The text address module's overall architecture 5500 is shown in FIG. 55. In the first block 5502 entering TAD (called "raw s,t to int.frac data path") the S and T values for each of the four pixels are cast from a fixed point 0.00 to 2.00 range to an integer-fraction representation, based on map size information and the current LMS of each texel. At the same time, NPT clamping is evaluated. Also in the first stages of TAD, the upper left texel address is calculated by offsetting the sample point by a distance of (−0.5,−0.5).

Next, all pixel aggregation information needed for the pixel quad in progress is computed in the block 5504.

The TAD controller state machine receives the aggregation information through the stall de-coupling block 5506 and determines if a stall is desired. This logic is expected to take a significant portion of the clock cycle, necessitating the stall de-coupling module. The control SM 5508 walks the pixel quad, submitting the appropriate requests to the color cache tag unit, up to four or more physical addresses per cycle. The physical addresses corresponding to the 4×4 or 16×1 cache entry alignments in s,t space.

The "s,t data path" block 5510 computes the final s,t values to be used in the computation of physical addresses. Finally, the physical addresses are computed, through instantiation of the standard X,Y to physical address translation module.

Figure 56:
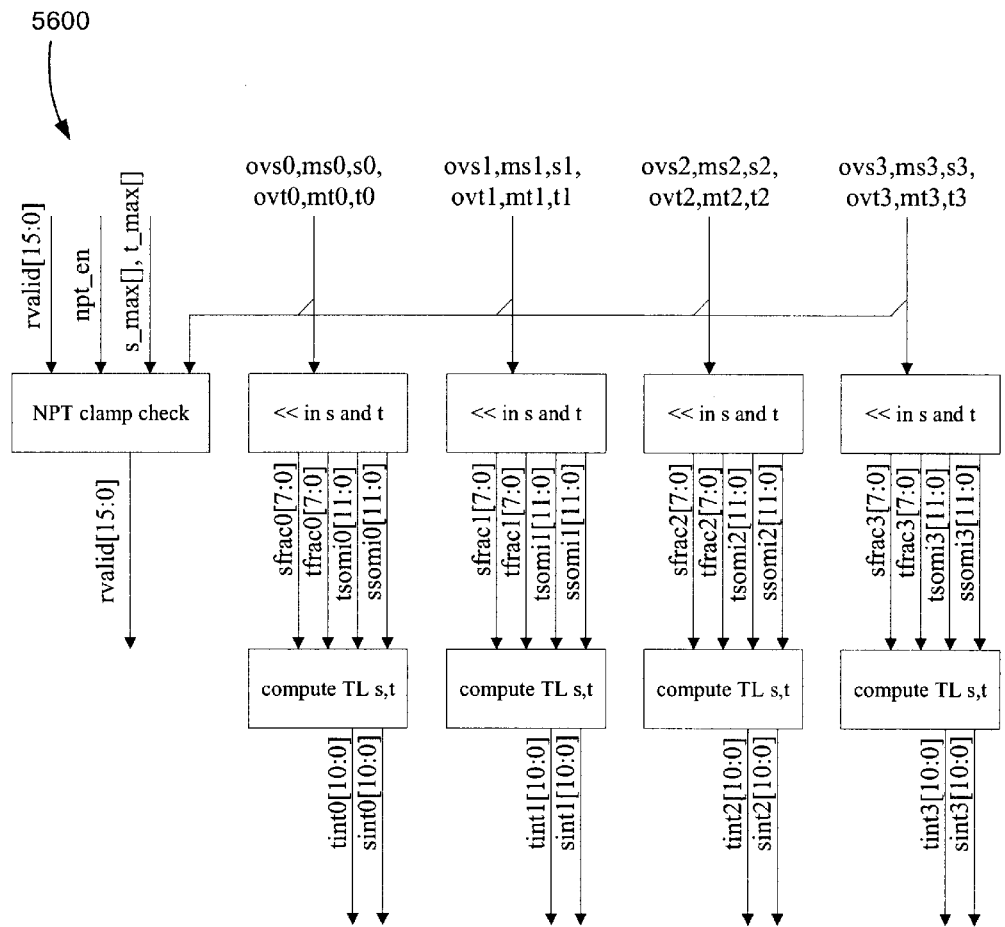
FIG. 56 illustrates the Raw S,T data path.

FIG. 56 illustrates the Raw S,T data path 5600. Two operations are applied to the raw s,t data first. The s and t values are individually shifted per pixel, based on that pixel's computed LMS (along with aspect ratio and s is larger flag). At the same time, if NPT is enabled for the given pixel quad, then the texel valid mask is modified to reflect NPT clamp conditions. This is the last stage that needs to know if the quad is associated with an NPT map. Next, the upper left texel coordinate (in integer s,t space) is computed for each pixel. This result is tint and sint values for each pixel. Together tint and sint form the texel space address for a pixel's reference texel.

Figure 57:
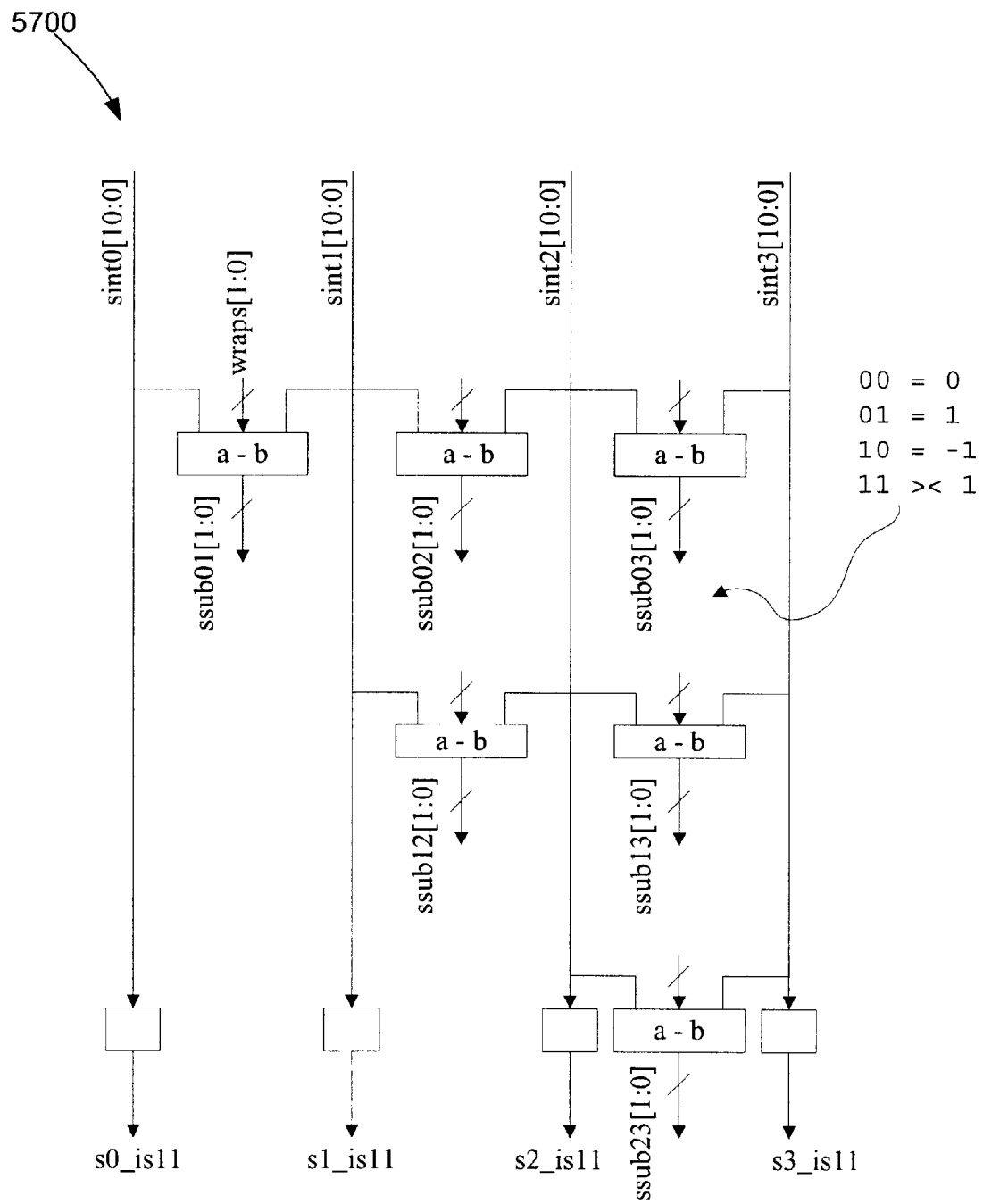
FIG. 57 shows the matching operations utilized to determine texel grouping.

FIG. 57 shows the matching operations utilized to determine texel grouping. Only the S channel 5700 is shown; an identical instance of the logic shown is needed for T. Together the two instances of the match logic (one for S, one for T) compute all necessary information in one cycle for the group walker to progress; the walker may take up to 4 or more cycles.

Figure 58:
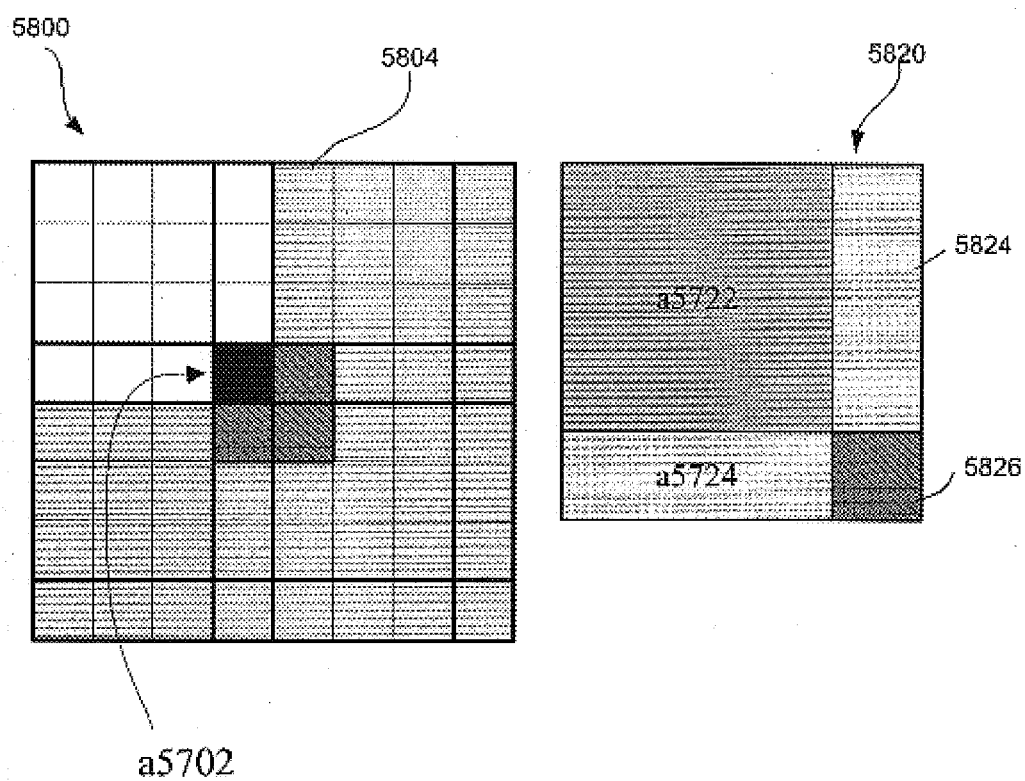
FIG. 58 shows a 2×2 set of 4×4 cache entries.

FIG. 58 shows a 2×2 set 5800 of 4×4 cache entries. The location of the reference texel 5802 is shown in black. The grayed out 4×4 cache entries 5804 (one texel from each of the 3) are used to satisfy the texel requirements of the bilinear neighborhood associated with the reference texel. The reference texel explicitly touches the 4×4 cache entry it lands on; in this example the other three cache entries are implied. On the right side of FIG., 58 the four regions of a 4×4 5820 are marked with labels 5822, 5824, 5824, and 5826; if a reference texel lands in the upper left region 5822 then only one 4×4 block (cache entry) is needed for the associated pixel's bilinear neighborhood. If a reference texel lands in the lower right of an aligned 4×4 block, then 4 cache entries are needed (as shown in the figure on the left).

Note that only one each of the four cache alignments are preferably posted per cycle.

A fixed priority assignment establishes the submission order of requests for a given cache alignment, with pixel 0 having the highest priority and pixel 3 having the lowest submission priority. The reference texel for pixel 0 can preclude pixel 1, pixel 2 or pixel 3 from posting a request in the same cycle as pixel 0's request. Thus if pixel 0 needs data from t[2],s[2] alignment "01" then no other requests for alignment "01" are possible in the same CC FIFO push cycle.

The restriction of posting only one each of the four cache alignments per cycle comes from the fact that the color cache tag unit can only tag compare one each of the four alignments per cycle. Refer to the section below discussing the VTA Cache for a description of the color cache tag operation.

Figure 59:
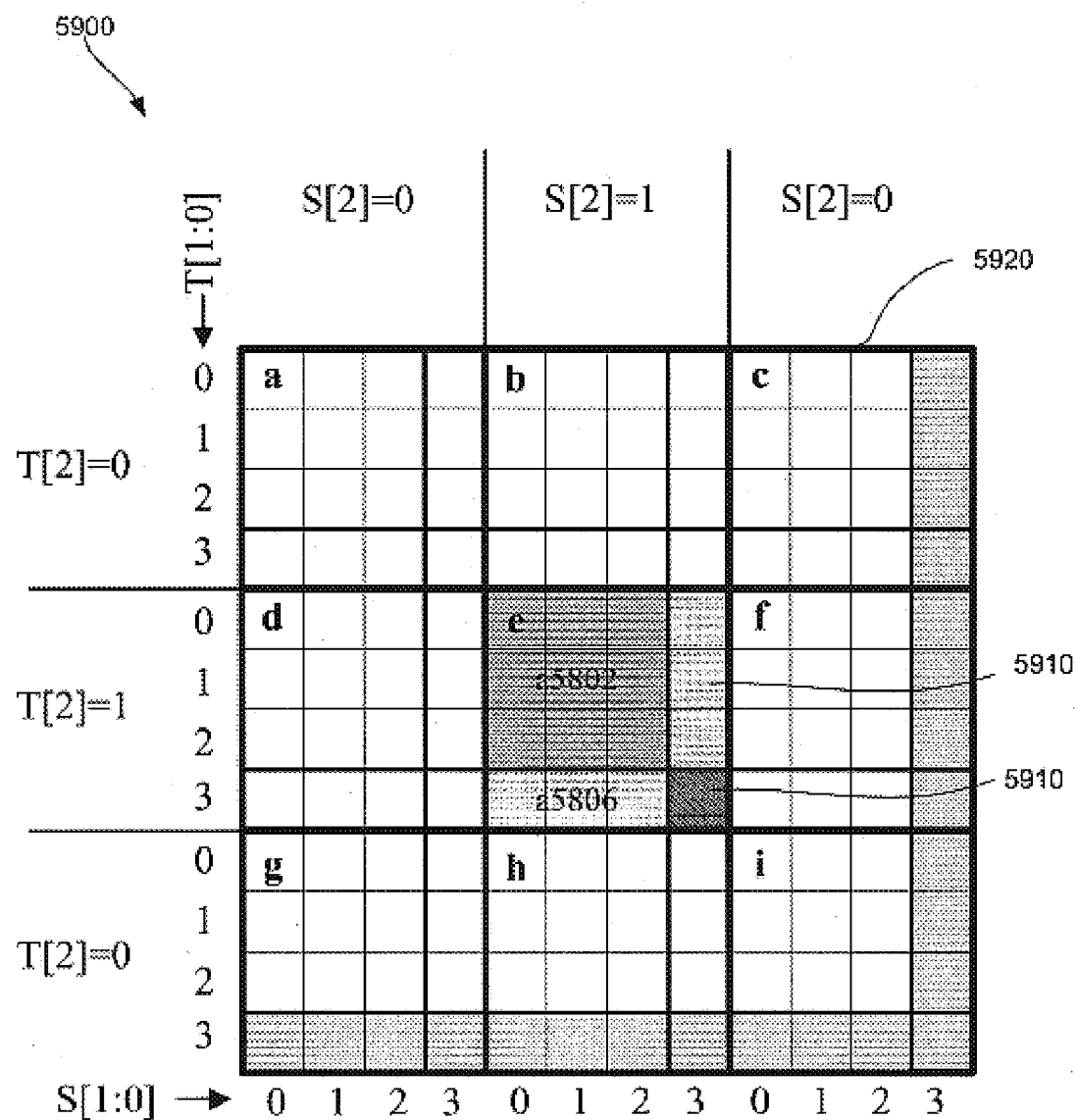
FIG. 59 depicts a 3×3 set of 4×4 blocks in s,t space.

In FIG. 59, a 3×3 set 5900 of 4×4 blocks in s,t space are shown. The center 4×4 cache entry is where a reference texel lands. The center 4×4 is categorized into four regions. If a reference texel lands in region 5902, then one aligned cache entry is needed to satisfy the bilinear neighborhood. If a reference texel lands in either region marked 5904, then two 4×4 blocks are needed; two of the required texels will come from the adjacent 4×4. If a reference texel lands in the region marked 5910, then four 4×4 blocks are needed and one texel is taken from one each to form the bilinear neighborhood.

In FIG. 59, the 4×4s 5920 are labeled "a" through "i". If the reference texel for pixel 0 (the highest priority pixel) lands in region 1 of block e, then pixel 1 (the next highest priority pixel) can take up to 3 or more additional 4×4 blocks to satisfy it's bilinear neighborhood. The allocation of 4×4 blocks continues until either all four possible alignments in T[2],S[2] are taken or no more reference texels can allocate a block in the current cache request set of up to four or more 4×4 alignments.

The aggregation logic is a fairly complex priority tree.

Figure 60:
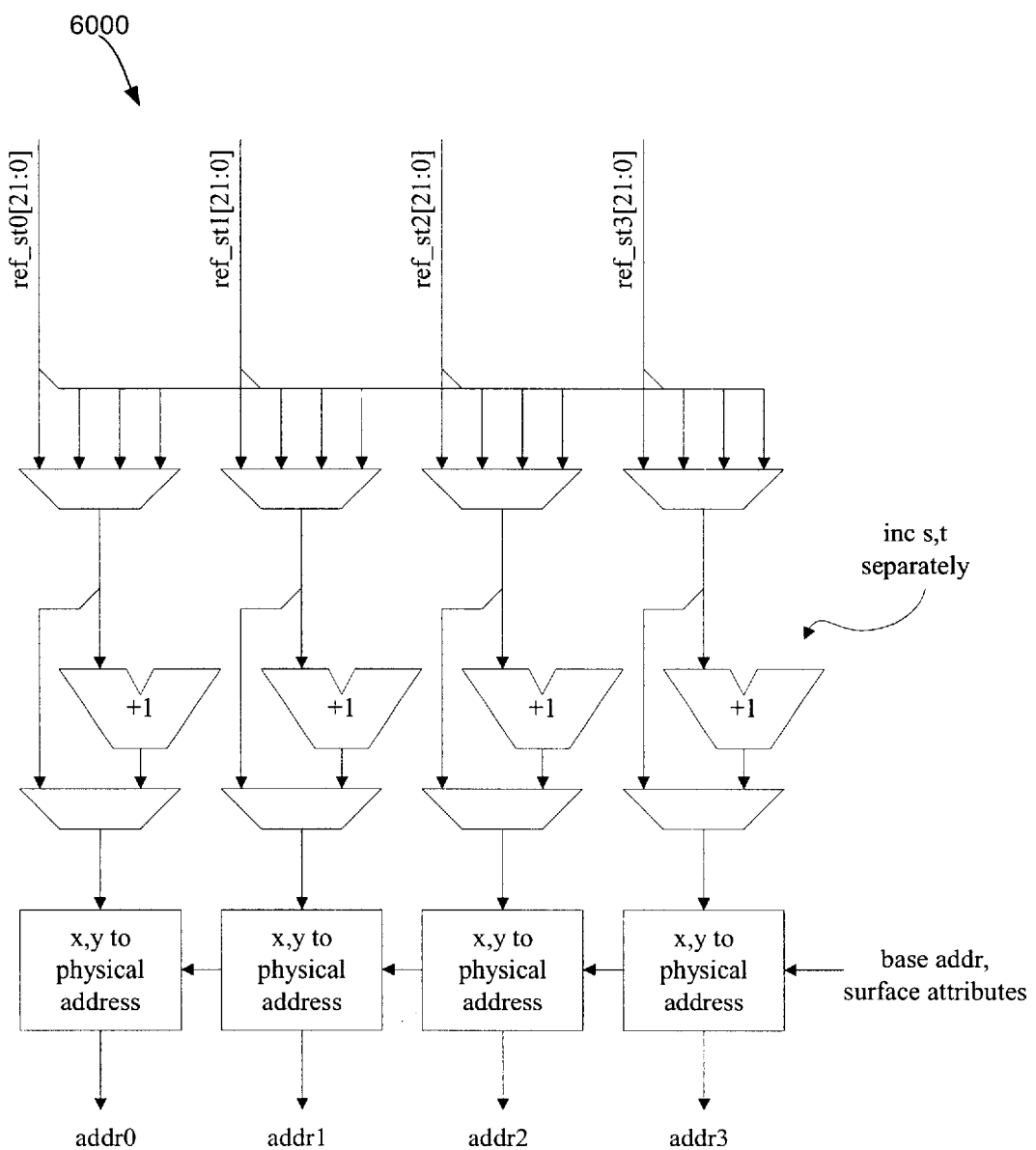
FIG. 60 depicts a final s, t data path.

The final s, t data path 6000 is shown in FIG. 60. This logic provides for explicit neighborhood calculation and pass-through of reference texels for X, Y to physical calculation. Finally, this logic provides the necessary muxes to align requests to their appropriate cache alignment.

Texture Cache (TC) 820 (see FIG. 8)

The Texture Cache provides texel data to support the VTA pipeline while minimizing redundant texture memory accesses through a two level cache structure. Data is retrieved and translated from either local SGRAM or AGP memory to enable bilinear filtered texturing of four pixels, of a 2×2 quadrant of pixels, in every clock.

An Address Unit converts S and T addresses into physical memory addresses and a Data Unit converts raw texture data into true color data. Raw texture data is stored in a large first level "raw" cache and true color texture data is stored in a smaller second level "color" cache.

Textures sought may be compressed and uncompressed. Uncompressed textures arrive in 8, 16 and 32 bit formats and compressed textures arrive in 4 (texture) and 16 (frame) bit formats. Each format is retrieved in order and entered into the two level texture cache pipeline.

The following paragraphs describe a method for building a texture cache using a 4 way set associative cache with 16 cache lines, which can do sixteen texel accesses simultaneously, uses a least-recently-used (LRU) replacement algorithm, and has no stall miss penalty for up to 4 or more misses simultaneously.

The texture cache preferably provides the following desirable features:

TABLE 11

The cache supports bilinear filtering on four pixels per cycle.
Minimization of the time spent stalling the pipeline to service cache misses
is provided.
Trilinear filtering is performed by taking multiple cycles. The cache replacement algorithm is friendly to trilinear filtering.
Multiple textures per pixels are supported, with 8 or more textures per pixel.

When performing bilinear filtering of four pixels per cycle, four somewhat independent S,T values (texture coordinates) are generated. Each of these S and T values are then used to generate a 2×2 neighborhood of pixels, generated 16 texel address requests per cycle. During mipmapping, the independent texture coordinates are close together, increasing cache efficiency. The 2×2 neighborhoods also have good cache locality.

Since there are sixteen address requests per cycle, the percentage of cycles with cache misses can be very high. Stalling for cache misses can greatly reduce performance. Because of this, ensuring that cache misses can be effectively pipelined is preferred. This means the cache replacement algorithm needs to run in one cycle, and that the missed cache line can be loaded before being used.

Since using trilinear filtering causes two texture to be fetched with different cache locality, and multiple texturing using lightmaps also causes two texture maps to be fetched with greatly differing locality, a cache replacement algorithm that doesn't cause re-fetching of data that's was recently replaced.

A four way set associative cache with an LRU replacement algorithm is described in the following paragraphs. Initially, a fully associative cache was investigated, but the potential downside is in the cache replacement speed. The time to perform 256 (16*16) tag compares, compute the least recently used, and replace it with a cache miss is the critical path in determining the speed that the entire pipeline will run at. This new approach reduces the number of tag compares per LRU, reducing the size of this critical logic. Reducing the physical size of this circuit will improve cycle time.

Figure 61:
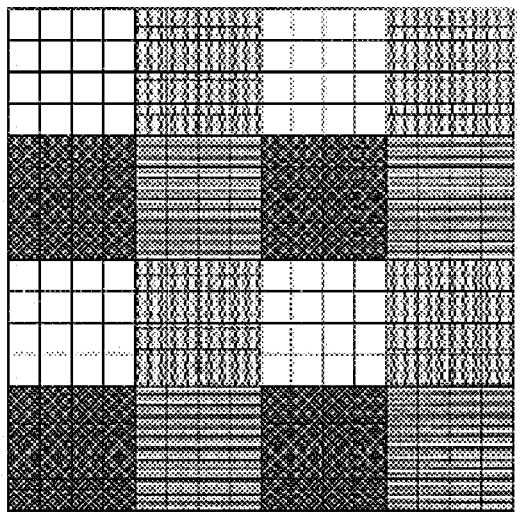
FIG. 61 depicts a cache line set association according to one embodiment.

FIG. 61 depicts a cache line set association 6100 according to one embodiment. The cachelines are 4×4 sets of texels, and the cache lines are organized into four "sets", based on the S and T address bit number 2. This means each cache line is surrounded by cache lines in other sets.

Since the cache contains 16 cachelines, each set contains 4 cachelines. This allows for a simple LRU circuit per set, enabling trilinear and multiple textures to use the cache efficiently.

Worst case, there can be sixteen cache misses in one cycle, but this case occurs when all four S,T neighborhoods straddle corners of different 4×4 cachelines. This ensures that when there's sixteen cache misses, they will end up being four misses in each of the four sets, avoiding a deadlock condition.

Figure 62:
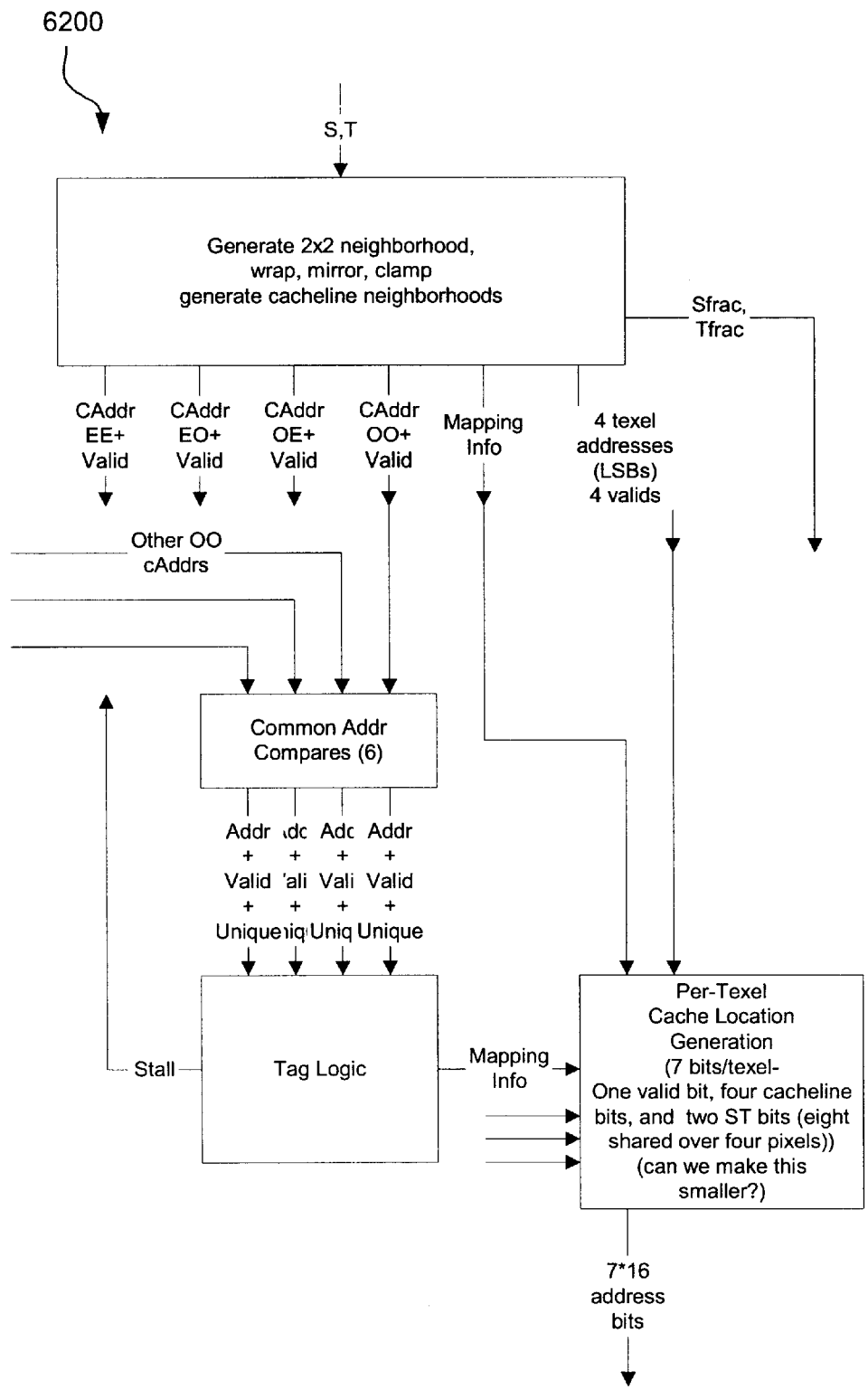
FIG. 62 shows an address generation portion of the pipeline for generating an address from on S,T pair.

FIG. 62 shows an address generation portion 6200 of the pipeline for generating an address from on S,T pair. Logic here is duplicated four times. The first stage (which is the last stage of the kernel walker) takes an S ant T pair, and expands it out into a 2×2 neighborhood of texels, and also determines the 4×4 cachelines that all texels occupy. Mapping info is also generated to map cache lines to texel addresses.

Each of the four cacheline addresses are grouped with similar cacheline addresses from other Neighborhood generators, based on which set the address belongs in. The four addresses for the given set are then compared for uniqueness, and the four addresses, along with a per-address "unique" bit, to the tag logic. The tag logic performs cache hit/miss determination, and cache line replacement, sending the missing address to the uncompressed cache. When all cachelines have been serviced, the mapping info from the tag and from the neighborhood generator are used to determine the cache address that locates each pixel. These sixteen "cache addresses" are sent through a FIFO to the cache RAM.

Figure 63:
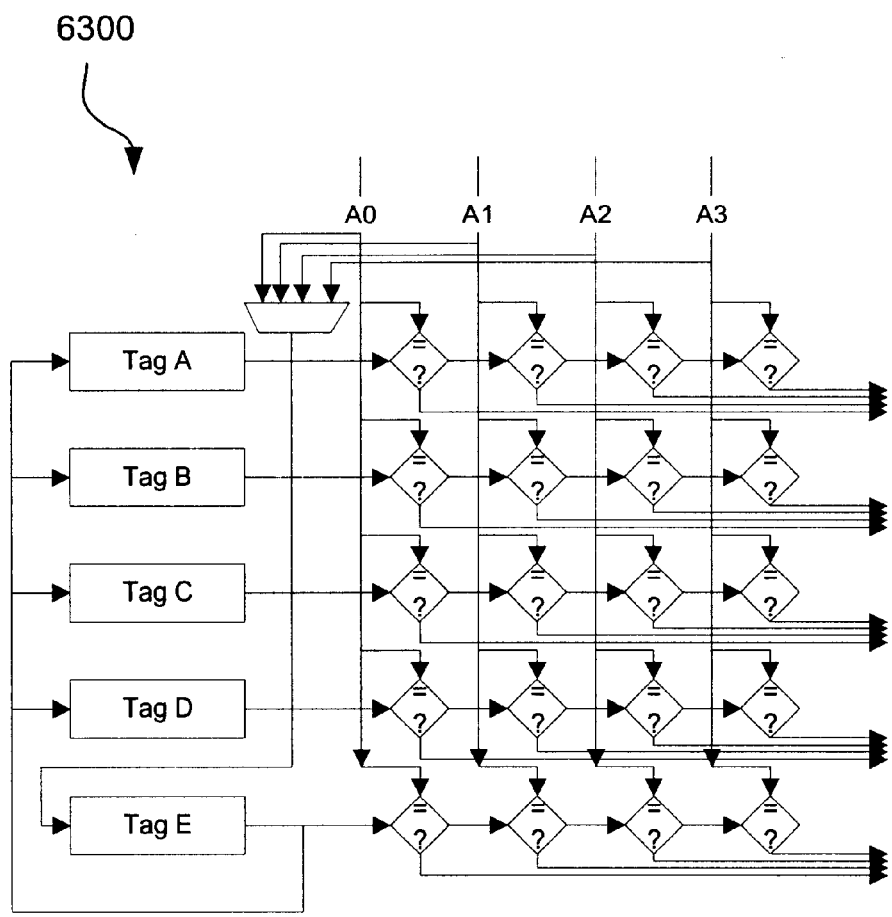
FIG. 63 depicts tag logic of the cache.

FIG. 63 depicts tag logic 6300 of the cache. Even though there are only four cachelines per set, the tag logic actually has five tags. In normal operation, when the previous cycle was a cache hit, TagE is invalid. When a miss occurs, the first missing unique address is loaded into tag E, while the LRU circuit invalidates one of the other tags. One cycle later, TagE is moved into this invalid location. This allows for each set to get one miss and not stall the pipeline. More than one miss, however, will cause a cache miss. During the time TagE is valid, the mapping logic is told that any hit on TagE maps to the invalid tag's cache memory location.

Since there are four sets, each set can get one miss without causing a pipeline stall. This means in normal operation (decent locality within the triangle), the pipeline should never stall inside a triangle and also should rarely stall when starting a new triangle.

Several advantages of the four way set associative approach are set forth in the following table.

TABLE 12

The tag logic, including LRU replacement logic is very small, enabling a faster cycle time on the rest of the graphics pipeline.
The uniqueness identification circuit is also smaller, reducing gate count.
Further, if a completely fully associative cache is selected, the same uniqueness logic can be used.
The method supports up to four or more cache misses without stalling.

The following paragraphs describe the functional features utilized to support S3 decompression in the VTA texture cache and describes the memory arrangement of the various surface cases.

There are five S3/DX6 formats; one utilizes 4 bits per pixel, and four formats are represented by 8 bits per pixel. These formats are be mapped onto a 256 bit (32 byte) read atom supported by the VTA texturing unit.

Memory organization is discussed first to establish a memory organization that satisfies both the S3 constraints and the VTA texturing unit constraints. Then specific additions to the existing TAD and TC units are outlined.

Figure 64:
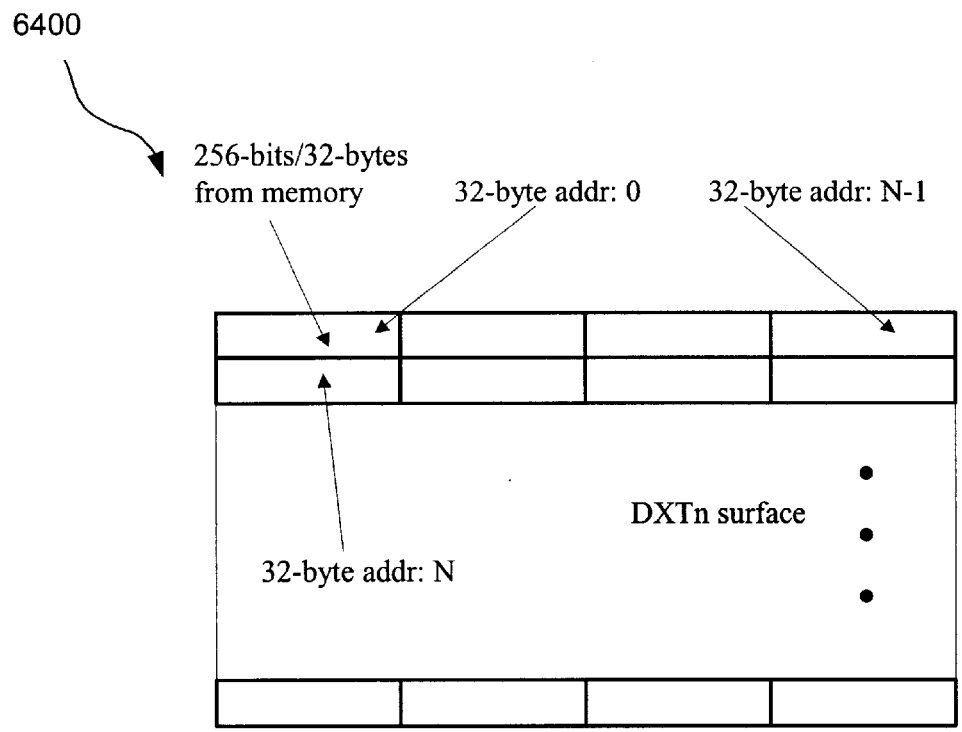
FIG. 64 illustrates a large DXTn surface.

FIG. 64 illustrates a large DXTn surface 6400. The S3 compressed texture surface type is a progressive linear format surface. Increasing memory addresses build to the right first and then down. Each separable memory quanta in the DXTn format is either a 64 bit unit representing a 4×4 color block (DXT1 format) or a 128 bit unit representing a 4×4 color block (DXT2, DXT3, DXT4, DX127 formats).

Figure 65:
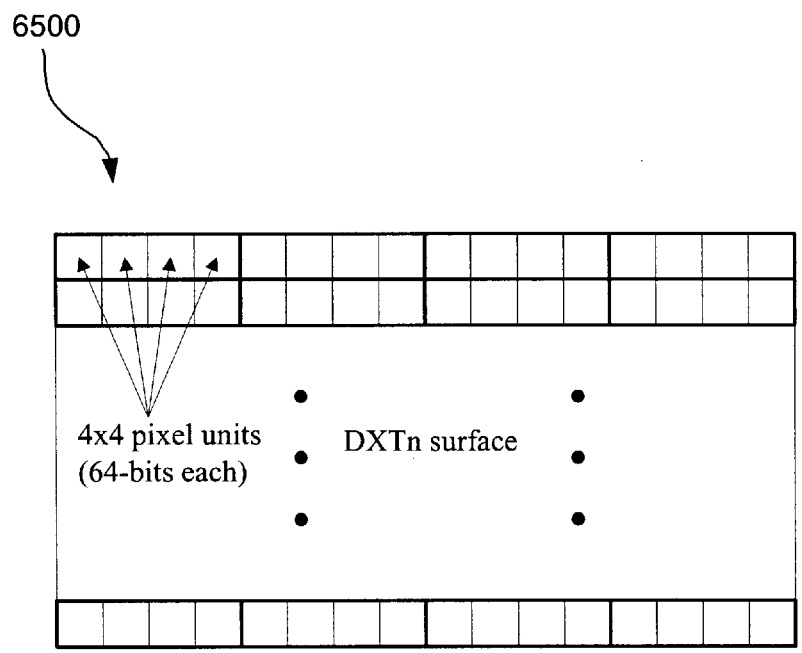
FIG. 65 shows a large surface for the DXT1 format with 64-bit units.

In FIG. 65, a large surface 6500 is shown for the DXT1 format with 64-bit units. Each 64 bit unit decompresses into a 4×4 color patch. Each 256-bit read atom corresponds to four 4×4 patches.

Figure 66:
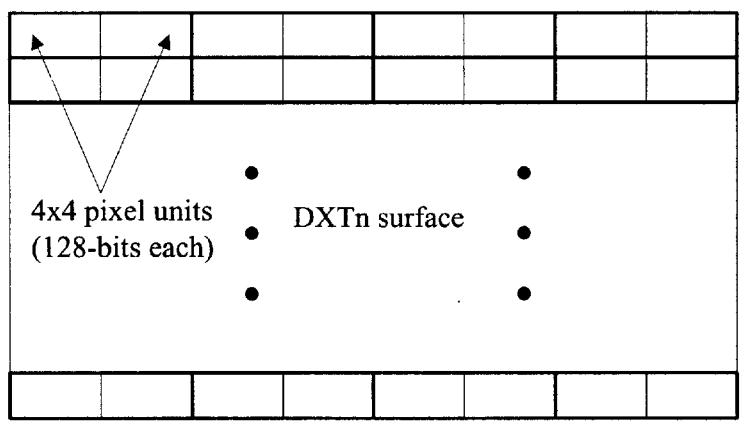
FIG. 66 illustrates a large surface in the DXT2,3,4 and 5 formats, where each 4×4 takes 128 bits.

FIG. 66 illustrates a large surface 6600 in the DXT2,3,4 and 5 formats, where each 4×4 takes 128 bits. Each 256 bit read atom contains two 4×4 patches.

Smaller surfaces can use special casing to efficiently utilize 256 bit read atoms. In all, five general modes are used; three modes for the DXT1 format and two modes for the DXT2,3,4,5 formats.

Figure 67:
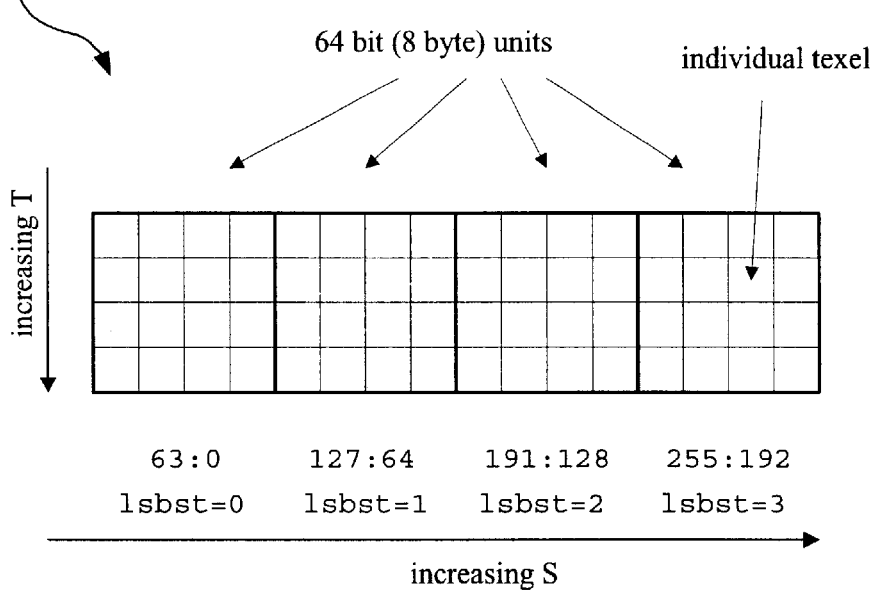
FIG. 67 shows the memory layout within a single 256 bit read atom in DXT1 (4 bpp) mode.

FIG. 67 shows the memory layout 6700 within a single 256 bit read atom in DXT1 (4 bpp) mode. The left most 4×4 block corresponds to memory interface bits [63:0], the lower 8 of 32 bytes. This layout is used for surfaces that are 16 texels wide or wider and will be referred to as "mode A."

Figure 68:
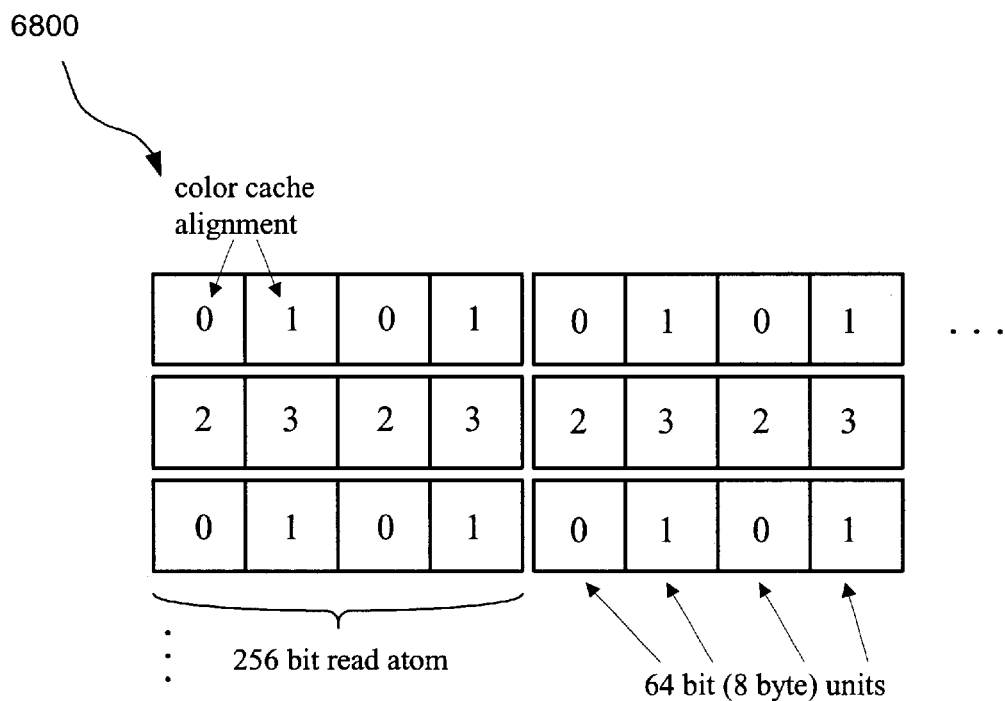
FIG. 68 shows the S,T space alignment corresponding to mode A.

FIG. 68 shows the S,T space alignment 6800 corresponding to mode A.

Figure 69:
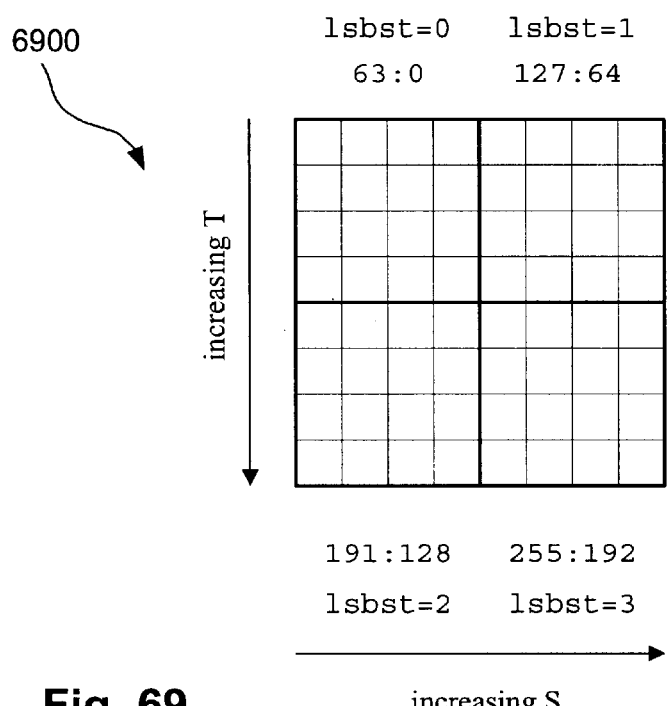
FIG. 69 shows a surface that is 8 texels wide and arbitrarily tall.

FIG. 69 shows a surface 6900 that is 8 texels wide and arbitrarily tall. This special case will be used for surfaces that are exactly 8 texels wide and will be referred to as "mode B."

Figure 70:
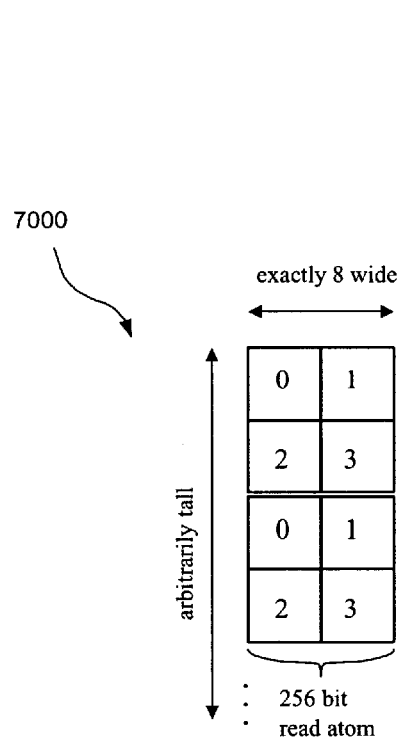
FIG. 70 shows the S,T space alignment for mode B.

FIG. 70 shows the S,T space alignment 7000 for mode B.

Figure 71:
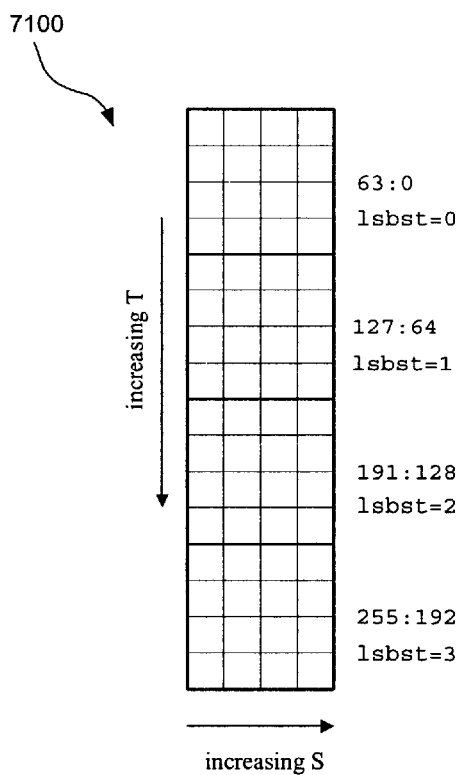
FIG. 71 shows a surface that is 4 texels wide and is used for surfaces that are 4, 2, or 1 texel wide and arbitrarily tall.

FIG. 71 shows a surface 7100 that is 4 texels wide and is used for surfaces that are 4, 2, or 1 texel wide and arbitrarily tall. This arrangement is defined as "mode C." Surfaces that are 1 wide are presented to TC as 2 wide with a weight and valid clamp applied by TAD.

Figures 72, 73:
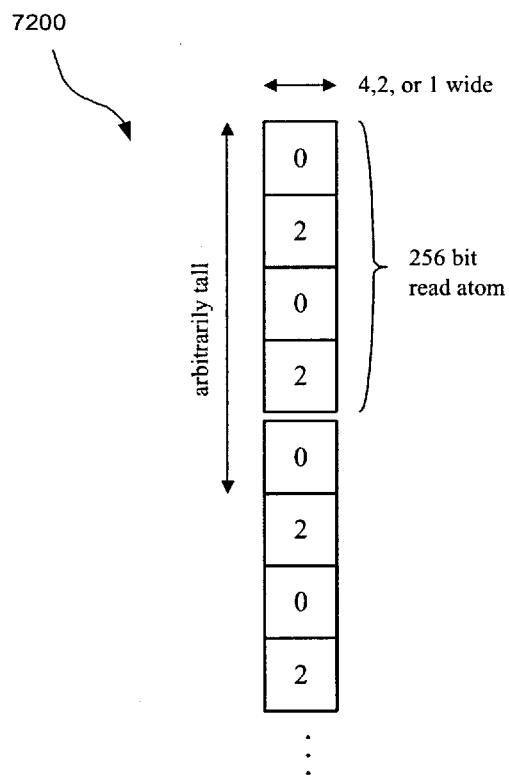
FIG. 72 shows the alignment for mode C.
FIG. 73 shows a DXT2 to DX127 surface in mode D.

FIG. 72 shows the alignment 7200 for mode C. Note that alignments 1 and 3 are never used. The option of interleaving 02 with 13 was explored and discarded; doing so would introduce a large number of special cases throughout the TAD pipeline for an infrequently used surface mode and surface dimension.

The four remaining S3 compressed texture formats (DXT2 through DX127) are all 128 bits per 4×4 block. These four 128 bit formats utilize two tiling modes: "mode D" and "mode E." FIG. 73 shows a DXT2 to DX127 surface 7300 in mode D. This mode is used for surfaces 8 texels wide or wider.

Figure 74:
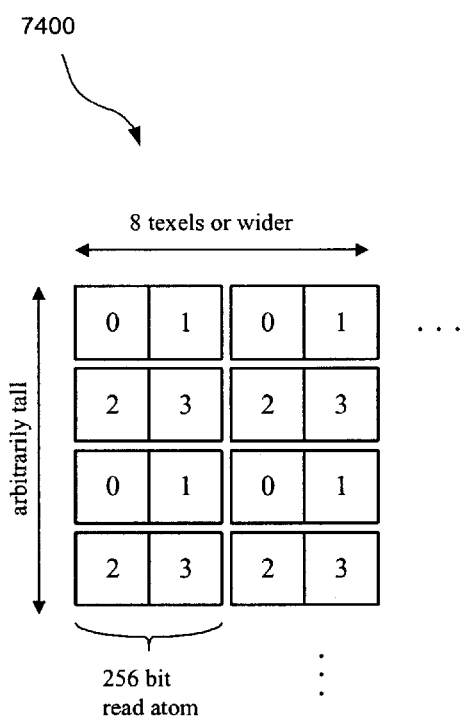
FIG. 74 shows the alignment of mode D in S,T space.

FIG. 74 shows the alignment 7400 of mode D in S,T space. The surface can be arbitrarily tall.

Figure 75:
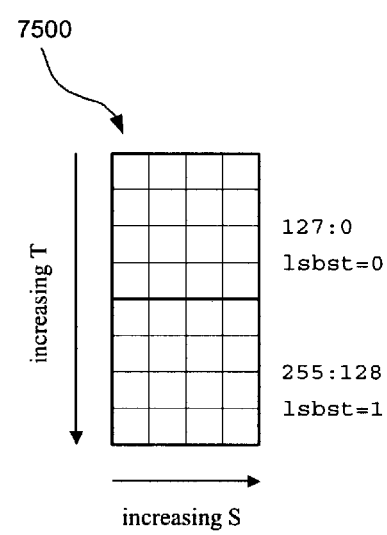
FIG. 75 illustrates mode E.

When a DXT2 to DX127 surface is 4 texels wide or narrower mode E is used. FIG. 75 illustrates mode E 7500.

Figure 76:
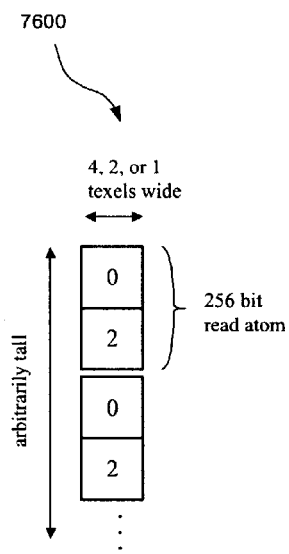
FIG. 76 shows the alignment of mode E in S,T space.

FIG. 76 shows the alignment of mode E in S,T space. The surface can be arbitrarily tall. Note that alignments 1 and 3 are never used.

The DXTn mode (A, B, or C for DXT1; D and E for DXT2-5) is specified to TC's format unit by bits [3:2] of the wrapst context field. In this section lsbst values are labeled on the Figures.

For surfaces shorter than 8 texels, additional wrapping information is used by the tc_fmt unit; explicit height information is conveyed in bits [1:0] of the wrapst context field. "No wrap" indicates to the tc_fmt unit that it should not apply small surface wrapping since the surface is larger than 4 tall.

Figure 77:
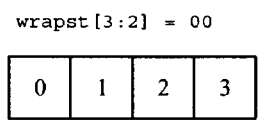
FIG. 77 illustrates alignment blocks and wrapst values for Mode A.

FIG. 77 illustrates alignment blocks 7700 and wrapst values for Mode A. Mode A is used with DXT1 where the surface is 16 texels wide or wider. Surfaces can be allocated in integral multiples of 16 texels; this happens naturally within the definition of a DXTn surface, but not if an NPT surface is attempted.

Figure 78:
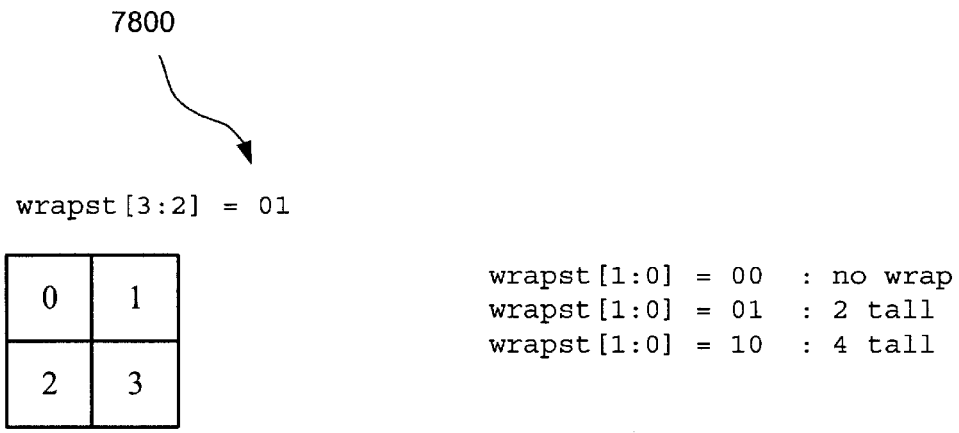
FIG. 78 illustrates alignment blocks and wrapst values for Mode B.

FIG. 78 illustrates alignment blocks 7800 and wrapst values for Mode B. Mode B is used with DXT1 surfaces that are exactly 8 texels wide. If the surface is 8 wide but less than 8 tall, then the blocks marked 2 and 3 can be allocated (but left vacant) to assure 32 byte allocation granularity.

Figure 79:
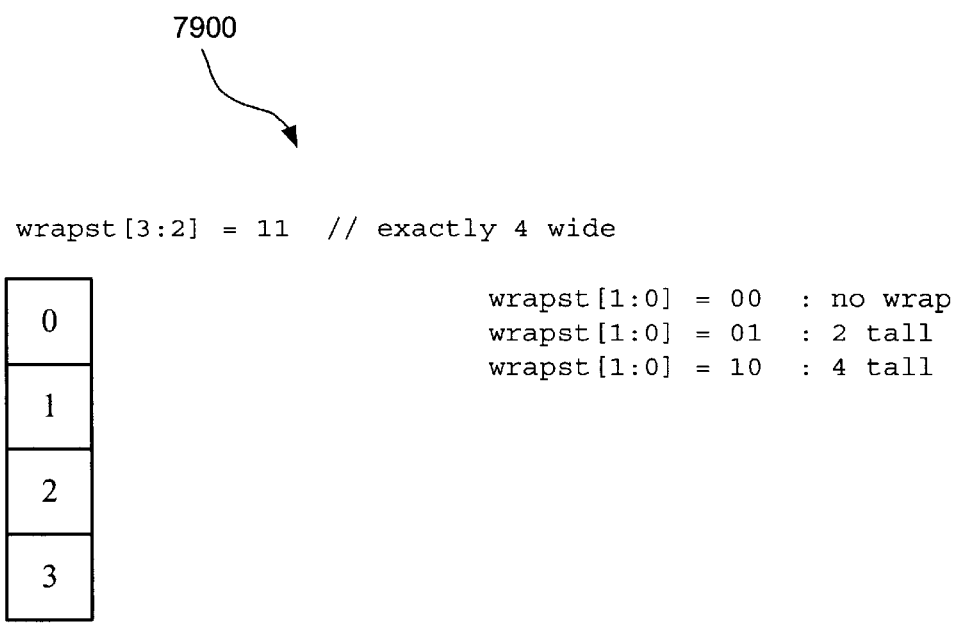
FIG. 79 illustrates alignment blocks and wrapst values for Mode C.

FIG. 79 illustrates alignment blocks 7900 and wrapst values for Mode C. Mode C is used with DXT1 surfaces that are exactly 4 or exactly 2 texels wide. With wrapst[3:2]=11, a surface that is exactly 4 wide is assumed. If the surface is less than 16 tall, all four blocks can be allocated (but left vacant) to assure 32 byte allocation granularity.

Figure 80:
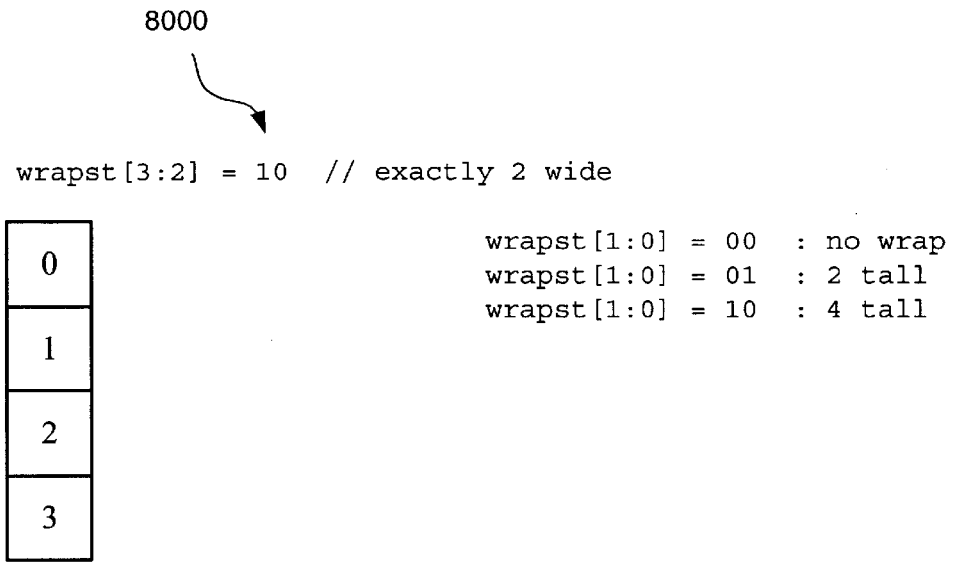
FIG. 80 illustrates alignment blocks and wrapst values for Mode C when wrapst[3:2]=10.

FIG. 80 illustrates alignment blocks 8000 and wrapst values for Mode C when wrapst[3:2]=10. In this case, a surface that is exactly 2 wide is assumed. If the surface is less than 16 tall, all four alignment blocks can be allocated (but left vacant) to assure 32 byte allocation granularity.

Figure 81:
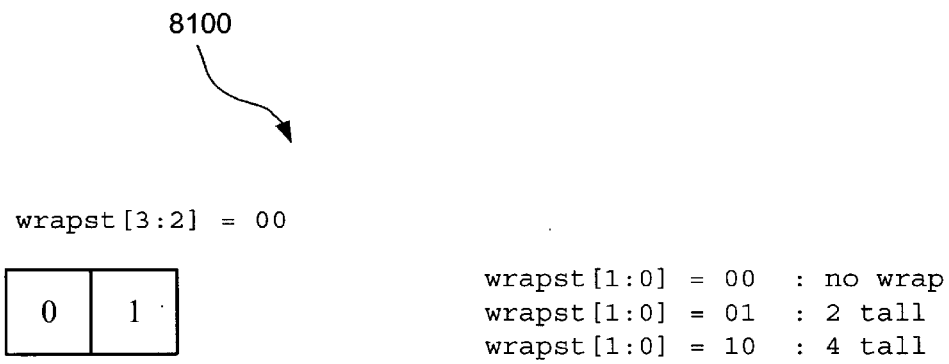
FIG. 81 illustrates alignment blocks and wrapst values for Mode D.

FIG. 81 illustrates alignment blocks 8100 and wrapst values for Mode D. Mode D is used with DXT2 to DX127 where the surface is 8 texels wide or wider. Surfaces can be allocated in integral multiples of 8 texels; this happens naturally within the definition of a DXTn surface, but not if an NPT surface is attempted.

FIG. 82 illustrates alignment blocks 8200 and wrapst values for Mode E with a 4 wide surface, wrapst[3:2]=11. FIG. 83 illustrates alignment blocks 8300 and wrapst values for Mode E with a 2 wide surface in Mode E, wrapst[3:2]=10. Mode E is used with DXT2 to DX127 where the surface is exactly 4 or 2 texels wide. If the surface is less than 8 texels tall both blocks may be allocated (although block 1 may be left vacant) to assure 32 byte allocation granularity.

The wrapst[3:2] code 01 is unused in DXT2-5 formats.

Supporting the five S3 compressed texture formats in the VTA preferably requires the TAD and TC modules to accommodate a mixed linear/tiled format.

In the S3 format, the TAD unit may perform a number of exceptions/additions to the normal linear and tiled mode functions. The TAD unit computes a stride that corresponds to the necessary stride for a linear surface to accommodate the DXTn stride. Although NPT surfaces are explicitly not defined by the DXTn format spec, if an NPT surface is submitted in one of the DXTn formats, the stride register will indicate the number of 4×4 blocks wide the surface is-this stride is used to compute a corresponding linear surface stride.

The TAD categorizes the surface as a mode A, B, C, D, or E (previously described) and overload the meaning of the wrapst bits to convey the specifics of the selected mode. See the previous section on defining small surface wrapping. The TAD also provides the appropriate two S,T selection ("lsbst") bits.

The STM (S, T merge) module accounts for the five modes (A-E) of tiling since three S3-unique rules of adjacency are introduced to support modes A, C, and E. The gcontext s134, s130, st4, and st0 fields are adjusted to reflect an appropriate sub-selection. The gcontext p181, pg8, pg4, and pg0 fields are computed to reflect the S, T space alignment of the four or two 4×4 texel blocks.

In the TC unit the only module that needs to know about the S3 formats is the FMT unit. The format unit modifies its treatment of an implied Y+1 texel location. Modes B and D are equivalent to tiled and linear Y+1 rules, but modes A,C, and E introduce exceptions.

The format unit detects that a format DXT1 though DX127 format is being sent to suppress loading of the palette. In the DXTn modes, the format unit examines the wrapst bits to determine which width configuration is specified and details of the specified mode indicating width and height of a surface; the width and height details are used when computing Y+1 and X+1 wraps. The format unit preferably detects DXT1 or DXT2–5 because the wrapst bits have different meanings for DXT1 versus DXT2–5. See the previous section on small surface wrapping definitions.

Filter Unit (FLT 822 (see FIG. 8))

The filter unit of the VTA is the companion unit to the kernel walker. The filter is responsible for taking in the multi-neighborhood expanded kernel generated by the kernel walker, and filtering the volume of texel data generated by these requests back down into a single quad of 2x2 textured pixels. Three or more filtering modes can be supported, among them, point-sampling, bilinear, and trilinear, with both bilinear and trilinear having the additional option of enabling anisotropic filtering. Like all of the blocks in rampage, the filter operates on 4 pixels, or a 2x2 quad, per clock cycle.

In order to support this, the filter unit is composed of 4 pixel filters. Each pixel filter is composed of a basic bilinear interpolator (bilerp), to perform a bilinear filter on 4 texel values for each pixel. In addition, the result of this bilinear blend can be scaled and accumulated with other bilinear results from previous sub-kernels to generate properly filtered pixels in the advanced filter modes. Thus, the filter can generate a valid quad in each clock in bilinear mode, but may use multiple clocks to produce a valid quad when performing anisotropic or trilinear filtering. As a result the filter is a bubble-producing unit in the VTA pipeline. These bubbles are later collapsed in the combine unit. The controls for the filter are generated in the kernel walker and sent downstream to the filter via two pixel state bits.

For Bilinear filtering, the filter unit receives sixteen texel values for the four pixels in the quad, and the S and T fractions, along with the least significant integer bit of S and T. If the integer bit is set, the bilerps received 1.0-Frac. If the integer bit is clear, the bilerps receive the fraction value. The Multiplier on the output receives a scale value of 1.0 from the kernel walker/TAD portion of the VTA pipeline. Bilinear Filtering is a degenerate case for Anisotropic filtering. It is anisotropic on one filter unit with a max anisotropic ratio set to 1.0. In other words, it is a single iteration through the filter unit.

For Anisotropic filtering the filter performs the same functionality as in bilinear mode, except that each bilinear neighborhood is scaled by a fractional scale value, and a number of scaled bilinear neighborhoods is accumulated over multiple clocks to generate the final textured quad output. The sum of the scalefactors applied to the bilinear neighborhoods always will sum to one, and comes from the anisotropic lookup table. See the kernel walker section for more information on how these scalefactors are derived.

Trilinear filtering can optionally be turned on with either bilinear or anisotropic filtering. When this mode is enabled, the complete filtering operation is done first on one mipmap, then the other. As a result, trilinear-filtered pixels will iterate in the filter for twice the time, and the scalefactors are still always set such that the total of all contributions sum to one.

Figure 84:
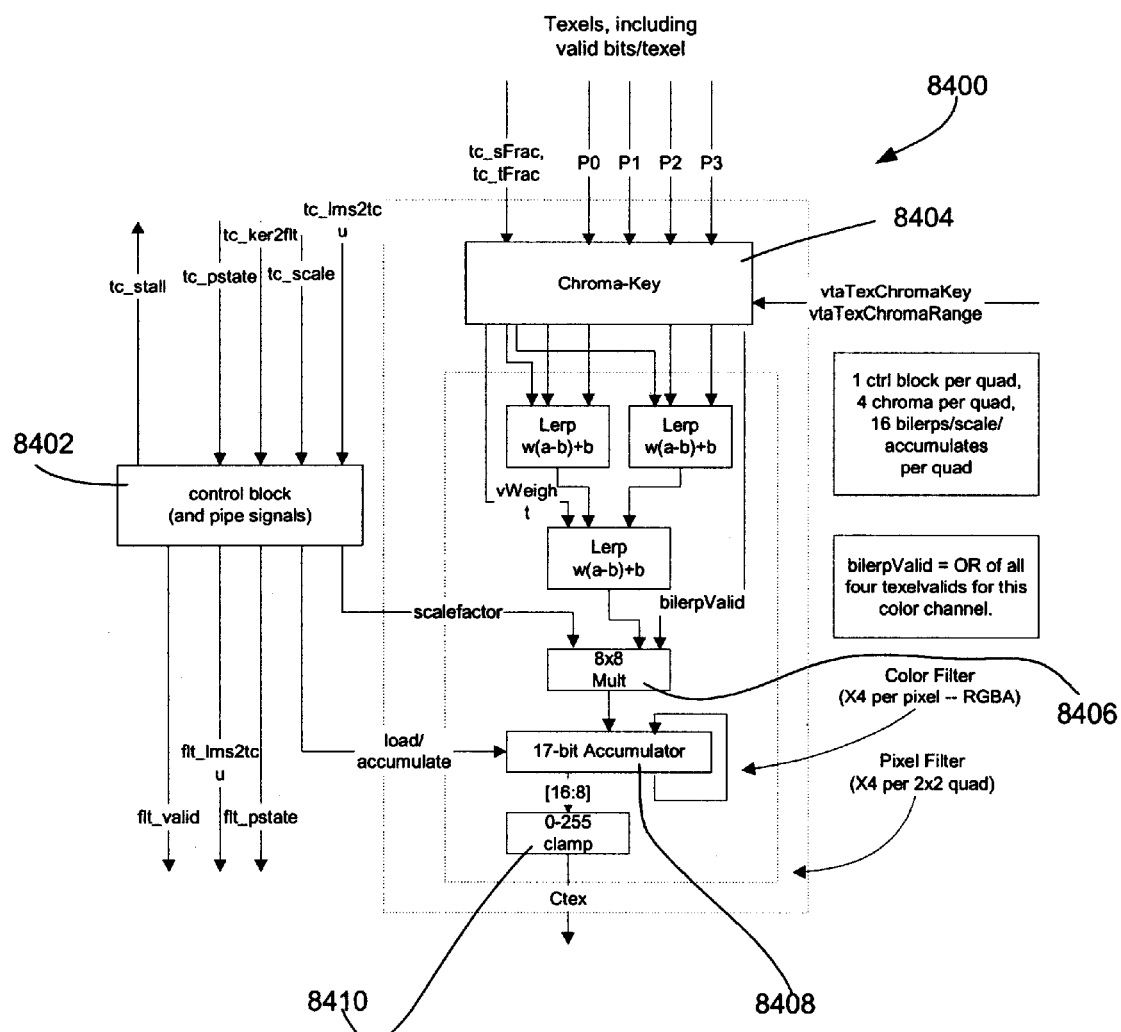
FIG. 84 is a block diagram of the filter unit.

FIG. 84 is a block diagram of the filter unit 8400. The filter unit is made up of a control unit 8402, and 4 pixel filters. Each pixel filter has a chromakey unit 8404 and four color filters, one for each RGBA color channel. Each color filter has a bilinear blender, a scale multiplier 8406, an accumulator 8408, and a clamp/invert unit 8410.

In general the operation of the filter is relatively straightforward. Several filtering modes are provided: point-sampling, bilinear filtering, and trilinear filtering. In addition the bilinear and trilinear filtering can be anisotropic, requiring scaling and accumulation of a number of bilinear-filtered neighborhoods. In all cases the core filter unit of operation is the bilinear filter. If point-sampling is enabled, units upstream of the filter set the bilinear weights appropriately so that one texel value is passed through by the normal operation of the bilinear filter. In this case the incoming scale would be set to 1.0, as it would in pure bilinear filtering. For anisotropic or trilinear filtering, the bilinear results of two or more neighborhoods could be scaled and accumulated to produce the final filtered result. Upstream units control the behavior of the accumulator, control the filter's assertion of valid, and ensure that the sum of the scalefactor weights of all component neighborhoods adds up to 1.0.

The control module operates the selects in the data pipeline. It receives a scale (tc_scale[8:0]) input which gets piped to the scaling multiplier and receives two state bits from the kernel walker (tc_pstate_ker2flt[1:0]) to control the data pipeline. One bit is used to generate the load_accum and hold_accum signals to the accumulator. Another is used to tell the filter when to assert flt_valid. In addition the control block pipes through variables from TC that are needed downstream in the combine unit. These include lms2tcu (either LMSfrac, detail factor or texel area) and miscellaneous pixel state data. The control block also is responsible for controlling the data flow through the pipeline based on the DVS interface.

The Chromakey unit compares the incoming texels against a reference value, derived from either a set of constant registers (taTexChromaKey and taTexChromaRange). There are three modes in which chromakey operates, Traditional Chroma, Chroma-replace, and percentage-passed. The inputs to each chroma unit are four texels, plus the S and T fraction bits (actually 0.0 to 1.0), plus a per-texel valid bit (four total). The valid bits are usually true, except where there's no valid texel (during texture clamping, a possible edge case in mirroring, and point sampling).

For each texel the chroma unit compares the texel value against the reference chroma values and determines whether the texel is chromaed out. A new texel valid is generated: newTexelValid=TexelValidIn &~TexelChromaed . At the end of the first chroma stage, there's four texel values, and four newTexelValids.

In traditional Chroma mode, a texel that passes chroma is replaced with tranparent black. In this mode, with Anti-aliasing and screen door transparency, the most accurate chroma-key output is achieved. In the VTA this is a range check, with the low range set by taTexChromaKey values and the high range set by taTexChromaRange values. An exact check can be accomplished by setting both registers to have the same value.

In chroma replace mode, the passing pixel is replaced with alpha=0 and the color equal to the color of one of the samples. A simple replacement algorithm is used. If a texel is invalid, its alpha is always set to zero. For each pair of horizontal texels, if both texels are valid or both texels are invalid, then texel colors don't change. If one texel is valid and the other invalid, both texels are given the value of the valid one. For vertical replacement, if one set of horizontal texels are BOTH invalid, then the colors are replaced by the texel values from the other set. Finally, if all texels are invalid, then no texel values are replaced.

This can all be implemented by playing with the S and T fraction bits, As shown by the following table. Here texelValids[3:0] correspond to {texel3,texel2,texel1,texel0}, respectively. Or {LR,LL,UR,UL}.

TABLE 13

| TexelValids | Shigh | Slow | T   |                                         |
|-------------|-------|------|-----|-----------------------------------------|
| 0 0 0 0     | SIn   | Sin  | Tin | // No Texels valid                      |
| 0 0 0 1     | 0.0   | Sin  | 0.0 | // Upper Left only                      |
| 0 0 1 0     | 1.0   | Sin  | 0.0 | // Upper Right Only                     |
| 0 0 1 1     | Sin   | Sin  | 0.0 | // Top Only                             |
| 0 1 0 0     | Sin   | 0.0  | 1.0 | // Lower Left contributes all           |
| 0 1 0 1     | 0.0   | 0.0  | Tin | // Left only                            |
| 0 1 1 0     | 1.0   | 0.0  | Tin | // First diagonal                       |
| 0 1 1 1     | Sin   | 0.0  | Tin | // Only Lower Right Chroma'ed out       |
| 1 0 0 0     | Sin   | 1.0  | 1.0 | // Lower right contributes all          |
| 1 0 0 1     | 0.0   | 1.0  | Tin | // Second Diagonal                      |
| 1 0 1 0     | 1.0   | 1.0  | Tin | // Right Only                           |
| 1 0 1 1     | Sin   | 1.0  | Tin | // Only Lower left chroma'ed out        |
| 1 1 0 0     | Sin   | Sin  | 1.0 | // Lower Two contribute all             |
| 1 1 0 1     | 0.0   | Sin  | Tin | // Only Upper right Chroma'ed out       |
| 1 1 1 0     | 1.0   | Sin  | Tin | // Only Upper left chroma'ed out        |
| 1 1 1 1     | Sin   | Sin  | Tin | // All texels valid. Act like nothing's happened. |

Note that there are two S fraction variables, one for each horizontal pair. Also, Shigh Slow, and T only affect the RGB interpolators, Alpha interpolates normally.

A 2×2 percentage passed filter is generated by taking each incoming texel and comparing it against the reference value. A 1-bit pass/fail for each input is generated, resulting in values of 0x00 or 0xff for each channel. To be consistent with the normal chroma modes, a choma match (fail) will set the texel value to 0x00, or transparent black. This value is then simply output to the bilinear interpolators, which then perform the standard percentage-passed filter.

Figure 85:
FIG. 85 depicts a CSA tree.

An embodiment takes advantage of the fact that the equation can also be written as follows: result=w*B+(1−w)*A. This can be implemented with little more than the logic needed for a single 8×8 multiplier. Since (1−w) can be represented as a bit inversion of w+0x00, the sum of the above two products can be generated by summing A plus eight partial products, where each partial product is a shifted version of A or B, based on each fractional bit of w. Since the partial products are a muxed A or B term, this logic is sometimes called a muxlerp. The 9 partial products are summed with a CSA tree 8500, as shown in FIG. 85. As an example, consider a weight of 0xB7. In this example the final output is the upper 8 Z bits.

Figure 86:
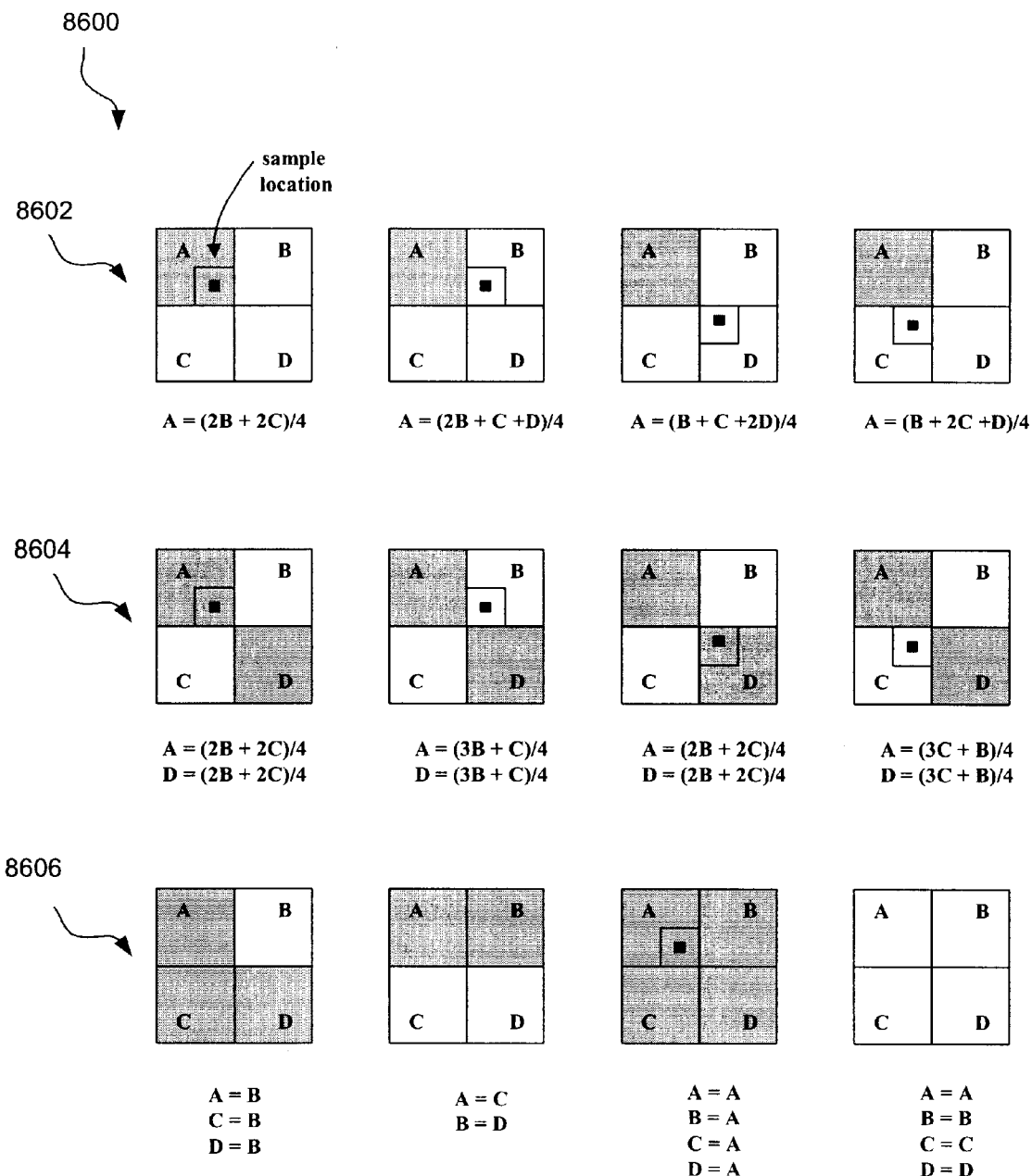
FIG. 86 depicts a model for color substitution.

FIG. 86 depicts a model 8600 for color substitution. Four bilinear texels (A,B,C, D) are shown in FIG. 86. The gray regions indicate a chroma color or chroma range match for that texel. The S and T sampling quadrant and color substitution function is indicated for each case of the twelve cases shown. The substitution function is rotationally independent. For example, if only B were chroma-matched instead of A and the sampling point were on B then the substitution function would be B=(2A+2D)/4.

The first row 8602 illustrates the four sampling quadrant cases where one of four bilinear texels matches chroma (in this case texel A). Basically two different functions on texel data are applied to determine the substitution color for A.

The next row 8604 shows the four sampling quadrant cases of two diagonal texel colors matching chroma. Again, two different functions are applied to determine the substitution colors for the two keyed out texels (A and D).

The third row 8606 shows the four remaining cases. Of these remaining cases, only the case where all texels are keyed out (second from right) is slightly tricky. For this case the alpha values are set to zero. But, to preserve the color of the keyed texel as a chroma match, the point sampled color from the S and T sampling coordinate is replicated to the other three texels. The bilinear blend unit thus produces the equivalent of a point sampled color for that pixel. Note that if color substitution is turned off the resulting pixel color is black with alpha equal to zero.

Two factors determine what the chroma module does with chroma match information and the substitution colors: (1) whether or not color substitution is enabled, and (2) if bilinear blending is turned on for the color channels.

If color substitution is turned off, the color substitution calculation is ignored and the output of a chroma key match is transparent black. This applies to both point sampled and bilinear texels.

If color substitution is turned on, and the texture mode is point sampled RGB, then a chroma match results in an alpha of zero for the matched texel, and the point sampled color passes through the chroma module unmodified. For bilinear chroma color substitution, the substitution function generates the colors for chroma-keyed out samples.

FIG. 87 is a table 8700 that shows all the combinations of color substitution, bilinear RGB, and bilinear alpha. The column labeled "require all 4 texels" indicates that all four texels are required even if the S and T coordinates are exactly centered on a texel row or column. The memory controller and texel cache is optimized to not bother with the zero bilinear contribution row or column texels. However, since the chroma module uses adjacent colors to reconstruct a substitution color, this memory fetch optimization needs to be overridden sometimes. The override to force fetching of all four texels can occur when bilinear RGB blending is enabled. Note that bilinear alpha alone does not indicate the need for all four texels to be fetched.

Figure 88:
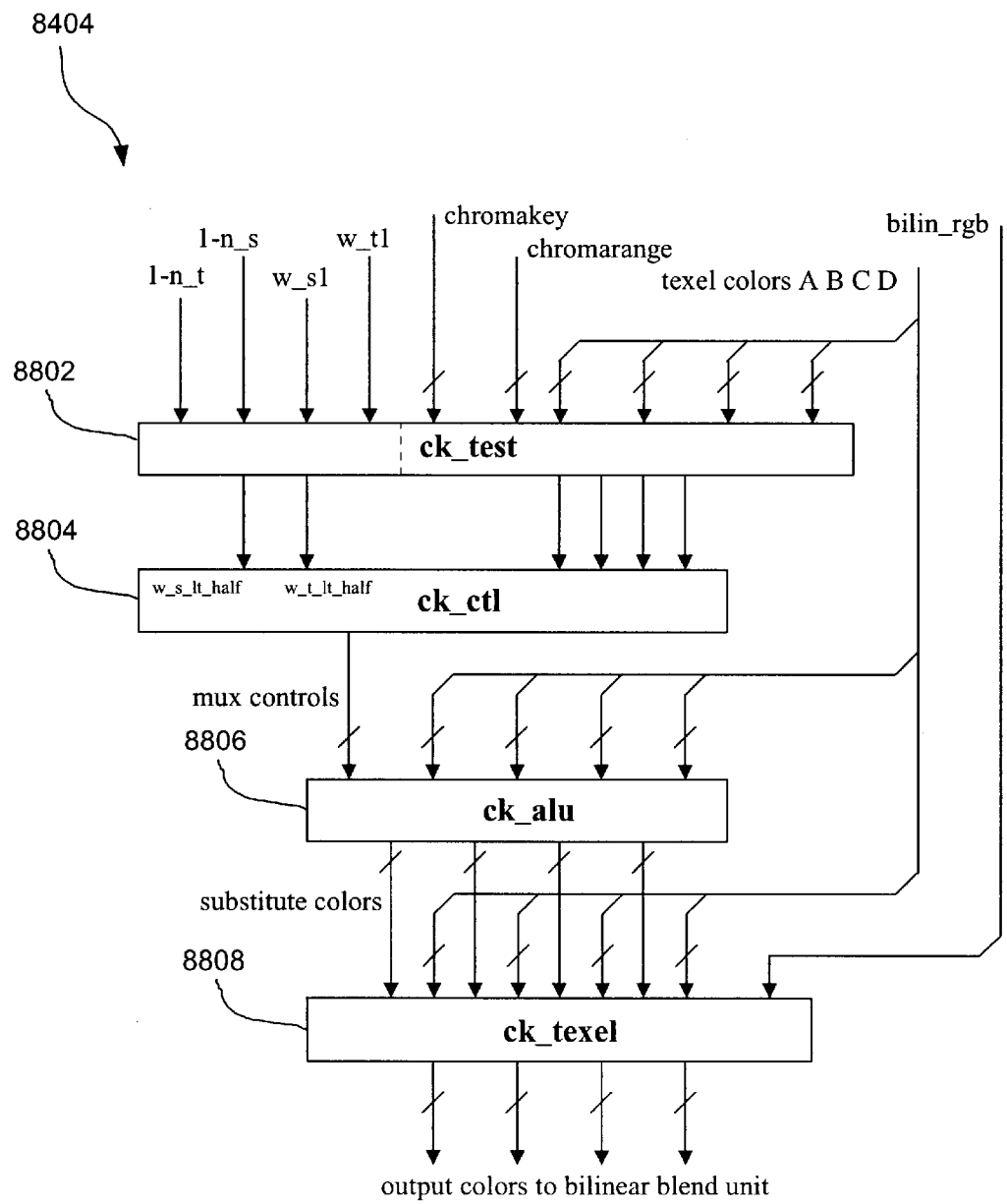
FIG. 88 depicts the structure of a chroma key module.

The structure of a chroma key module (or "unit") 8404 is shown in FIG. 88. The chroma key matches are determined first, based on incoming texel colors and the values set in the chromakey and chromarange registers. Once the chromamatches are determined and collected into a mask value, 16 control switches are computed by the mux_ctl function. These mux controls are used to generate the substitution function to be executed by an 8 bit four-way adder. Based on the encolorsubstitution bit and the bilinear_rgb bit passed in from upstream, the final texel color for each of the four texels is determined.

The chroma test function (ck_test) 8802 tests an incoming color against the chroma match criteria set forth in the chromakey and chromarange registers. The combined results of chroma testing the four incoming texel colors form a mask with bits set to indicate a chroma match. The ck_ctl module 8804 generates a set of mux controls that feed into the ck_alu funtion 8806. This function computes substitution the color(s). The final output color is determined by the ck_texel module 8808 which selects among (1) generated colors (chroma and colorsubstitute enabled), (2) original colors (as is the case of chroma being disabled), and (3) black (chroma enabled and colorsubstitute off).

The ck_test module is responsible for generating the mask value which indicates if a color matches chroma. As part of this task, ck_test observes the S and T weights (w_s1 and w_t1 as well as the 1-n signals) and determine which quadrant the sample point is in. This information is conveyed through the w_s_lt_half and w_t_lt_half signals. Observing the S and T weights is preferred at this step because the ck_test function preferably is able to compute a special chroma mask value under certain conditions: (1) S is clamped to 0 or S is clamped to 1, (2) T is clamped to 0 or T is clamped to 1, or (3) all 4 texels match chroma and bilinear RGB is enabled. Both (1) and (2) can occur together. And (3) can occur independent of (1) and (2). The S and T weights communicate a "clamped to 0" or "clamped to 1" condition by overloading the weight value, as shown in the following table.

TABLE 14

| Weight code | Description |
| --- | --- |
| 0.00000000–1.00000000 | |
| 1.10xxxxxx | Weight value of 0, clamped to 0 |
| 1.11xxxxxx | Weight value of 1, clamped to 1 |

Figure 89:
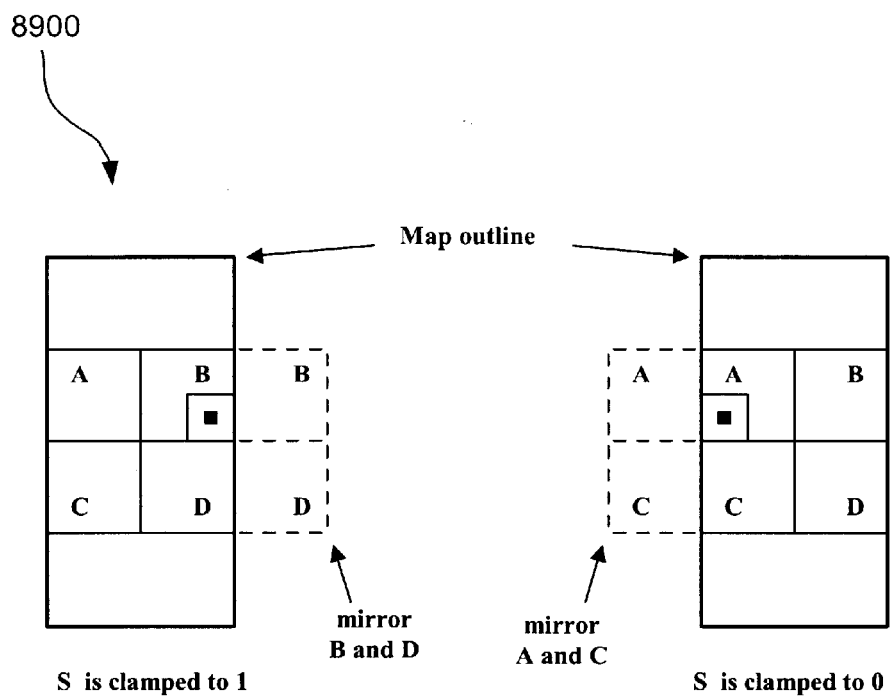
FIG. 89 depict a model for clamping at 1.
Figure 90:
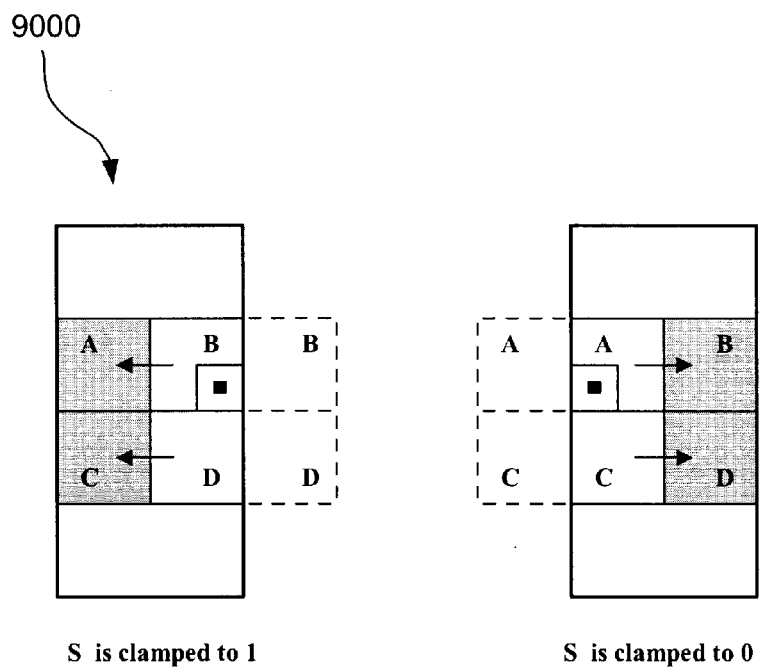
FIG. 90 depicts a model for clamping at 0.

When clamping occurs on S or T the texels on the inside clamped edge of the map need to be mirrored. FIGS. 89 and 90 illustrate this for S clamping at 1 and S clamping at 0. The four sample alignment is assumed even (one_minus flag de-asserted) when clamping is asserted in that dimension.

FIG. 89 depict a model 8900 for clamping at 1. FIG. 90 depicts a model 9000 for clamping at 0. Color mirroring about the clamp axis is accomplished indirectly through manipulation of the chroma mask bits generated by the ck_test function. The color substitution function for the two cases shown in FIGS. 89 and 90 is a horizontal copy of the non-chroma colors. This has the same post-bilinear effect as mirroring the texel color inside the map boundaries.

Note that, while the mirrored texel color does not contribute to the post-bilinear color, it is essential to not allow a mathematically irrelevant color into the raw color substitute function. By coercing the chroma mask, the correct post-bilinear result is achieved without having to pre-copy the incoming color data (the ck_test) when clamping is asserted. Note also that the color substitution values generated for the zero contribution texels are merely a byproduct of generating the 1.0 contribution texels.

Figure 91:
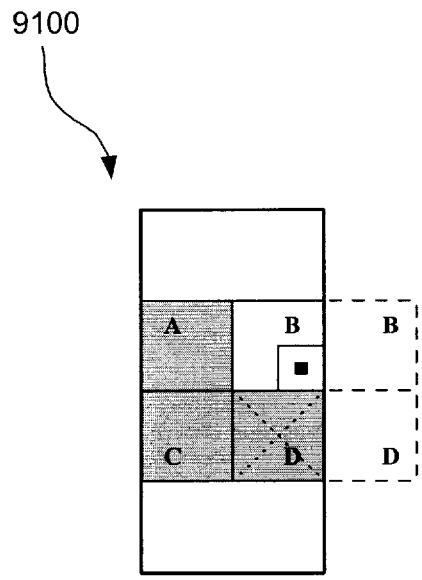
FIG. 91 illustrates a model for clamping according to another embodiment.

FIG. 91 illustrates a model 9100 for clamping according to another embodiment. In FIG. 91, assume S is clamped to 1, and color D matches chroma. The chroma mask bits would be set to show A, C, and D as matching chroma, thus yielding the correct post-bilinear result, of B bilinear blended with the color substituted value for D (which should be B in this case). With the chroma mask coerced to show A, B, and D matching, the color substitution for D yields B, the correct result. Symmetry can be used to show this works for all rotations of a single chroma match and clamp edge.

Figure 92:
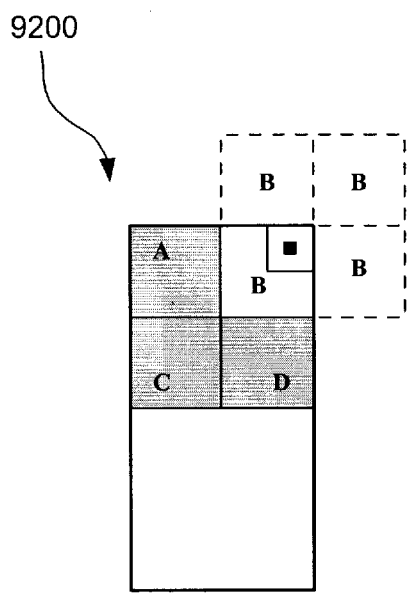
FIG. 92 illustrates a model for clamping according to yet another embodiment.

FIG. 92 illustrates a model 9200 for clamping according to yet another embodiment. If clamping occurs in both S and T dimensions, as shown in FIG. 92, the correct post-bilinear result is achieved through coercing the chroma mask to show A, C, and D as chroma matches. The arrows indicate B is copied to the other texels.

Texture maps (or LOD levels) that are 1 color wide are always clamped to 0.0 in the S dimension. Texture maps that are 1 color tall are always clamped to 0.0 in the T dimension.

Other special cases may need to be handled occur when all four texels match chroma. When this happens, the desired result is to preserve what would have been the point sampled color. To achieve this, the mask is coerced to indicate a non-chroma match on the point sampled texel, and matches on the remaining three. This causes all four texels going to the bilinear blend unit to assume the point sampled color. Setting all four texels to the same color may be necessary because the bilinear blender may or may not rely on weight clamping to achieve point sampling in some cases. All four alpha values are set to zero.

If clamping is asserted, the clamp values are used to uniquely determine which texel should be used for the point sampled color. For example, if S is clamped to 1.0, then either B or D is the point sampled color; if T is asserted then the choice is uniquely determined. If T clamping is not asserted, the bilinear blend's T weight is examined to determine if B or D is to be preserved (and copied to the other three).

The bilinear blenders are made up of three linear interpolators (LERPs). A linear interpolation is done on the upper left and upper right texels according to a horizontal weight, and similarly on the lower left and lower right texels according to a horizontal weight. Then the results of these are interpolated based on a vertical weight. The equation used for each of the lerps for interpolating between A and B with a weight w is as follows: result=A+w*(b–a), where weight is a fractional 8-bit range between zero and one. A nine-bit weight is sent to each LERP such that valid weights range between 0x000–0x100. Weights at either extreme represent passing out A or B, and weight 0x001–0x0ff represent a linear interpolation between A and B.

Figure 93:
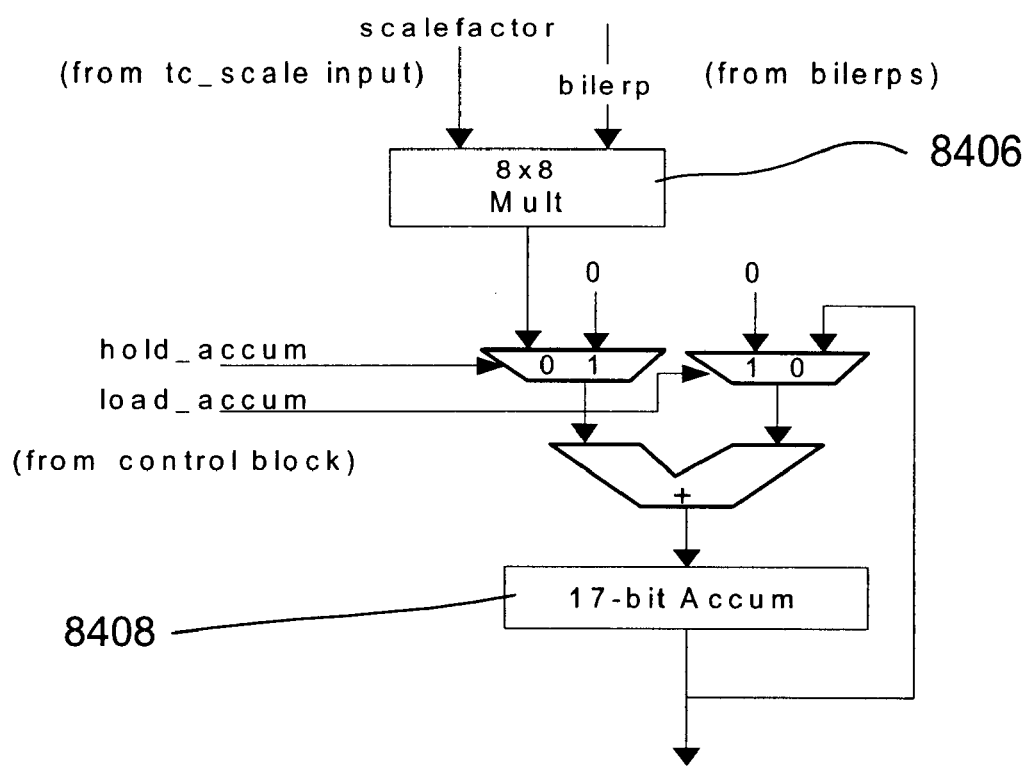
FIG. 93 is a detailed diagram of the multiplexer and accumulator.

FIG. 93 is a detailed diagram of the multiplexer 8406 and accumulator 8408. The Mult is an 8×8 mult, outputting 16 bits. Its inputs are the incoming scalefactor, the incoming bilinear blended texture color, and valid bits indicating the status of the blended texels. The accumulator is 17 bits to handle overflow. They are used to scale each bilinearly interpolated output and sum them together, performing the intermediate stages of the anisotropic filter, and performing the scaling and summing of neighborhoods when trilinear is enabled. The control for the accumulator is based on the ker2flt inputs. Setting both hold_accum and load_accum at reset will zero the output. Hold_accum will be set for invalid packets to hold accumulator values until the next valid token comes down the pipe.

The final stage of the filter extracts the upper 9 bits from the accumulator, and clamps this to 0–255. The data is then sent onward to the combine unit. There is no need to invert the output, since the input of the combine unit is programmable with a full (1.0–x) functionality. The filter's output is clamped to a range 0x00 to 0xFF. Bits in the tcu control registers describe how to convert this value to the overbright s.4.8 format which is used in the combine unit.

Combine Unit (COM) 804 (see FIG. 8)

The VTA Combine Unit includes Texture and Color Combine Units. The VTA solution provides compatibility for all texturing capability exposed within the DirectX, OpenGL and Glide APIs. In addition, unique features are added for the support of the OpenGL lighting, difference multiplexing, over-bright lighting, light-map distance attenuation, shadow-map attenuation, matrix transformations and ARGB dot products.

Figure 94:
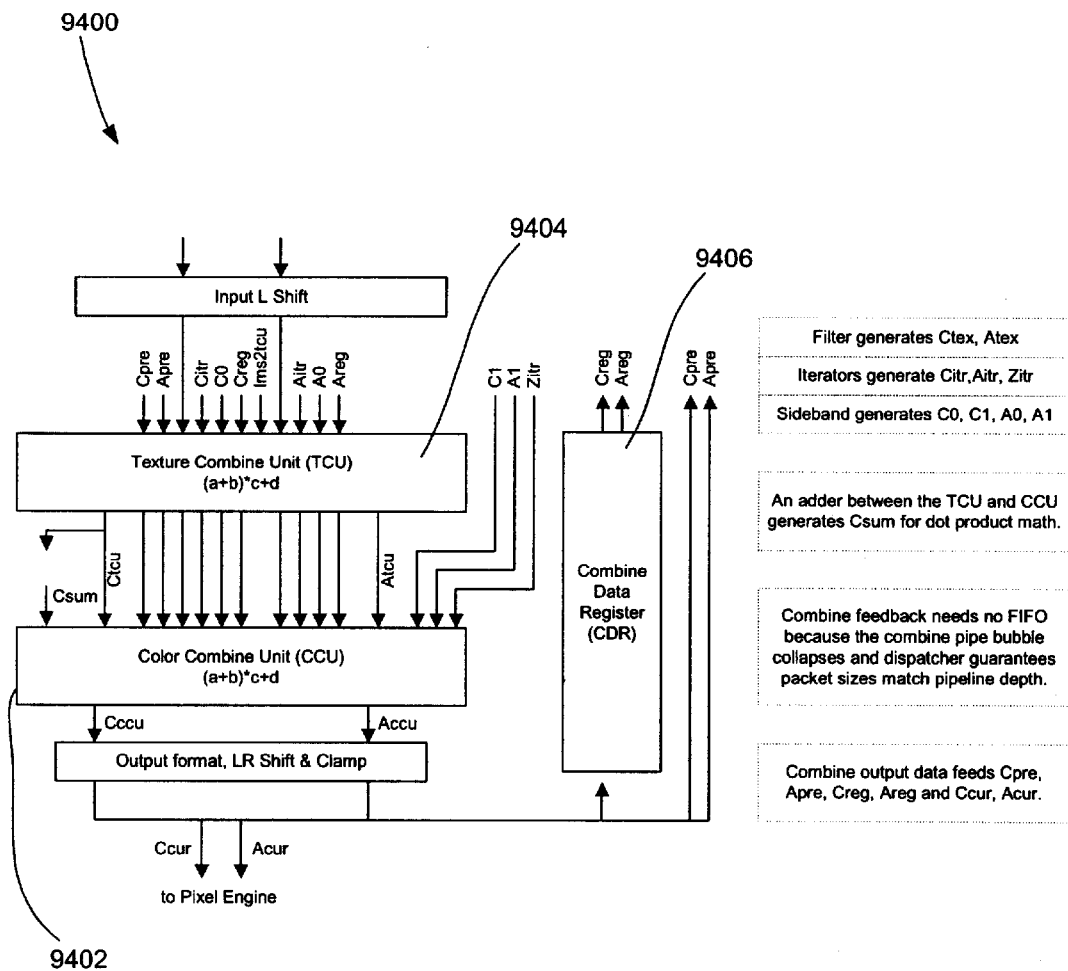
FIG. 94 shows an overview of the combine unit within the VTA.
Figure 95:
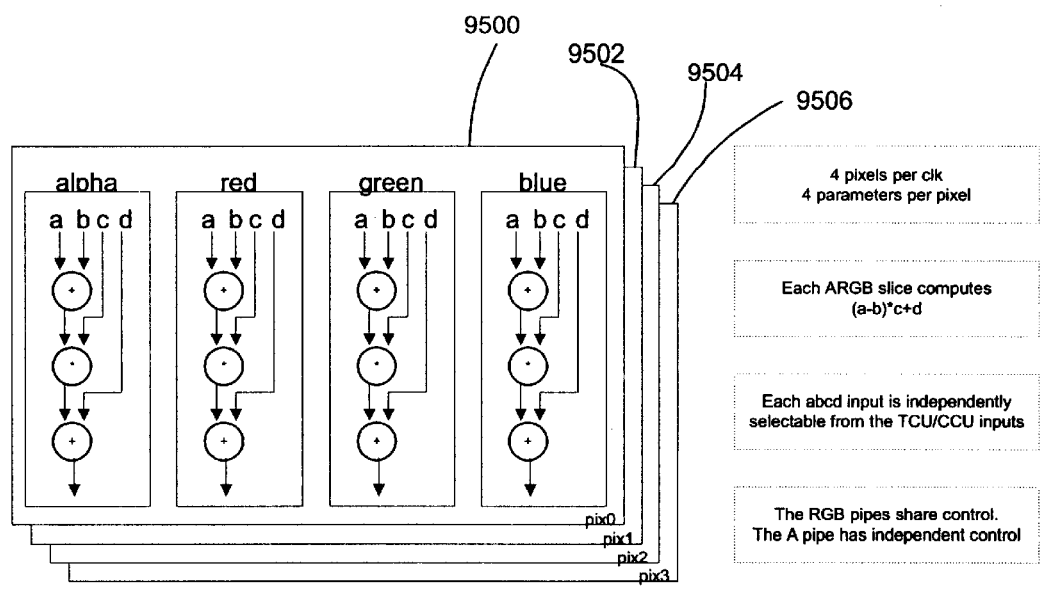
FIG. 95 illustrates the Texture and Color Per-Pixel Combine Units.

Features of the Combine Unit 9400 are divided between the Color Combine Unit (CCU) 9402, the Texture Combine Unit (TCU) 9404 and the Combine Data Register (CDR) 9406. FIG. 94 shows an overview of this organization within the VTA. FIG. 95 illustrates the Texture and Color Per-Pixel Combine Units 9402, 9400. As shown, each of the Texture and Color Combine Units incorporate 4 sets 9500, 9502, 9504, 9506 of pixel processing units consisting of ARGB arithmetic processing units and the Combine Data Register provides a single level of texture data storage.

The Combine Unit ARGB arithmetic units perform "(a+b)*c+d or (a<b)?c:d" math on inputs selected from filtered texture values, iterated colors, previous combine results, registered combine results and programmable constants. Inputs for the arithmetic function may be independently selected for color and alpha slices and independently manipulated through "1−x" input formatting blocks. Once formatted, the arithmetic operations of each of the pipeline slices are performed in over-bright format (1.4.8) with non-over-bright clamp and shift options.

The Texture Combine Unit (TCU) combines data from the current filtered texture, the previous combine unit output, the registered combine unit output, the current evaluated (i.e. iterated) color, the current evaluated (i.e. iterated) alpha, a constant color or a constant alpha value. Inputs from the filter may be optionally shifted left 0 to 3 bits for over-bright evaluation. And, additional inputs from the LMS unit provide arithmetic access to LOD fraction, detail factor, or texel area.

The Color Combine Unit (CCU) combines data from the current TCU output, the current filtered texture, a previous combine unit output, a registered combine unit output, an evaluated (i.e. iterated) color, an evaluated (i.e. iterated) alpha, a constant color or a constant alpha value. Additional functionality provides a Chroma-key check which allows pixels matching a chroma value to be invalidated before writing the frame buffer.

Further CCU functionality provides output formatting to provide for a final "1−x" data-munge, a left-right shift of 0 to 4 positions and an optional clamp to non-over-bright. The "1−x" option provides for legacy support and new options for data headed for recursion or the pixel engine. Similarly, the left-right-shift option provides for d3d base-2 multiply, general base-2 division and mechanism for over-bright data conversion.

The Combine Data Register (CDR) provides a mechanism for storing and re-using texture data from one VTA texture pass to another. This feature allows for the non-immediate use of a feedback texture as well as the re-use of a feedback texture.

The texture and color combine units are composed per-pixel R, G, B and A units. Alpha channel units select inputs from a variety of alpha sources and the color channel units select inputs from a variety of color and alpha sources. The input selection options are shared for the R, G and B channels and independently controlled for the A channels.

RGBA iterators generate 25-bit values yielding 13 MSBs of pixel data and 12 LSBs for error accumulation across the (x,y) screen range. The 13-bit iterator pixel data is forwarded to the combine unit inputs as an over-bright color in s.4.8 format.

Each input to the "(a+b)*c+d" math is sent through a "1−x" function. This function provides the following formatting options for each a, b, c and d input.

TABLE 15

Mode[1:0] = 00: output = input
Mode[1:0] = 01: output = −input (for 2s complement negate)

TABLE 15-continued

Mode[1:0] = 10: output = input − 0.5 (for bias to d3d 1.0 to −1.0 range)
Mode[1:0] = 11: output = 1.0 − input (for flip around 0.5)

A min-max function provides for an alternative evaluation of "(a+b)*c+d" to create "(a<b)?c:d". Each combine unit can also optionally perform a min-max function. In this mode, the output is determined by a magnitude comparison of the terms selected for a and b. The output in this mode evaluates to either input c or d.

A RGB adder is included to provide the TCU sum of R+G+B as an input to the a, b, c and d muxs of the CCU. This additional input provides for dot product arithmetic within the CCU.

The output of the TCU has the option of being clamped to 1.0 for compatibility with legacy systems and outputs from the CCU have options for "1−x" formatting (same as above), a 4 bit left or right shift and a clamp to 1.0. The precision throughout the Combine Unit pipeline is [−16.0, 15.999] overbright while the 1.0 clamp options allows for a [0,1.0] legacy compatibility mode.

Multi-texturing support is accomplished through dispatch alignment from the head of the Combine Unit to the base of the Combine Unit. Once the output is computed in the TCU and CCU, subsequent texture iterations can cause the result to get sent back for additional combine operations. The VTA dispatcher sends packets sized to match the latency of the combine unit pipeline. The combine unit performs bubble collapsing of invalid data such that valid data gradually fills every stage of the combine pipe. Once the entire pipe is full, the next valid data will come from the next texture iteration, and the combine unit achieves data re-circulation. This process continues until the final texture iteration (iteration zero) has completed, at which point the resulting pixels are sent to the pixel engine (PE).

Figure 96:
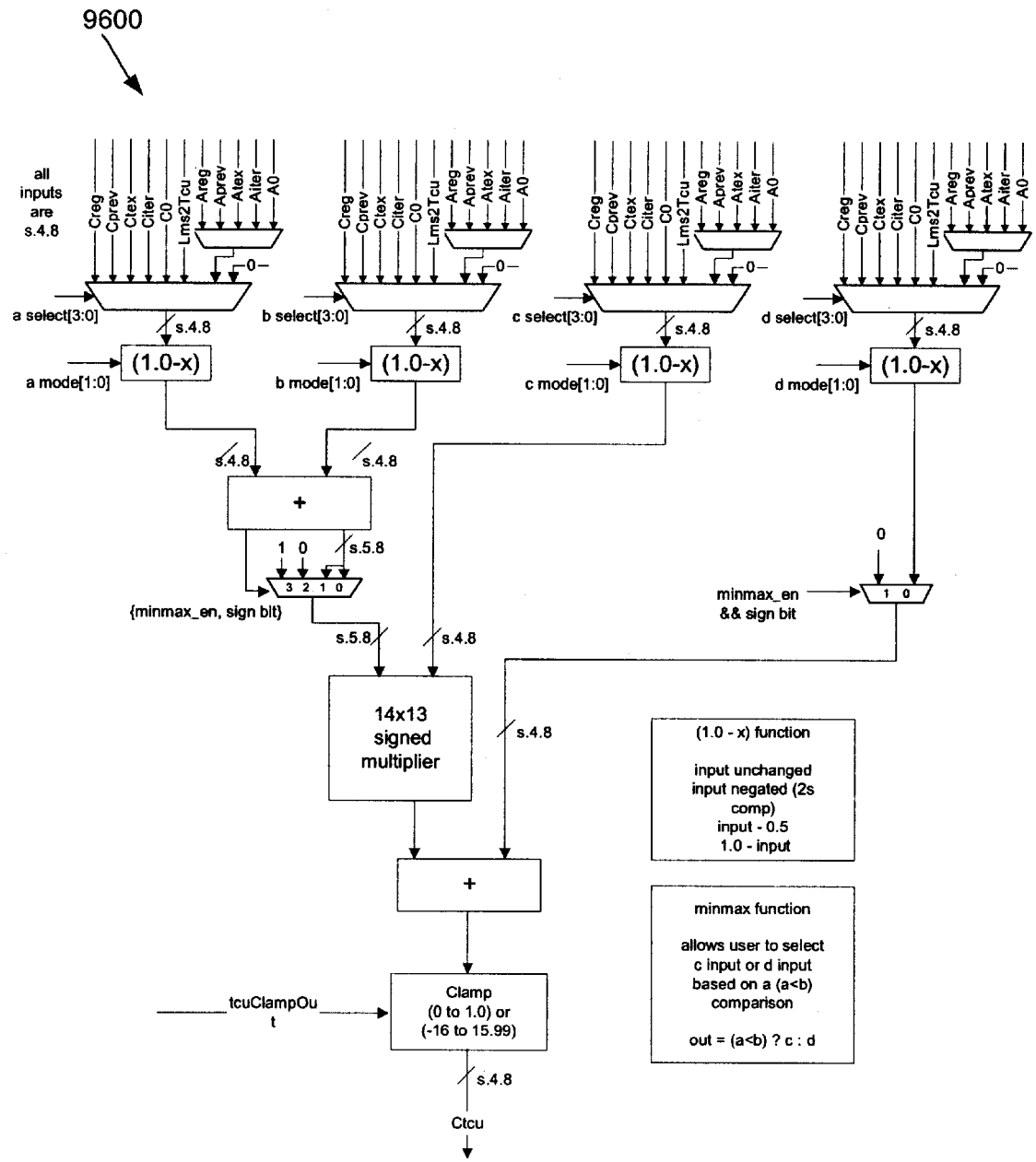
FIG. 96 illustrates the color path (for each RGB) of the TCU.
Figure 97:
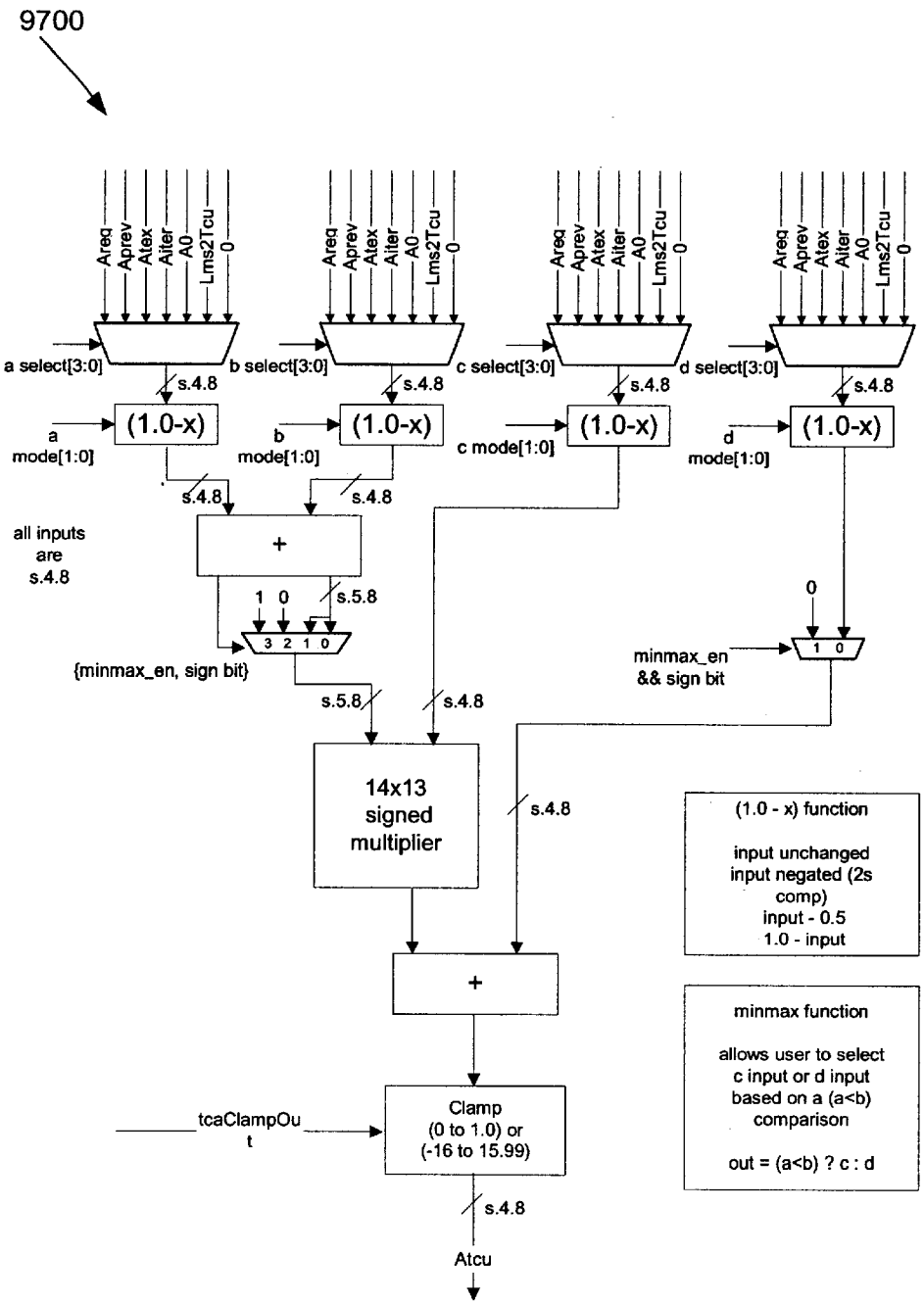
FIG. 97 depicts an alpha path of the TCU.
Figure 98:
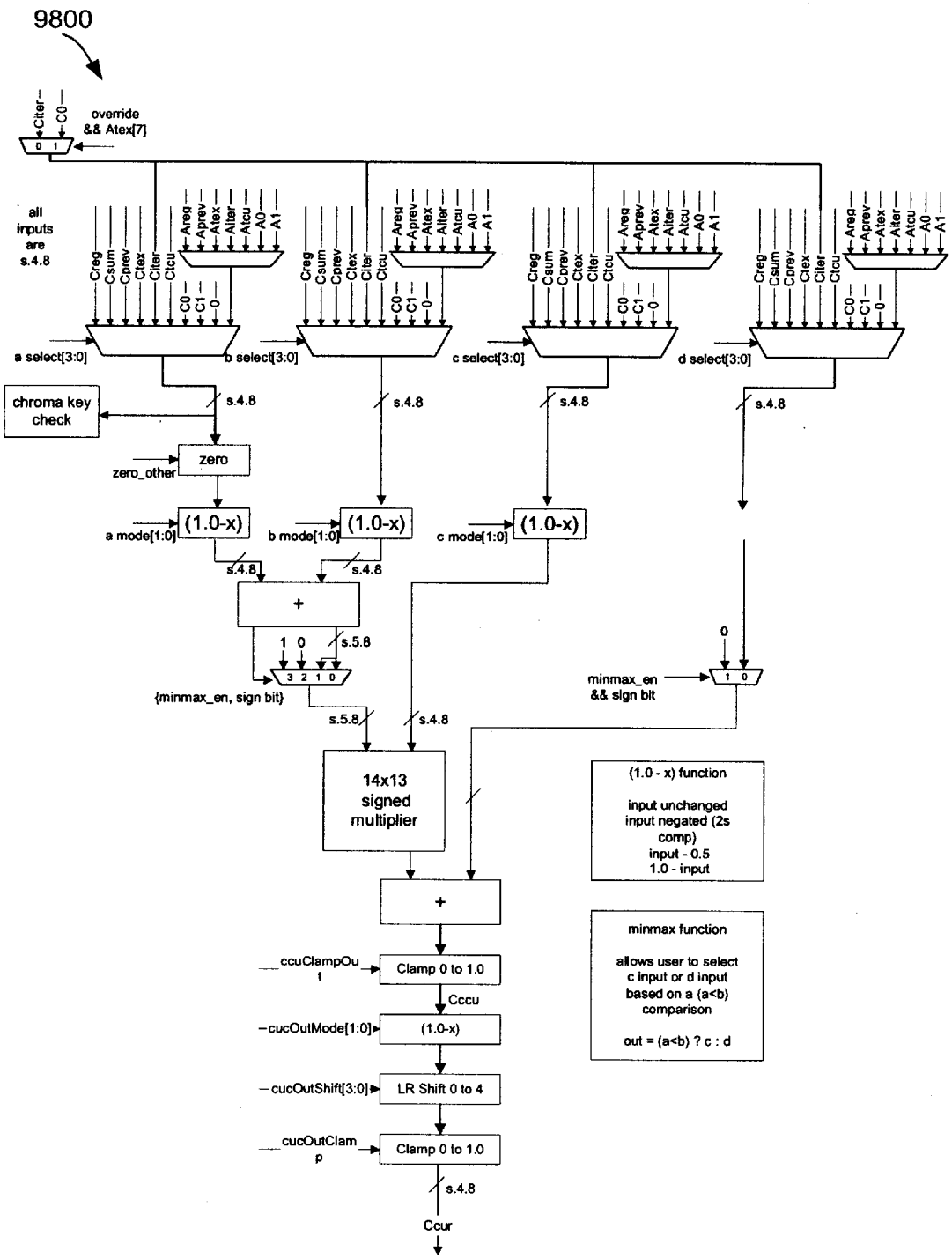
FIG. 98 shows a color path (for each RGB) of the CCU.
Figure 99:
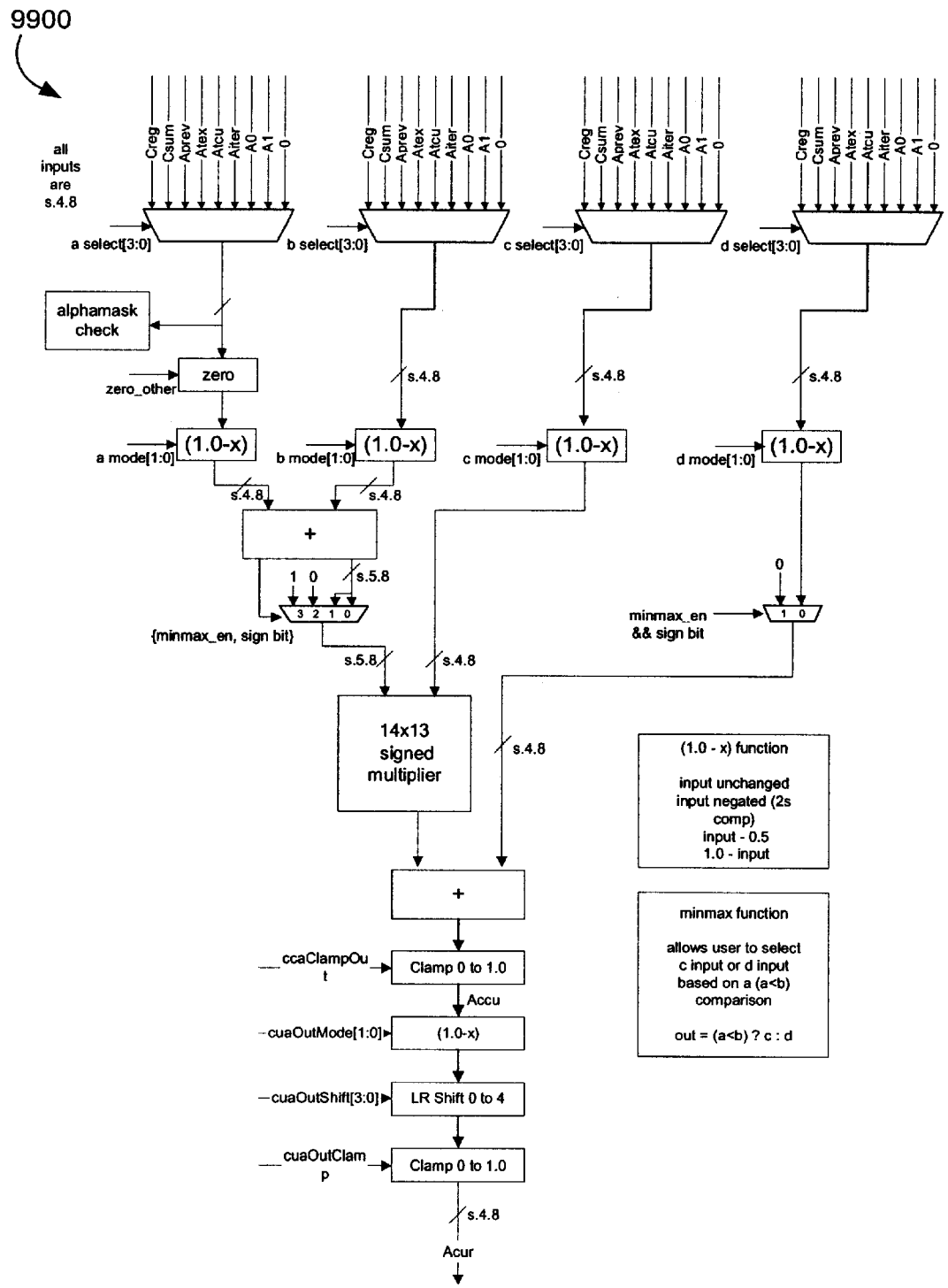
FIG. 99 illustrates an alpha path of the CCU.

FIGS. 96–99 show block diagrams of color and alpha slices of the TCU and CCU. More particularly, FIG. 96 illustrates the color path 9600 (for each RGB) of the TCU. FIG. 97 depicts an alpha path 9700 of the TCU. FIG. 98 shows a color path 9800 (for each RGB) of the CCU. FIG. 99 illustrates an alpha path 9900 of the CCU. The inputs to the color channels and the alpha channel are all independently selectable. LFB data is muxed in with evaluated (i.e. iterated) color data, since LFB operations and 3D operations are mutually exclusive.

Figure 100:
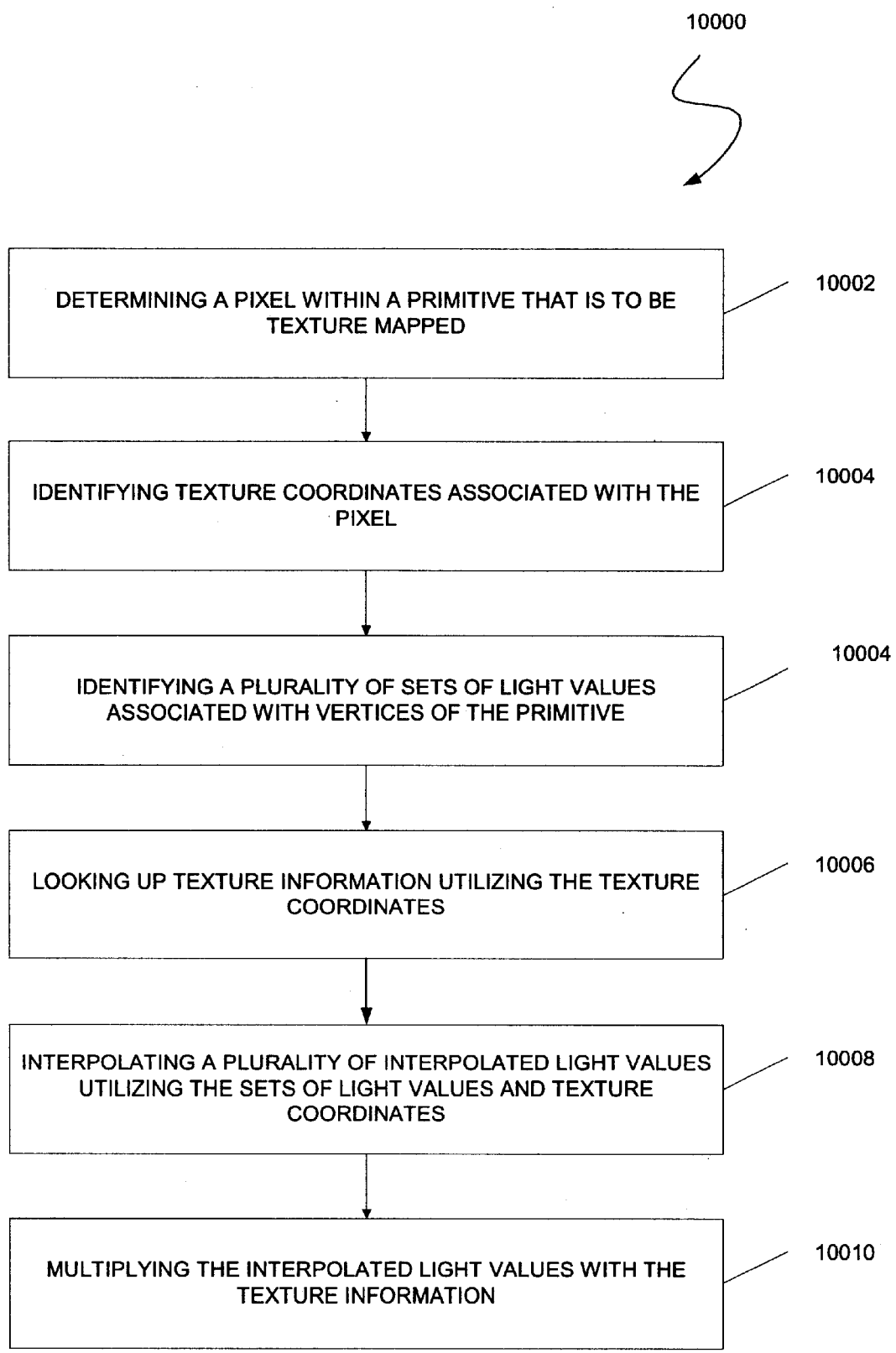
FIG. 100 illustrates a method for texture lighting, in accordance with one embodiment.

FIG. 100 illustrates a method 10000 for texture lighting, in accordance with one embodiment. It should be noted that the present method 10000 may be carried out in the context of the TCU of FIG. 96 or in any other desired context. Initially, in operation 10002, a pixel is determined within a primitive that is to be texture mapped.

Next, in operation 10004, texture coordinates associated with the pixel are identified along with a plurality of sets of light values corresponding to vertices of the primitive. As an option, each set of light values may include an r-value, g-value, b-value and a-value. Still yet, the sets of light values may include a set of diffuse light values or a set of specular light values.

Texture information is then retrieved in operation 10006 utilizing the texture coordinates. A plurality of interpolated light values is then calculated utilizing the sets of light values and texture coordinates. See operation 10008. As an option, the interpolated light values may form a dot product with the texture information. Such interpolated light values are then multiplied with the texture information, as set forth in operation 10010.

As an option, at least eight sets of lighting values are utilized for increasing the accuracy of the manner in which the texture information is lighted. Further, each light value may have a range that is capable of exceeding (1) for increasing the accuracy of the manner in which the texture information is lighted. Still yet, each light value my have a range between (−8) and (8).

More information will now be set forth regarding the TCU of FIG. 96 with which the foregoing method may be carried out.

LMS2TCU of the TCU can be either the LMS_frac, Detail_Factor, or TexelArea. LMS2TCU is generated in the LMS circuit, and sent through the pipe to the Combine unit. Since the texel area is a float, the LMS circuit needs to scale it down to a useable range. A proposed way of doing this is to pass the exponent of the texel-area downstream, optionally adding it to the software-set exponents of the incoming textures, along with the exponent of the evaluated (i.e. iterated) color. The output of the CCU is then shifted left by this amount and clamped. Another method is to add the exponents of the inputs to the TCU, and then use this to select less significant bits from the output of the TCU multiplier, clamping if upper bits are set.

The multiply or c input of the TCU can have its (1.0−x) function polarity inverted by an incoming signal that indicates LMS mipmap level for the even/odd TREX. This supports "old trilinear" modes of legacy systems. Since this mode is legacy, operation of "old trilinear" can be defined only for certain cases if desired. If the "old trilinear" bit is set, software can set the multiplier mode to be either 00 or 11 to perform either a nop or the full (1.0−x). When the mipmap level indicates it, the polarity of the (1.0−x) function will be inverted. This is equivalent to the old behavior of performing an xor of reverseblend and LODB[0].

According to one embodiment, non-overbright clamping can be performed by optionally clamping data to the range 0 to 1.0. Otherwise the full overbright range can be used (−16 to 15.99). The clamping is controllable in the TCU and CCU outputs.

The "a" term of the CCU can be used to perform a chroma key or alphamask check, and optionally zero used as the add term instead of "a".

VIDDEV uses tcu→ccu→tcu→ccu for multiple passes. The chromakey and alphamask check can be performed multiple times for various iterations. Since uses can be envisioned for extending this functionality, one embodiment can support such testing in multiple passes. chroma/alpha checks can be independently enabled or disabled for each pass, and the results from valid fails are OR'd together for the final result. PE will then determine whether to invalidate or not based on these masks. Overbright colors greater than 0xFF are clamped to 0xFF for purposes of chroma comparisons.

Compatibility can be programmed in software by setting up evaluated (i.e. iterated) alpha to perform the computations of evaluated (i.e. iterated) Z in an additional VTA pass if desired.

LMSfrac, detail factor, and Texel area can be muxed as LMS2TCU. Compatibility with legacy systems can be maintained by forcing software to set up multiple VTA passes to get this functionality. Only one LMS2TCU value is piped downstream from LMS.

For the b, c, and d terms, it is possible to override the software select of c_local (c_iter or color0) with the Atex[7] bit. According to one embodiment, one local select mux whose output was sent to the subtract, multiply, and final adder. If c_local was selected for any of these terms, the override selection would be used. Preferably, this is implemented as using the Atex[7] bit to select between Citer and C0. This dynamically changing value can be used at the b, c, or d inputs by selecting Citer when the override is enabled.

The 1.4.8 output of the color combine unit can also be routed to the Zbias register, allowing a texture to be used to modify the Z/Fog value.

Figure 101:
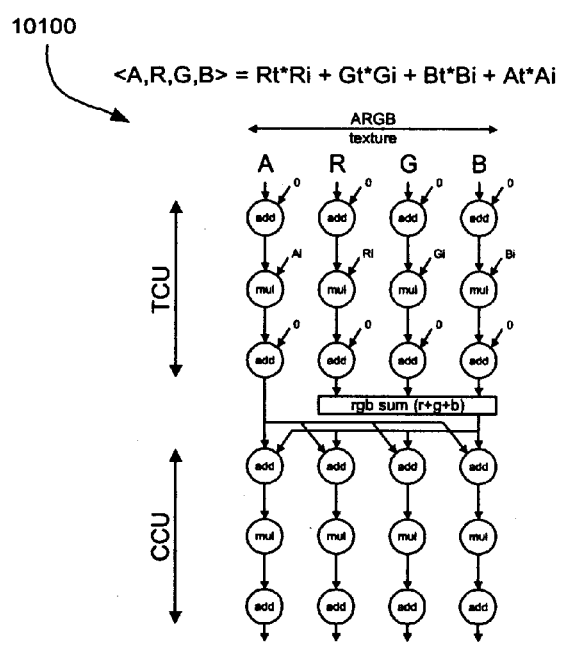
FIG. 101 demonstrates how more complex math functions can be programmed using the general selectability of the combine unit inputs, in particular, a four term dot product.
Figure 102:
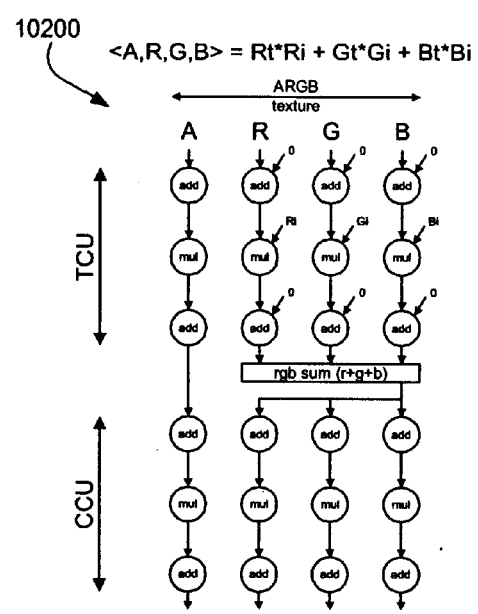
FIG. 102 demonstrates how more complex math functions can be programmed using the general selectability of the combine unit inputs, in particular, a three term dot product.
Figure 103:
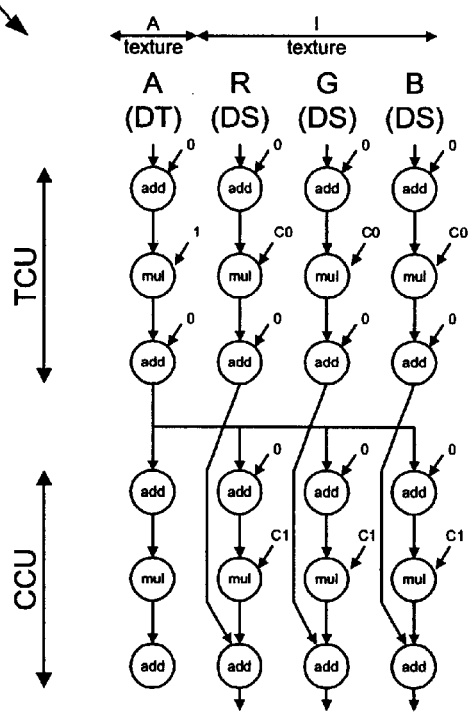
FIG. 103 demonstrates how more complex math functions can be programmed using the general selectability of the combine unit inputs, in particular, a 2×3 matrix multiply.

The combine unit can be programmed to perform dot products, matrix multiplications, in addition to the functions described above. FIGS. 101–103 demonstrate how more complex math functions can be programmed using the general selectability of the combine unit inputs, in particular, a four term dot product 10100, a three term dot product 10200, and a 2×3 matrix multiply 10300.

Accumulator (ACC) 824 (see FIG. 8)

Figure 104:
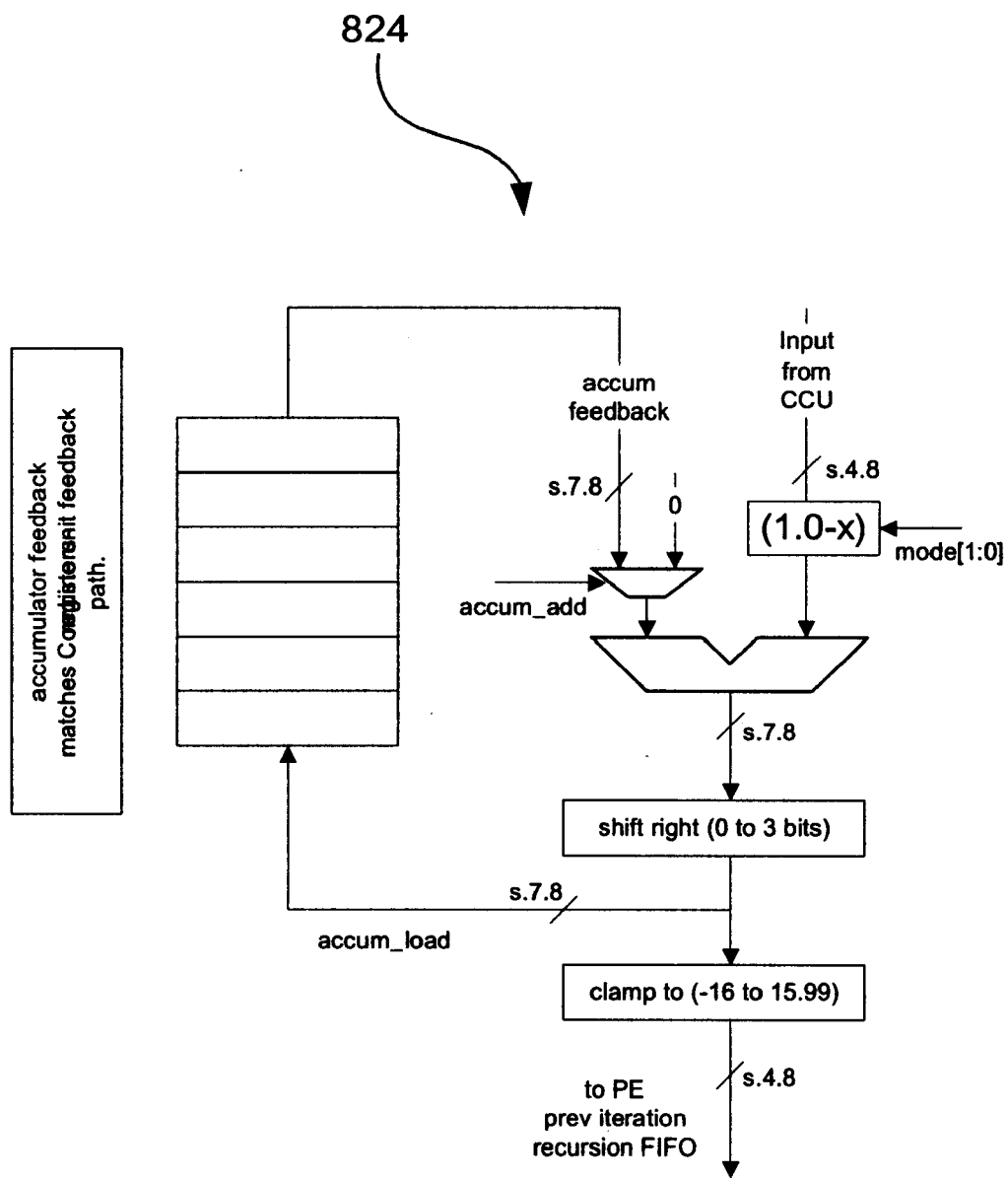
FIG. 104 illustrates the accumulator of the VTA.

FIG. 104 illustrates the accumulator 824. The accumulator can add together multiple combine unit outputs per texture. Since it takes up to N clocks for data to feed through the Combine unit, the accumulator needs to keep track of N partial values.

The output of the CCU can be either loaded into the accumulator, added to the current accumulator value, and optionally right-shifted to perform a rough average function.

The output to the accumulator FIFO can be in an s.7.8 format to account for 8 potential accumulates, and the output to PE/recursion FIFO/prev iteration feedback is clamped back down to the s.4.8 overbright range before being output.

The table below describes the accumulator behavior based on the ACC_LOAD and ACC_ADD bits from the taCcu-Color register.

TABLE 16

| ACC_LOAD | ACC_ADD | Output | ACC holds |
| --- | --- | --- | --- |
| 0 | 0 | CCU output | Previously loaded value (undefined if no prior load) |
| 0 | 1 | CCU output + Accum | Previously loaded value (undefined if no prior load) |
| 1 | 0 | CCU output | CCU output |
| 1 | 1 | CCU output + Accum | CCU output + Accum (undefined if no prior load) |

Iterators

Figure 105:
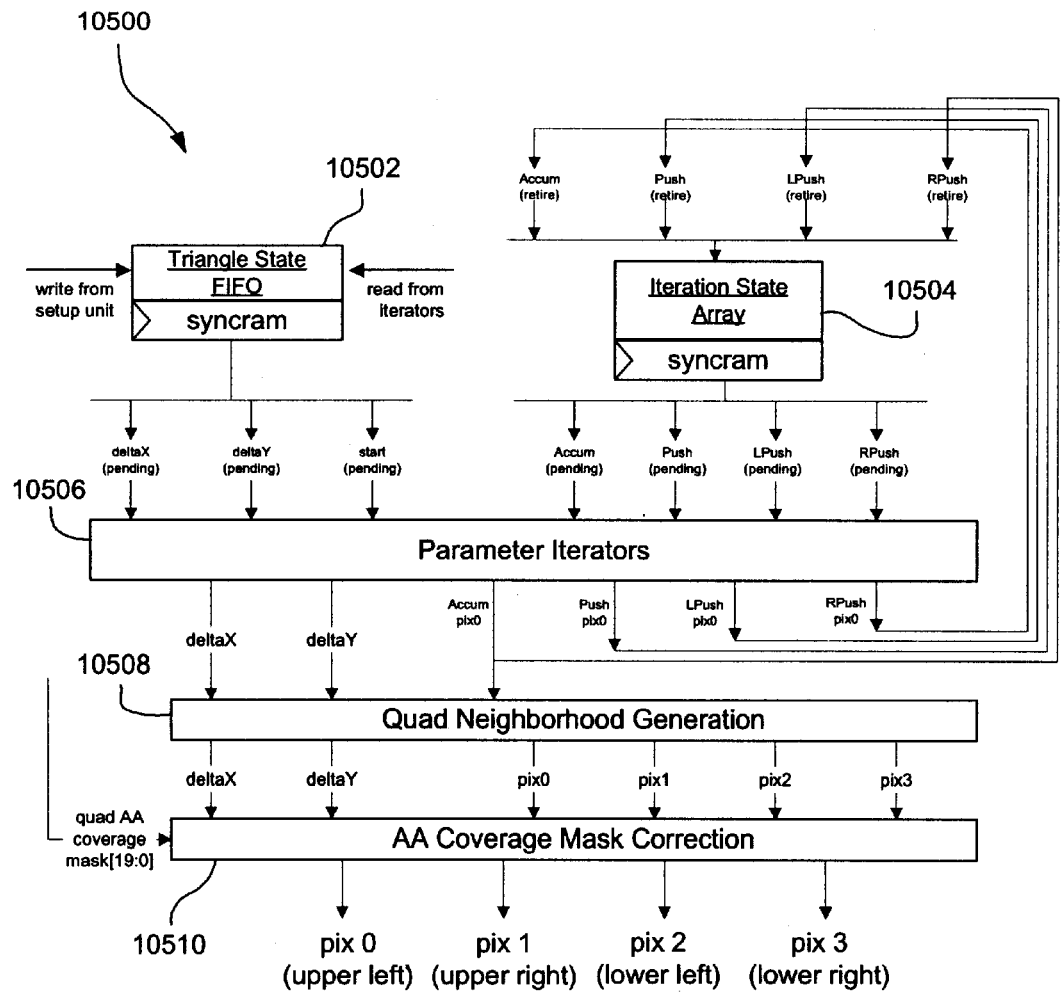
FIG. 105 is a top-level block diagram of an iterator.

The triangle iterators in the VTA are responsible for delivering iterated parameter data to the pipeline based on the stepping instructions from the raster unit and setup information from the setup unit. A top-level block diagram of an iterator 10500 is shown in FIG. 105. All the iterators in the VTA use basically the same structure, differing only on the precision and bit-width of the specific parameter being iterated. As shown, the iterator includes a triangle state array 10502, an iteration state array 10504, parameter iterators 10506, a quad neighborhood generation logic 10508, and an AA coverage mask correction block 10510. These will be described in more detail below.

The iteration of parameters is made more challenging in the VTA due to the large volume of state information that is preserved. At any given time, a large number of triangles can exist at various points in the VTA pipeline, and up to 8 or more different texture iterations can be applied to each triangle. The VTA iterators provide a smooth transition from triangle to triangle and iteration to iteration without stalling. In order to accomplish this, triangle state rams and iteration state rams hold data from a range of triangles and a range of iterations, and as needed, data is extracted from these rams into pending state registers in the iterative walker. The walker bases its computations either on its local accumulate registers or will pull data from these pending registers. In this way, no cycles are lost when switching triangles or switching iterations.

The VTA iterators iterate on the upper left pixel in each quad, these values are later expanded out into all four pixel values by the neighborhood generation unit. At this point, the RGBAZ iterators need to perform corrections for the AA coverage mask if the center mask bit is not valid. After the AA correction, pixel data is sent to the VTA pipeline. All of this is accomplished by utilizing RAMs and circular FIFOs to save and restore pending state information to the iterators. To simplify top-level interfaces, the XYZQ parameters are iterated in the VTA and are valid only for iteration zero. The XYQ parameters are unused in the VTA and the iterators output the upper left pixel value and delta terms to the PE, which is responsible for neighborhood generation and sub-sample correction. The Z iterator output is used in the VTA, but its output is also only valid for iteration zero. However, AA correction is still done before its use in the COM unit. The interface to PE is similar to XYQ, with iterated UL pixel and delta values sent to PE, which uses the coverage mask to compute subsample depths on its own.

The iterator widths in the VTA are as follows:

TABLE 17

| Parameter | Width (format) |
|---|---|
| XY | 22 bits (11 bits each) |
| STW | 51 bits (8.43 or 16.173) |
| RGBA | 25 bits (1.4.20) |
| Z | 36 bits (1.173 or 9.27) |
| Q | 36 bits (1.173) |

Figure 106:
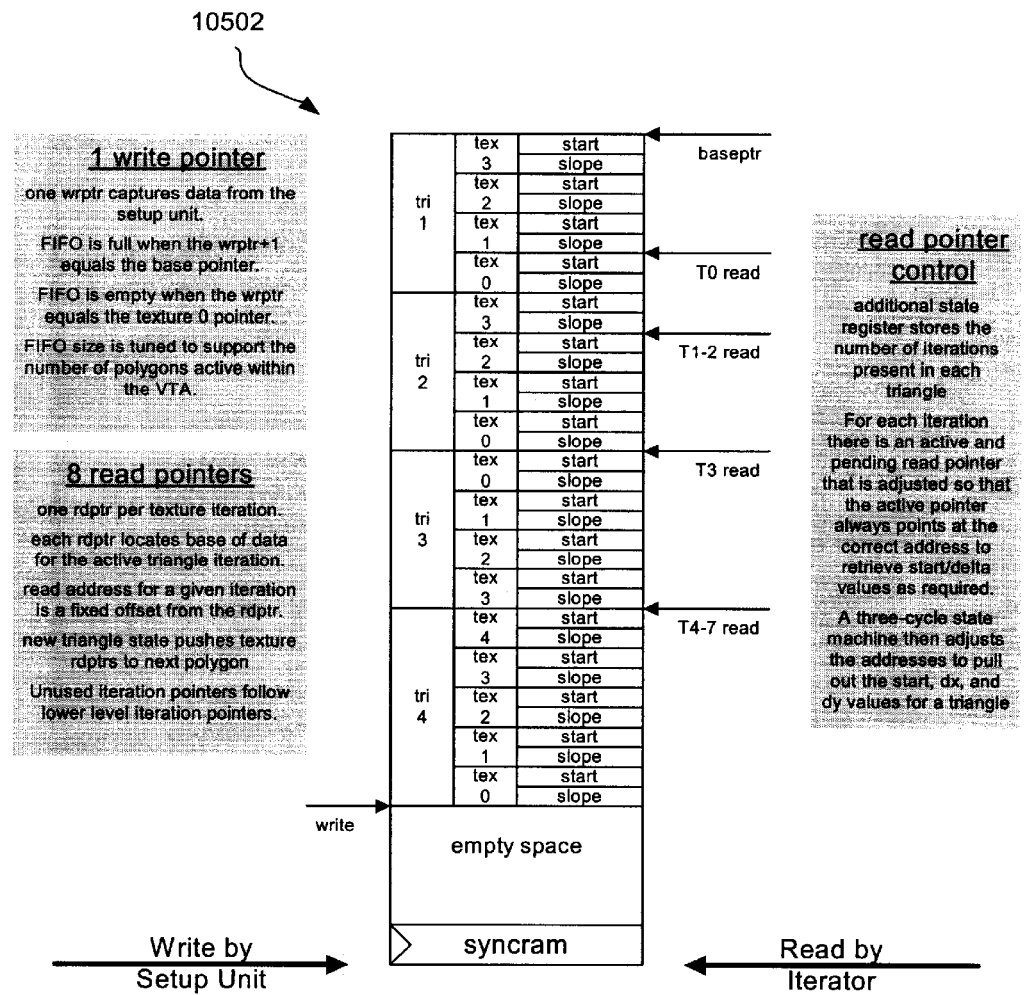
FIG. 106 depicts a triangle state FIFO.

FIG. 106 depicts the triangle state FIFO 10502. The triangle state FIFO stores the start and delta values from the setup unit until they are ready to be used as the triangle is processed downstream in the VTA. The triangle state FIFO holds all the start and delta values for a triangle until iteration zero has been processed. Until then, the FIFO is used as storage for the start and delta values, and the state ram is read appropriately to restore pending delta values for the walkers as they switch iteration state or triangle state. The start, deltaX, and deltaY values are read in three successive clocks to fill or reload the pending tstate registers in the walker.

The writing of the triangle state FIFO is fairly straightforward, as the setup unit fills N iterations worth of start, deltaX, and deltaY values for each parameter and each triangle. Iterations are written highest to lowest, to match the order of their use within the VTA. The Z, Q, and XY iterators need only concern themselves with iteration zero, and these iterators simply stall during nonzero texture iterations. The STWARGB iterators, however, can support up to 8 or more potential iterations of data for each triangle.

There are two cases to be aware of regarding the write pointer. The first regards the fact that parameter data arrives from the setup unit in two cycles. However, it takes three cycles to write the start, deltaX, and deltaY values into the ram array. As a result, if the setup unit sends back to back packets for the same parameter (an unlikely but possible case), the iterators need to stall the setup interface. The second unusual case regards the Wbroadcast (Wb) capability of the setup unit. Each triangle's parameter setup begins with a special combination XY and Wb packet. The Wb packet's data can be used for any iteration of W (Qtmu) or Qpe if explicit parameter data was not otherwise sent. As a result, the Wb data may be set aside and could potentially be needed to initialize parameter state behind the scenes. All other parameters are written only when explicitly selected.

The following table lists several write pointer rules.

TABLE 18

1. Write pointer resets to zero, the original base of the triangle state FIFO.
2. If valid parameter data is sent, write data in 3 cycles, bumping write pointer by one each clock.
3. If no valid parameter sent for triangle or iteration, bump write pointer by three
4. Special case for Qpe and W(Qtmu): If no valid parameter received, update with Wb data, adjusting pointer as in case (2).

Control for the read pointers is a bit more complex. The basic idea is to have two sets of pointers, active pointers and pending pointers, which will control the reading of the triangle state rams. The active pointers locate the position of the start and delta values for active triangles, and the pending pointers precompute the next location of the active pointers. Thus, when a newtri signal is encountered, the active pointers are updated to the pending locations, and new locations for the pending pointers are computed. Thus, the pending pointer movement is where much of the complexity lies. The motion of the active and pending triangle state ram read pointers obeys the rules set forth in the following tables. Table 19 lists active read pointer rules, while Table 20 lists pending read pointer rules.

TABLE 19

1. All active pointers reset to zero, the original base of the triangle state FIFO.
2. At newtri, any iteration's active rd pointer greater than or equal to the current iteration number's active rd pointer gets its pending pointer if both active and pending registers match the values in the current iteration's active and pending pointers.

TABLE 20

1. All pending pointers reset to zero, the original base of the triangle state FIFO.
2. At newtri, any iteration's pending rd pointer less than the current iteration number's pending pointer is bumped by three (one iteration's start and delta data) if its pending register matches the current iteration's pending pointer.
3. At newtri, any iteration rd pointer greater than or equal to the current iteration's pending rd pointer is bumped by whichever is smaller, three times the total iteration count for that triangle, or the distance to the pending pointer for iteration 7. (Pending pointer for a lowered numbered iteration can never pass a higher numbered iteration's pending pointer)

The final resting state of this read pointer labyrinth will be such that the active pointers point at the respective iterations of the final triangle, and all pending pointers are equal. At this point as the dispatcher spins through iterations of a potentially huge triangle, the pointers are set up to pull out and restore the correct delta information for the walkers. If no more triangles are stored in the state FIFO ram, this will also match the write pointer where subsequent data will be written.

In any event, this should be the state when iteration zero is completed, since all iterations are guaranteed by the dispatcher to have the same sequence of newtris and raster steps. This is also guaranteed to be occurring when the iteration state sequence changes, as the dispatcher will complete the previous iteration state down to iteration zero. Therefore, whenever this point is reached (all pending pointers are equal), the iteration number where the next newtri occurs matches the total iteration count of the next dispatch bundle sequence. This is how the iterators keep track of the total iteration count of the triangles indexed in the triangle state FIFO.

Figure 107:
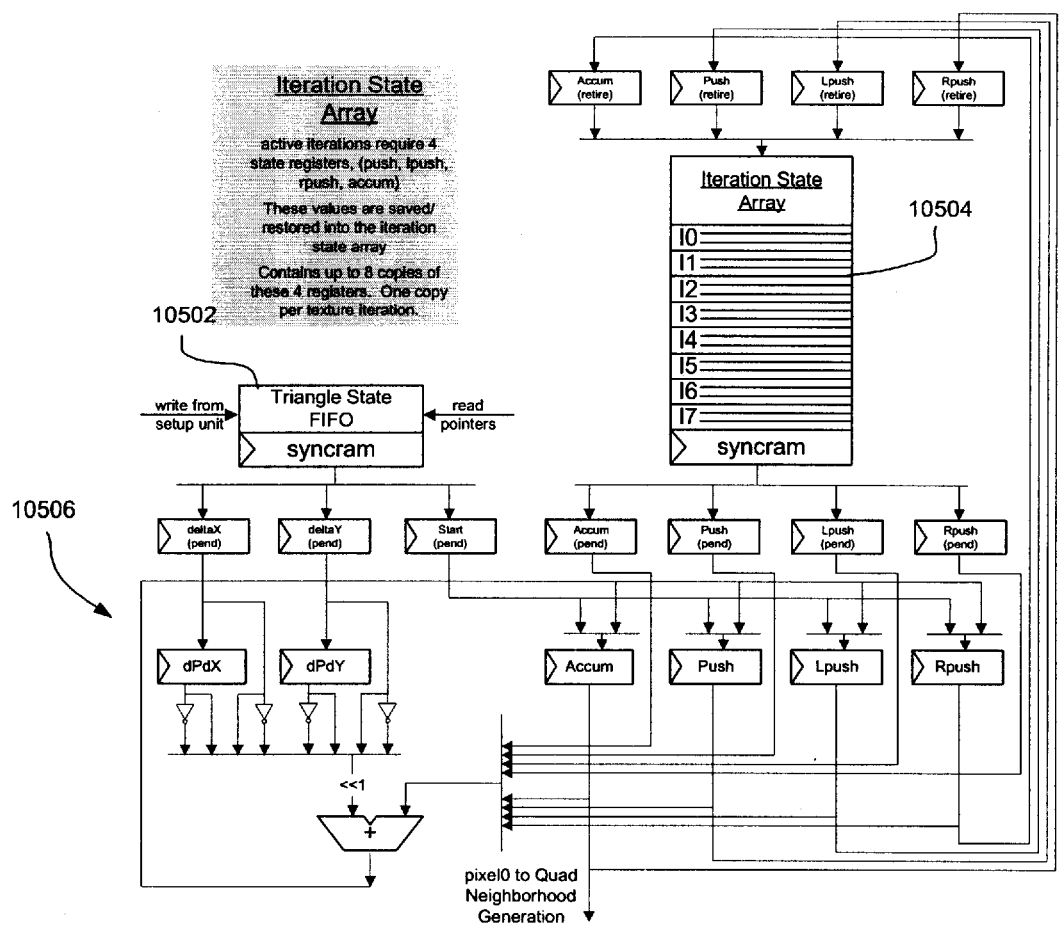
FIG. 107 depicts an iteration state array and parameter iterators according to one embodiment.

FIG. 107 depicts the iteration state array 10504 and parameter iterators according to one embodiment. Like the triangle state array, the iteration state array stores the current state of the walkers, as it is saved and restored due to changes in iteration packets. The state values that need to be stored are the accumulator value, a push value for the serpentine walk, and left/right push values for the column8 rasterization paradigm. The iteration state array stores 8 copies of these parameters, one for each possible texture iteration. The deltaX and deltaY values also need to be saved and restored, but since these are already contained in the triangle state FIFO, they are restored through clever control of the triangle state read pointers rather than storing these values again in the iteration state array.

Iteration changes trigger reads and writes to the iteration state array, as the four state values are saved and restored over a period of four clocks. This restoration, together with the three cycle read from the tstate FIFO, is currently what limits the dispatcher to submitting new triangles no closer than four clocks from a prior or subsequent new triangle or iteration change. New triangles can of course be coincident with a new iteration. The iteration state array applies only to STWARGB parameters, as the others only iterate in iteration zero.

The parameter iterators (or walkers) are the units which actually do the iteration based on the sequence of steps, pushes, and pops received from the raster unit. The source of the iterative computation either comes from a bank of pending registers preloaded from the triangle and iteration state arrays, or local accumulator registers. This allows the triangle walkers to never stall when switching triangles or switching iterations.

The parameter walkers step according to shifted delta terms, since they need to move +/− twice dx and dy. This is due to the fact that the upper left pixel of the quad is being iterated, so the steps occur in terms of units of 2 x locations or 2 y locations. The iterated upper left pixel is then sent onward to the neighborhood generation unit, where the quad is expanded.

Another note regards stalling. The walkers and downstream units (quad generation and AA mask correction) are stallable independent of the tstate and istate updates of the pending registers. One reason this is the case is for void quads. Voids can not be allowed to iterate, but voids also do not want to get in the way of the four cycle restriction between newtris and iteration boundaries. In other words, voids need to stall the blocks downstream of the walker, but not stall the triangle state FIFO or iteration state FIFO.

Figure 108:
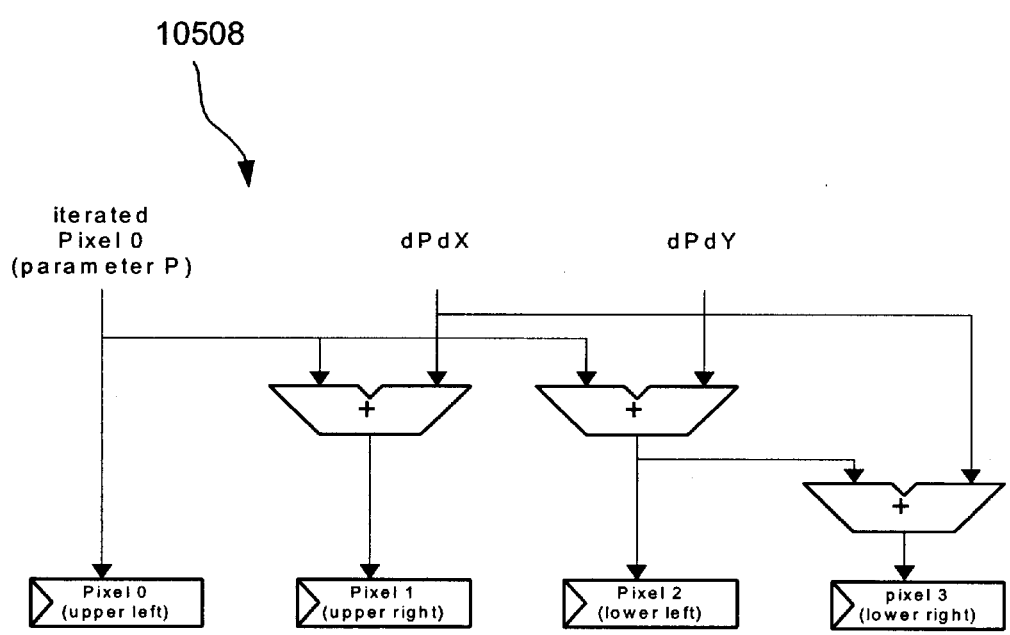
FIG. 108 illustrates quad neighborhood generation logic.

FIG. 108 illustrates the quad neighborhood generation logic 10508. Using the delta values and iterated upper left pixel for a given iteration, this block expands the quad, generating values for all four pixels. Qpe and XY iterators do not need to expand the neighborhood, as this will be done within the PE.

Figure 109:
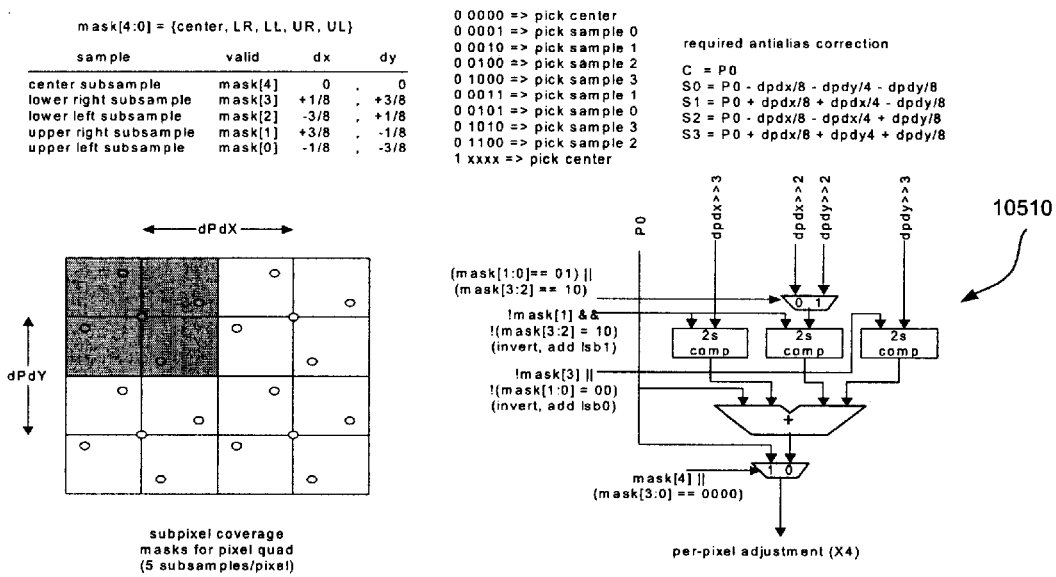
FIG. 109 depicts a coverage mask correction block.

FIG. 109 depicts the coverage mask correction block 10510. The AA coverage mask correction block is required only for iterators that feed the combine unit (ZARGB). This function is not performed for STW or Qpe. The correction for STW is not needed, and the correction for Qpe will happen in the PE.

This logic adjusts parameter values on a subpixel level when the center iterated value is invalid according to the coverage mask, but one or more of the adjacent subsamples are valid. As shown in FIG. 109, the adjustment relies on the fact that subsamples 0 and 3 are colinear with the center, as are subsamples 1 and 2. This means that if subsample 0 and 3 are both valid, the center is also valid. Likewise for subsamples 1 and 2. This makes it possible to simply choose the course of action with something resembling a priority encoder.

Therefore, the logical correction can be summarized as follows:

TABLE 21

| | |
|---|---|
| 1. | If all subsamples invalid or center is valid, do nothing. |
| 2. | Else if subsample zero is valid, adjust to subsample zero. |
| 3. | Else if subsample three is valid, adjust to subsample three. |
| 4. | Else if subsample one is valid, adjust to subsample one. |
| 5. | Else if subsample two is valid, adjust to subsample two. |

Linear Frame Buffer Writes

Figure 110:
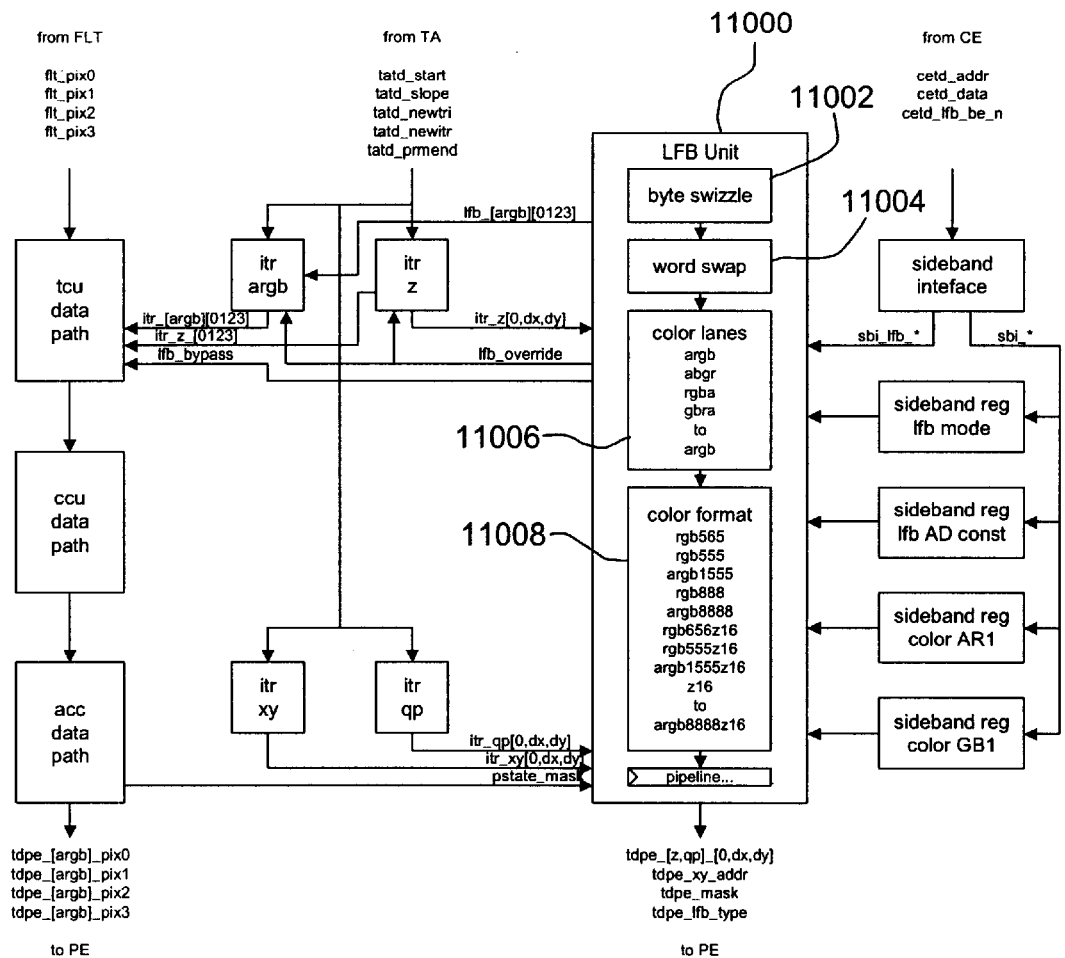
FIG. 110 diagrams the weave of LFB transaction into the pixel pipeline of the VTA Combine Unit.

The Linear Frame Buffer writes, processed by the Linear Frame Buffer (LFB) Unit 11000 of the VTA, are received from the Command Front End (CE) at the side-band and transported to the Pixel Engine (PE) from the Combine Unit (COM). State at the side-band determines the LFB transaction mode to a XY based addresses. FIG. 110 diagrams the weave of LFB transaction into the pixel pipeline of the VTA Combine Unit. Elements of the LFB Unit include a byte swizzle unit 11002, a word swap unit 11004, a color lane unit 11006, and a color format unit 11008. These will be described in more detail below.

A signal generated by the LFB Unit sets the ARGB iterators into a LFB override mode. This signal is set for all valid LFB transfers. When set, the ARGB iterators pass LFB data to the Combine Unit and the LFB Unit passes XYZQ LFB data to the PE.

Another signal generated by the LFB Unit sets the Combine Unit into a LFB bypass mode. This signal is set for XY address based LFBs which do not enable the pixel pipeline. When set, the Combine Unit forces iterator color selection and an null math function.

The LFB Write function provides for XY address based LFBs processed by the combined state of the LFB mode register and the VTA Combine Unit. Linear frame buffer writes are managed by the LFB Unit. The LFB Unit includes functional blocks providing byte-swizzling, word-swapping, color-lane-muxing, color-formatting and data piping. The following sections describe the major functional units of the LFB Unit and their requirements for the generation of data, address and control.

The LFB Mode Register, sampled off of the side-band, controls the 3D processing of XY address based LFBs. FIG. 111 is a chart 11100 that describes each of the control bits of the LFB mode register.

FIG. 112 is a table 11200 that decodes VIDDEV_LFB_FORMAT of the LFB Mode register.

FIG. 113 is a chart 11300 listing the control bits of the LFB Depth Constant Register. The LFB Depth Constant Register sampled off of the side-band, defines 16 bits of data used for the generation of depth of XY based LFBs. This register is used when a LFB format lacks definition depth.

The LFB Byte-Swizzle Unit modifies bytes of data received from the CE and delivered to the LFB Word-Swap Unit. Byte manipulation should not be required for little endian operation (Intel). This feature should only be set for big endian operation. The function of this unit is described in the table 11400 shown in FIG. 114.

The LFB Word-Swap Unit modifies words of data received from the Byte-Swizzle Unit and delivered to the Color-Lanes Unit. Word swapping allows the upper and lower 16-bit data words of LFB data to be swapped. The function of this unit is described in the table 11500 of FIG. 115.

The LFB Color-Lane Unit modifies ARGB fields of pixel data received from the Word-Swap Unit and delivered to the Color-Format Unit. Lane juggling allows ARGB data to be packed in four ways. Color formats not involving alpha are juggled identically only with the "A" term considered to be 0 bits. In all modes the depth format is not affected. FIG. 116 is a table 11600 describing the function of this unit.

The LFB Color-Format Unit modifies pixels of data received from the Color-Lanes Unit before delivery to the pipeline of the Texture Data-path (TD). Data received defines one or two pixels to generate four pixels of a quad. When the source data defines just one pixel then four identical pixels are generated for the quad, otherwise, when the source data defines two pixels (left and right) then two independent pixels are replicated vertically.

The table below sets forth the three stages of processing that exist within the LFB Color Format Unit.

TABLE 22

1. LAB True Color
   All input colors (ARGB) are expanded to true color. This manipulation is accomplished through a left shift of the input vector to align MSBs and a replication of the input MSBs into the remaining LSBs of the output vector. The following equation illustrates this using the conversion of rgb565 to rgb888 as an example.
   $\{r[7:0], g[7:0], b[7:0]\} <= \{r[4:0], r[4:2], g[5:0], g[5:4], b[4:0], b[4:2]\}$;
2. LFB Constants
   All undefined color components of the LFB format are supplanted with data defined by the constants taColorAR1, taColorGB1 and taLfbADConst. The taColorAR1 register defines red, the taColorGB1 register defines green/blue and the taLFBADConst register defines alpha/depth. The following equations illustrate this functionality for the red channel.
   $a[7:0] <= (a\_defined\_by\_1fb)? a[7:0] : taColorAR1[7:0]$;
3. LFB Over-bright
   All of the constant-corrected true color components (ARGB) are converted to an over-bright color range (1.4.8 precision). This is done with a simple mux based on a comparison to 0xff. The following equation illustrates this manipulation using red as an example.
   $r[12:0] <= (r[7:0] == 0xff)? 0x0100 : \{5'b0, r[7:0]\}$;

FIG. 117 is a table 11700 that details the processing for true-color and 1fb-constants of the LFB Color Format Unit. Beyond the manipulation of data shown in FIG. 117, the design adds the over-bright conversion indicated above.

The LFB type signal, sent to the PE interface, differentiates between normal rendering data transfers and LFB data transfers to the PE. The table 11800 shown in FIG. 118 defines equations for determining the LFB Type sent to the PE.

The Mask sent to the PE encodes sub-pixel coverage for XY address based LFB. For XY address based LFBs, the 4 pixel masks are set to enable fully covered pixel writes to the addressed pixels of the LFB. The table 11900 depicted in FIG. 119 details the interpretation of the coverage mask based on the state of the LFB Type bus.

The XY address sent to the PE transports XY address for normal rendering and XY address for XY address based LFBs. FIG. 120 is a table 12000 that details the interpretation of the XY address bus based on the state of the LFB Type bus.

The 36-bit depth of left and right LFB depth values are sent, LSB aligned, on the Z and Q busses at the VTA interface to the PE. buses. Data sent on the Q bus during LFBs is also conditionally modified by the state of VIDDEV_LFB_W_SELECT bit of the LFB mode register. The table 12100 shown in FIG. 121 details interpretation of the tdpe_z_pix0, tdpe_z_dx, tdpe_q_pix0 and tdpe_q_dx buses for LFB transactions.

The colors (ARGB) of two pixels (left and right) 12202, 12204 are generated by the LFB Unit and output to the Combine Unit. At the Combine Unit, left and right pixels are replicated vertically to create a full pixel quad 12200. See FIG. 122.

VTA Cache Description

This section describes a method and design for caching texture data. The design attempts to maximize performance while minimizing the risk of encountering any difficult timing bottlenecks.

The VTA texture cache has 4 physical address request ports and 16 contexts corresponding to the 16 texels that can be requested per cycle by the TAD unit. Each physical address port can post a 256-bit aligned memory block representing a group of texels that fall within that boundary. In 4-bit per texel mode one S and one T select bits are needed to further determine which of four 4x4 blocks are needed. For the 8-bit per texel mode one S bit is needed to further determine which of two 4x4 blocks are needed in tiled mode or which half of a 32x1 line is needed in linear mode. The output from the texel cache is 16 32-bit colors. All format conversion is done by the texture cache in the stage preceding the cache data store unit.

The texture cache consists of two stages. A color cache ("L1") stage and a raw cache ("L2") stage. The color cache stores 16 texel colors per cache entry in a unified 32 bit per texel format (8888 ARGB). The raw cache stores 256-bit words from 256-bit aligned reads retrieved from memory.

The following paragraphs describe the I/O ports and port behavior that the texture cache expects. These port descriptions are independent of the cache implementation chosen. The cache has three ports: (1) the input request port where physical addresses are presented, (2) the memory read port, where the cache interfaces to the memory controller, and (3) the color output port, where requested texel colors are presented. DVS flow control is used on all three ports.

Figure 123:
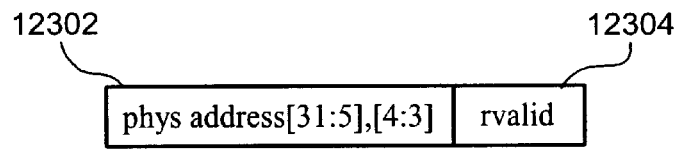

The input request port consists of 4 physical addresses (with additional s,t bits as desired per format), 16 texel contexts and a valid bit (rvalid) for each address to mark that request as needed or not needed. Each of the 4 physical address requests contain the fields 12302, 12304 shown in FIG. 123, representing one of four physical address request ports.

It is possible that none or a subset of the total 4 address requests will be valid and required at a time. Thus, anywhere from 0 to 4 requests may be posted per DVS transaction.

Since all of the 16 texel request contexts correspond to a given 2×2 pixel footprint they are posted together. Those texel requests that are marked valid (rvalid==1) are satisfied with texture data by the cache. Those that are marked not valid (rvalid==0) are not satisfied. Each of the 4 rvalid bits are preserved and presented with their corresponding color value at the output of the texture cache.

Figure 124:
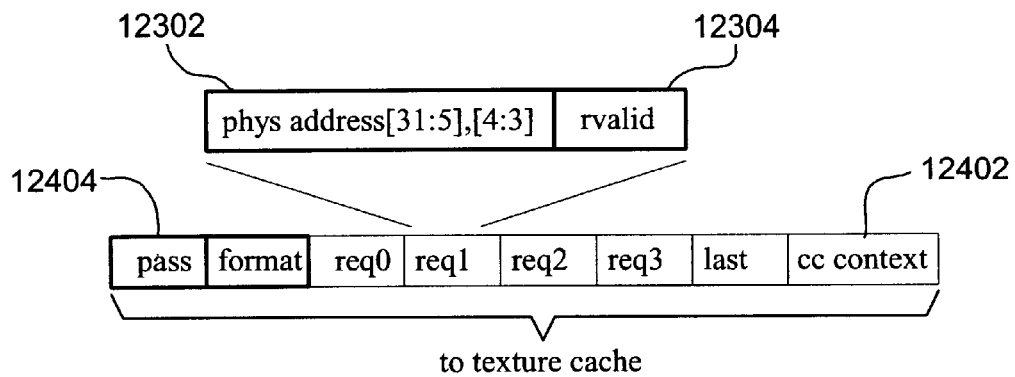

In FIG. 124, the color cache context (cc context) field 12402 is generated by the TAD unit; the content of this data field is shown in FIG. 167 and is discussed along with the discussion of the color cache context FIFO, below.

In addition to the 4 physical addresses and color cache context the cache needs to know the color format of the requested texels. Format information is relevant to the cache tag unit because it determines the number of bits per texel and thus the packing organization of those texels in memory. The format of a given request is also important in the format conversion unit (FMT) because format conversion from all the available formats to a uniform 32-bit format is performed by this unit.

The "pass" field 12404 in FIG. 124 is data that gets passed through the cache, but remains associated with a set of texel requests in a given DVS transaction. This information includes bilinear blend factors, etc., and any other per pixel data that is not directly relevant to the cache functionality.

The physical address field 12302 (bits [31:5]) points to a 256-bit aligned address that the requested texel resides in. Texel color storage is 256-bit aligned. Because there are 4 different bit widths for representing a color (4, 8, 16, and 32) the blocking within 256-bit words can vary. To facilitate cache tagging, two bits are appended to the physical address from the S and T texture map indices (to select 16 texel subsets from a 64 or 32 texel footprint):

1. In 4-bit per texel mode: physical address bits [4:3] are set to {T[2], S[2]}.
2. In 8-bit per texel tiled mode: physical address bits [4:3] are set to {1'b0, S[2]}.
3. In 8-bit per texel linear mode: physical address bits [4:3] are set to {1'b0, S[4]}.
4. In all other modes: physical address bits [4:3] are set to {1'b0, 1'b0}.

Figure 125:
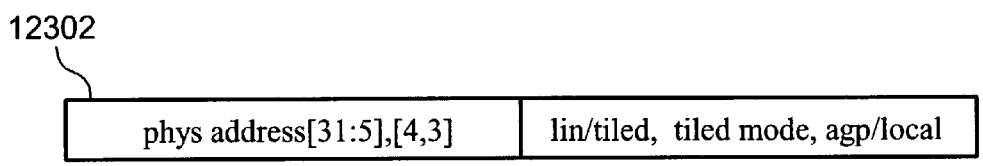
Figure 126:
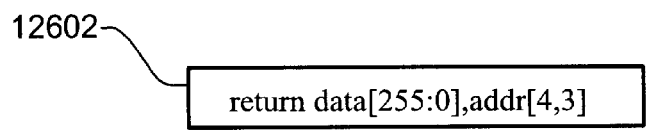

FIG. 125 depicts the data fields 12302, 12502 in the memory request port. The memory port consists of one outgoing DVS stream for the request addresses and one incoming DVS stream for 256-bit data back from memory. The requests are 256-bit aligned. FIG. 126 illustrates the field 12602 of the return data.

Figure 127:
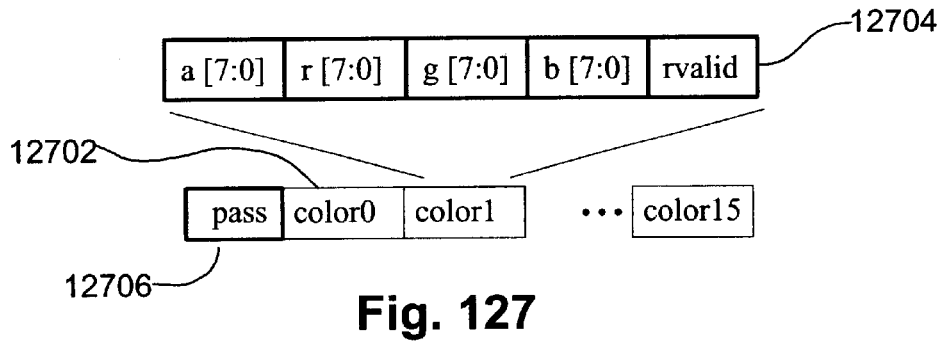

FIG. 127 shows the data fields in the color output port. The color output port consists of 16 32-bit colors (fields 12702) along with corresponding rvalid signals (field 12704). Related pass data (field 12706) is also presented on the same DVS transaction with this color data.

The following paragraphs discuss the input request formats for 4, 8, 16, and 32-bit per texel color. Color space definition data beyond the number of bits per texel are preferably not important to the cache at this point. As an example, the texture cache doesn't care if a 16-bit format is ARGB 1555, AR181044, or etc., as long as it is 16 bit per texel. Only the format conversion unit cares about these specifics.

Figure 128:
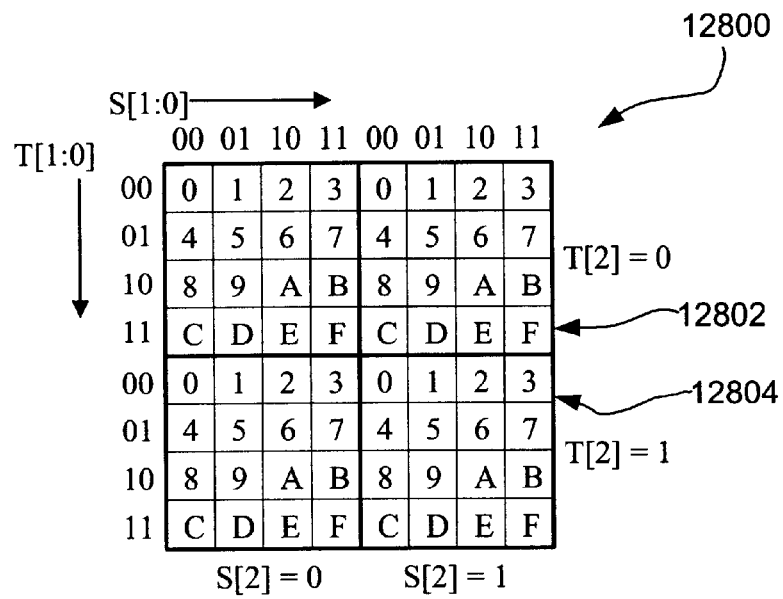

FIG. 128 illustrates a texel map 12800 in 4-bit per texel tiled mode. In 4-bit per texel (compressed) mode each 256-bit word corresponds to an 8×8 raw block of texels. The color cache stores only the 4×4 sub-block(s) touched by input requests. Each 16 texel sub-block occupies one color cache data store entry. However, a 256-bit word (2×2 block of 4×4 blocks 12802, 12804 shown in FIG. 128) only occupies one raw cache entry. In tiled 4-bit per texel mode:

$$ST[5:0]=\{T[2:0], S[2:0]\}.$$

As indicated earlier S[2] and/or T[2] may be appended to the physical address to tag unique cache entries when one physical memory location of 256 bits maps to more than one color cache entry.

Figure 129:
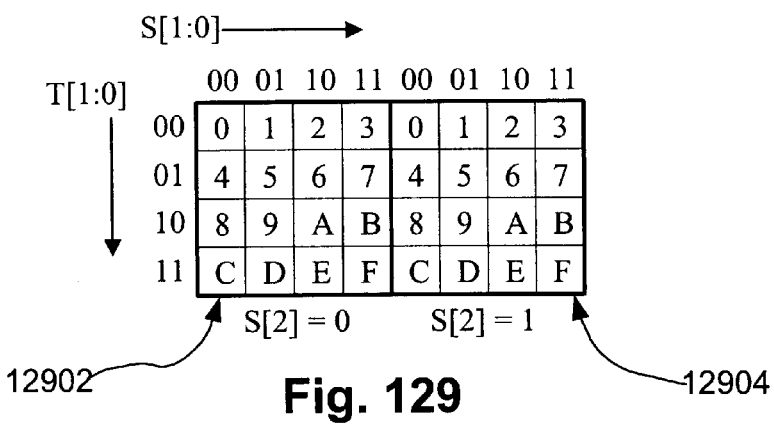

In 8-bit per texel mode (palette, alpha, intensity, alpha-intensity, etc.), 32 texels are represented by a 256-bit word. In tiled mode, this is a horizontal group of two 4×4 blocks 12902, 12904 as shown below in FIG. 129. In tiled 8-bit per texel mode:

$$ST[5:0]=\{T[2:0], S[2:0]\}.$$

In 8-bit per texel linear mode, a 256-bit word corresponds to a 32×1 line of texels 13000 as shown in FIG. 130. In this case the address generation logic preceding the cache provides S[4] as part of the physical address. In linear 8-bit per texel mode:

$$ST[5:0]=\{T[0], S[4:0]\}.$$

In 16-bit per texel mode (alpha-palette, RGB565, AR181044, etc.), 16 color values are represented by one 256-bit word. In 16-bit per texel tiled mode, this corresponds to one 4×4 block of colors 13100, shown in FIG. 131. In tiled 16-bit per texel mode:

$$ST[5:0]=\{T[2:0], S[2:0]\}.$$

In 16-bit per texel linear mode a 256-bit word corresponds to one 16×1 line of texels 13200 as shown in FIG. 132. In linear 16-bit per texel mode:

$$ST[5:0]=\{T[1:0], S[3:0]\}.$$

In 32-bit per texel mode only 8 texels are represented by 256 bits. All other modes retrieve one or more color cache entries worth of data (16 texels); this mode only retrieves half of a color cache entry worth of data (8 texels). There are two different solutions to deal with this special case.

FIG. 133 illustrates a texel block 13300 for 32-bit per texel tiled mode. FIG. 134 depicts a row of texels 13400 for 32-bit per texel linear mode. In 32-bit per texel mode two 256-bit reads are used. The TAD unit submits a 512-bit aligned request for the lower 256 bits. In 32-bit mode the raw cache walker submits the second request to fill the second half of the 4×4 block. In 32-bit per texel tiled mode:

$$ST[5:0]=\{T[2:0], S[2:0]\}.$$

In 32-bit per texel linear mode:

$$ST[5:0]=\{T[2:0], S[2:0]\}.$$

The mapping from a 256-bit read atom to each of the four bit depths will now be considered. FIGS. 135 through 138 show the mappings 13500, 13600, 13700, 13800 for tiled mode 4 bit per texel through 32 bit per texel textures. Note that two 256 bit reads can be used to represent the 4×4 block of texels in a color cache entry. FIG. 139 illustrates the mappings 13900 in linear mode for 8, 16, and 32 bpp.

The following paragraphs describe a two stage cache architecture to serve as the VTA texture cache. The VTA needs 16 colors per cycle from the cache. It is, however, very difficult and costly to pipeline a high-speed multi-port cache. Some effort is therefore spent in the TAD design preextracting relationships between the many requests so the basic caching functions (tag compares and tag replacement policy) can be substantially simplified. In fact, the core functionality of both cache levels is preferably only that of a single ported FA/LRU tag unit.

The texture cache is composed of two cache stages, each operating independently. The color ("L1") cache receives up to 4 or more physical address requests; each request can satisfy up to 16 or more pre-grouped texel requests. The raw ("L2") cache attempts to group these requests into unique 256-bit raw cache entries or memory requests. The raw cache posts zero to four memory requests when zero to four of its incoming requests are misses. The raw cache spends one cycle accepting each unique 256-bit aligned request. Thus three unique requests will take three cycles, even if they are all hits; of course, if they are all hits, they will produce no memory requests. The raw cache spends one cycle emitting each valid request to the format conversion unit.

FIG. 140 shows the block level organization 14000 of the color cache and the raw cache. The color cache tag unit 14002 is fed up to four or more addresses; based on color cache hit/miss information, the raw cache 14004 then works to satisfy each of the misses.

The concept of a unique request group is important to the texture cache design. FIG. 141 illustrates the concept of a unique request group in S and T space. For the purpose of this example a 4-bit per texel texture is used. FIG. 141 shows a 4×4 set of color cache entries (each entry being 4×4 texels). Four pixels are shown, each with a unique S,T pair. The S,T pair is split out to four bilinear samples. Pixel 14120 has one texel from each of the four groups (14102–14108). All of pixel 14122's texels come from Group 14104. Two of pixel 14124's texels come from Group. 14106, and two from Group 14108. All of pixel 14126's texels come from Group 14108. Another way to view this situation is Group 14102 satisfies 1 request, Group 14104 satisfies 5; Group 14106 satisfies 3; Group 14108 satisfies 7. Together they satisfy all 16 requests. The key observation is that all 16 samples come from only 4 unique groups; this is equivalent to saying that all 16 texel requests are satisfied by 4 cache tag queries.

One additional observation is worthwhile at this point: in any tiled mode, if a mip-mapped texture is bein used and one observes the mip-map texel stride constraints in S and T ($0.5 \leq \Delta S < 1$, $0.5 \leq \Delta T < 1$) then there will never be a situation where more than 4 unique blocks are needed to satisfy all 16 requests. In other words, with the common case constraints met, the probability of missing more than 4 is equal to 0. Of course, not all textures are mip-mapped and tiled; and the mip-map constraint is not necessarily going to be met at all times given our ability to bias the lod and under-sample. In the TAD unit, the group walker unit handles arbitrary cases of group configurations; 1 to 16 groups is possible.

The cache is optimized to handle the most common case of mip-mapped textures without an extreme lod bias applied. Designing the cache to handle four unique group queries per cycle is based on the conjecture that the sum of miss probabilities from zero through four misses encompasses the vast majority of all real world miss cases. Highly minified, highly lod-biased, linear, and non-mip textures can mathematically produce more than 4 misses and will therefore see gradual performance degradation as the probability of larger miss counts (>4) increases.

Linear mode presents an exception to the working assumption of a texture space footprint of 4 cache entries or less. All linear mode textures may require more entries to achieve the same texel space footprint height as tiled mode textures.

It should be noted that two memory request may be necessary for each 32-bit per texel mode miss. Each 256-bit read atom only fetches 8 texels; half the needed data for a 4×4 color cache entry.

The raw cache feeds the data conversion unit, which does all required color space conversion or decompression into 32-bit ARGB color. Finally the color cache data store gathers requested data for presentation down the pipeline as completed requests of up to 16 or more texels.

The data fields 14200 directly entering the color cache tag unit are shown in FIG. 142. There are four address requests 14202. Each has a physical address 14204 and S and T bits to select a sub block of 4×4 texels in 4 and 8-bit modes. A request valid (rvalid) sub-field 14206 is included to mark each of the four physical address requests.

The color cache tag unit receives four address requests per cycle and produces four address requests to the raw cache per cycle. This unit will stall in lock step, but will not generate stalls. FIG. 143 shows the arrangement of the color cache tag unit 14300. It consists of four independently operating tag modules 14302 and a data bypass module 14304. The data entering each of the four tag modules is an address and a valid.

The data exiting each tag module is a ccts (color cache tag status) signal. The data fields 14400 within each ccts signal are shown in FIG. 144. This index, together with the tag unit number, indicates which address to be read or written in the color cache data store unit. When writing to the data store unit (on a miss, when miss=1), these bits are enough to define which addresses are to be written. When reading (miss=0 and rvalid=1), additional S and T bits may be needed; the necessary bits are extracted from the lower S and T bits as indicated in FIGS. 128 to 134. The rvalid0–3 signals are piped through the bypass data module.

Each tag module consists of four tag entries 14502 and one tag control module 14504. FIG. 145 shows the block level construction of a tag module 14500. Each tag entry stores an address tag and an index number from 0 to 3. Each of these blocks takes a reset; on reset, tag module 0 resets its index to 0, tag module 1 resets its index to 1, and so on. Each tag module resets to a "not valid" state. The mapping from an address tag to an entry in the cache data store is made through this index. The LRU policy is implemented through shifting the tag and index towards the bottom of the list until it is de-allocated and replaced with new data at the top of the list. When an entry hits, the tag is collapsed in the list and re-inserted at the top of the list. The tag controller module coordinates the four tag modules.

The behavior of each tag entry can be divided into compare and replace functions. The compare function consists of reporting a hit if the input address (addr[31:3]) matches the tag value and the tag state is "valid". When the tag controller asserts the write signal back to the tag module, the locally stored compare tag is overwritten with the address input; the locally stored index value is overwritten with iin, and the state of that entry is set to "valid". If the inval signal is asserted then the entry state is set to "not valid". All four tags are invalidated on the same cycle if invalidate is asserted and "stall" is de-asserted.

The tag controller generates four sets of two signals that go to each of the four cache tag entries. The inval signal is asserted when stall is de-asserted and invalidate is asserted. This clears the tag state. The write signals depend on the collection of hit signals, stall, and rvalid. If rvalid is de-asserted then no update action takes place. If stall is asserted, the unit stalls (in lock step). If a hit occurs, then all the writes starting with the hitting tag on up the chain are asserted. This causes the tag that hit to be collapsed in the list and reinserted at the top. If no tag hits, then all the writes are asserted, causing the oldest entry to be de-allocated and a new entry to be inserted at the top. The tag controller generates an index (tag controller signal iout) to insert at the top entry, along with the new address which is inserted at the top of the list. This is accomplished by selecting the hit index when a hit occurs or the bottom index when a miss occurs. After a few cycles of operation, the index order looking down the list can become arbitrarily jumbled, but the tag to data store mapping is simple and explicit. A beneficial side effect of this method of mapping is that the LRU replacement policy can be implemented with little additional logic.

The index output is the same as the iout signal. This is the hit index when a hit occurs, and the newly allocated index when a miss occurs. The hit output is asserted in the form of miss=0 and rvalid=1. The bypassed rvalid output signal is asserted a cycle after an rvalid input is received, along with flopped miss and index signals.

The format conversion unit is positioned between the raw cache unit and the color cache data store unit. It merges and synchronizes the color cache context FIFO data stream and the memory read data stream. On a color cache miss, it performs one of four major color space conversions (YUV2RGB, RGB2RBG, PLT2RGB, COMP2RGB). On a color cache hit, it generates up to 16 or more read addresses per cycle.

The merging rules for the color cache context FIFO stream and the raw cache stream are straight forward. If a color cache miss is reported in the context FIFO then both streams present a valid for either to progress. If no miss is presented in the color context FIFO stream then CC FIFO stream may progress until a miss is encountered. If no miss is encountered, the raw cache stream is stalled.

The format conversion unit waits until the raw cache provides the data (either from a memory read or from a raw cache hit). On a miss, once the data is provided from the raw cache output stream the format conversion unit performs the appropriate color space conversion.

The format conversion unit can be stalled by the unit down stream; however, the down stream stall will only be propagated upstream if there is valid data to the color cache data store unit. Bubble collapsing is therefore performed in the format conversion unit.

The format conversion unit usually takes 1 cycle to absorb data back from the raw cache, except in 32-bit ARGB texels where it takes 2 cycles (limited by the raw cache output bandwidth, providing 256 bits–only 8 texels per cycle). YUV and palette-based cache entry conversions take 4 cycles.

In 32-bit ARGB format, the format conversion unit will accept one token from the color cache FIFO while it accepts one 256-bit token from the raw cache; on the next cycle the format conversion unit will stall the color cache FIFO and accept a second 256-bit token from the raw cache. The raw cache can guarantee ordering of the two 256-bit units (lower address 256-bit aligned word followed by higher address 256-bit aligned word). In this way, it is unimportant to the color cache and color cache FIFO context how many memory retrieval cycles are needed to satisfy a color cache miss.

In YUV and Palette formats, the format conversion unit will stall both the color cache FIFO and raw cache 3 cycles for every miss (4 total cycles per 16-texel conversion to the color each). This is due to limited YUV and palette conversion bandwidth. The YUV 32-bit format is an exception; only two stalls are generated to the raw cache because two 256-bit words are needed in this format during the 4 conversion cycles.

Inputs 14600 from the raw cache unit are shown in FIG. 146. When the texels are stored in a tiled storage mapping, format[5]=1. When format[5]=0, this indicates a linear storage mapping. FIG. 147 is a table 14700 where format[4:0] indicates the format of the data, "tformat".

FIG. 148 illustrates fields 14800 for input from the raw cache. In 4-bit per texel mode, [4,3] are used to select which of the four 64-bit words to use. In 8-bit per texel mode, lsbst[4,3] are used to select which of the two 128-bit words to use. In all other modes, lsbst[4,3] are not used.

Input data from the raw cache is 256-bits wide. The raw cache output lsbst[4:3] is used to select one of four 64-bit words from the 256 bit memory read in 4-bit per texel compressed mode or 128-bits in the 8-bit/texel formats.

FIG. 149 is a block diagram of the format conversion unit 14900. As shown, the format conversion unit includes a YUV to ARGB conversion module 14902. Three YUV formats are supported. KYUV format takes 32-bits of data per texel and converts them to 32-bits ARGB per texel. The next two YUV color space formats allocate 16 bit per texel; the two formats differ only in their byte alignment. One is $VY_1 UYO$ and the other is $Y_1VY_0U$, where $Y_0$ and $Y_1$ share the same UV values in both cases. In both cases the following assumptions are made:

$$16 \leq Y \leq 2173,\ 16 \leq U \leq 240,\ 16 \leq V \leq 240$$

The following equations are used for the color space conversion:

R=1.164 (Y−16)+1.596 (V−128)

G=1.164 (Y−16)−0.391 (U−128)−0.813 (V−128)

B=1.164 (Y−16)+2.018 (U−128)

K=alpha

There are two implementation options in performing the YUV to RGB conversion:

1. Each unique subtract and add is rolled into a lookup table. The results are added together to form each of R,G and B.
2. Extract the significant bits in the coefficient of each multiply that will contribute to the final value of R, G, B. Shift the Y, U or V values to the coefficient bits that is a '1'. Perform multiple adds on the shifted values to obtained the intermediate terms. Add the intermediate terms to get R, G and B.

Note that the second method produced the same precision (preferably a maximum of 1 lsb error) with much smaller area.

An analysis was performed (in C) to find a set of coefficient tweaks that produce a maximum of 1 lsb error in RGB while minimizing the number of add/subtracts needed to represent the operation (by maximizing the number of 0's or 1's in the coefficient's binary representation). Shown below is a table containing the YUV to RGB coefficients labeled "OLD" for the standard YUV to RGB color space conversion coefficients and "NEW" the binary optimized coefficients.

TABLE 23

| OLD | | NEW | | |
| --- | --- | --- | --- | --- |
| 1.164 | ==> | $1.1640625_{10}$ | ==> | $1.0010\_101_2$ |
| 0.391 | ==> | $0.390625_{10}$ | ==> | $0.0110\_01_2$ |
| 2.018 | ==> | $2.015625_{10}$ | ==> | $10.0000\_01_2$ |

TABLE 23-continued

| OLD | | NEW | | |
|---|---|---|---|---|
| 1.596 | ==> | $1.59375_{10}$ | ==> | $1.1001\_1_2$ |
| 0.813 | ==> | $0.8125_{10}$ | ==> | $0.1101_2$ |

Checking the Y, U and V values in hardware:

```
//16 <= y <= 2173
    t_ymin =~ | yuv_mux_y[7:4] ;
    if (yuv_mux_y > 8'heb)
        t_yrange = 8'heb;
    else if (t_ymin == 1'b1)
        t_yrange = 8'104;
    else
        t_yrange = yuv_mux_y ;
// 16<= u <= 240
    t_umin = ~| yuv_mux_u[7:4] ;
    t_umax = & yuv_mux_u[7:4] ;
    if (t_umin == 1'b1)
        t_urange = 8'104 ;
    else if (t_umax == 1'b1)
        t_urange = 8'hf0 ;
    else
        t_urange = yuv_mux_u;
// 16<= v <= 240
    t_vmin = ~| yuv_mux_v[7:4] ;
    t_vmax = & yuv_mux_v[7:4] ;
    if (t_vmin == 1'b1)
        t_vrange = 8'104 ;
    else if (t_vmax == 1'b1)
        t_vrange = 8'hf0 ;
    else
        t_vrange = yuv_mux_v ;
// Y - 16
// Will never be underflow, since the min t_yrange is 16
    t_yminus = t_yrange - 16 ;
In order to obtain Y1, where
    Y1  = 1.1640625* (y - 16) (decimal)
        = 1.0010101* (y - 16) (binary)
```

Shift (y−16) to the position that contains a binary '1' in the new coefficient, and added all the shifted (y−16) values. Then truncate them to have 2 bit of fraction. All the other values for V1, V2, U1 and U2 are obtained from the similar way. Red, Green, and Blue values then can be obtained by adding Y1, V1, V2, U1 and U2 according to the equation and truncating the trailing 2 fraction bits.

```
// Y1
//1.164  ===> 1.1640625_10
//       ===> 1.0010_101_2
Y1 =    ((t_yminus<<7) + (t_yminus <<4)
      + (t_yminus <<2) + t_yminus) <<5 ; // 0.8.2
// V1
// 1.596 ===> 1.59375_10
//       ===> 1.1001_1_2
V1 =    ((t_vrange <<5) + (t_vrange <<4)
      + (t_vrange <<1) + t_vrange - (204 <<5) ) <<3 ;
// 1.8.2
// U2
// 2.018 ===> 2.015625_10
//       ===> 10.0000_01_2
U2 = (( t_urange <<7) + t_urange - (258 <<6) ) <<4 ; //
1.8.2
// U1
// 0.391 ===> 0.390625_10
//       ===> 0.0110_01_2
U1 =    ( ( t_urange <<6) + (t_urange <<4)
      + (t_urange <<3) − (50 <<6) ) <<4 ; // 1.7.2
// V2
```

-continued

```
// 0.813 ===> 0.8125_10
//       ===> 0.1101_2
V2 =    ( ( t_vrange <<3) + (t_vrange <<2)
      + t_vrange − (104 <<4) ) <<2 ; // 1.7.2
// Red, sign extending 1 bit on V1
R = (Y + V1) <<2 ; // 1.9.0
If (R > 255), R=255 ;
If (R<0) , R=0 ;
// Green, sign extending 2bits on U1 and V2
G = (Y − U1 − V2) >>2 ; // 1.9.0
If (G > 255) , G = 255 ;
If (G < 0) , G = 0 ;
// Blue, sign extending 1 bit on U2
B = (Y + U2) <<2 ; // 1.9.0
If (B > 255) , B = 255 ;
If (B < 0) , B = 0 ;
```

A total of 4 YUV conversions are performed per cycle, thus 4 cycles are needed to fill up 16 texels in a color cache miss cycle. At the end of the forth pipe in the format conversion unit, 4 converted texels are registered every cycles. After all of the 16 texels are converted and accumulated, the 16 texels are written into the color cache data store.

A palette to ARGB conversion unit 14904 is also provided. Palette based textures can be either 8 bit per texel or 16 bit per texel. The 8 bit type assumes a fully opaque texture (alpha=0xff), while the 16-bit type uses 8 alpha bits and 8 palette index bits.

The palette lookup RAM has four 24-bit read ports and one 24-bit write port. With four read ports it takes four cycles to complete 16 index to color conversions. The palette LUT can only be written when the pipe is idle. Palette writes are encoded by the TAD unit and pushed down the color cache context FIFO. A palette write is indicated by a swapst[3:0]=0x1 in linear mode (an otherwise illegal condition).

The ARGB to ARGB conversion unit 14906 starts with data that is 8-bit/texel, 16-bit/texel or 32-bit/texel. RGB conversion are performed based on the SW model's format conversion table (formats 0,2,3,4,8,10,11,12,13,18). The conversion consists of muxing of the correct data to the desired position in the target output ports. All 8 bit and 16 bit per texel RGB formats take one cycle to convert 16 colors from the input 256-bit word. The 32-bit per texel RGB format takes two cycles to move a 16 color cache entry into the color cache data store (two cycles of 256 bits each together yield 512 bits of data).

A compressed to ARGB conversion unit 14908 is also provided. There are many types of compressed data. The type discussed here is DirectX Compressed Texture Format. DirectX has three different modes DXT1, DXT2 and DXT3.

The compressed formats are 4-bit/texel (one DX6 format is an effective 8 bits per texel with 4 bits for color and 4 bits for alpha per texel). However, 128-bit or 64-bit of data are used initially to decompress into 16 texel colors. The format conversion unit is capable of decompressing 16 texel colors per cycle.

FIG. 150 illustrates opaque and one bit alpha transparency blocks (DXT1) 15000 in DirectX.0:Compressed Texture Format.

```
if (color0 > color1) - - treating rgb565 and unsign
number
```

-continued

```
    4 colors encoding, always opaque
else
    3 colors encoding, when texel_index= 11, alpha=
    tranparent, rgb=00h
```

FIG. 151 illustrates explicit texture transparency (Alpha Channel) encoding (DXT2) 15100. Note that Bit 127 to bit 64 are processed the same as DXT1 format. 16 alpha values are used as it is without any form of interpolation.

FIG. 152 illustrates 3-Bit Linear Alpha Interpolation (DXT3) 15200. Again, Bit 127 to bit 64 are processed the same as DXT1 format.

```
If (alpha0 > alpha1)
    6 intermediate alpha values are created by
    interpolation
else
    4 intermediate alpha values are created by
    interpolation and 2 implicit alpha values
    (alpha=0, fully transparent) and (alpha=255,
    fully opaque)
```

There are four additional compressed texture formats: C_HI, CC_CHROMA, CC_MIXED and CC_ALPHA. Each of the formats compress two 4×4 texel blocks into 128 bits. A unique number(format[4:0]=VIDDEV_TA_FXT1 ) is assigned to this compressed texture format to distinguish it from the rest of the texture formats.

FIG. 153 depicts compressed texture format (CC_HI) 15300. In CC_HI format, mode=$002$, color1(RGB555) and color0(RGB555) are converted into RGB888 by duplicating the upper 3 bits for the 3 lsb. See the following table. Color1 and color0 are used to linear interpolate 5 more levels of color to create seven total levels of colors and 1 alpha (transparent). The first seven colors always have alpha=ffh (opaque). The eighth color value indicates that alpha=00h; with alpha=$0_2$, the RGB component is set to 0 (full black).

These eight colors are used as the content of a 3 bit index look up. The color(ARGB8888) for texel31 to texel0 is obtained by muxing in the selected one of eight available colors (7 opaque colors, 1 clear black).

TABLE 24

Generating RGB888 from RGB555:

| Color1 | (red)   | = | { [125:121], [125:123] } |
| Color1 | (green) | = | { [120:116], [120:118] } |
| Color1 | (blue)  | = | { [115:111], [115:113] } |
| Color0 | (red)   | = | { [110:106], [110:108] } |
| Color0 | (green) | = | { [105:101], [105:103] } |
| Color0 | (blue)  | = | { [100:96], [100:98] } |

TABLE 25

Creating Seven ARGB8888 Colors From Two RGB888 Colors:

```
Color[0] = color0 [r,g,b],
alpha[0] = ffh
Color[1] = (5*color0 [r,g,b] + color1 [r,g,b] + 3 ) /6
alpha[1] = ffh
Color[2] = (4*color0 [r,g,b] + 2*color1 [r,g,b] + 3 ) /6
alpha[2] = ffh
Color[3] = (3*color0 [r,g,b] + 3*color1 [r,9,b] + 3 ) /6
alpha[3] = ffh
```

TABLE 25-continued

Creating Seven ARGB8888 Colors From Two RGB888 Colors:

```
Color[4] = (2*color0 [r,9,b] + 4*color1 [r,g,b] + 3 ) /6
alpha[4] = ffh
Color[5] = (color0 [r,g,b] + 5*color1 [r,g,b] + 3 ) /6
alpha[5] = ffh
Color[6] = color1 [r,g,b],
alpha[6] = ffh
Color[7] = where r,g,b = 00h, alpha [7] = 00h
```

The following table sets forth table look up values.

TABLE 26

| Index of texel31 to texel0 | Color for texel 31 to texel 0 ARGB8888 |
|---|---|
| 0 | color[0] => {a[7:0], r[7:0], g[7:0], b[7:0]} |
| 1 | color[1] |
| 2 | color[2] |
| 3 | color[3] |
| 4 | color[4] |
| 5 | color[5] |
| 6 | color[6] |
| 7 | color[7] |

FIG. 154 depicts a memory mapping 15400 of texel 31 to texel 0.

FIG. 155 shows the Compressed Texture Format (CC_CHROMA) 15500. In CC_CHROMA format, mode=$010_2$, color[3:0](RGB555) are converted into RGB888 as before. Color3 to Color0 are used as they are, no interpolation is needed. Color3 to color0 are used as the contents of a 2-bit look up table. Alpha is always opaque(0xff). The color (ARGB8888) for texel 31 to texel 0 could be obtained by performing table look up from the 2-bit index that is assigned to them.

The following table sets forth table look up values.

TABLE 27

| Index of texel 21 to texel 0 | Color for texel 31 to texel 0 ARGB8888 |
|---|---|
| 0 | color0, alpha channel=ffh => {a[7:0], r[7:0], g[7:0], b[7:0]} |
| 1 | color1, alpha channel=ffh |
| 2 | color2, alpha channel=ffh |
| 3 | color3, alpha channel=ffh |

FIG. 156 depicts the Compressed Texture Format (CC_MIXED) 15600. In CC_MIXED format, mode[0]=$1_2$ (only one bit), color2 and color3 are used for texel 31 to texel 16, and color0 and color1 are used for texel 15 to 0.

When alpha[0]=0, these two pairs of colors color0/1 and color2/3 are interpreted as RGB565 colors. For color1 and color3, the lsb of the green channel comes from the glsb bits. Color1.green[0]=bi1345. Color3.green[0]=bi1346. For color0 and color2, the lsb of the green channel comes from the upper select bit for texel 0 and texel 16, respectively. Color0.green[0]=bit1 xor bi1345. Color2.green[0]=bi171 xor bi1346. The two colors are then expanded to RGB888 format by bit replication, and used to create 2 more levels of color in between the color0/2 and color1/3 values through linear interpolation. A total of 4 colors are therefore available for 2-bit index per texel selection.

When alpha[0]=1, only 1 more level of color is created between color1/3 and color0/2, texel index of 3 will indicate transparent black.

The color (ARGB8888) for texel 31 to texel 0 could be obtained by performing table look up from the 2-bit index that is assigned to them.

The following table describes creating the base colors color3 and color2.

TABLE 28

Color3 (red) = { [123:119], [123:121] }
Color3 (green) = { [118:114], [126], [118:117] }
Color3 (blue) = { [113:109], [113:111] }
Color2 (red) = { [108:104], [108:106] }
Color2 (green) = alpha ? { [103:99], [103:101] }
             : { [103:99], [33] ^ [126], [103:102] }
Color2 (blue) = { [98:94], [98:96] }

The table below describes creating the base colors color1 and color0.

TABLE 29

Color1 (red) = { [93:89], [93:91] }
Color1 (green) = {[88:84], [125], [88:87] }
Color1 (blue) = {[83:79], [83:81] }
Color0 (red) = {[78:74], [78:76] }
Color0 (green) = alpha ? {[73:69], [73:71] }
              :{ [73:69], [1] ^ [125], [73:72] }
Color0 (blue) = { [68:64], [68:66] }

NOTE: When alpha[0]=0, because one of the select bits is used to determine a bit of color0/2, the software performs differently. The recommended method is presented int eh following table. The method describes how to get color0 & color1 and the associated select bits. The same method applies to the lsb of green for color2 & color3.

TABLE 30

1. Determine 5-6-5 values for color0 & color1
2. Determine the select bits for each pixel in the 4x4 block.
3. If(pixel[0].select[1] != color0.green[0]^color1.green[0]) then swap color0 & color1, and invert all the select bits.

Below is a snippet of pseudo-C to generate bits 0–31, bits 64–93 & bit 125 based on the initial color0, color1 and pixel indices:

```
struct RGB565 {Byte red; Byte green; Byte blue};
struct CSels {Byte index[16]};
// cc_mixed_right_half derives bits[93:64] of the
// 128 bit data word of a
// CC_MIXED non-alpha compression block and
// returns them in 'bits_64_to_31'.
// Plus, as a bonus, you will receive bit 125,
// containing the lsb of
// the green channel of color1, and bits_0_to_31,
// containing all of the pixel indices - All
// at no extra charge.
void
cc_mixed_right_half(RGB565 color0, RGB565 color1,
CSels pix, Dword &bits_0_to_31,
          Dword &bits_64_to_93, Bit &bi1345)
{
   RGB565 o_color0;
   RGB565 o_color1;
       // Determine whether to switch color0 &
color1
       if (((pix.index[0] >> 1) & 1) !=
((color0.green ^ color1.green) & 1)) {
          o_color1 = color0;
          o_color0 = color1;
          for (int i=0; i<16; i++) pix.index[i] =
~pix.index[i] & 3;
       } else {
```

```
          o_color0 = color0;
          o_color1 = color1;
       }
     // Save lsb of color1.green in bi1345
     bi1345 = o_color1.green & 1;
       // Convert color0 & color1 to RGB555, and
then munge into bits 64 to 93
       o_color0.green >>= 1;
       o_color1.green >>= 1;
          bits_64_to_93 = (  (o_color1.red<<25) |
(o_color1.green<<20) | (o_color1.blue<<15)
                                                |
(o_color0.red<<10) | (o_color0.green<<5)   |
(o_color0.blue)            );
     // Munge the pixel indices into bits 0 to 31
       bits_0_to_31 = 0;
       for (int i=0; i<16; i++) bits_0_to_31 |=
pix.index[i]<<(i*2);
}
EQUIVALENT for bit accurate C-sim for texel 31 to 16
    If alpha=0,
        Color[0] = color2[r,g,b] , alpha=ffh
        Color[1] = (2 * color2[r,g,b] + color3[r,g,b] +
           1) / 3, alpha=ffh
        Color[2] = (color2[r,g,b] + 2 * color3[r,g,b] +1)
           / 3, alpha=ffh
        Color[3] = color3 [r,g,b], alpha=ffh
    If alpha=1,
        Color[0] = color2[r,g,b], alpha=ffh
        Color[1] = (color2[r,g,b] + color3[r,g,b]) / 2,
           alpha=ffh
        Color[2] = Color3[r,g,b], alpha=ffh
        Color[3] = [a,r,g,b] = 00h
EQUIVALENT for bit accurate C-sim for texel 15 to 0
If alpha=0,
        Color[0] = color0[r,g,b] , alpha=ffh
        Color(1) = (2 * color0[r,g,b] + color1[r,g,b] +
           1) / 3, alpha=ffh
        Color[2] = (color0[r,g,b] + 2 * color1[r,g,b] + 1)
           / 3, alpha=ffh
        Color[3] = color1[r,g,b], alpha=ffh
If alpha=1,
        Color[0] = color0[r,g,b], alpha=ffh
        Color[1] = (color0[r,g,b] + color1[r,g,b]) / 2,
           alpha=ffh
        Color[2] = Color1[r,g,b], alpha=ffh
        Color[3] = [a,r,g,b] = 00h
```

The following table sets forth table look up values.

TABLE 31

| Index of texel 31 to texel 0 | Color for texel 31 to texel 0 ARGB8888 |
|---|---|
| 0 | color[0], {a[7:0], r[7:0], g[7:0], b[7:0] |
| 1 | color[1] |
| 2 | color[2] |
| 3 | color[3] |

FIG. 157 depicts the Compressed Texture format (CC_ALPHA) 15700. In CC_ALPHA format, mode[2:0]=011$_2$, color2, color1 and color0 (ARGB5555) are converted to ARGB8888 by duplicating the upper 3-bits for the 3 lsb.

When lerp 0, color2 to Color0 are used as they are, no interpolation is needed, and texel index of 3 indicates transparent black. A total of 4 colors will be used as the content for the 2-bit look up table (mux selection).

The color (ARGB8888) for texel 31 to texel 0 could be obtained by performing table look up from the 2-bit index that is assigned to them.

The following table sets forth table look up values.

TABLE 32

| Index of texel 31 to 0 | Color for texel 31 to texel 0 (ARGB8888) | |
|---|---|---|
| 0 | Color[0] = color0 | alpha = alpha0 |
| 1 | Color[1] = color1 | alpha = alpha1 |
| 2 | Color[2] = color2 | alpha = alpha2 |
| 3 | Color[3] = 000000h | alpha = 00h |

When lerp=1, color2 and color1 will be used as the base colors for texel 31 to texel 16. Color1 and color0 will be used as the base colors for texel 15 to texel 0.

These two pairs of colors are used to create 2 more levels of color in between Hi and Lo through linear interpolation. A total of 4 colors will be used as the content for the 2-bit look up table (mux selection).

The color (ARGB8888) for texel 31 to texel 0 could be obtained by performing table look up from the 2-bit index that is assigned to them.

The following table describes creating the 4 colors from the base colors for texel 31 to texel 16.

TABLE 33

EQUIVALENT for bit accurate C-sim
Color[0] = color2[a,r,g,b]
Color[1] = (2 * color2[a,r,g,b] + color1[a,r,g,b] + 1) / 3
Color[2] = (color2[a,r,g,b] + 2 * color1[a,r,g,b] +1) / 3
Color[3] = color1[a,r,g,b]

The table below describes creating the 4 colors from the base colors for texel 15 to texel 0.

TABLE 34

EQUIVALENT for bit accurate C-sim
Color[0] = color0[a,r,g,b]
Color[1] = (2 * color0[a,r,g,b] + color1[a,r,g,b] +1) / 3
Color[2] = (color0[a,r,g,b] + 2 * color1[a,r,g,b] +1) / 3
Color[3] = color1[a,r,g,b]

The following table sets forth table look up values.

TABLE 35

| Index of texel 31 to 0 | Color for texel 31 to texel 0 ARGB8888 |
|---|---|
| 0 | color [0] |
| 1 | color [1] |
| 2 | color [2] |
| 3 | color [3] |

FIG. 158 graphically describes write address generation 15800 for tiled storage mapping. In a color cache miss, 16 texel colors can be produced by the format conversion unit to fill a cache entry.

One write address wradd[3:0] 15802 needs to be generated to write 4 texels into 4 color cache data store RAM locations of same cache tag group and cache entry.

When more than one misses are indicated by miss[3:0], the miss with the lower tag group, miss[0] is serviced first, then miss[1], miss[2] and finally miss[3]. The tag field in the write address are 00, 01, 10, 11 respectively when miss[0], miss[1], miss[2], miss[3] are being serviced. The cache entry field in the write address will be the contents in i0, i1, i2 or i3 respectively when miss[0], miss[1], miss[2] or miss[3] serviced.

The position of cache slots that will be occupied by the 16 texels are based on the linear/tiled storage mapping and their st[[3:0] position.

The format conversion unit also needs to mux the converted texel colors appropriately to the respective color cache data store ram based on the two different storage mapping styles (tiled/linear). FIGS. 159–162illustrate several storage mapping styles. FIG. 159 depicts a cache tag group 15900 for tiled storage mapping. FIG. 160 illustrates a cache slog 16000 for tiled storage mapping. FIG. 161 shows a cache tag 16100 for linear storage mapping. FIG. 162 illustrates a cache slot 16200 for linear storage mapping.

FIG. 163 illustrates read address generation 16300. There are 4 read address generation units in the format conversion unit according to one embodiment. Each of the read address generation units are assigned to one of four 2×2 texel for each pixel. In each cycle, up to 16 or more texel addresses are generated (4 per generation unit). Pg0[1:0], pg4[1:0], pg8[1:0] and p181[1:0] contains the tag group that corresponding to upper lef reference texel for the upper left pixel, upper right pixel, lower left pixel and lower right pixel respectively. Where st0[3:0], st4[3:0], s130[3:0] and s134 [3:0] are for the upper left reference texel of the upper left pixel, upper right pixel, lower left pixel and lower right pixel respectively.

With the st reference values and the pg0 (pixel group), all the tag groups for the 2×2 texels can be computed. Using the tag group to select i0, i1, i2 or i3 (if tag=00, then i0 . . . if tag=11, then i3), the contents of the selected i0, i1, i2, or i3 will be the cache entry.

Depending on the linear or tiled storage mapping, and the st reference values, the cache slot of the desired 2×2 texel is thus obtained.

These four addresses are finally muxed to the correct RAM cell to get the needed texel.

The mask bits, m0[3:0], m4[3:0], m8[3:0] and m12[3:0] are sticky and accumulate to indicate valid texel set (rvalid [15:0]). The color cache data store unit will be able to consult the rvalid[15:0] to obtain the valid texel mask output. When all read and write addresses are set up the "last" signal is asserted, indicating to the color cache data store unit that it needs to generate a valid DVS transaction to the TD unit–the next unit below the texture cache in the pipeline.

FIG. 164 illustrates the S, T Swizzle 16400 for a tiled storage map. FIG. 165 shows the S, T Swizzle 16500 for a linear storage map. In order to realigned the read data from the color cache store in a 2×2 texel foot print with upper left texel, upper right texel, lower right texel and lower left texel, the read data can be swizzled in S or T space, depending on the reference texel and the linear or tiled storage mapping. As shown, a swap in S means: swap both upper and lower texels left to right. A swap in LT means: swap the left texel top to bottom. A swap in RT means: swap the right texel top to bottom.

FIG. 166 illustrates the output fields 16600 from the format conversion unit. Color cache data store unit handles write around when writing and reading from the same address.

The color cache context FIFO is used to account for the uncertainty in memory request latency when conveying information from the color cache tag unit to the color cache data store unit. FIG. 140 (discussed above) shows the placement of the color cache context FIFO in the texture cache. FIG. 167 shows the data fields 16700 pushed into this FIFO. Each unique color cache miss results in a push on the color cache context FIFO of the data in FIG. 167. The color cache context takes 58 bits in the FIFO, the pass data takes up another 116 bits. A total of 174 bits are needed in the color cache context FIFO. The FIFO target size will be 176 (11*16) bits to leave 2 spares. The group context data in FIG. 167 is gathered into a single vector called gcontext in Verilog. The remainder of the color context FIFO contains escorted state:

```
//////////////////////////////////////
///// ccfifo[:] definition    ////
/////   gcontext vector       ////
//////////////////////////////////////
// these are computed by TAD:
gcontext [1:0]     = pg0[1:0];    //
gcontext [3:2]     = pg4[1:0];
gcontext [5:4]     = pg8[1:0];
gcontext [7:6]     = p181[1:0];
gcontext [11:8]    = st0[1:0];
gcontext [15:12]   = st4[1:0];
gcontext [19:16]   = s130[1:0];
gcontext [23:20]   = s134[1:0];
gcontext [27:24]   = m0[3:0];
gcontext [31:28]   = m4[3:0];
gcontext [173:32]  = m8[3:0];
gcontext [39:36]   = m12[3:0];
// these are computed and added by CTU:
gcontext [41:40]   = i0[1:0];
gcontext [43:42]   = i1[1:0];
gcontext [45:44]   = i2[1:0];
gcontext [47:46]   = i3[1:0];
gcontext [51:48]   = miss[3:0];
// these are passed from TAD and tacked on here.
gcontext [57:52]   = format[5:0];   // {1: tiled,
0:linear}, {SW formats}
gcontext [58]      = last;          // 1: last CC item
//////////////////////////////////////
/////  pstate bundle vector ////
//////////////////////////////////////
psbundle [1:0]     = pstate_dir[1:0];
psbundle [4:2]     = pstate_itrnum[2:0];
psbundle [9:5]     = pstate_mask_pix0[4:0];
psbundle [14:10]   = pstate_mask_pix1[4:0];
psbundle [19:15]   = pstate_mask_pix2[4:0];
psbundle [24:20]   = pstate_mask_pix3[4:0];
psbundle [27:25]   = pstate_newstate[2:0];
psbundle [28]      = pstate_newtri;
psbundle [30:29]   = pstate_pop[1:0];
psbundle [32:31]   = pstate_push[1:0];
psbundle [33]      = pstate_void;
psbundle [42:34]   = scale[8:0];
psbundle [51:43]   = lms2tcu[8:0];
psbundle [53:52]   = ker2flt[1:0];
psbundle [61:54]   = wts_pix0[7:0];
psbundle [69:62]   = wts_pix1[7:0];
psbundle [77:70]   = wts_pix2[7:0];
psbundle [85:78]   = wts_pix3[7:0];
psbundle [93:86]   = wtt_pix0[7:0];
psbundle [101:94]  = wtt_pix1[7:0];
psbundle [109:102] = wtt_pix2[7:0];
psbundle [117:110] = wtt_pix3[7:0];
psbundle [121:118] = wrapst[3:0];     // in linear mode
if wrapst[0]= 1
                                       // then palette
write for that push
pallette [7:0]     = palette_addr [7:0];
palette [31:8]     = palette_data [23:0];
palette [58:32]    = 27'h0; // linear mode set by 0
// push ccfifo (rcu walker)          // ?
palette write : normal mode
ccfifo [58:0]      = (wrapst[0]&&
!format[5])?palette[58:0] :gcontext[58:0];
ccfifo [180:59]    = (wrapst[0]&&
!format[5])?{4'h1,118h'0}:psbundle[121:0];
ccfifo [183:181]   = 3'b 000;       // 3 spares reserved
// pop ccfifo (fmt)
if (wrapst[0] && !format[5]) begin // unconditional
ccfifo pop to palette write
    palette[58:0 = ccfifo [58:0:];
end
else begin // do conditional pop on ccfifo in fmt
    gcontext [58:0]   = ccfifo [58:0:];
    psbundle [121:0]  = ccfifo [180:59];
                     // ccfifo [183:181] reserved
end
// extract individual signals from ccfifo bit sub-
fields . . .
```

The pass field contains all per-pixel non-cache related data such as blend factors and "pstate" data.

The upper three bits (7:5) of the format field specifies access modes. One bit indicates if the access is to local RAM or AGP space (bit 7). One bit indicates if the access is to tiled or linear space (bit 6). And if the access is to a tiled space, then the third bit is specifies which of two tile mode is being used (bit 5). The lower 5 bits (4:0) state which color space format is being used; only the lower 5 bits actually have to be sent down the FIFO to the format conversion unit (FMT).

The pixel mask information field (pm info) 16702 states which texel requests have been filled. The first mask corresponds to request ports 0 to 3 (bits 0 to 3 in the mask nibble); these in turn correspond to the upper left (0), upper right (1), lower left (2) and lower right (3) texel positions for pixel 0 (upper left in screen space). Pixel 1 (upper right in screen space) is represented in "m4". The pixel 2 (lower left in screen space) is represented in "m8". The pixel 3 (lower right in screen space) is represented in "m12". When all requests are satisfied by walking all the groups, the accumulated OR of these four masks is the original rvalid input vector. This vector will be presented at the output of the cache. When one to four miss occurs, the masks indicate which texels are filled after the miss or misses are satisfied. If more than four misses occur and the color cache spends more than one cycle satisfying a request, then the mask indicates the texels satisfied by the current cycle's data (up to four or more cycles).

The st0 through s134 fields 16704 contain the coordinates of each pixel's top left texel in S,T space. The top left texel serves as the reference from which the other three texel coordinates will be derived. The st0 through s134 values indicate which of 16 texels from a cache entry satisfies the reference texel. The others are always at an offset of +1 in S and +1 in T relative to the reference texel. The format of st0 through s134 is {T[1:0], S[1:0]}.

The pg0 through p181 fields 16706 indicate which of the four color cache tag groups each of the four reference texels are in. The i0 through i3 fields indicate which tag entries from the four groups are participating in this cycle. A value of 3 in the pg0 field indicates that the reference texel for pixel 0 (st0) is in the cache entry indicated by i3.

The i0 through i3 fields 16708 map directly to the tag modules in the color cache tag unit. Each i0 through i3 value is the hit/miss index from each of the four modules.

The miss[3:0] field 16710 is a mask that indicates which of the index_info field index values are misses. In a miss condition, the current cache entry to write is given by the lowest set miss field flag and the value in the indicated i0 to i3 field. For example, if miss [3:0]=0110, then a cache entry associated with tag group i1 is to be written first, and tag group i2 next. The first cache entry to be filled is selected by the value in i1 [1:0], the second to be filled is in i2[1:0]. The field called "last" is a single bit indicating that after processing the given token to completion (perhaps including a cache entry write) the 16 original input requests have been completely serviced.

Extracting three texel S,T values from the reference value involves examining the S and T value of the reference texel (st0, st4, s130, or s134) and incrementing that value by one in the S dimension and by one in the T dimension. Incrementing in either dimension may exceed the footprint of the reference texel's cache entry. Some additional information may be required to determine both the target cache entry and the S,T coordinates in that target cache entry.

FIG. 168 illustrates the S, T calculation process 16800, 16802 from a FIFO context when the extracted texel coordinates cross a cache entry boundary. The orientation of the groups is specified by the notion of gss and gst functions (group swap s and group swap t). If the groups are oriented with respect to S as shown on the left side of FIG. 168 then gss is 0; if they are swapped as shown on the right side then gss is 1. From a reference texel (top left), the other three texel's group and S,T coordinates can be calculated. For example, with gss=0 and the reference texel S=0xF, the top right texel is in group 01 and that its S coordinate is 0.

In a similar way, the gst function will swap the original orientation (shown on the left in FIG. 168) in the T dimension. Both gss and gst can be determined uniquely from the group and reference texel information in the color cache context.

The color cache data store accepts write data from the format conversion unit at a rate of 16 texels per cycle. The data store unit accepts write data and read addresses from the format conversion unit. FIG. 169 shows the bit fields 16900 in the color cache data store input token. The read_info data field d3102 consists of sixteen read addresses used by the sixteen total read ports (4 RAMS, 4 ports each). The swaps data is used to align read data to the appropriate output color port; this will be explained shortly. The rvalid data field indicates which of the sixteen output colors are the result of valid read requests. The write_info data field 16904 consists of four 128 bit data words, four 4 bit addresses, and four write enable bits. The "last" bit indicates that all the cache entries are filled as of that data token and the 16 entries are ready to be presented down the pipeline. A stallable bypass path is preferred in the RAMs so that data written to a given address can be read from that address and/or stalled in the same cycle.

Color data is stored sorted by S and T lsb alignment (T[0],S[0]={00, 01, 10, 11}). Four RAMS, each with five independent ports (1W: 128 bits; 4R: 32 bits each) are used to store 4 sets of 16 colors each. Each 16 texel color cache entry stores four colors in each of the four RAMS. Four colors can be written at a time and four read at a time. This provides a total read rate of 16 colors out of the data store RAM and a write rate of 16 colors into data store RAM.

FIG. 170 illustrates a color cache data store unit 17000. The mapping process of each request on to the appropriate S and T aligned RAM 17002 utilizes an alignment step. The Mux0 through Mux3 17004 blocks in FIG. 170 provide this step. Each mux in FIG. 170 receives one color from each of the four RAMs. In tiled mode these colors form a 2×2 block. If the 2×2 block is aligned with the four target texels then no swapping is necessary. If the texels from each group (0–3, 4–7, 8–11, 12–15) are miss-aligned then they are swapped in S or T then they are swapped in S or T. The swaps signals provide indication of which mux needs to swap in S or in T. As an example, if the reference texel for pixel 0 (corresponding to Mux0) lands on an even S value (lsb of S=0), then either RAM0 or RAM2 will contain the required data for that texel (depending, of course on the T alignment). In this case, no swapping in S in necessary. However, if the reference texel lands on an odd S value (lsb of S=1), then either RAM1 or RAM3 will contain the required data for that texel. In this case, swaps[0]=1 and the data for RAM0 is swapped with RAM1 and the data for RAM2 is swapped with RAM3. After this swap, a second level of swapping can occur based on the T dimension alignment. FIG. 171 shows a tiled space mapping 17100 of cache entry to physical RAMS.

FIG. 172 depicts a linear space storage mapping 17200 according to one embodiment. In linear mode the notion of interleaving in the T dimension is somewhat lost since the color cache entries are only 1 sample tall. This is a potential problem because the cache output performance depends on being able to read all necessary texels in a single cycle from the four color cache data store RAMs. If linear mode data is loaded into the data store RAMs with the same stagger pattern used by tiled mode data, the data store RAMs can not provide read data at full performance. However, by staggering the texel storage locations as shown in FIG. 172, linear mode data can be accommodated with full read performance.

Although the T[0] bit is not present in linear mode texel addresses, the tag group implies the value of T[0]. That is, in linear mode tag groups 2 and 3 always map to cache entry footprints with T=1, and groups 0 and 1 always map to footprints with T=0. Thus, when the format conversion unit writes into a cache entry associated with tag group 0 or 1 in linear mode it uses the T=0 alignment and when it writes a cache entry associated with tag groups 2 or 3 it uses the T=1 alignment.

Four set of two swap bits are used for T. Each pixel may need to have their left and/or right two texels swapped in T.

The raw cache accepts four requests per cycle. The raw cache has a mechanism similar to the color cache aggregation unit and group walker; the raw cache aggregation function attempts to group addresses and the raw cache walker only presents unique addresses to the raw cache tag unit. One to four cycles are therefore needed to process a request to the raw cache.

The raw cache data store unit always takes one cycle per valid address request to present outgoing data to the format conversion unit, even if all four cycles are spent emitting the same address contents or hit data. This behavior has two reasons: 1) it is a simple way to retire all valid requests presented to the raw cache, and 2) this is the peak absorption rate of the format conversion unit/color cache data store for single cycle fills.

In 4-bit and 8-bit per texel modes it is possible to have unique tag groups which fall in the same 256-bit memory address. When this happens only the unique addresses are posted to the raw cache tag unit. The redundant address or addresses are not emitted as redundant memory requests. Thus four requests can be collapsed down to as few as one actual tag query and perhaps no memory request if that one request is a raw cache hit. The raw cache context FIFO (rcfifo) gets one push per raw cache tag query. If all four addresses can be aggregated into one request, then only one FIFO push is needed. Each FIFO push is marked with how many raw cache requests it represents. Note that the color cache context FIFO contains as many pushes as there are valid physical addresses. Thus, it is possible to have four pushes on the color cache context FIFO and only one push on the raw cache FIFO (with one or no resulting memory request).

Although the raw cache aggregator functionality is conceptually separate from both the raw cache walker unit and the color cache tag unit, it may prove more practical to implement the raw cache aggregator logic in the same pipeline stage as the color cache tag unit.

The raw cache address walker unit accepts a stall from the raw cache tag unit. This stall is actually the OR of the stalls from the rcfifo (FIFO 2 in FIG. 140) and the memory interface. The raw cache address walker unit generates stalls when the number of unique addresses is greater than one. Up to three or more stalls can be generated (four or more total cycles).

The address walker scans the four request inputs from the aggregator and serializes them down to one per cycle which it presents to the raw cache tag unit. Starting with the first memory request cycle for a group of up to four or more requests, it pushes the grouping information provided by the aggregator unit on to the rcfifo. This grouping information is used by the raw cache data store when presenting the memory reads to the format conversion unit; each read request (redundant or not) takes a cycle at the format conversion unit end of the raw cache.

The raw cache address walker starts with addr0 and tries to group addr1, addr2 and addr3 in much the same way as the color cache group walker. The difference is there is no observation of blocking alignment. The raw cache address walker scans for the first non-redundant appearance in the address list from addr0 to addr3 and emits requests in that sequence to the raw cache tag unit.

The raw cache tag unit receives a sequential stream of address requests and generates memory requests when those address requests miss. This unit accepts a stall (same stall signal as the raw cache address walker) but does not generate stalls. It always completes a tag lookup and tag write in the same cycle. The current plan is the build this unit as one 1 port 16 entry fully associative LRU cache; this is a single instance of a 16 entry version of the cache tag module used in the color cache. Other replacement policies may be worth exploring (LRA, or some counter based quasi-LRU mechanism).

The raw cache data store contains entries for 256-bit words in a 256-bit x N entry RAM. The raw cache data store slaves it's state from the raw cache address walker and raw cache tag units. When the tag detects a hit the data store is instructed to read the address associated with that hit from it's RAM and present it as output. When a miss occurs, the data store unit over-writes the indicated address in its RAM and also presents that data as output in the same cycle.

FIG. 173 shows the data 17300 entering the raw cache data store from the raw cache context FIFO. The raw cache data store receives an address and a miss signal. The miss signal indicates that a data store entry is to be overwritten. If miss is not asserted (but a DVS transaction occurs) then a hit is assumed and only a read is necessary. The n[1:0] field specifies how many cycles the current data is to be emitted by the raw cache data store. Recall the raw cache accepts four requests per cycle and attempts to group them going into the raw cache tag unit to minimize memory request traffic. The n[1:0] field indicates how many physical address requests are satisfied by this read data. The raw cache data store emits one request per cycle to the color cache data store.

FIGS. 174 and 175 are block diagrams 17500 for performance simulation of the texture cache. More particularly, FIG. 174 shows a color cache performance model 17400. FIG. 175 depicts a raw cache performance mode 17500. See each module's respective description in the preceding paragraphs for more details. The texture cache presents a testing exception to the general test flow used throughout most of the 3D pipeline. The following paragraphs outline where and why the cache is an exception and how to address some of the resulting issues.

The general philosophy employed in testing the 3D pipeline's Verilog RTL code is to consider the HW CSIM a golden reference from which equivalence can be achieved. The CSIM does not model the cache's internal behavior, thereby disallowing the equivalence-to-golden model of module level testing adopted in the rest of the pipeline. The PSIM does not attempt to model the real internal behavior either, although it does model per cycle behavior to allow cycle counting performance measurements. The CSIM does model the texture cache's external behavior so equivalence testing can proceed on that level.

To address the module level testing issue, each major sub-module in the texture cache pipeline can be tested by vectors from a local CSIM of that module. These sub-modules are:

| | |
|---|---|
| tc_ctu | color tag unit |
| tc_rcu | entire raw cache unit |
| tc_rcu_138 | raw cache tag sub-unit |
| tc_fmt | format conversion unit |
| tc_cds | color data store |

Each of the above five sub-modules can be tested using standard test bench scripts, with the test vectors coming from a UNIX based C application that produces stimulus for the module and simulates the intended result. The goal of module level testing on this level is not to achieve equivalence with a separately created golden reference, but rather has two specific goals:

1) To assure the module behaves as the designer intended—at least to the first order. This does not guarantee final agreement at the TC level, but that is what TC level testing is for.

2) To provide a infrastructure for debugging TC level vectors (when they become available) at the module level.

The ctu module's behavior is easily defined independently of the CSIM; the design intent can be tested with a high degree of confidence. The stimulus is a set of request addresses, with a random probability of choosing a new address on each of the four ports, or an address known to be current and valid.

The two rcu modules can also be defined neatly and independently of CSIM. The rcu has some additional behaviors that need to be tested—for example, generating one additional address request to the next 256-bit word while in 32-bit mode.

The texture cache interfaces to the memory controller through the rcu module. This may impose an additional set of testing requirements.

1) A memory port transactor may be necessary.

2) A mechanism for loading a memory image from the CSIM through a backdoor into Verilog may be necessary.

3) A mechanism for algorithmically computing a memory data back result based on input address and mode bits may be helpful for stand along testing.

The fmt module contains significant data path and data manipulation logic for color space conversion and formatting that matches the CSIM. To perform module level testing on the fmt module, CSIM code will be incorporated by the module level test application to generate test vectors. This introduces some uncertainty in module level testing for fmt, but this uncertainty became unavoidable with the decision to not model the cache at all in the CSIM.

The fmt module performs four categories of format conversion:
1) YUV to RGB. This conversion is numerical equivalence to the CSIM.
2) Compressed to RGB. This conversion preferably also requires numerical equivalence to the CSIM
3) Palette to RGB. This concerns bit manipulation, and testing the Palette write mechanism.
4) RGB to RGB. This conversion is almost completely bit manipulation.

All four categories involve testing their respective paths through the format conversion unit's control logic.

The cds model is most useful when combined with the fmt unit, but will have its own test vectors as well.

Testing against the golden CSIM can not happen without the ta_tad module since the CSIM will only produce vectors at the ta_tad input level and tc output level. Thus, the ta_tad module may require its own c application to test its intended functionality; note that the CSIM provides memory images for texture space. These images need to be loaded into the back side of the memory port transactor. Tests that involve re-allocating texture memory will necessitate a mechanism for re-loading that memory in the simulation.

VTA Hardware Inrerfaces

The VTA interfaces the Setup (su) and Raster (ra) Units at the top, the Pixel Engine (pe) Unit at the bottom and the Memory Controller (mc) and Command Front End (ce) Units on the sides.

The VTA receives per-triangle and per-iteration parameters into triangle state FIFOs distributed throughout the arithmetic pipeline. A triangle state FIFO is allocated for each iterated parameter. The triangle state FIFOs capture and maintain the setup data for all currently active triangles and texture iterations.

Parameters are stored in triangle order, as delivered by the Setup Unit, and retired in triangle order, as consumed by the Iteration Units. Each parameter FIFO is managed through one write pointer and eight read pointers. One write pointer places parameters in to the FIFO and eight read pointers, one for each of the eight texture iterations, take parameters out of the FIFO.

State from the Setup Unit is received until any one of the VTA triangle-state FIFOs is full. Each FIFOs is sized to support the depth of the VTA filled with small polygons and multiple texture iterations. However, when any one of the triangle state FIFOs fills, the VTA generates a stall to the Setup Unit.

Parameters from the setup unit are received within a single DVS packet. This packet includes parameter data and parameter control defined within the table 17600 shown in FIGS. 176A–C.

The SUTA transfer cases, involving a minimum number of parameters for a tri or a minimum number of parameters for an iteration, exhibit the behavior described in the following paragraphs.

FIG. 177 illustrates behavior patterns 17700 for a one iteration polygon with no per-iteration parameter. In this case, newtri is at least 2 cycles after the previous newtri. newitr and prmend are not active for the [WbZQp] only polygons. [WbZQp] is transferred only with no valid [QtSTARGB] iteration.

FIG. 178 illustrates behavior patterns 17800 for a one iteration polygon with one per-iteration parameter. In this case, newitr is at least two cycles after newtri. newtri is at least two cycles after the previous newtri.

FIG. 179 illustrates behavior patterns 17900 for a N iteration polygon with N per-iteration parameters. Here, newitr is at least two cycles after newtri. newitr is at least two cycles after previous newitr. newtri is at least two cycles after previous newitr. newitr is activated once for each active iteration.

Raster Interface (RATA)

The VTA receives per-pixel raster instructions from the Raster Unit into the Dispatch Unit. Raster instructions collect within the dispatcher to form dispatch packets to be released to the STG Unit. Packets are filled and dispatched across all of the active texture iterations.

Raster instructions collect until the dispatch packet is full. A full dispatch packet stalls the Raster Unit until each dispatch packet has completed dispatch. Packets are released in descending texture iteration order with a stall condition for all lesser numbered texture iterations.

Raster Unit instructions are received within a single DVS packet. This packet includes per-pixel stepping-state and coverage-control defined within the table 18000 of FIG. 180.

Pixel Engine Interface (TDPE)

The VTA delivers pixel data from Combine Unit to the Pixel Engine. Pixel data is delivered for fully iterated pixel quad parameters of ARGB and partially iterated left pixels parameters of XYZ & Q. Parameters partially iterated are delivered with delta parameters of dz/dx, dz/dy, dq/dx and dq/dy.

Additional control exists to support LFB transfers to the Pixel Engine. For this purpose, a control bit from the CFE identifies valid LFBs and an LFB transfer type of 3D or physically addressed. These bits, in conjunction, tell the PE to deal with the TD data as rendered pixels, 3D processed LFB data, and 3D bypassed LFB data. physically addressed LFB data is no longer supported.

Pixel data is delivered to the PE through a single DVS packet. This packet includes the pixel data signals defined within the table 18100 of FIGS. 181A–B.

Command Front end Interface (CETA & CETD)

The VTA receives register write mode control from the CFE Unit into Side-band Interfaces of the TA and TD blocks. Register writes are captured off of the side-band into per-triangle and per-texture iteration side-band registers. Data is captured through a double buffered scheme of active and pending registers to allow two sets of state for each register and each texture iteration.

The CFE interface also supports palette downloads to the Texture Cache at the CETA interface and LFB transfers to the Combine Unit at the CETD interface. These interfaces simply extend the side-band bus to provide data and address to for palette and LFB downloads.

The CETA and CETD interfaces utilize two independent interfaces to provide for register, palette and LFB writes. The two interfaces include the address and data buses defined in the table 18200 of FIGS. 182A–B.

Memory Controller Interface

FIGS. 183 and 184 illustrate tables 18300, 18400 defining input and output signals associated with the memory controller.

Following is a description of Streamdef.tv:

```
// streams for module vta
vta ceta IN ceta_addr[11:0] ceta_data[31:0]
vta suta IN suta_itrnum[2:0] suta_prmsel[3:0]
    suta_newtri [0:0] suta_newitr[0:0] suta_prmend[0:0]
    suta_start[50:0] suta_slope[50:0]
vta rata IN rata_pop[1:0] rata_push[1:0] rata_dir[1:0]
    rata_mask[19:0] rata_newtri[0:0] rata_newstate[2:0]
vta cetd IN cetd_addr[21:0] cetd_data[31:0]
    cetd_lfb_valid[0:0] cetd_lfb_be_n[3:0]
vta sgram.ram MEMORY 2097152 32
vta agp.ram MEMORY 2097152 32
vta tdpe OUT tdpe_xy_addr[19:0] tdpe_lfb_type[1:0]
    tdpe_newstate[0:0] tdpe_mask[19:0] \
        tdpe_z_pix0[173:0] tdpe_z_dx [38:0]
    tdpe_z_dy[38:0] tdpe_q_pix0[173:0] tdpe_q_dx[38:0]
    tdpe_q_dy[38:0] \
        tdpe_a_pix0[12:0] tdpe_r_pix0[12:0]
    tdpe_g_pix0[12:0] tdpe_b_pix0[12:0] \
        tdpe_a_pix1[12:0] tdpe_r_pix1[12:0]
    tdpe_g_pix1[12:0] tdpe_b_pix1[12:0] \
        tdpe_a_pix2[12:0] tdpe_r_pix2[12:0]
    tdpe_g_pix2[12:0] tdpe_b_pix2 [12:0] \
        tdpe_a_pix3[12:0] tdpe_r_pix3[12:0]
    tdpe_g_pix3[12:0] tdpe_b_pix3[12:0]
```

VTA Physical Characteristics

FIGS. 185A–B depict a table 18500 setting forth several physical characteristics of the RAMs of the VTA. FIGS. 186A–B depict a table 18600 listing exemplary gate counts of the VTA.

VTA Verification

A VTA diagnostic suite can be used to ensure the integrity of the CSIM and Verilog implementations of the VTA block of VIDDEV. The test suite can consist of sub-module, module and standalone tests. One set of tests will concentrate on each of the sub-modules within the VTA CSIM. A second set of tests will focus on testing the VTA CSIM model at a functional level. The sub-module and functional level tests will utilize the CSIM model of the VTA to generate output transactions that will be compared to the verilog output.

The test suite provides comprehensive coverage of the VTA functionality in the CSIM. Due to the complexity of the VTA engine, the first set of tests concentrate on the sub-module level tests within the VTA module. Once this set of tests runs successfully, a set of functional tests are run.

FIGS. 187–195 are tables 18700, 18800, 18900, 19000, 19100, 19200, 19300, 19400, 19500 listing several sub-module tests. FIGS. 196–198 are tables 19600, 19700, 19800 listing several functional coverage tests. Some test areas specified in *Sub-Module Level Coverage* can also be duplicated in *Functional Coverage* (e.g. testing the Combine Unit effectively tests Color Combining functions as well). In that case a test is listed only once.

FIGS. 199A–199E is a table 19900 listing VTA registers and fields, specifies which modules they control, and the name of the test that ensures the coverage. This is intended to be the checklist to insure complete test coverage.

To the greatest extent possible, the diagnostics can make use of Glidex API calls to program the hardware models. The CSIM tests test functionality of the VTA.

Preferably, the geometry is not tested; that means a single triangle will suffice for most of the tests. That provides the bandwidth to exercise multiple functional combinations.

Except for testing texture cache, VTA tests do depend neither on the texture size nor on the triangle shape. Therefore very small triangles can be used, each triangle representing single testing combination (a triangle should still be at least one quad large so to exercise four slices of the pipeline design). Small triangles provide more bandwidth to test all or most intra logic combinations.

The following paragraphs detail a test plan for each submodule of the VTA that can be tested using CSIM. For further information on the CSIM diagnostic tests that are used to verify the VTA, refer to the section below entitled VTA Test Descriptions. This section provides details on the location of the tests, how to run them, and the functions tested by each diagnostic.

The VTA verification plan assumes that both CSIM and PSIM models are a fully tested references for the design functionality and performance. As a result, the requirements for VTA verification become 1) prove arithmetic agreement between CSIM and RTL, 2) prove cycle compliance between Psim and RTL, and 3) prove reliable operation across all conditions of operation.

Testing the VTA with CSIM provides a couple of challenges in the areas of virtual texturing and texture caching. Neither area of the design maps well to checking every transaction in the CSIM at a certain interface against the same interface in exactly the same order.

The VTA module (unit) and the VTA sub-modules (modules) may be tested at the unit level and the module level to prove completeness. Testing at the VTA module levels focuses on proving the arithmetic while testing at the VTA unit level focuses on proving stability and performance.

Verification of the VTA is greatly benefited by module level testing before unit level composition as well as conjunctive module level checking during unit level test. These two areas of test allow for a much more rapid approach to a bug free top level design. Testing at the module level should flush out most of the low level arithmetic bugs and test inspection at the module level will help in the diagnosis of bugs at the unit level.

At the module level, the VTA can be tested by each of the module level design engineers. Here a full arithmetic test coverage is expected from a suite of diagnostics that can be conducted at both the module level and the unit level.

Directed diagnostics to focus on the common and obscure arithmetic combinations.

Random diagnostics to focus on the exhaustive arithmetic combinations.

At the unit level, the VTA shall be tested by each of the module level design engineers on the team. At this level, each of the design engineers will simulate the design with an emphasis on exposing problems between modules.

Directed diagnostics to focus on common and obscure module level interactions.

Random diagnostics to focus on the exhaustive module level interactions.

FIGS. 200A–200F show a VTA module level test matrix 20000 that itemizes each of the modules of the VTA and their interaction with software. This matrix can be used as a checklist/guide for module level test coverage.

FIG. 201 illustrates a VTA unit level test matrix 20100 that itemizes each of the modules of the VTA and their interaction with software. This matrix is intended to be a checklist/guide for module level test coverage.

VTA Test Descriptions

The following section provides details on all the VTA verification tests. The purpose of this section is to provide information on various scripts that can be used by a verification team and to document the tests location, features, and use.

The following paragraphs list the tests used to verify the VTA CSIM as well as the tests used to create vectors that are run on the VTA verilog. Details of each test and how to build them are also described below. The test list sections are used by CARTS and the CSIM test vector generation scripts. When listing tests, the relative (to VIDDEV) path of the test is specified along with the name of the executable and the necessary command line options. If a test needs to be run multiple times with different options, it should be listed multiple times with each of the options.

The following section will describe each test, providing details on the Unit Under Test (UUT), the purpose of the test, what's actually tested, what's not tested, and how to verify that the test display is correct.

TA_LIA

This test was based on ta_ani.c. It rotates a textured rectangle first along the x axis and then along the y axis in order to show the image quality of anisotropic filtering effects. These rotations are done five times with increasing values of maximum anisotropic ratios (VIDDEV_TA_ANI_MAX_RATIO). Each successive set of rotations should show improved image quality due to a higher degree of anisotropic filtering (VIDDEV_TA_ANI_MAX_RATIO increases by 2 on each pass).

The random options allow for random texels and random x and y axis rotations. The maximum anisotropic ratio (VIDDEV_TA_ANI_MAX_RATIO) can also be random.

The color mip map levels option helps make some of the filtering more apparent than the default checkboard pattern. There is also an option to use a texture file rather than the algorithmic texture patterns.

Command line arguments:

| | |
|---|---|
| -xtex:{filename.3df} | checkboard texture is substituted with texture in filename.3df |
| -xrandtex: {0/1} | uses random texel values for texture |
| -xrandxrot:{0/1} | uses random x axis rotation of object |
| -xrandyrot:{0/1} | uses random y axis rotation of object |
| -xframe.s:{int} | number of frames to render |
| -xcmm:{0/1} | use different colors for each mip map level |
| -xrandmaxani:{0/1} | use random maximum anisotropic ratio |
| -o | write all command line options to a file called "dbgfile" in the current directory. |
| -p-1 | pauses after rendering |

TA_LMS_FI.EXE

This program tests the interaction of features that affect the lms calculation for anisotropic texture filtering. There are 6 test cases; each tests two features, i.e. parameters, at a time by iterating over different combinations of the two parameters. The reason it tests two parameters at a time is because doing a combinatorial test of all the parameters will take too long to run, and it's easier to construct meaningful cases when only two parameters are being tested at a time. Note that more combinatorial cases can be added to get more coverage if desired.

All of the cases are built around a routine that draws a 2×2 pixel quad with a given aniratio and lms. All the tests use a texture that has a constant solid color at each mipmap. This is important because the effect of each feature is reflected in the lms of the quad, and therefore the color of the quad.

Command line arguments:

| | |
|---|---|
| -xsize:N | scales each guad to NxN pixels, to make debugging easier |
| -xtest:testName | run a particular test; this is described in more detail below |

Within each test case, in addition to iterating over combinations of the two parameters, for each combination a range of ani ratios are also iterated over, namely 1 through 32. The only exception to this is the test case that is listed last, where a range of lms are iterated over instead of ani ratios.

Following is a description of the 6 cases, and how the image can be interpreted:

1. VIDDEV_TA_ANI_MAX_RATIO and VIDDEV_TA_ANI_RSCALE_LOG2

To run this case, do: ta_lms_fi.exe -xtest:armax_arscale

The effect of the ani max ratio is to widen the anisotropic patch if needed, and the effect of the ani ratio scale is to widen any patch whose ratio is greater than 1. The final width of the patch is the maximum of the two widths. So the effect and interaction of these two parameters are reflected in the LMS, and therefore the color of the quad.

In the image that is drawn, there are some quads whose lms calculation is dominated by VIDDEV_TA_ANI_MAX_RATIO; these are the quads that make up the horizontal rows of constant color. There is an exception to this, and that is the rows at the bottom of the image; those rows correspond to the aniratio bottoming out to 1. There are also quads whose lms calculation is dominated by VIDDEV_TA_ANI_RSCALE_LOG2; these are the quads that make up the horizontal rows of varying color.

2. VIDDEV_TA_ANI_MAX_RATIO and VIDDEV_TA_LMS_BIAS

To run this case, do: ta_lms_fi.exe -xtest:armax_lmsbias

The effect of the ani max ratio is to widen the anisotropic patch if needed, and its effect on the image is similar to case #1. The effect of the lms bias is to narrow or widen every patch, and its effects are a slight color shift over every quad.

3. VIDDEV_TA_ANI_MAX_RATIO and VIDDEV_TA_LMS_MIN/VIDDEV_TA_LMS_MAX

To run this case, do: ta_lms_fi.exe -xtest:armax_lmsclamp

The effect of the ani max ratio in this test is similar to #1 and #2. The effect of the lms clamp is seen easily by the color clamping on the quads whose lms is being clamped. This test will also hit the case where the anisotropic ratio is clamped to 1.0 if the patch is clamped to the maximum lms.

4. VIDDEV_TA_ANI_RSCALE_LOG2 and VIDDEV_TA_LMS_MIN/VIDDEV_TA LMS_MAX

To run this case, do: ta_lms_fi.exe -xtest:arscale_lmsclamp

The effect of the ani ratio scale is to widen the patch by a fractional amount, similar to case #1, and the effect of the lms clamp is a color clamping similar to #3.

5. VIDDEV_TA_ANI_RSCALE_LOG2 and VIDDEV_TA_LMS_BIAS

To run this case, do: ta_lms_fi.exe -xtest:arscale_lmsbias

The effect of the lms bias is a color shift similar to than in #2.

6. VIDDEV_TA_LMS_BIAS and VIDDEV_TA_LMS_MIN/VIDDEV_TA_LMS_MAX

To run this case, do: ta_lms_fi.exe –xtest:lmsbias_lmsclamp

This is the only case where the inner loop iterates over lms values instead of ani ratio values.

TA_LMS_MO_LMS.EXE

This program exercises every value of the following outputs of the lms module: lms integer, lms fraction, and lms2tcu. It doesn't do any combinatorial testing; it just constructs a simple case to confirm that every value can be passed through those outputs and that each value has the correct effect on the image.

Command line arguments:

| | |
|---|---|
| –xsize:N | scale each quad to NxN pixels to make debugging easier |
| –xtest:lmsfrac | run the lms integer and fraction test |
| –xtest:detail | run the test that uses lms2tcu as a detail factor |
| –xtest:tarea | run the test that uses lms2tcu as a texel areal factor |
| –xtest:lodfrac trilinear | run the test that uses lms2tcu as a lod factor for old |

Only one of the four tests can be run at a time.

For lms integer and fraction, it simply draws a quad whose patch in texture space is scaled to obtain the needed lms integer and fraction.

For lms2tcu, the test generates every value when lms2tcu is used as a detail factor, as a texel area calculation, and as a LOD fraction for old trilinear filtering.

TA_LMS_MO_ANI.EXE

This program exercises every value of the following outputs of the lms module: ani steps and ani ratio. It doesn't do any combinatorial testing; it just constructs a simple case to confirm that every value can be passed through those outputs and that each value has the correct effect on the image.

Command line arguments:

| | |
|---|---|
| –xtest:aniratio | run the aniratio test |
| –xtest:aniweight | run the aniweight test |

For the ani ratio test, the program draws a quad for every value of the 4.4 ani ratio. However, it takes more than one pixel to tell whether the patch is properly filtered by the kernel walker. For example, to test an ani ratio of 8, the program uses a texture 20200 such as the one shown in FIG. 202, where "." is black and "x" is white.

Then 8 pixels are drawn; for each pixel, construct an anisotropic patch that is one texel wide (along S) and 8 texels high (along T). FIG. 203 shows the patches 20300 for the 8 pixels, numbered 0 to 7, that correspond to the texture shown in FIG. 202.

In this way, the color of pixels 0 through 7 should evenly ramp from almost black to white.

For the ani weight test, the program also draws a quad for every value of the 4.4 ani ratio. In this case, however, the purpose is to test that the kernel walker properly weighs the two samples at the ends of the patch. To do this the program uses a texture 20400, shown in FIG. 204, where all samples except those two are black, and the sample at one end is yellow while the sample at the other end is green:

Since the patch is centered around the texture, the two ends should contribute a small amount of yellow to the pixel. In order to make this amount visible in the image, the color combine units are used to scale it up by a factor of 8. So for integer values of ani ratio, the pixel should be full yellow.

This test exercises every entry in the ani weight table of the kernel walker.

TA_LMS_MO_DPDC.EXE

This program exercises every value of these outputs of the lms module: dsdc and dtdc. It doesn't do any combinatorial testing; it just constructs a simple case to confirm that every value can be passed through those outputs.

Command line args:

None

This program draws a quad with the orientation needed to result in each value of dsdc,dtdc.

TA_PLANE.EXE

It basically tiles a rectangle with random triangles. There are a number of options, some of which are set forth in the following table:

TABLE 36

Scaling the rectangle in screen space
Rotating it about the x-axis
Stretching it along the z-axis to distort perspective
Varying the number of triangles from 2 to 20,000
Enabling random texture data
Load a *.3df texture file (default is checkerboard)
Changing the texture filtering mode (point/bilinear/trilinear)
Specify the number of frames to create movie loop.

To get all the command line option run the following:

ta_plane –o

Now look at the "dbgfile" in the current directory to see all the options.

This command line will render the woody texture at a 45 degree angle with distorted Z perspective using 2 triangles with trilinear filtering, (press CTRL-Q to exit, –p–1 enables this feature):

ta_plane –p–1 +q –xtex:woody.3df –xobjscale:30–xobjangle:45–xobjscaleZ:5–xtexfilter:3–xmax x:1–xmax y:1

The "+q" option will create a ppm file of the window called cmov001csim.ppm

This command line will draw the same scene with 20,000 triangles:

ta_plane –p–1 +q –xtex:woody.3df –xobjscale:30–xobjangle:45–xobjscaleZ:5–xmax_x:100–xmax y:100–xtexfilter:3

This will render 50 triangles with a random texture and no rotation:

ta_plane –p–1+q –xrandtex:1 –xobjscale:20–xmax_x:5–xmax_y:5

TA_STG_RC_REC.EXE

This program tests every valid combination of the recursion push and pop masks. In doing so, it tests all combinations of recursion and composition. Since there are hundreds of combinations, the test will check the image for correctness, so no golden images are needed.

To do this, it generates a valid push and pop mask. For that mask, it creates a texture for each tmu that takes into account whether that tmu is used for recursion or not. If the tmu is used for recursion, the texture that is created for it such that in the resulting image it will be easy to check whether recursion was properly done through all the texture iterations.

In the VTA, for any given push/pop mask, you can think of each tmu's texture as having gone through some number of times, which I'll call the "depth", through the recursion FIFO before it ends up in the final image. This depth affects the texture that is created for each tmu.

For every tmu, the texture is an 8×8 grid 20500, as shown in FIG. 205, where each column is used to track the data for the corresponding tmu, and each row is used to track the depth of each tmu's data through the recursion FIFOs.

This is described in more detail below. A "." means a black square, and an "X" will mean a colored square; the value of the color is used in recursion to perturb that square in a later tmu.

If the tmu does not pop from the recursion FIFO, its texture is simply a colored square at depth 0, in the column of that tmu. For example, if tmu0 does not pop, its texture is as shown in the grid 20600 of FIG. 206.

If the tmu does pop from the recursion FIFO, its texture is also a colored square at depth 0, but there are additional squares depending on which previous textures are in the data being popped from the recursion FIFO. For example, if there are 2 active tmus, where tmu1 pushes and tmu0 pops (in our notation that is "tmu1>tmu0", where ">" means to recurse), their textures and the resulting textures are as shown in the grid 20700 of FIG. 207.

As another example, suppose the push and pop mask are configured to do "(tmu2# tmu1)>tmu0", where in notation "#" means to combine. The resulting grid 20800 is shown in FIG. 208.

There are hundreds of valid push/pop masks; the program will iterate through them, generate an image for each, and check it for correctness.

TA_LFL.EXE

This is the name for the combined ta_lms_fi_lms2tcu and ta_lms_fi_detail diags. It tests three modes supported by a taDetail register. They are VIDDEV_TA_LODFRAC, which is the lms fraction of the currently selected map. VIDDEV_TA_DETAIL, the detail factor, which is controllable via the grTexDetailControl glide call. And VIDDEV_TA_TAREA, the texel area, which is controlled via a direct write to the taDetail register as there is no glide call to set this value.

The diag operates by setting up TMU0 such that the lod2tcu output is sent directly to the d input of the TCU. When run in 32 bpp mode, this should allow the full 8 bit value of the lod2tcu factor to be captured in the frame buffer in all three channels. It generates ramps of varying pixel areas across all LODs.

The diag will attempt to allocate a 2K×2K×32 bpp texture, but if there is insufficient memory it will default to a 256×256×32 bpp texture.

Command line options are set forth in the table below.

TABLE 37

-xlod2tcu  (0 = LODFRAC, 1 = DETAIL, 2 = TAREA) select the Lod2Tcu mode to be tested.
-xdBias  (-31 to 32) Detail bias, only valid when DETAIL mode selected
-xdScale  (0 to 7) Detail Scale, only valid when DETAIL mode selected
-xdMax  (0.0f to 1.0f) Detail Max, maximum detail value, only valid when DETAIL mode selected.
-xdiv  (0 to 50) number of steps displayed per LOD in the gradient. (default 11)
-xmaq  (0/1) default value of 0 tests all ratios of texel to screen size <1, value of 1 tests all ratios of texel to screen size >1. Should be used with -xlod2tcu values of 1 and 2.
-xonetri  (0/1) default 0. Setting this value to 1 will only draw half of a quad, cutting the number of triangles and pixels generated in half for simulation.

TABLE 37-continued

-u2  This diag should always be run in 32 bpp mode, so always use -u2.
-p-1 pause after each frame.

Sample command lines are listed in the table below.

TABLE 38 ta_lfl -u2  -p-1 // selects LODFRAC mode by default, each line is a ramp from one LOD to the next smaller LOD. eg 256 to 128, 128 to 64, 64 to 32, etc. The number of steps is div * log2 of the map size. Pause.
ta_lfl -u2 -p-1 -xlod2tcu:1 -xdbias:8 -xdScale:1 //
selects Detail mode, the first 32 lines are varying detailBias from -32 to 31 in steps of 2, the next line shows where the LOD break across the horizontal line, the next 8 lines vary the detailScale from 0 to 7.
When varying the detailBias, the detailScale is held constant to the value provided (default 0), likewise, when the detailScale is varied, the detailBias is held to the value provided (default 8).
ta_lfl  -u2  -p-1 -xlod2tcu:2 //selects texel area mode. The first line shows where each LOD starts and ends, the next 64 lines vary the VIDDEV_TA_TEXEL_AREA_SCALE_LOG2 register across 64 values from 0 to 8192. This is really a 5.8 format register.
ta_lfl  -u2  -p-1 -xlod2tcu:2 -xmag:1 -xonetri:1 //selects texel area mode. The first line shows where each LOD starts and ends, the next 64 lines vary the VIDDEV_TA_TEXEL_AREA_SCALE_LOG2 register across 64 values from 0 to 8192. Set magnify to view multiple screen pixel per texel. Only draw one triangle per quad.

TA_VIE_W.EXE

This is a simple 3D Studio model viewer. It will read in any .3ds format model and display all of the meshes. This is the old 3D Studio format, not the new 3D Studio Max max format. It only supports a single texture map, and if no texture coordinates are supplied, it uses the x,y values of the vertex for s,t. Currently there is no lighting. Rotation is limited to the x-axis, it's trivial to change the objRotAxis variables in the source to switch the axis of rotation. There are a number of options, some of which are set forth in the following table:

TABLE 39

Load any .3ds model (shouldn't be any limit to size or complexity.)
Scaling the model about the center of the screen.
Rotating it about the x-axis
Enabling random texture data
Load a *.3df texture file (default is checkerboard)
Changing the texture filtering mode (point/bilinear/trilinear)
Specify the number of frames to create movie loop.

The table below lists several arguments and their functionality.

TABLE 40

>ta_view
  Display a predetermined 3D object.
>ta_view -xmod:modelname.3ds
  Read in a different .3ds 3D studio file, this is the old format, not the new .max 3D studio max format
>ta_view -xtex:woody.3df
  Will map something more interesting than the default checkerboard
>ta_view -xrandtex:1
  Will use random texture data for texture maps.
>ta_view -xobjscale:10
  Will make said object tiny
>ta_view -xobjangle:30
  Will rotate object 30 degrees about the x-axis
  "-o" Will write out all the command line options to "dbgfile"
  "+q" Will write out a .ppm file of the frame
  "-p-1" Will pause the test after each frame, hit CTRL-Q to continue.

TC_STP.EXE

This diagnostic tests all combinations of S&T aspect ratios, and clamp/wrap/mirror modes. It has two modes of operation. The default mode draws a specific pattern of polys in a grid with increasing S on the X-axis, and T on the Y-axis. The randpoly mode draws polys with random size, texture size, texture aspect ratio, and S & T clamp/wrap mirror mode. The texture coordinates are picked such that at least one corner of the texture is somewhere in the interior of the poly. The command options are set forth in the table below.

TABLE 41

1. −xNw:{float} specifies the number of pixels that make up the width of corner of the texture.
2. −xNh:{float} specifies the number of pixels that make up the height of corner of the texture.
3. −xrandtex{1/0} indicates whether to use a color ramp or random data for textures. (same polys drawn)
4. −xminLMS{11-0} specifies the minimum texture size.
5. −xmaxLMS{11-0} specifies the maximum texture size. The two values define the range of textures tested.
6. −xrandpoly{1/0} enables random poly mode, use with randtex to enable random texture data as well.
7. −xnumpolys{int} number of polys to draw in randpoly mode. (default 500)
8. −xtexfmt{17 = 4 bit, 0 = 8 bit, 10 = 16 bit, 18 = 32 bit} Select texture format. (default 16 bpp)
9. −o write all command line options to a file called "dbgfile" in the current directory.
10. −X disable tiled addressing The functions tested are listed in the table below.

TABLE 42

1. lms_log_aspect
2. lms_s_is_larger
3. wrap_s
4. wrap_t
5. tex_is_tiled
6. lms_log_aspect

TC_FMT.EXE

This test is a data check only for all the different formats. There will be two modes: image and random. In the image mode, two triangles will be used to build a rectangular image for each format. When all formats are complete, the pieced-together rectangles will compose the final image. This test also has options for render height and width, individual format rendering, and alpha blending. The render height and width allow for reduced pixel rendering, while the individual format rendering is included for debug. The alpha blending option tests the formats that have alpha field by generating an alpha ramp and blending two images using two TMUs.

Illustrative command options are set forth in the following table.

TABLE 43

1. −xrandtex:{1/0} input texture is substituted with random texels.
2. −xsh:{float} scale height of rendered image; useful for reducing pixel count for debugging purposes.
3. −xsw:{float} scale width of rendered image; useful for reducing pixel count for debugging purposes
4. −xonefmt:{1/0} with this option, only one format is rendered. The format is specified with the next option.
5. −xfmt:{0-24} used in conjunction with the above option. This option specifies the one texture format to be rendered. See format number in "Functions Tested" column to the left.

TABLE 43-continued

6. −xalpha_en: enable alpha bending. This option verifies that the alpha bits were read in correctly. In this mode, a ramp is written in the alpha bits. A second texture image is read in, and the two images are alpha bended together using two TMUs.
7. −o write all command line options to a file called "dbgfile" in the current directory.
8. −p-1 pauses after rendering The functions tested are listed in the table below.

TABLE 44 tex_format:

1. R17692 (format 0)
2. YIQ_422 (format 1)
3. ALPHA_8 (format 2)
4. INTENSITY_8 (format 3)
5. ALPHA_INTENSITY_44 (format 4)
6. P_8 (Palette) (format 5)
7. P_8_6666_EXT (format 6)
8. ARGB8332 (format 8)
9. AYIQ_8422 (format 9)
10. RGB_565 (format 10)
11. ARGB_1555 (format 11)
12. ARGB_4444 (format 12)
13. ALPHA_INTENSITY_88 (format 13)
14. AP_88 (Alpha/Palette) (format 14)
15. FBCMP (framebuffer compressed) (format 16)
16. FXT1 (compressed) (format 17)
17. ARBG_8888 (format 18)
18. YUYV_422 (format 19)
19. UYUV_422 (format 20)
20. AYUV_444 (format 21)
21. DXT1 (DX6 compressed) (format 22)
22. DXT2 (DX6 compressed) (format 23)
23. DXT3 (DX6 compressed) (format 24)

TC_MBA.EXE

This test will check the base address modes for all combinations of LMS values for both agp and frame buffer memory. It will also test the texture staggered feature. It also has a random texture data and random poly test mode.

The command options are listed in the table below.

TABLE 45

1. −xrandtex:{0-1} solid color textures are substituted with random texels.
2. −xnumpolys:{int} number of triangles that are rendered in random poly mode.
3. −xrandpoly:{0-1} enables random poly mode "1". If "0", all combinations of base address modes are rendered using solid colors each mipmap level.
4. −o write all command line options to a file called "dbgfile" in the current directory.
5. −p-1 pauses after rendering
6. −xmba:{0-4} specifies the multibase address mode. The following table specifies which mipmap level corresponds to which base address for each mba mode.

ba values are listed for each mode in the table below.

TABLE 46

| Mode | ba0 | ba1 | ba2 | ba3 |
|------|------|-----|-----|-----|
| 0 | 0–11 | — | — | — |
| 1 | 8–11 | 7 | 6 | 0–5 |
| 2 | 9–11 | 8 | 7 | 0–6 |
| 3 | 10–11 | 9 | 8 | 0–7 |
| 4 | 11 | 10 | 9 | 0–8 |

The functions tested are listed in the table below.

TABLE 47

1. lms_mba_mode
2. tex_agp 0,1,2,3
3. tex_staggered 0,1,2,3
4. tex_base_addr 0,1,2,3

TC_DIT.EXE

This test will check mipmap dithering. It will use textures with the following orientations: deep perspective, upward/downward slant, left/right/45 degree slants. The command options are listed in the table below.

TABLE 48

1. -xtexfmt{17 = 4 bit, 0 = 8 bit, 10 = 16 bit, 18 = 32 bit} Select texture format. Default 16 bpp
2. -xtexfiltert{1 = point sampled, 2 = bilinear, 3 = trilinear} texture filtering mode. Default point sampled.
3. -xlmsdither{1 = enabledi 0 = disabled } hardware lms dithering. Default enabled.
4. -xfirstlevel{11-0} select the highest mipmap to start texturing from. Default 11.
5. -xslices{int} number of polys in the pinwheel pattern. Default is 8.
6. -xrandtex{1/0} indicates whether to use a color ramp or random data for textures. Default disabled.
7. -xrandpoly{1/0} enables random poly mode, use with randtex to enable random texture data as well. Default disabled.
8. -xnumpolys{int} number of polys to draw in randpoly mode. Default disabled.
9. -o write all command line options to a file called "dbgfile" in the current directory.
10. -X disable tiled addressing The functions tested are listed in the table below.

TABLE 49

1. ta_lms_dither

TC_NPT.EXE

This test will check all aspects of non-power of 2 texture maps. It will use linear/tiled formats with various sit max and strides. It will render corners of textures and check clamping. It also has a random texture data and random poly test mode.

The command options are listed in the table below.

TABLE 50

1. -xNw:{float} specifies the number of pixels that make up the width of corner of the texture.
2. -xNh:{float} specifies the number of pixels that make up the height of corner of the texture.
3. -xrandtex{1/0} indicates whether to use a color ramp or random data for textures. (same polys drawn)
4. -xrandpoly{1/0} enables random poly mode, use with randtex to enable random texture data as well.
5. -xnumpolys{int} number of polys to draw in randpoly mode. (default 500)
6. -xtexfmt{17 = 4 bit, 0 = 8 bit, 10 = 16 bit, 18 = 32 bit} Select texture format. (default 16 bpp)
7. -xtexw{1-2047} specifies the width of the npt texture (default 32)
8. -xtexh {1-2048} specifies the height of the npt texture (default 32)
9. -xtexstr {8-2048} specifies the stride of the npt texture
10. +T{tiled}:{agp} specifies linear (tiled = 0) or tiled (tiled = 1) mode. When agp = 0, texture memory is local memory (frame buffer); when agp = 1, texture memory is from agp.
11. -o write all command line options to a file called "dbgfile" in the current directory.
12. -p-1 pauses after rendering The functions tested are listed in the table below.

TABLE 51

1. lms_en_npt
2. lms_s_max
3. lms_s_stride
4. npt_t_max

TC_LEG.EXE

This test will check legacy tsplit and odd features. This test will use mipmapping tiled/nontiled, different aspect ratios, and different texel sizes The command options are listed in the table below.

TABLE 52

1. -xtexfmt{17 = 4 bit, 0 = 8 bit, 10 = 16 bit, 18 = 32 bit} Select texture format. Default 16 bpp
2. -xtexfiltert{1 = point sampled, 2 = bilinear, 3 = trilinear} texture filtering mode. Default point sampled.
3. -xrandtex{1/0} indicates whether to use a color ramp or random data for textures. Default disabled.
4. -xrandpoly{1/0} enables random poly mode, use with randtex to enable random texture data as well. Default disabled.
5. -xnumpolys{int} number of polys to draw in randpoly mode. Default disabled.

The functions tested are listed in the table below.

TABLE 53

1. lms_tsplit
2. lms_odd

TD_TCU.EXE

The TCU test program is designed to test each individual function found in the combine unit. To accomplish this, the program is composed of ten separate tests, each testing a different portion of the unit.

Test a: Select bits in the TCC

This test cycles through the four main muxes in the TCC: A, B, C, and D, testing the ten different inputs available to each. The program selects one mux to test and sets the values on the other three paths to allow the input on the selected mux to pass through the unit unperturbed. It accomplishes this in the following fashion:

Select mux A:
  To test mux A, muxes B, C and D have their inputs set to 0. However, the (1−x) function is utilized on the C path, to make the 0 a 1. Thus the final equation becomes (A+0)*1+0=A.
Select mux B:
  To test mux B, muxes A, C and D have their inputs set to 0. Once again the (1−x) function is utilized on the C path to make the 0 a 1. Thus the final equation is (0+B)*1+0=B.
Select mux C:
  To test mux C, muxes A, B and D have their inputs set to 0 while the (1−x) function causes the 0 to become a 1 on B. The final equation is (0+1)*C+0=C.
Select mux D:
  To test mux D, muxes A, B and C have their inputs set to 0. The final equation is (0+0)*0+D=D.

The ten different mux inputs allowed are as follows:

Czero:
  This value is simply R=0, G=0, B=0.
Cprev:
  Cprev is the output of the CCU on TMU1. This is initialized to simply be Citer by placing Czero on A, B and C and Citer on D for TMU1. On TMU1, Citer is initialized to be R=256, G=256, B=0.

Citer:
    For TMU0, Citer is initialized as R=256, G=0, B=0.
Ctex:
    Ctex uses the texture named Buzz.3df.
C0:
    C0 is simply the constant color defined by grConstantColorValue. For this test it is defined as R=255, G=0, B=255.
LOD2TCU:
    The value on this select is determined in a mux higher up the pipe. The default value passes through this select.
Aprev:
    This value is defined on the CCU Alpha portion in TMU1. Setting A, B, C=0, and D=Aiter on TMU1, Aprev is actually Aiter on TMU1. Initialize this value to 224, so the color output is R=224, G=224, B=224.
Aiter:
    For TMU0, Aiter is initialized as 160. So the color output should be R=160, G=160, B=160.
Atex:
    Once again use the texture named Buzz.3df.
A0:
    This is the constant alpha value defined by grConstantColorValue. For this test it is defined as 64, so the color output should be R=64, G=64, B=64.

Test b: Tex Shift Functionality

This test loads two textures, one a simulation of spotlights and the other a picture of Buzz Lightyear, for example, into TMUs 1 and 0 respectively. It combines these textures in the following fashion: in TMU1, D is set to Ctex (the lights) while the rest of the inputs are set to 0. This value is passed through to the TCU on TMU0. Here, Ctex (now Buzz) is placed on the A mux, C is set to Cprev (the lights) and B and D are set to 0. Thus a multiply effect is produced, (Buzz)*(Spotlights). The test forms this image 5 times. The first time, the lights are left as is, the second time they are shifted into overbright by 1 bit. The third iteration they are shifted by two bits and so on until the final iteration they are shifted by four bits. At this point the spots where there are lights and image are pretty dissolved.

Test c: Clamp Mode on the TCC

This test is almost identical to the Tex Shift Functionality test. The only difference is that in TMU1, after the texture is shifted into overbright regions, its output is then clamped to the range of 0.255. Thus the output images do not wash out. The only effect of the shift is that the spotlights become more and more intense as more and more texels are into the overbright region and then clamped to 255.

Test d: Min/Max Capability on the TCC

The Min Max function allows the TCU to select a color utilizing an equation of the form (A<B)?C:D. Set this test up by loading a texture that is a ramp of colors, displaying a sizable spectrum. Place this texture on muxes A and C, and place the constant color on muxes B and D. The constant color is initialized to be Gray, or R=128, G=128, B=128. The (1−x) function is set to negate B, so that instead of (A+B), (A−B) is provided. This is because really the A<B?C:D function is (A−B)<0?C:D. This complete, the TCU will pass the texture color if it is less than 128, otherwise it will just pass 128.

Test e: TCC (1−x) Functionality

This test examines the three functions available to each mux in the (1−x) block. It tests each mux, one at a time. To test the individual muxes, it uses the same technique as the Select Bits Test. All values for the muxes not being tested are chosen to allow the value of the mux chosen to pass straight through the unit. This time however, the test utilized three TMUs. In the first TMU, a (1+x) function is used on the selected mux. In the following TMU, a (1−x) function is used. In the final TMU a (−x) function is used. Thus if A were the selected mux, −(1−(1+A))=−1+1+A=A is provided. So, if these functions work, the final image should be the same as an image without any manipulation. This test produces five images, the first an image of the texture with no manipulation, then tests of muxes A, B, C and D.

Test f: Select bits in the TCA

This test cycles through the four main muxes in the TCA: A, B, C, and D, testing the six different inputs available to each. The program selects one mux to test and sets the values on the other three paths to allow the input on the selected mux to pass through the unit unperturbed. It accomplishes this in the following fashion:

Select mux A:
    To test mux A, muxes B. C and D have their inputs set to 0. However, the (1−x) function is utilized on the C path, to make the 0 a 1. Thus the final equation becomes (A+0)*1+0=A.

Select mux B:
    To test mux B, muxes A, C and D have their inputs set to 0. Once again the (1−x) function is utilized on the C path to make the 0 a 1. Thus the final equation is (0+B)*1+0=B.

Select mux C:
    To test mux C, muxes A, B and D have their inputs set to 0 while the (1−x) function causes the 0 to become a 1 on B. The final equation is (0+1)*C+0=C.

Select max D:
    To test mux D, muxes A, B and C have their inputs set to 0. The final equation is (0+0)*0+D=D.

The TCC simply passes Citer from TMU1 down through the unit causing the color R=256, G=256, B=0 to be displayed. The six different mux inputs allowed are as follows:

Azero:
    This value is simply A=0;
Aprev:
    Aprev is the output of the CCU on TMU1. This is initialized to simply be Aiter by placing Azero on A, B and C and Aiter on D for TMU1. On TMU1, Aiter is initialized to be 224.
Aiter:
    For TMU0, Aiter is initialized as 160.
Atex:
    Atex uses the texture named Buzz.3df.
A0:
    C0 is simply the constant alpha defined by grConstantColorValue. For this test it is defined as 64.
LOD2TCU.
    The value on this select is determined in a mux higher up the pipe. The default value passes through this select.

Test g: Tex Shift on the TCA

This test functions almost identically to the Tex Shift Test on the TCC. The only difference is that all of the manipulation previously done in the TCC is now done in the TCA. The TCC simply passes down the light texture, not shifted, multiplied by the Buzz Lightyear texture.

Test h: Clamp Mode on the TCC

This test functions almost identically to the Clamp Mode Test on the TCC. The only difference is that all of the manipulation previously done in the TCC is now done in the TCA. The TCC simply passes down the light texture, shifted and clamped, multiplied by the Buzz Lightyear texture.

Test i: Min/Max Capability on the TCA

This test functions almost identically to the Min/Max Capability on the TCC. The only difference is that all of the manipulation previously done in the TCC is now done in the TCA. The TCC simply passes down a constant texture.

Test j: TCA (1−x) Functionality

This test functions almost identically to the TCC (1−x) Functionality test. The only difference is that all of the manipulation previously done in the TCC is now done in the TCA and the texture value is replaced with A0. The TCC simply passes down a constant color, R=255, G=0, B=255.

TD_CCU.EXE

The CCU test program is designed to test each individual function found in the color combine unit. To accomplish this, the program is composed of ten separate tests, each testing a different portion of the unit.

Test a: Select bits in the TCC

This test cycles through the four main muxes in the CCC: A, B, C, and D, testing the ten different inputs available to each. The program selects one mux to test and sets the values on the other three paths to allow the input on the selected mux to pass through the unit unperturbed. It accomplishes this in the following fashion:

Select mux A:
To test mux A, muxes B, C and D have their inputs set to 0. However, the (1−x) function is utilized on the C path, to make the 0 a 1. Thus the final equation becomes (A+0)*1+0=A.

Select mux B:
To test mux B, muxes A, C and D have their inputs set to 0. Once again the (1−x) function is utilized on the C path to make the 0 a 1. Thus the final equation is (0+B)*1+0=B.

Select mux C:
To test mux C, muxes A, B and D have their inputs set to 0 while the (1−x) function causes the 0 to become a 1 on B. The final equation is (0+1)*C+0=C.

Select mux D:
To test mux D, muxes A, B and C have their inputs set to 0. The final equation is (0+0)*0+D=D.

The ten different mux inputs allowed are as follows:

Czero:
This value is simply R=0, G=0, B=0.

Cprev:
Cprev is the output of the CCU on TMU1. This is initialized to simply be Citer by placing Czero on A, B and C and Citer on D for TMU1. On TMU1, Citer is initialized to be R=256, G=256, B=0.

Citer:
For TMU0, Citer is initialized as R=256, G=0, B=0.

Ctex:
Ctex uses the texture named Buzz.3df.

C0:
C0 is simply the constant color defined by grConstantColorValue. For this test it is defined as R=255, G=0, B=255.

C1:
C1 is the secorid constant color. For this test it is defined as R=0, G=255, B=255.

Ctcu:
This value is defined on the TCU in TMU0. Setting A, B, C=0, and D=Citer Ctcu is actually Citer on TMU0. Initialize this value to R=256, G=0, B=0.

Ctcusum:
For TMU0, Ctcu is R=256, G=0, B=0, so the sum isjust 256. Therefore R=256, G=256, B=256 are output.

Aprev:
Aprev is the output of the CCU on TMU1. This is initialized to simply be Aiter by placing Zero on A, B and C and Aiter on D for TMU1. On TMU1, Aiter is initialized to be 224, so R=224, G=224, B=224 are output.

Aiter:
For TMU0, Aiter is initialized as 160, so R=160, G=160, B=160 are output.

Atex:
Atex uses the texture named Buzz.3df.

A0:
A0 is defined as 128, so R=128, G=128, B=128 are output.

A1:
A1 is defined as 255, so R=255, G=255, B=255 are output.

Atcu:
This value is defined on the TCU in TMU0. Setting A, B, C=0, and D=Aiter, Atcu is actually Aiter on TMU0. Initialize this value to 160, so R=160, G=160, B=160 are output.

Z:
This value is simply the z values. These are all .5.

Test b: CCC Clamp

This test loads two textures, one a simulation of spotlights and the other a picture of Buzz Lightyear, into TMUs 1 and 0 respectively. It combines these textures in the following fashion: in the TCU on TMU1, D is set to Ctex (the lights) while the rest of the inputs are set to 0. The value is then shifted into the overbright regions by n bits, where n=0 to 4. This value is passed through to the CCU on TMU1. Here A, B, and C are all zero again, and D is Ctcu. The output of this module is clamped to a range of 0 to 255. This value is passed to the TCU of TMU0. Here, Ctex (now Buzz) is placed on the A mux, C is set to Cprev (the lights) and B and D are set to 0. Thus a multiply effect, (Buzz)*(Spotlights) is created. The output images do not wash out because the over bright. values have been clamped. The only effect of the shift is that the spotlights become more and more intense as more and more texels are into the overbright region and then clamped to 255.

Test c: CCC Min/Max Function

The Min Max function allows the TCU to select a color utilizing an equation of the form (A<B)?C:D. Set this test up by loading a texture that is a ramp of colors, displaying a sizable spectrum. Place this texture on muxes A and C, and place the constant color on muxes B and D. The constant color is initialized to be Gray, or R=128, G=128, B=128. The (1−x) function is set to negate B, so that instead of (A+B), (A−B) is provided. This is because really the A<B?C:D function is (A−B)<0?C:D. This complete, the CCU will pass the texture color if it is less than 128, otherwise it will just pass 128.

Test d: CCC (1−x) Function

This test examines the three functions available to each mux in the (1−x) block. It tests each mux, one at a time. To test the individual muxes, it uses the same technique as the Select Bits Test. All values for the muxes not being tested are chosen to allow the value of the mux chosen to pass straight through the unit. This time however, the test utilized three TMUs. In the first TMU, a (1+x) function is used on the selected mux. In the following TMU, a (1−x) function is used. In the final TMU a (−x) function is used. Thus if A were the selected mux, −(1−(1+A))=−1+1+A=A is provided. So, if these functions work, the final image should be the same as an image without any manipulation. This test produces five images, the first an image of the texture with no manipulation, then tests of muxes A, B, C and D.

Test e: CCC Azero Bit

The CCC has a bit that, when enabled, causes whatever value that was selected on the A mux to become 0. To test this, two images are run. The first time, C0 is placed on A, and zeros on B, C, and D. The (1−x) function is used to convert C to 1. Thus, our image should just contain C0. The second pass through, enable the Azero bit, which forces the image to black.

Test f: CCA Select Bits

This test cycles through the four main muxes in the CCA: A, B, C, and D, testing the six different inputs available to each. The program selects one mux to test and sets the values on the other three paths to allow the input on the selected mux to pass through the unit unperturbed. It accomplishes this in the following fashion:

Select mux A:
  To test mux A, muxes B, C and D have their inputs set to 0. However, the (1−x) function is utilized on the C path, to make the 0 a 1. Thus the final equation becomes (A+0)*1+0=A.
Select mx B:
  To test mux B, muxes A, C and D have their inputs set to 0. Once again the (1−x) function is utilized on the C path to make the 0 a 1. Thus the final equation is (0+B)*1+0=B.
Select mux C:
  To test mux C, muxes A, B and D have their inputs set to 0 while the (1−x) function causes the 0 to become a 1 on B. The final equation is (0+1)*C+0=C.
Select mux D:
  To test mux D, muxes A, B and C have their inputs set to 0. The final equation is (0+0)*0+D=D.

The TCC simply passes Citer from TMU1 down through the unit causing the color R=256, G=256, B=0 to be displayed. The six different mux inputs allowed are as follows:

Azero:
  This value is simply A=0;
Aprev:
  Aprev is the output of the CCU on TMU1. This is initialized to simply be Aiter by placing Azero on A, B and C and Aiter on D for TMU1. On TMU1, Aiter is initialized to be 224.
Aiter:
  For TMU0, Aiter is initialized as 160.
Atex:
  Atex uses the texture named Buzz.3df.
A0:
  A0 is simply the constant alpha defined by grConstantColorValue. For this test it is defined as 128.
A1:
  A1 is simply the constant alpha defined by grConstantColorValueExt. For this test it is defined as 255.
Atcu:
  This value is defined on the TCU in TMU0. Setting A, B, C=0, and D=Aiter, Atcu is actually Aiter on TMU0. Initialize this value to 160, so R=160, G=160, B=160 are output.
Ctcusum:
  For TMU0, Ctcu is R=256, G=0, B=0, so the sum is just 256.

Z:
  This value is simply the z values. These are all .5.
Test g: CCA Clamp Function This test functions almost identically to the Clamp Mode Test on the CCC. The only difference is that all of the manipulation previously done in the CCC is now done in the CCA. The CCC simply passes down the light texture, shifted and clamped, multiplied by the Buzz Lightyear texture.

Test h: CCA Min/Max Function

This test functions almost identically to the Min/Max Capability on the CCC. The only difference is that all of the manipulation previously done in the CCC is now done in the CCA. The CCC simply passes down a constant texture.

Test i: CCA (1−x) Function

This test functions almost identically to the CCC (1−x) Functionality test. The only difference is that all of the manipulation previously done in the CCC is now done in the CCA and the texture value is replaced with A0. The CCC simply passes down a constant color, R=255, G=0, B=255.

Test j: CCA Azero Bit

This test functions almost identically to the CCC Azero bit test. Only difference is what was done in the CCC is now done in the CCA. The CCC simply passes down a constant color, R=255, G=0, B=255.

TD_RNDCH.EXE

The td_rndch test program is designed to test the chromakey functionality in the VTA. The test utilizes four command line switches to allow the user to choose what aspect to test. A list of the switches can be obtained by running td_rndch −o. This will dump the description of switches into the local dbgfile. The following table is a listing of the available options and rationale behind them.

TABLE 54 size - This switch defines the size of the test square. The test is written in clip coords so the screen goes from (−1.0f, −1.0f) to (1.0f, 1.0f).
Default value: 0.25f
seed - This switch is an integer used as the randomization seed.
Default value: 1234567890
numtests - This switch defines how many tests to cycle through. Basically, the test will set up a random state (as explained below) and draw a test square. This variable simply stipulates how many states to form and consequently how many test squares to draw.
Default value: 100
pd - This variable is to define what percentage of tests have chroma disabled.
Default value: 10
pct - This variable is to define what percentage of tests should be chroma texture tests vs. regular chroma.
Default value: 50

The test will draw a number of test squares on the screen, after randomly setting up texchroma or regular chroma states. The probability of selecting texchroma mode is defined using the pct switch, as described above.

If texchroma is chosen, a random texture (out of eight preselected) is loaded into TMU 0. Then two random colors are selected to provide the chroma range settings. Additionally two other random numbers are selected. The first is a random number between 0 and 15 inclusive. This number is the range mode in which texchroma will function. Each of the RGB color components can be chosen to be inclusive or exclusive plus the chroma-range block can be the intersection of the rgb colors, or the union of the three colors. Inclusive means that color components within the range are prohibited, while exclusive prohibits color components outside the range. The intersection mode will prohibit colors only if each of the RGB factors is prohibited. The union mode will prohibit a color if any of the RGB factors are prohibited. The second random number is between 0 and 3 inclusive. Zero corresponds to chroma disabled for the test. The percentage of tests utilizing a disabled chroma is determined by the switch pd. This number will provide the key mode. 0 disables chroma, 1 performs traditional chroma, 2 chroma replace, and 3 percentage passed. Once this mode is set, the test square is drawn. Once it is drawn, the buffer is cleared and once again, randomly it is decided to try texture chroma or regular chroma.

If regular chroma is chosen, the test square will be gouraud shaded using the random rgb values defined at each vertex of the test square. Once again two random colors are chosen to provide the chroma range settings and two random numbers to define the range mode and key mode. The procedure is the same as above except this time the key mode is chosen to be between 0 and 2 inclusive. 0 will disable chroma, 1 enables chroma key, and 2 enables chroma range. Zero corresponds to chroma disabled for the test. The percentage of tests utilizing a disabled chroma is determined by the switch pd. The test square is then drawn, and a buffer clear is performed.

TD_ACC.EXE

The td_acc test program is designed to test the accumulator functionality in the VTA. The test utilizes two command line switches to allow the user to choose what aspect to test. A list of the switches can be obtained by running td_acc –o. This will dump the description of switches into the local dbgfile. The table below is a listing of the available options and rationale behind them.

TABLE 55 size - This switch defines the size of the test square. The test is written in clip coords so the screen goes from (–1.0f, –1.0f) to (1.0f, 1.0f).
Default value: 0.25f
test - This switch is a string telling the program which tests to run. The choice follow
Default value: ""

The test will draw a number of test squares on the screen following the design of the following tests.

TABLE 56

A) ADD BEFORE LOAD
   This test simply attempts to pop the acc before pushing it.
b) Load, Load, Add
   This test pushes twice, then pops the acc.
C) LOAD, ADD, ADD
   This test pushes, then pops twice.
d) Load and Add Simultaneously
   This test pushes and pops simultaneously. (Thus the pop will be undefined.)
e) Load, Shift, Add
   This test pushes ctex onto the acc. It then uses acc_shift and shifts over 0, 1, 2, 3 bits, then pops and displays.
f) Load, Shift
   This test pushes ctex onto the acc, uses acc_shift to shift over 0, 1, 2, 3 bits, and then display ctex without popping.
g) Load with OB, Add
   This test shifts ctex into the ob using tex_shift with 0, 1, 2, 3 bits. It then pushes this onto the acc, and then pops it.
h) Load, Add and Load Simultaneously
   This test pushes onto the acc. It then pops this value while loading a value at the same time. Then pops this final value.
i) Using ACC_SHIFT to average Sum of Textures
   This test spreads the same texture across each tmu. Then it cycles through using 1, 2, 4, or 8 tmus. With 1, it shifts the texture over by 0
   bits pushes it, pops it, displays. For 2 tmus, it pushes texture onto tmu, pops it and adds it with the same texture (thus = 2*texture) and pushes this value. It then does an acc_shift
   over 1 bit, pops it, and this should be almost identical to just ctex. Likewise for 4 and 8 tmus.

TD_RNDTR.EXE

The td_rndtr test program is designed to randomly form triangles using different functionality in the VTA. The test utilizes a number of command line switches to better focus the random stages. A list of the switches can be obtained by running td_rndtr o. This will dump the description of switches into the local dbgfile. The following table is a listing of the switches in more depth.

TABLE 57

Frames - This switch just tells how many frames of the test to run.
Default value: 1
Tri - This switch tells how many triangles to draw each frame.
Default value: 125
Small - This switch defines the maximum side length of a small triangle. The test is written in clip coords so the screen goes from (–1.0f, –1.0f) to (1.0f, 1.0f).
Default value: 0.1f
Med - This switch defines the maximum side length of a medium triangle.
Default value: 0.5f
Large - This switch defines the maximum side length of a large triangle.
Default value: 0.75f
Seed - This switch is an integer used as the randomization seed.
Default value: 1234567890
Change - This switch simply gives the probability of the test switching modes. Td_rndtr will run in three modes: texture combine, gouraud shading, or a combination of the two. Once it has entered a certain mode, it has a certain probability of changing modes given by this switch.
Default value: 40
Alpha - This switch just defines whether the test should use alpha blending
or not.
Default value: FXFALSE
Zbuffer - This switch just defines whether the test should use z buffering or not.
Default value: FXFALSE
Mintmu - This switch sets the minimum number of tmus to use.
Default value: 1
Maxtmu - This switch sets the maximum number of tmus to use.
Default value: 8
Tgc - This switch sets the probability of entering the texture, gouraud, or combo states. This data is recorded in the following fashion: ?ttggg. For example 30% texture, 40% gouraud, 30% combo would be 30040. 100% gouraud is just 100.
Default value: 33033 (33% texture, 33% gouraud, 34% combo)
Sml - This switch sets the probability of having a small, medium, or large triangle. This data is recorded in the following fashion: ?ssmmm. For example 10% small, 0% medium, 90% large would be 10000. 40% medium, 60% large is just 40.
Default value: 33033 (33% small, 33% medium, 34% large)
Aa - This switch just defines whether the test should use anti-aliasing when drawing triangles.
Default value: FXFALSE
Ob - This switch just defines whether the test should allow over-bright colors when drawing triangles.
Default value: FXFALSE To invoke a switch run randtri –xswitch:value, for example:

randtri –xaa –xtri:1000–xsml:70010 will run randtri with anti-aliasing creating 100 triangles with 70% small triangles, 10% medium triangles and 20% large triangles.

TD_RNDVT.EXE

The td_rndvt test program is designed to randomly form triangles using random states in the VTA. The test has been written to ensure that all states are legal, e.g. no accumulator pops before pushes etc. The test utilizes a number of command line switches to better focus the random stages. A list of the switches can be obtained by running td_rndvt o. This will dump the description of switches into the local dbgfile. Here is a listing of the switches in more depth.

Frames—This switch just tells how many frames of the test to run.
  Default value: 1

Tri—This switch tells how many triangles to draw each frame.
Default value: 125
Ob—This switch will allow iterated colors into overbright range.
Default value: FXFALSE
sml—This switch sets the probability of having a small, medium, or large triangle. This data is recorded in the following fashion: ?ssmmm. For example 10% small, 0% medium, 90% large would be 10000. 40% medium, 60% large is just 40.
Default value: 33033 (33% small, 33% medium, 34% large)
roc—This switch simply gives the probability of the test switching number of TMUs utilized. Td_rndvt will run with a random number of TMUs, but will change this number with probability roc.
Default value: 10
seed—This switch is an integer used as the randomization seed.
Default value: 1234567890
small—This switch defines the maximum side length of a small triangle in pixels.
Default value: 200.0f
med—This switch defines the maximum side length of a medium triangle in pixels.
Default value: 200.0f
large—This switch defines the maximum side length of a large triangle in pixels.
Default value: 500.0f
vis—This switch attempts to ensure that the information makes more visual sense. It will only place color values on the TCC and CCC (i.e. no alpha values) and make sure that C is not CZERO.
Default value: FXFALSE
To invoke a switch run randvta -xswitch:value, for example:
randvta -xob -xtri:1000-xsml:70010
will run randvta with over-bright evaluated (i.e. iterated) colors creating 100 triangles with 70% small triangles, 10% medium triangles and 20% large triangles.
ANICUBE.EXE
The anicube test simply draws a cube on the screen, placing a different texture on each of the six faces. It then proceeds to rotate the cube along each of the three axes. A frame swap occurs between each iteration, allowing for the images to be saved and animated. The program has a few constants of interest defined at the beginning. These are listed in the following table.

TABLE 58

NUM_FRAMES: How many frames of animation to produce
TOTAL_DEGREES: How many degrees in the x, y, and z direction the cube should rotate.

The functions being tested include basic multi texture in 3D and rotations. This is a good primitive to use to look for artifacts in animation.
ANISQU. EXE
The anisqu test draws a simple square on the screen, layering a single texture a given number of times, scaling by an appropriate scale factor so that at the end it should produce the original texture. In other words, one could specify to layer the texture 4 times, and the program would scale the texture by ¼ at each TMU, and then add the four results. This program repeats this process while rotating the square, producing an animated sequence. It too has some interesting constants defined at the beginning of the file, as shown in the following table:

TABLE 59

NUM_ITER - total number of TMUs.
NUM_LAYERS - total number of times the texture should be layered
NUM_FRAMES - total number of frames for the animation
NUM_DEGREES - total number of degrees the square should be rotated.

The functions being tested include loss of precision in multiple texture layers and the resulting effect on animated sequences.
OB. EXE
The ob test tests basic over bright attributes. It takes a texture of Buzz Lightyear and multiplies it with a light texture, with 5 lights: one red, one blue, one green, and two white. It then shifts the light texture by one bit into the overbright region and displays a new image. On the third pass it shifts by two bits, on the fourth three, and the fifth four bits. As the values get larger, more and more of the image gets washed away.
The functions being tested include multiplicative over bright characteristics.
TD_OBCLP. EXE
Td_obclp is almost identical to ob, but the value of the light texture is clamped immediately following the shift into overbright so that the resulting image is never washed out. This tests the clamp functionality at the base of the CCU.
The functions being tested include the clamp function at the base of the CCU.
OBADD. EXE
Obadd is also almost identical to ob. However, instead of multiplying the light texture and the buzz texture, the two are added together. Before being added together however, the light texture is multiplied by ½ so that the white doesn't immediately wash out the buzz texture.
The functions being tested include additive over bright characteristics.
OBMTEX. EXE
The obmtex is another overbright test. It takes a single texture, layers it eight times on a square (one on top of another) taking it into the over bright region, then scales it down by ⅛. Thus, the final product should be near identical to the original texture mapped once. Constants of interest are set forth in the following table.

TABLE 60

NUM_ITER - number of time to lay the texture down.
NUM_FRAMES - number of frames for animation
TOTAL_DEGREES - number of degrees to rotate the square through the animation
NUM_TEXTURES - number of textures to load.

The functions being tested include loss of precision in layering textures and the resulting effect on animation. Also tested is shifting into overbright through purely additive methods.
INVTEX. EXE.
The invtex test tests the functionality of the various (1−x) operations on the a, b, c, and d channels in the TCU. It draws a single texture on a square, but goes through 3 TMUs. The first TMU performs a (1+x) operation on the input texture color. The second performs a (1−x) on the previous TCU color. The final performs a (−x) operation on the previous TCU color. This provides −(1−(1+x))=−1+(1+x)=x. Thus, the same image is generated as if the texture were laid directly on a square. This test runs through 4 cycles, each cycle testing one of a, b, c, or d.

The functions being tested include the (1+x) functions on the TCU.

MINMAX. EXE

Minmax simply tests the functionality of the (a<b)?c:d function of each TMU. It uses a rainbow gradient texture to lay down on a square. However, before placing the texture values on the square, it compares it with a constant gray 00808080. Thus, if this function operates properly, no rgb value should be higher than 128. A simple modification allows the user to choose whether to test the function in the TCU or the CCU.

The functions being tested include the (a<b)?c:d functions on the TMU.

MGOUR.EXE

This test sets up a random number of tmus and draws random triangles on the screen utilizing only gouraud shading. It has a few command line switches, which are listed in the following table.

TABLE 61

| | |
|---|---|
| max: | sets the maximum side length of a triangle from vertex a |
| seed: | sets the randomization seed |
| frames: | number of frames to produce |
| tri: | number of triangle per frame |
| ob: | allow the shading to go into over bright. |

The functions being tested include multiple iteration color combine.

3×3. EXE

This test creates a 3×3 set of images on the screen. The first row is composed of three squares with their centers cut out. The first square utilizes color shading, the second has a texture mapped onto it, and the third has sections of constant color. These three boxes rotate around the z-axis. The first object in the second row is a diamond, actually two triangles with a ½ pixel space in between them. The next two objects are the same type of squares as above (with sections of constant color) but one square lies behind the other, and is at an angle with its top left corner sticking out. The diamond rotates on the z-axis while the middle square stays still and the third square rotates around the y-axis. This causes some interesting intersections to take place. The third row is a repeat of the first row, but has some changes in the alpha values. The first square has its alpha value go from 0 to 255 from left to right, the second from top to bottom, and the third from top left to bottom left. On the top and left side of this screen setup, two long, skinny triangles are drawn. These rotate towards each other on the z-axis. These triangles will intersect with some of the other images produced. Constants of interest are set forth in the following table.

TABLE 62

NUM_FRAMES - Number of frames of animation to produce.
NUM_DEGREES - Number of degrees to rotate objects.

The functions being tested include texture compression and anti-aliasing performance.

PICKET. EXE

The picket test draws a square on the screen, one line at time, skipping spaces in between, and placing a texture the face. It then procee ds to rotate the square along the z-axis. A frame swap occurs between each iteration, allowing for the images to be saved and animated. The program has a few constants of interest defined at the beginning. These are listed below:

TABLE 63

NUM_FRAMES: How many frames of animation to produce
TOTAL_DEGREES: How many degrees in the z direction the cube should rotate.
RUNG_WIDTH: Width in pixels of each rung in the picket fence
RUNG_HEIGHT: Height in pixels of each rung in the picket fence
NUM_RUNGS: Number of rungs on the picket fence
GAP_HEIGHT: Height in pixels of the gap between rungs
GAP_INCREASE: Number of pixels to increase GAP_HEIGHT by in between each rung The functions being tested include effects of anti-aliasing between small spaces.

Note that other tests that are used to provide fault coverage for functions that may not be able to be tested with the CSIM diagnostics can also be provided, including verilog tests.

Software Programming Model

This section details how software can program the VTA, giving specific cases. The following paragraphs describe how to use the VTA to perform new rendering algorithms.

Textures for specular and diffuse lighting can be divided into three types: Material Textures, Lightmaps, and Shadows. Material textures describe the surface; they can include diffuse properties, specular properties, and bumps. Lightmaps include specular and diffuse lighting, along with reflection maps and projection maps. Shadow maps are used to attenuate light maps.

Specular and diffuse lighting can be done by Creating a specular light reflection map, a Diffuse lightmap, and specular and diffuse material maps. Lighting can optionally be done in the iterator. The Output equations are then:

Color=(Specular light)*(Specular material)+(Diffuse Light)*(Diffuse Material),

The accumulator at the output of the color combine unit is used for the add.

Alternatively, if the Alpha of the texture isn't needed, it can be used as the specular component, multiplying the alpha by a specular lightmap, and rgb against a diffuse lightmap, and then adding the result together.

The following paragraphs describe methods for constructing lighting maps using VIDDEV hardware instead of requiring host computations. This could lead to more interactive lighting in applications.

In this description, lighting maps are built using the rendering hardware, texture maps that model the light source, and shadow maps that model the occlusion. Later, the lighting maps are applied to the polygons during the rendering of the scene. When lighting maps are built, they are rendered into the frame buffer with a constant Z distance across the lighting map.

The first case discusses using projected textures to build lighting maps with distance/angle attenuation. If a projected texture that models the light source (point light source has all texels at the same intensity is built, spotlights have a fall-off at the edges, etc. Then the light can be projected onto the lighting map. The only problem with doing this is that distance and angle attenuation isn't taken into account.

The light source attenuation is proportional to the square of the distance, and also related on the angle of the light rays. Basically the equations give the number of photons that hit a given area of the light map. Another way of looking at this, is the intensity of the Light is proportional to the area of the projected texture that each pixel takes up. For Anisotropic texturing, the texel space area of each pixel is already calculated. If the filtered texel is multiplied by the area, the distance attenuated light is generated.

FIG. 209 illustrates a model 20900 for building light maps using projected textures. In FIG. 209, the "Projected" light source 20902 models the way the light looks. For a point light source 20904, the Projected light source can be a small (1-pixel) texture with a uniform color in every pixel. The rendering hardware is used to render each lightmap separately, then use the lightmaps when rendering the scene. The light source texture is projected onto the framebuffer using standard projected texture techniques, the only difference being that the filtered texel value is multiplied by the area the pixel takes up in texture space.

For real projected textures however, the light value is multiplied by the area of the pixel in projected texture space, and then the area of the pixel is divided by the surface texture space. This gives the area of the texture in lightmap space.

The following paragraphs describe using backward texturing to apply shadow maps while generating light maps. This method of generating shadows has many advantages. It adds the shadow attenuation into the lighting map, rendering shadows at lower resolution than if applied to the final scene. Also, if objects and lights aren't moving (just the viewpoint), then the same lighting map can be used over many scenes. Also as lights move, their old position can be subtracted from the map, and the new position added, removing the need to re-render the entire map when one thing moves.

The following discussion describes a way to map an algorithm into VIDDEV hardware, accelerating the construction of lightmaps. FIG. 210 illustrates a model 21000 for building shadows.

First, a shadow map 21002 is created by rendering the scene (light maps only) from the point of view of the light source 21004. Instead of rendering color, each light map's ID # is rendered instead of color. This texture is point sampled. Note: When rendering the lightmaps in light source space, the coordinates of the lightmaps in light source space can be saved offline, as they will be useful in the next step.

FIG. 211 depicts a model 21100 for determining occlusion using shadow. When building the lightmaps, the shadow map is transformed into lightmap space, and texture mapped onto the surface. In this case, the filter compares the lightmap's ID against the value in the shadow map.

If they're equal, then a 1 is generated. If not, a zero is generated. A percentage-passed filter is used on neighboring texels to produce an attenuation value. This attenuation value is multiplied by the projected light source's value to produce the light's contribution to the lightmap.

Transforming the shadowmap to lightmap space is very easy. The coordinates of the transformed lightmaps from rendering in light source space are the S,T, and W in the lightmaps space. So the transform is re-using the coordinates saved in the previous step.

Since an identity compare is performed during lightmap reconstruction, the shadow map can be point sampled to prevent artifacts. This is one of many cases where multiple virtual TMUs can perform a function that's very difficult with multi-pass.

One problem with the current approach (and also the traditional approach) is that convex polygon intersection can cause problems. For instance, in the above figure, the area of the lightmap that's off the surface 104, and/or under surface 105 (see FIG. 210) will be detected as "in shadow". This can cause the filtering of the shadow mask to create a dark spot in this corner. Also, when the bilinear filter is used, the dark spots behind the may also cause the corner to get darker. To avoid this, convex abutting lightmaps are given the same ID#. Then during the compare, the off-and near-off polygon texels will be lit correctly.

As an illustration, the following paragraphs discuss generating a scene with a box and a corner, with two light sources. In the present description, the same cross section of each image is discussed. FIG. 212 shows a model 21200 for simple lightmap generation. In FIG. 212, the box 21202 is defined by surfaces 21204, 21206, 21208, and 21210, and the corner by surfaces 21212 and 21214. One light 21216 is close to the objects, and another light 17918 at infinity.

FIG. 213 is an illustration of a model 21300 for generating a shadow map. First the shadowmaps are rendered from the viewpoint of each light source (see FIG. 213). From Light 21216, the Left side of the wall is visible, followed by two sides of the box, followed by the right wall. From Light Two, it is the Left Wall, part of the Right wall, one side of the box (21206) and the right wall. As mentioned before, the XYZ coordinates for all triangles, transformed into lightsource space, are saved for a later step.

Since the right and left walls attach at a concave angle, they will both be given the same texture ID (21302 for reference). In cases where a lightsource illuminates the corner, this will be important. It's not important for this example, however. Second, each lightmap is constructed by rendering each light source texture through the shadow map.

Specular lighting and reflection maps can be used with the shadow maps during scene rendering (instead of lightmap rendering). Here, the Specular or reflection map is projected onto the surface as normal. Simultaneously with this, the shadow map for the light is projected on the surface from the light source, and used to generate the value used to attenuate the specular light.

Overbrightening is generated by making the output of the filter into a floating point number with a 3-bit exponent. This is done by effectively changing the output of the texture unit to a 3.8 floating point value, where the 3-bit exponent is set to zero. It is then multiplied or added to by floats in the TCU. The float can come from a constant register, a previous texture, or from the area calculation done upstream.

Bump Mapping uses recursive texturing, and reflection mapped textures: The bump map contains two components per texel: A deltaS component and a deltaT component. These components indicate how far the reflection vector is displaced from this surface. The deltaS and deltaT values are filtered normally, then a 2×2 transform is performed, scaling and rotating these coordinates. The coordinates are then converted into floating point numbers, and these numbers are added to the S and T values that come out of the multiply by W circuit. This disturbs the S and T coordinates of the reflection map (which can be used for Phone lighting). The 2×2 pixel quad of Ss and Ts will have been disturbed before the LOD calculation, so the LOD will take into account the bumpiness of the surface when choosing a mipmap level.

FIG. 214 is a drawing 21400 that describes how reflection mapping works. A reflection map 21402 is created, which describes how the world looks from the reflective object. As a triangle is rendered, coordinates in the reflection map are mapped to the vertices of the triangle, based on the reflection from reflection map to the eye. The triangle is then rendered like a regular texture map.

One deviation of the approach is to replace the reflection map with a "specular reflection map", which describes the specular lighting behavior and placement. Then when the reflection mapping operation is performed, the object looks like it was phong shaded for free.

FIG. 215 shows a model 21500 for bump mapping. Bump mapping is basically perturbing the normals used during phong shading. This maps easily into perturbing the S and T coordinates of the reflection map. So for our version of bump mapping, a bump map texel is filtered, which contains displacement values for the reflection map (2 components). These displacement values are then scaled and rotated (a 2×2 transform) and then added to the Per-Pixel S and T coordinates (before Mip-mapping).

One advantage of this approach is if instead of using a specular reflection map for the lighting surface, a true reflection map is used, effects like rippling water, diffraction through irregular glass, etc. can be easily generated.

The following paragraphs describe anisotropic LOD calculation. FIG. 216 illustrates a model 21600 for mapping pixels 21602 in texture space. FIG. 217 shows a model 21700 for mapping pixels into texture space for anisotropic texturing. With Anisotropic texturing, the pixel is mapped into a quad in texture space. The direction of the major axis in the quad is referred to as the "line of anisotropy". The length of the area of the quad divided by the length of the line of anisotropy is the LOD. The slope of the line needs to be calculated, and the ratio of the major and minor sides of the rectangle is the "anisotropic ratio".

Once the anisotropic line's slope (dC/dT, dC/dS), Anisotropic ratio, and LOD are calculated, the line of anisotropy is walked on the two mip levels that straddle the LOD. Starting at the center, the first two texel addresses are generated by adding half the slope in both directions. Two more texels are generated from there by moving outward from the first two texel addresses by the anisotropic slope. The number of texel addresses generated per mip level is equal to the next largest even number greater than the anisotropic ratio. For each of these Texel addresses, a Bilinear interpolate is performed. FIG. 120 illustrates a model 12000 for bilinear interpolations across the line of anisotropy. The result is then scaled and added to previous results.

All bilerp values are scaled by the same amount, except for the endpoint values

The equations used are:

Anisotropic line=Max ($dTex/dX$, $dTex/dY$)

LOD=min($dTex/dX$, $dTex/dY$)

AniRatio=AniLine/LOD

As shown in FIG. 46, the distance walked along the line of anisotropy is the same on both LODs 4602, 4604. This is because the real line of anisotropy is actually between these two rectangles, with the same aspect ratio.

For Anisotropic ratios less than two, the weighting factor of both bilerps is 12, and the sample points move towards the center of the pixel, shrinking the rectangle along the line of anisotropy.

FIG. 220 illustrates a model 22000 for mapping pixels into texture space for anisotropic texturing for a 2×3 quad. Since the anisotropic filter quads mesh perfectly (almost) in texture space, the area of the anisotropic filter quad is equivalent to the area of the quad defined by the four pixel centers.

More accurately, the area of anisotropy is equal to the determinant for each vector pair.

The following paragraphs describe trilinear LOD calculation. FIG. 221 illustrates a model 22100 for generating four pixels/2clk. Generating 4 Pixels/2clk, the equation for generation LOD is much simpler than VIDDEV, since dS/dX, dT/dX, dS/dY. dT/dY can be computed by simple subtracts. The deltas are then used to generate distances between pixels in the X and Y direction (by the root/sum of squares, and the larger of the two directions (dTex/dX and dTex/dY) is used. The log is taken and used as the LOD. This finds the best-fit square that the pixel fits into.

The following paragraphs describe how the VTA can be programmed to perform multiple textures per pixel.

Assume that it is desired to paint a triangle with:

A bump Map

A reflection Map (disturbed by bump map)

A specular surface map

A diffuse light map

A diffuse surface map

No evaluated (i.e. iterated) colors

For this example, assume all maps are trilinearly filtered. The equation to use is:

Output=(diffuseSurface($ST0$))*(diffuseLight($ST0$))+(specular Surface($ST0$))*(reflectionMap($ST1$+bumpMap($ST0$)))

All maps except the reflection map are associated with the surface, so they all use the same ST coordinates (ST0). The bump map's output is used to disturb the reflection map's coordinates, which are based on the viewer's eye point. The reflection map is multiplied by the specular surface map, generating the specular portion of the shading algorithm. A diffuse surface and a diffuse lightmap are multiplied together, and then the specular and diffuse components are added together. FIG. 222 is a table 22200 illustrating values that can be used when processing multiple textures per pixel.

For generating bump maps, the first TCU performs trilinear processing. The second TCU output is provided using the following equation:

Out={$S*C[31:24]$, $S*C[23:16]$, $T*C[15:8]$, $T*C[7:0]$}; ($T$local–($T$local*(1–Const))=$T$local*Const//Multiply part of 2×2 transform.

The CCU output is generated using the following equation:

Out[31:24]=$T$local[31:24]+$T$local[23:16]. Out[16:0]=$T$local [15:8]+$T$local [7:0]//summing part of transform While various embodiments have been described above, it should be understood that they have been presented by way of example only, and not limitation. Therefore, the breadth and scope of a preferred embodiment should not be limited by any of the above-described exemplary embodiments, but should be defined only in accordance with the following claims and their equivalents.

What is claimed is:

1. A graphics processing system, comprising:

(a) a front end module for receiving pixel data;

(b) a setup unit coupled to the front end module and adapted for generating parameter coefficients;

(c) a raster unit coupled to the setup unit and adapted for generating stepping information;

(d) a virtual texturing array engine adapted for texturing and coloring the pixel data based on the parameter coefficients and the stepping information, the virtual texturing array engine further for:

retrieving texture information utilizing texture coordinates, utilizing the texture information to generate results, and utilizing the texture information and the results to generate further results by determining which of a first technique and a second technique is to be employed,
wherein the first technique includes utilizing the results to modify the texture coordinates and the second technique includes utilizing the texture information to generate the further results which are modified based at least in part on the results; and (e) a pixel engine adapted for processing the textured and colored pixel data received from the virtual texturing array engine.

2. The graphics processing system as set forth in claim 1, wherein the virtual texturing array engine includes a dispatcher unit for assembling pixel packets.

3. The graphics processing system as set forth in claim 1, wherein the virtual texturing array engine includes a ST generator for generating perspective correct S and T addresses.

4. The graphics processing system as set forth in claim 1, wherein the virtual texturing array engine includes a level-of-detail unit for generating a level-of-detail.

5. The graphics processing system as set forth in claim 1, wherein the virtual texturing array engine includes a kernel walker for generating neighborhoods of S and T addresses.

6. The graphics processing system as set forth in claim 5, wherein the virtual texturing array engine includes a filter for filtering the neighborhoods of S and T addresses.

7. The graphics processing system as set forth in claim 1, wherein the virtual texturing array engine includes an address unit for converting texture requests to physical addresses.

8. The graphics processing system as set forth in claim 1, wherein the virtual texturing array engine includes a data unit for converting raw texture data to color data.

9. The graphics processing system as set forth in claim 1, wherein the virtual texturing array engine includes a combine unit for performing texture and color combine operations to generate output.

10. The graphics processing system as set forth in claim 9, wherein the virtual texturing array engine includes an accumulate unit for performing an operation on the output of the combine unit selected from the group consisting of capturing, accumulation, and bypassing.

11. The graphics processing system as set forth in claim 1, wherein the virtual texturing array engine includes a side band module for delivering a mode state to the graphics processing system.

12. The graphics processing system as set forth in claim 1, wherein the virtual texturing array engine includes a dispatcher unit, a ST generator, a level-of-detail unit, a kernel walker, a filter, an address unit, a data unit, a combine unit, an accumulate unit, and a side band module.

13. The graphics processing system as set forth in claim 1, wherein the virtual texturing array engine includes a plurality of components selected from the group consisting of a dispatcher unit, a ST generator, a level-of-detail unit, a kernel walker, a filter, an address unit, a data unit, a combine unit, an accumulate unit, and a side band module.

14. The graphics processing system as set forth in claim 1, wherein the virtual texturing array engine includes a dispatcher unit, a ST generator coupled to the dispatcher unit, a level-of-detail unit coupled to the ST generator, a kernel walker coupled to the level-of-detail unit, an address unit coupled to the kernel walker, a cache coupled to the address unit, a filter unit coupled to the cache, a combine unit coupled to the filter unit, an accumulate unit coupled to the combine unit, and a side band module coupled to the dispatcher unit, the ST generator, the level-of-detail unit, the kernel walker, the cache, the filter unit, the address unit, the combine unit, and the accumulate unit.

15. The graphics processing system as set forth in claim 1, wherein the virtual texturing array engine includes a recursion first-in-first-out (FIFO) memory.

16. The graphics processing system as set forth in claim 1, wherein the virtual texturing array engine includes a recursion first-in-first-out (FIFO) memory for providing recursion feedback while texturing and coloring the pixel data.

17. A graphics processing method, comprising:
receiving pixel data utilizing a front end module;
generating parameter coefficients utilizing a setup unit coupled to the front end module;
generating stepping information utilizing a raster unit coupled to the setup unit;
texturing and coloring the pixel data based on the parameter coefficients and the stepping information utilizing a virtual texturing array engine, the virtual texturing array engine further for:
(a) retrieving texture information utilizing texture coordinates,
(b) utilizing the texture information to generate results, and
(c) utilizing the texture information and the results to generate further results by determining which of a first technique and a second technique is to be employed, wherein the first technique includes utilizing the results to modify the texture coordinates and the second technique includes utilizing the texture information to generate the further results which are modified based at least in part on the results; and
processing the textured and colored pixel data received from the virtual texturing array engine utilizing a pixel engine.

18. The method as set forth in claim 17, wherein the modification involves a mathematical function.

19. The method as set forth in claim 17, wherein the second technique includes combining partial results from multiple texture fetches using a mathematical function selected from the group consisting of a replacement, a multiplication, an addition, and a dot product.

20. The method as set forth in claim 17, wherein a multiplexer is utilized to input the results and the texture coordinates.

21. A graphics processing system, comprising:
means for receiving pixel data;
means for generating parameter coefficients;
means for generating stepping information;
virtual texturing array means for texturing and coloring the pixel data based on the parameter coefficients and the stepping information, the virtual texturing array means further for:
(a) retrieving texture information utilizing texture coordinates.
(b) utilizing the texture information to generate results, and
(c) utilizing the texture information and the results to generate further results by determining which of a first technique and a second technique is to be employed, wherein the first technique includes utilizing the results to modify the texture coordinates and the second technique includes utilizing the texture information to generate the further results which are modified based at least in part on the results; and
means for processing the textured and colored pixel data.

* * * * *

UNITED STATES PATENT AND TRADEMARK OFFICE
CERTIFICATE OF CORRECTION

PATENT NO. : 6,778,181 B1  
APPLICATION NO. : 10/012895  
DATED : August 17, 2004  
INVENTOR(S) : Kilgariff et al.

Page 1 of 1

It is certified that error appears in the above-identified patent and that said Letters Patent is hereby corrected as shown below:

In the Claims:
Claim 4 col. 105, line 4 replace "emploved," with --employed,--;
Claim 21 col. 106, line 53 replace "coordinates." with --coordinates,--.

Signed and Sealed this

Ninth Day of February, 2010

David J. Kappos
*Director of the United States Patent and Trademark Office*